(12) United States Patent
Gibson et al.

(10) Patent No.: US 11,383,312 B2
(45) Date of Patent: Jul. 12, 2022

(54) ADAPTIVE CUTTING SYSTEM

(71) Applicant: Kreg Enterprises, Inc., Huxley, IA (US)

(72) Inventors: Joseph W. Gibson, Polk City, IA (US); Doyle R. Ramsey, Des Moines, IA (US); Shelby Lee Strempke, Kelley, IA (US); Nathan Scott Combs, Slater, IA (US); Neil M. Holland, Slater, IA (US); Elliot James Hoff, Ames, IA (US); Timothy J. Forbes, Ankeny, IA (US); Allen F. Raushel, Johnston, IA (US); Jacob Martin, Urbandale, IA (US); Casey L. Kerkmann, Bondurant, IA (US); Stacy A. Peterson, Ames, IA (US); Christian D. Ewoldt, Ankeny, IA (US); Michael P. Marusiak, Ankeny, IA (US); Mark David McClellan, Prairie City, IA (US); Frederick J. Good, Ogden, IA (US); Scott Clark, Boone, IA (US); Edward Charles Hay, Dubuque, IA (US)

(73) Assignee: KREG ENTERPRISES, INC., Ankeny, IA (US)

(*) Notice: Subject to any disclaimer, the term of this patent is extended or adjusted under 35 U.S.C. 154(b) by 0 days.

(21) Appl. No.: 17/127,318

(22) Filed: Dec. 18, 2020

(65) Prior Publication Data

US 2021/0138566 A1    May 13, 2021

Related U.S. Application Data

(63) Continuation of application No. 16/398,412, filed on Apr. 30, 2019, now Pat. No. 10,875,109.

(Continued)

(51) Int. Cl.
*B23D 47/02* (2006.01)
*B27B 27/02* (2006.01)

(52) U.S. Cl.
CPC ............ *B23D 47/025* (2013.01); *B27B 27/02* (2013.01); *Y10T 83/68* (2015.04)

(58) Field of Classification Search
CPC ... Y10T 83/773; Y10T 83/7593; Y10T 83/76; Y10T 83/7607; Y10T 83/7613;
(Continued)

(56) References Cited

U.S. PATENT DOCUMENTS 3,527,131 A * 9/1970 Ellerin .................. B26F 1/3853
83/522.19
3,734,151 A * 5/1973 Skripsky ............ B23D 57/0092
144/286.5

(Continued)

*Primary Examiner* — Phong H Nguyen
(74) *Attorney, Agent, or Firm* — Christopher A. Proskey; BrownWinick Law Firm

(57) ABSTRACT

An adaptive cutting system is presented that facilitates cutting workpieces in new and different ways in a fun, easy, fast, accurate and safe manner. The system includes a benchtop having a grid of bench dog holes across its surface as well as a pair of table tracks embedded within its surface. An edge track extends around the benchtop and a pair of hinge members are connected to the edge tracks that also connect to a saw track that is movable between a raised and lowered position. The system also includes narrow rip stops, wide rip stops, bench dogs and a miter gauge all of which work in concert with the on-table features to facilitate on-table measurement and alignment of workpieces for performing cutting operations.

39 Claims, 103 Drawing Sheets

Related U.S. Application Data

(60) Provisional application No. 62/664,460, filed on Apr. 30, 2018.

(58) Field of Classification Search
CPC .............. Y10T 83/762; Y10T 83/7627; Y10T 83/7647; Y10T 83/68; Y10T 83/687; Y10T 83/849; Y10T 83/853; Y10T 83/855; Y10T 83/857; Y10T 83/858; Y10T 83/8821; Y10T 83/8822; Y10T 83/821; Y10T 83/8887; Y10T 83/8889; B23D 47/025; B23D 47/02; B23D 47/04; B23D 47/06; B23D 47/08; B23D 47/10; B27B 27/02; B27B 27/00; B27B 27/04; B27B 5/16; B27B 5/18; B27B 5/187
USPC .................. 144/286.1, 286.5, 287, 306, 308
See application file for complete search history.

(56) References Cited

U.S. PATENT DOCUMENTS

| | | | | |
|---|---|---|---|---|
| 3,768,357 A * | 10/1973 | McBride | ............... | B26F 1/3853 |
| | | | | 83/438 |
| 4,378,716 A * | 4/1983 | Volk | ..................... | B23D 49/162 |
| | | | | 83/438 |
| 4,693,158 A * | 9/1987 | Price | ..................... | B23Q 16/001 |
| | | | | 144/253.1 |
| 5,768,966 A * | 6/1998 | Duginske | ................ | B27B 25/10 |
| | | | | 144/253.1 |
| 5,901,763 A * | 5/1999 | You | ...................... | B25H 1/0078 |
| | | | | 144/286.5 |
| 2006/0260455 A1* | 11/2006 | Yeghiayan | ............. | B26D 1/185 |
| | | | | 83/455 |

* cited by examiner

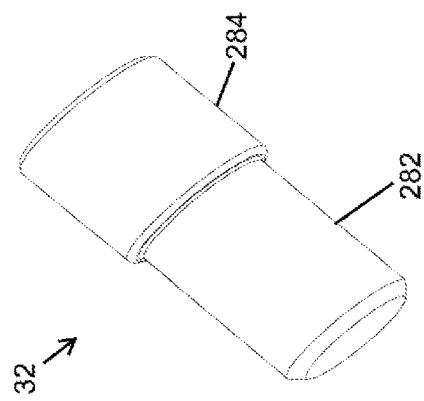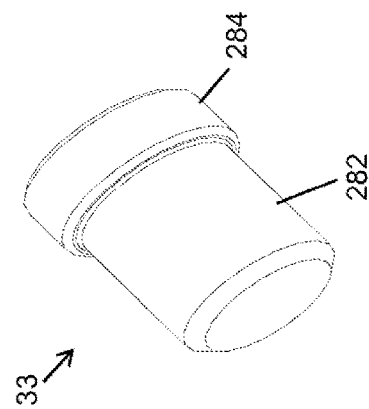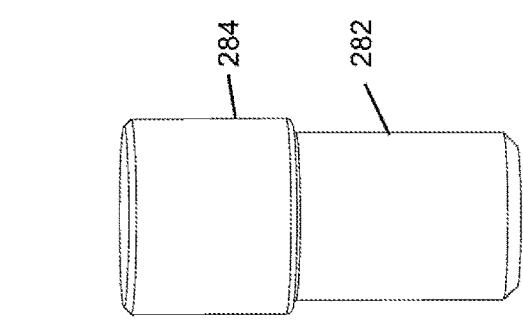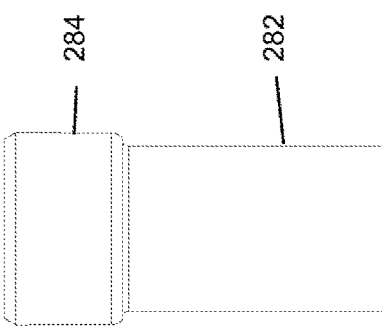

ADAPTIVE CUTTING SYSTEM

CROSS REFERENCE TO RELATED APPLICATIONS

This application is a continuation of U.S. Utility application Ser. No. 16/398,412 which was filed on Apr. 30, 2019, which claims priority to U.S. Provisional Application No. 62/664,460 which was filed on Apr. 30, 2018, the entirety of which is incorporated herein fully by reference.

FIELD OF THE DISCLOSURE

This disclosure relates to a cutting system. More specifically and without limitation, this disclosure relates to a system for cutting wood and other materials in various configurations.

BACKGROUND OF THE DISCLOSURE

A number of systems and devices have been developed for cutting wood and other materials. Common types of cutting systems include: band saws, circular saws, miter saws and table saws. Each of these saw configurations have their own unique benefits as well as their own unique disadvantages and drawbacks.

Band saws are formed of a rotating saw blade that is formed in the shape of a band or continuous loop. This blade is relatively narrow and therefore band saws are tremendously well suited for cutting intricate shapes or features in both large and small pieces of material. While effective in many applications, band saws suffer from many disadvantages.

Namely, band saws are not well suited for making long straight cuts due to the narrow configuration of the blade. In addition, due to the large blade, band saws are generally large in stature which makes them stationary, and not portable, tools limited to use within the confines of a workshop. In addition, band saw blades are generally expensive. Also, band saws generally have a slow through-put. Another disadvantage of band saws is that the blade can be easily moved by grains in the wood due to the flexible nature and narrow width of the blade, which adds inaccuracy to straight cuts. For these reasons, band saws are not well suited or desirable for many cutting operations or many users.

Table saws are generally formed of a rotating blade that that sticks upward from a table top surface. Table saws are generally well suited for making straight cuts in pieces of plank material. While table saws can be used with great precision to make straight cuts, table saws suffer from many disadvantages.

Namely, due to the rotating blade sticking up from the table top surface, table saws have a generally sinister appearance and therefore many users are scared or intimidated by table saws. While some of the bad reputation table saws have is partially fiction, it is true that the exposed blade is very dangerous, especially when used by the novice user. Another disadvantage of table saws is that due to the fact that the blade protrudes from a table-top-like surface, table saws are relatively large, heavy, complicated and expensive devices. Due to their large size, table saws cannot be used in many settings or are not convenient for use in many applications such as on a jobsite as they are not very mobile or easy to set up on-site. Instead, table saws, like band saws, are generally reserved for use within the confines of a workshop.

Yet another disadvantage of table saws is that they have a tendency to kick-back material during cutting.

A kick back occurs when a piece of material binds between the rotating blade and a guide surface or when a workpiece begins to twist or rotate while being cut. This often results in the blade pushing, kicking or throwing the workpiece back toward the user, sometimes in a catastrophic manner. Obviously this can be a very dangerous situation, not to mention a very scary one.

Another disadvantage of table saws is that they can be very difficult to use when cutting large sheets of material because the entire piece of material must be moved, not to mention moved in a manner that prevents binding and kick-back. If the piece of material is not precisely moved it can bind on the blade and kick back. Yet another disadvantage of table saws is that they require a lot of skill and experience to fully utilize the table saw in a safe manner. For these reasons, table saws are not well suited or desirable for many cutting operations or many users.

Circular saws are generally formed of a handheld motor connected to a rotating blade. Circular saws are relatively inexpensive, and unlike table saws, circular saws generally have a blade cover that at least tries to protect the user from the blade when not in use. This blade cover provides at least the appearance of safety which makes many users much more comfortable using a circular saw as opposed to a table saw. Also, due to their small size, circular saws are relatively easy to move and operate. In addition, circular saws are easy to transport and therefore circular saws are well suited for job-site use and are not constrained to use only within a workshop.

While circular saws have many advantages, they also have many disadvantages. Namely, due to their small size it is hard to accurately cut small pieces of material with a circular saw. In addition, it is difficult to make a long and straight cut with circular saws. Another disadvantage to circular saws is that the blade guide often gets into the way when a user is attempting to make a cut, which can cause the cutting operation to be less-safe and can cause the cutting operation to be less accurate. Another disadvantage is because the blade rotates upward through the workpiece circular saws tend to cause a great amount of tear out on the upper-positioned surface of the workpiece that is cut. For these and other reasons, despite their advantages, circular saws suffer from many substantial disadvantages and limitations.

Miter saws are generally formed of a rotating saw blade that vertically pivots on a hinge and plunges toward a base and into and through a workpiece placed on the base. Miter saws are particularly well suited to make perpendicular cuts in smaller width workpieces that may be anywhere from extremely long to extremely short. Miter saws also angularly pivot so as to facilitate a wide range of angular cuts. Miter saws can be used to make highly precise and repeatable cuts. Miter saws are relatively inexpensive, and unlike table saws, miter saws generally have a blade cover that at least tries to protect the user from the blade. Miter saws are relatively portable.

While miter saws have many advantages, they also have many disadvantages. Namely, miter saws cannot be used for cutting through wide and/or thick workpieces. In addition, it is difficult to see exactly where a cut is going to be made on a workpiece prior to making the cut, which leads to inaccurate cuts as well as delay in making the cuts. That is, there is no easily perceptible indication where the cut is going to be made on the workpiece prior to actually performing the cut. For these and other reasons, despite their advantages, miter saws suffer from many substantial disadvantages and limitations.

As such, the prior art cutting systems suffer from many substantial disadvantages including being: unsafe, inaccurate, large, expensive, hard to use, they have limited accuracy, they are hard to guide, and they form low quality cuts, among many other disadvantages.

Therefore, for all the reasons stated above, and the reasons stated below, there is a need in the art for an improved adaptive cutting system that provides functionalities and capabilities never before present in a system.

Thus, it is a primary object of the disclosure to provide a guided circular saw system and method that improves upon the state of the art.

Another object of the disclosure is to provide an adaptive cutting system and method that is safe to use.

Yet another object of the disclosure is to provide an adaptive cutting system and method that is efficient to use.

Another object of the disclosure is to provide an adaptive cutting system and method that is relatively inexpensive.

Yet another object of the disclosure is to provide an adaptive cutting system and method that is capable of making long straight cuts.

Another object of the disclosure is to provide an adaptive cutting system and method that can be used to cut both large and small pieces easily and accurately.

Yet another object of the disclosure is to provide an adaptive cutting system and method that is accurate.

Another object of the disclosure is to provide an adaptive cutting system and method that is efficient.

Yet another object of the disclosure is to provide an adaptive cutting system and method that provides precise alignment.

Another object of the disclosure is to provide an adaptive cutting system and method that can be used with workpieces with a wide range of thicknesses.

Yet another object of the disclosure is to provide an adaptive cutting system and method that is easy to learn how to use.

Another object of the disclosure is to provide an adaptive cutting system and method that is relatively small in size and shape.

Yet another object of the disclosure is to provide an adaptive cutting system and method that provides the benefits of a circular saw and a table saw in a single device.

Another object of the disclosure is to provide an adaptive cutting system and method that holds workpieces in a firm and rigid manner.

Yet another object of the disclosure is to provide an adaptive cutting system and method that is easy to set up.

Another object of the disclosure is to provide an adaptive cutting system and method that is easy to take down.

Yet another object of the disclosure is to provide an adaptive cutting system and method that is formed of a minimum number of parts.

Another object of the disclosure is to provide an adaptive cutting system and method that is simple to use.

Yet another object of the disclosure is to provide an adaptive cutting system and method that is easier to use than prior art systems.

Another object of the disclosure is to provide an adaptive cutting system and method that is unique.

Yet another object of the disclosure is to provide an adaptive cutting system and method that provides new capabilities to existing tools.

Another object of the disclosure is to provide an adaptive cutting system and method that can be used with a replaceable benchtop.

Yet another object of the disclosure is to provide an adaptive cutting system and method that is high quality.

Another object of the disclosure is to provide an adaptive cutting system and method that has a robust design.

Yet another object of the disclosure is to provide an adaptive cutting system and method that has a long useful life.

Another object of the disclosure is to provide a guided circular saw system and method that provides accurate and clean cuts.

Yet another object of the disclosure is to provide an adaptive cutting system and method that helps prevent chip tear-out.

Another object of the disclosure is to provide an adaptive cutting system and method that is durable.

Yet another object of the disclosure is to provide an adaptive cutting system and method that saves time.

Another object of the disclosure is to provide an adaptive cutting system and method that is fun to use.

Yet another object of the disclosure is to provide an adaptive cutting system and method that can be used with workpieces of practically any material.

Another object of the disclosure is to provide an adaptive cutting system and method that is easily portable and can be used on a job site.

Yet another object of the disclosure is to provide an adaptive cutting system and method that makes it easier to measure for cuts.

Another object of the disclosure is to provide an adaptive cutting system and method that makes measuring more repeatable than prior art systems.

Yet another object of the disclosure is to provide an adaptive cutting system and method that reduces or eliminates the need for a helper when making cuts.

Another object of the disclosure is to provide an adaptive cutting system and method that provides support for both sides of the workpiece after a cut.

These and other objects, features, or advantages of the disclosure will become apparent from the specification, figures and claims.

SUMMARY OF THE INVENTION

An adaptive cutting system is presented that facilitates cutting workpieces in new and different ways in a fun, easy, fast, accurate and safe manner. The system includes a benchtop having a grid of bench dog holes across its surface as well as a pair of table tracks embedded within its surface. An edge track extends around the benchtop and a pair of hinge members are connected to the edge tracks that also connect to a saw track that is movable between a raised and lowered position. The system also includes narrow rip stops, wide rip stops, bench dogs and a miter gauge all of which work in concert with the on-table features to facilitate on-table measurement and alignment of workpieces for performing cutting operations.

BRIEF DESCRIPTION OF THE DRAWINGS

FIG. 16A is a side elevation view of a standard bench dog, the view showing the bench dog having a lower section that is cylindrical in shape that is connected to an upper section that is also cylindrical in shape, the upper section having a larger diameter than the lower section, the view showing the lower section and the upper section having a shared central axis, the view showing the step between the lower section and the upper section extending outward from the central axis in a perpendicular manner or said another way there is a flat shoulder at the intersection between the lower section and the upper section; the view showing the lower edge of the lower corner having a chamfered edge to facilitate insertion into a bench dog of the benchtop;

FIG. 16B is a perspective view of the bench dog shown in FIG. 16A;

FIG. 16C is an elevation view of a narrow or short bench dog similar to that shown in FIG. 16A, the view showing that the upper section is vertically narrower than the bench dog shown in FIG. 16A;

FIG. 16D is a perspective view of the narrow or short bench dog shown in FIG. 16C;

DETAILED DESCRIPTION OF THE DISCLOSURE

Figure 1:
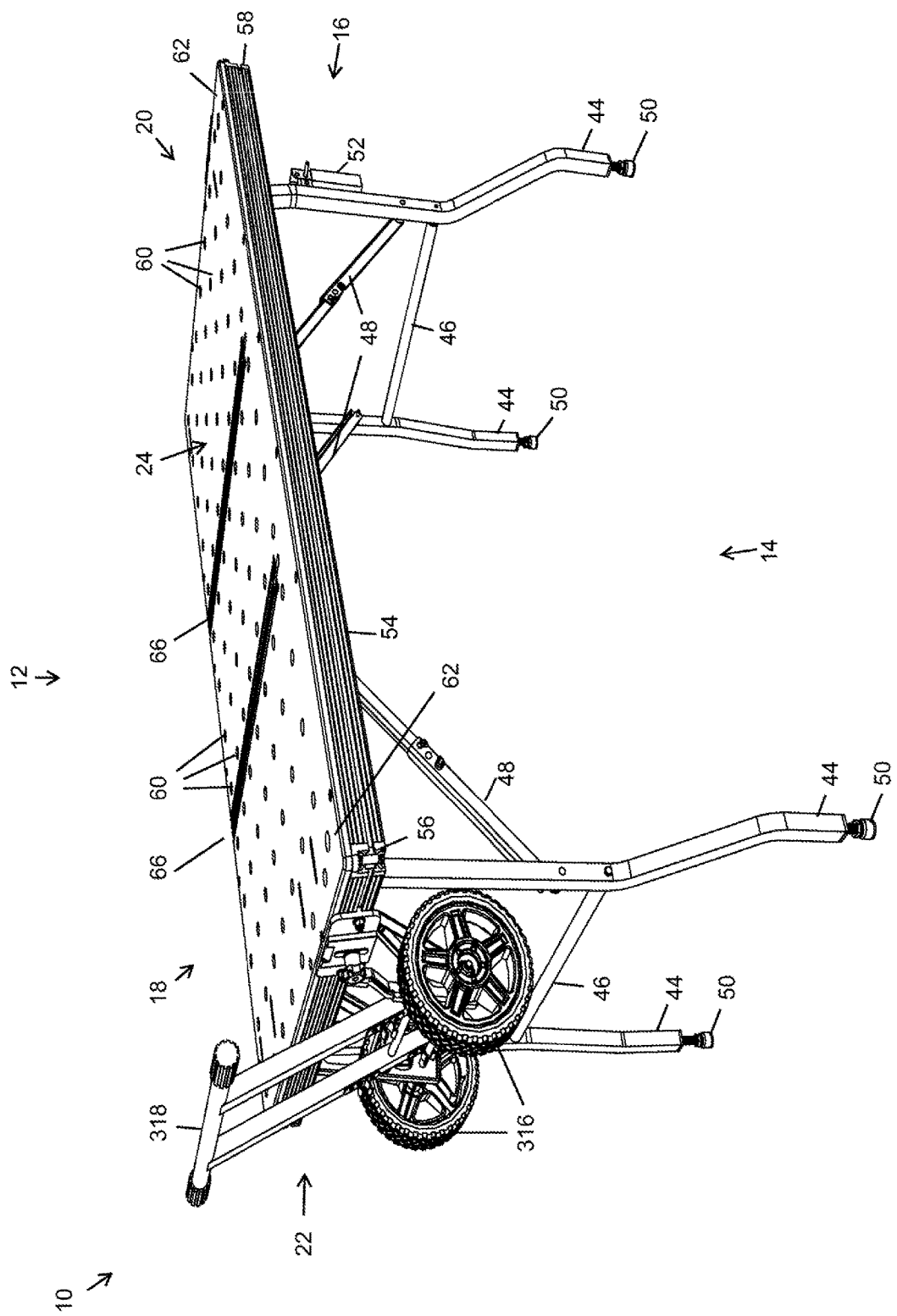
FIG. 1 is a perspective view of an adaptive cutting system, the view showing a benchtop having a grid pattern of bench dog holes across the upper surface of the benchtop, the view showing edge tracks extending around the exterior peripheral edge of the benchtop, the view showing a pair of table tracks extending across the benchtop in parallel spaced relation to one another, the view showing the benchtop in an upright position supported upon two pairs of legs and cross braces, the view showing a hinge member connected to an edge track, the view showing a stand and wheels connected to the one end of the benchtop.
Figure 2:
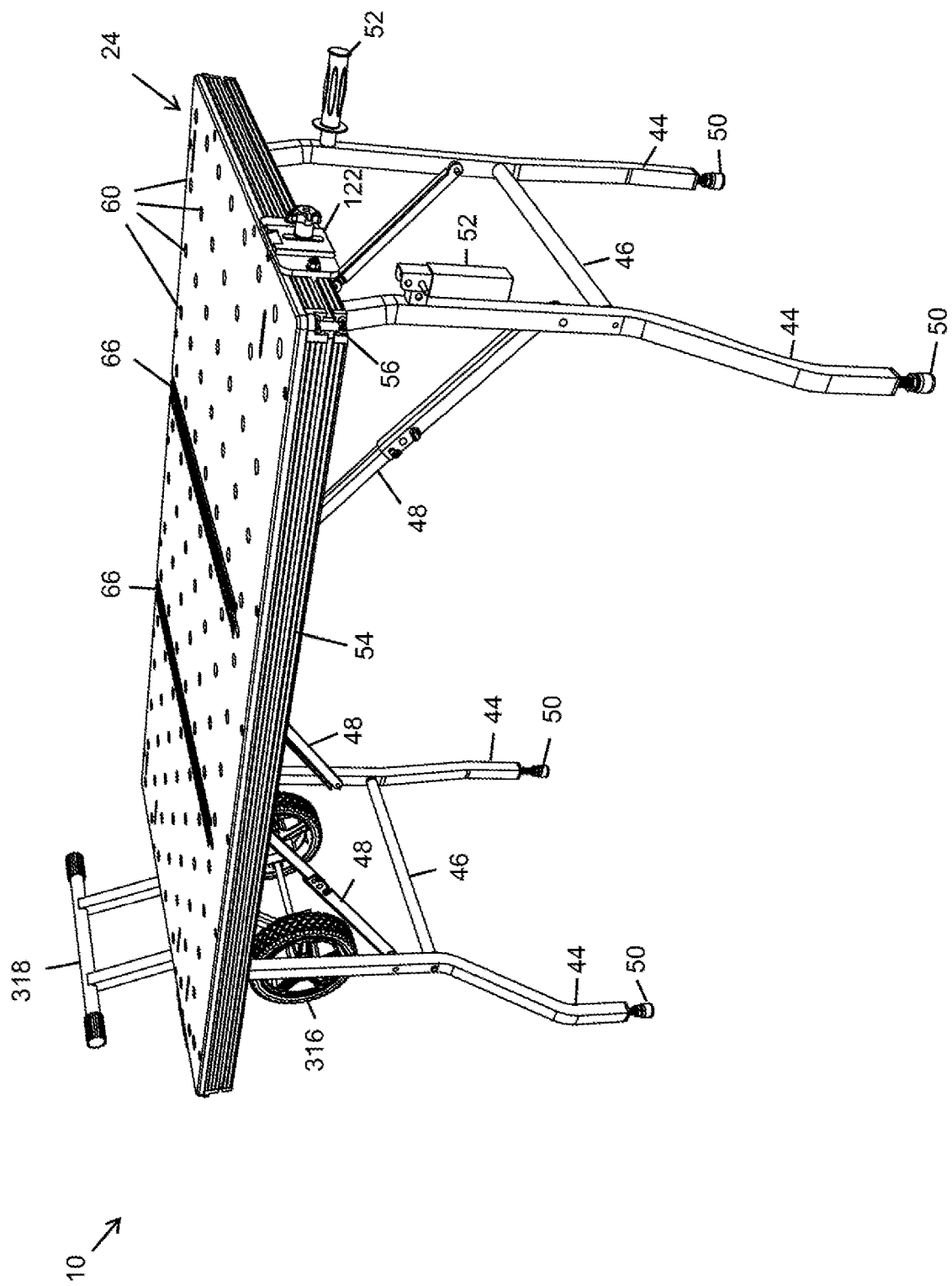
FIG. 2 is another perspective view of the adaptive cutting system shown in FIG. 1.
Figure 3:
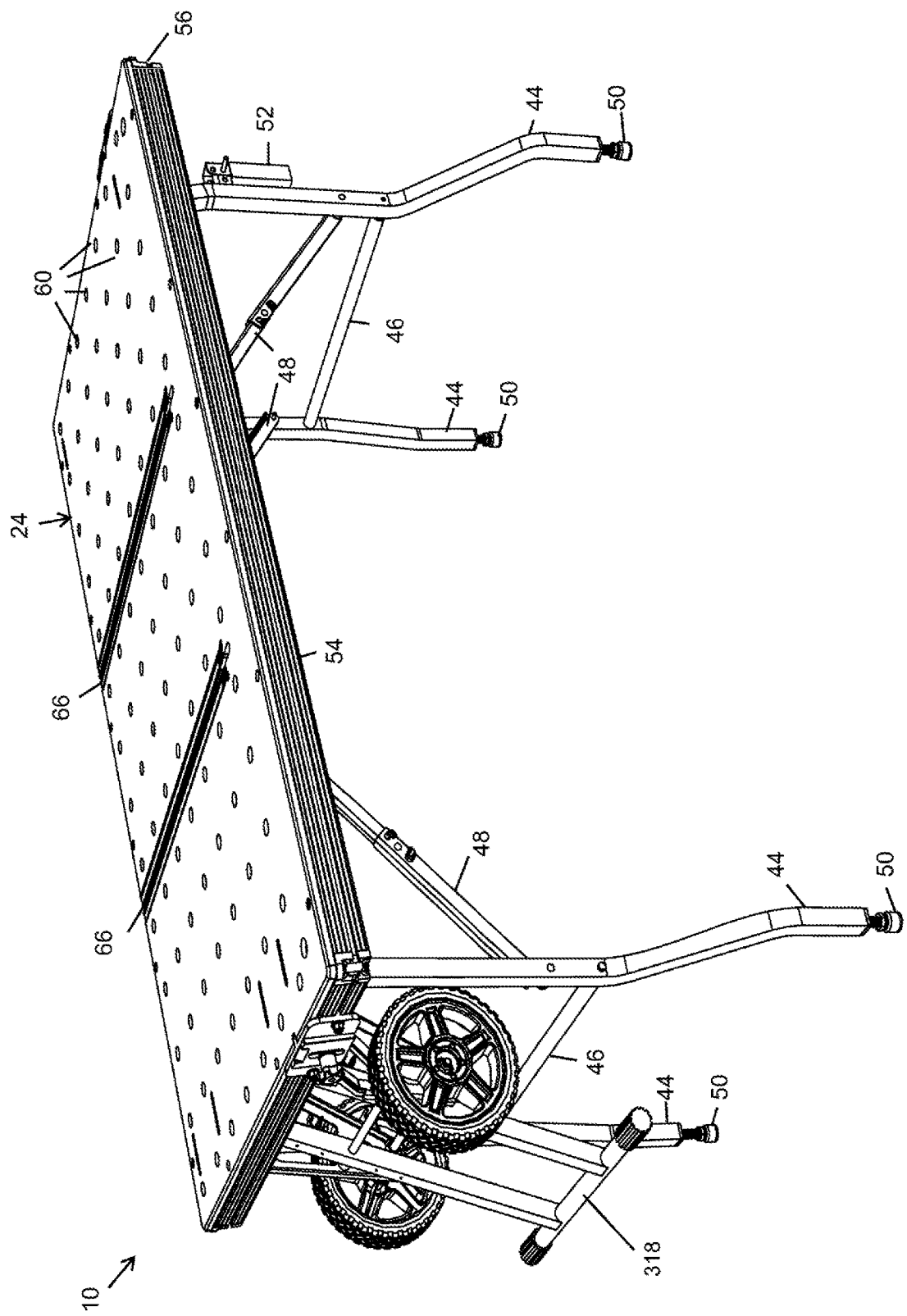
FIG. 3 is another perspective view of the adaptive cutting system shown in FIG. 1, the view showing the stand in a lowered position as opposed to a raised position.
Figure 4:
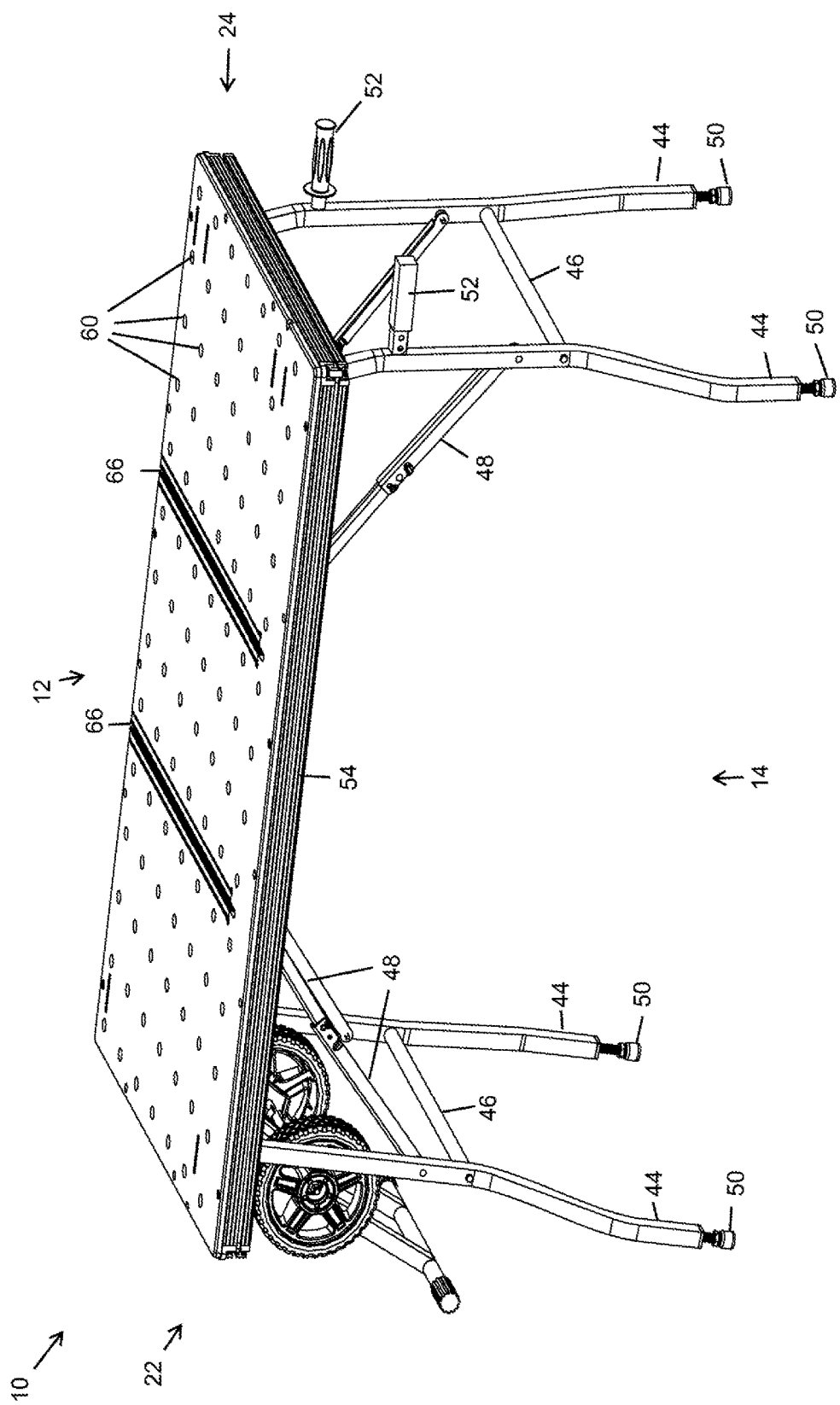
FIG. 4 is another perspective view of the adaptive cutting system shown in FIG. 3.
Figure 5:
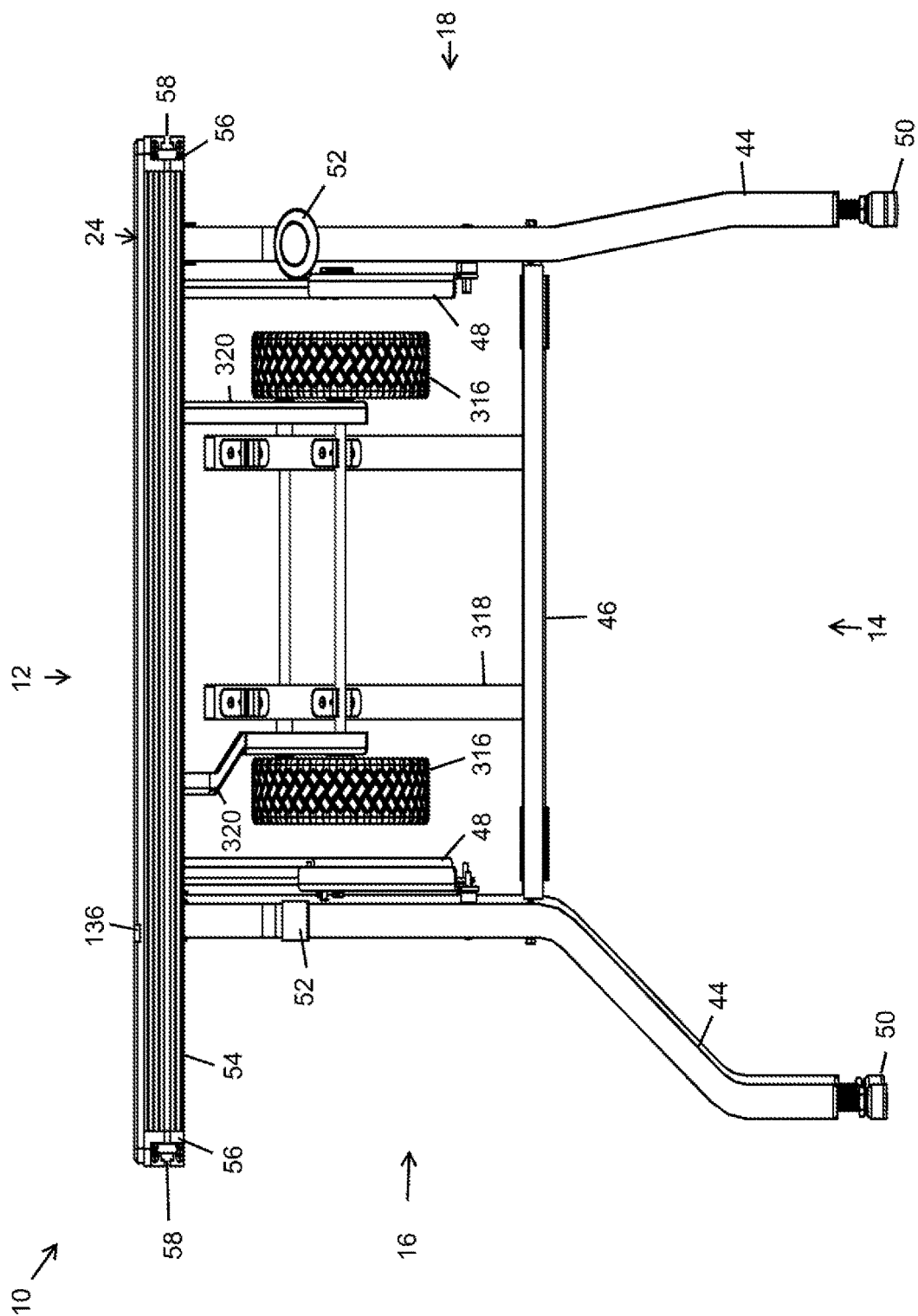
FIG. 5 is an elevation view of an end of the adaptive cutting system shown in FIG. 1, the view showing grooves in the edge tracks, the view showing an alignment receiver in the benchtop.
Figure 6:
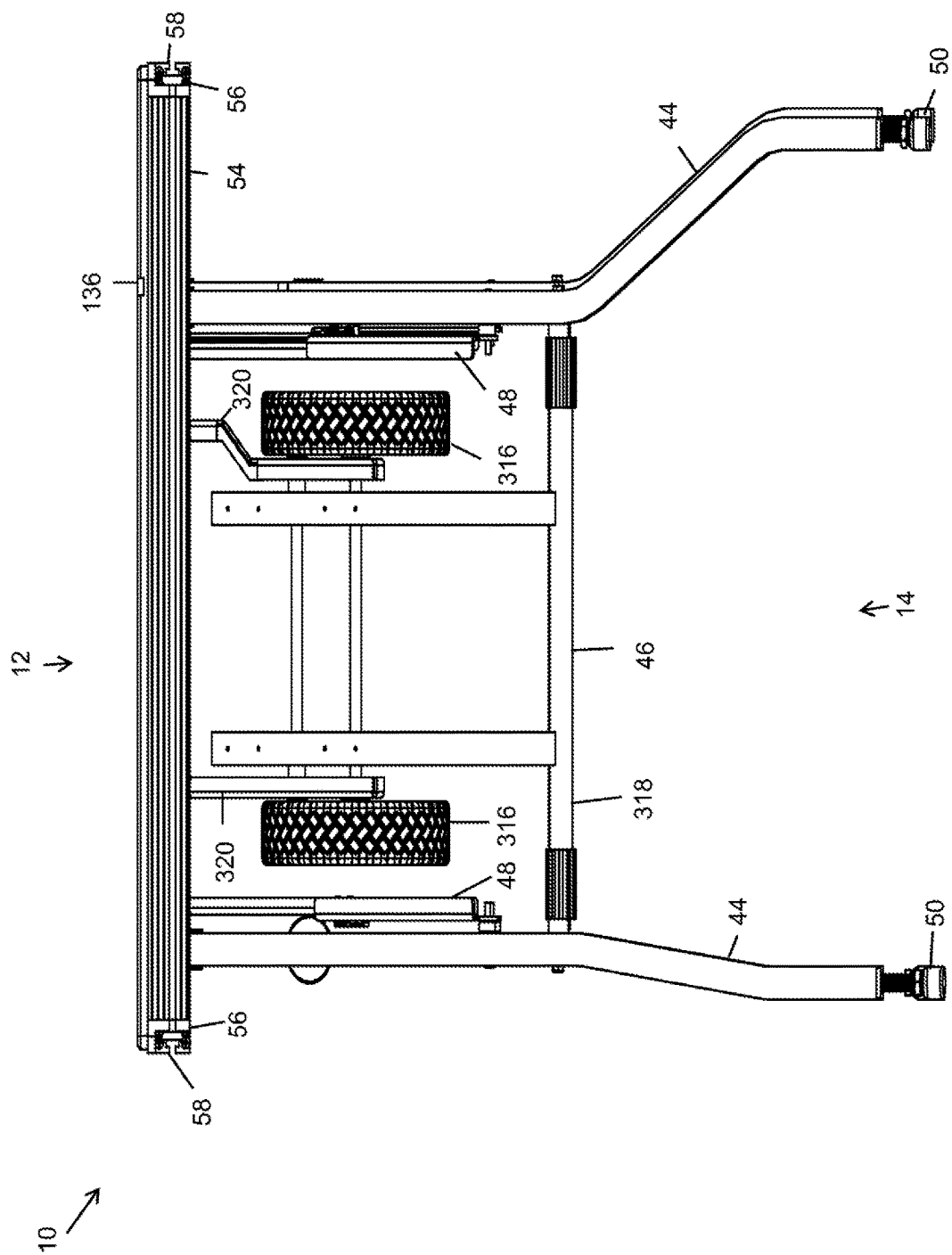
FIG. 6 is another elevation view of an end of the adaptive cutting system shown in FIG. 1, the view showing the opposite end as is shown in FIG. 5.
Figure 7:
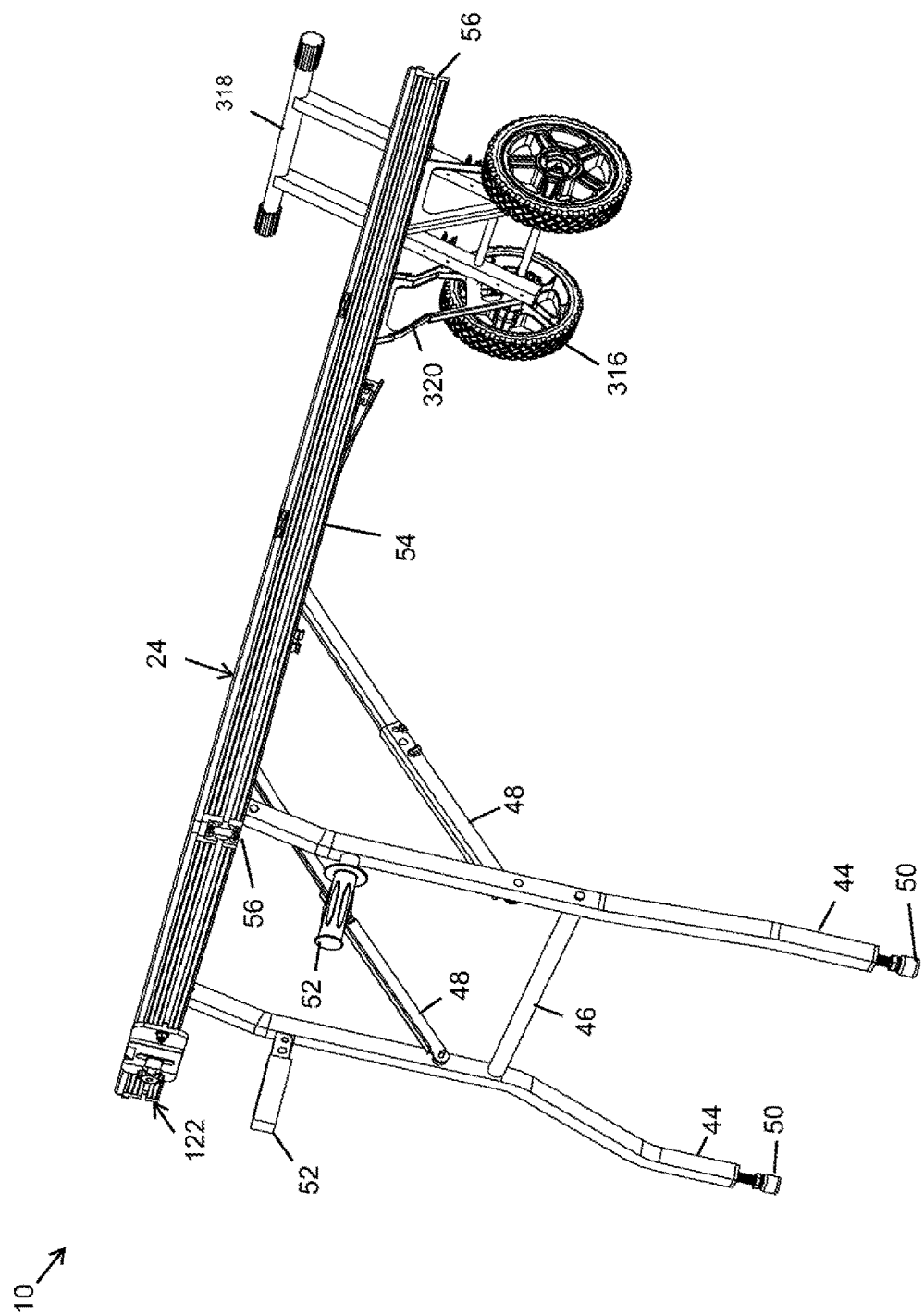
FIG. 7 is another perspective view of the adaptive cutting system shown in FIG. 1, the view showing one pair of legs in a folded position and the stand in a raised position with the wheels supporting an end of the benchtop.
Figure 8:
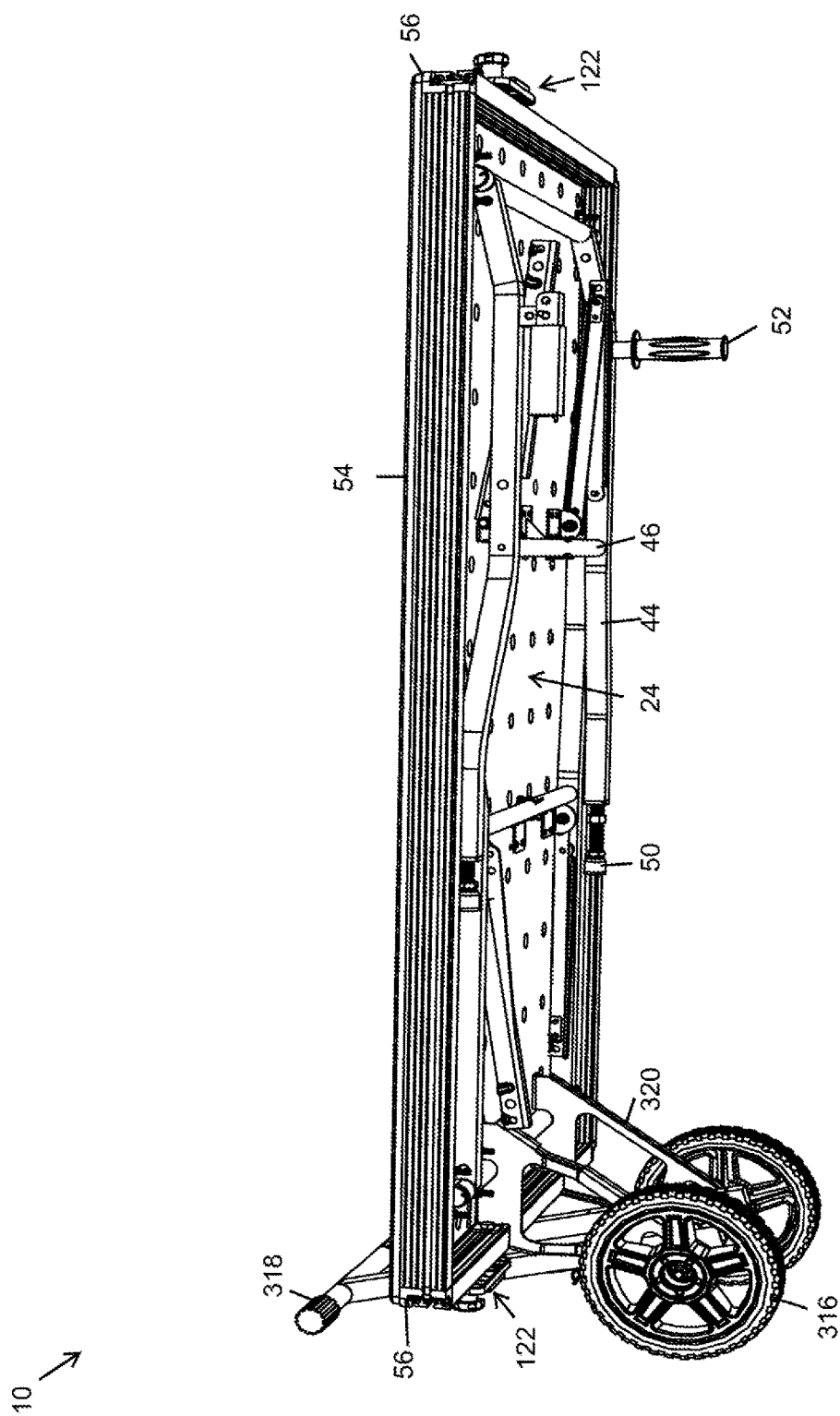
FIG. 8 is another perspective view of the adaptive cutting system shown in FIG. 1, the view showing both pairs of legs in a folded position and the stand in a raised position with the wheels supporting an end of the benchtop.
Figure 9:
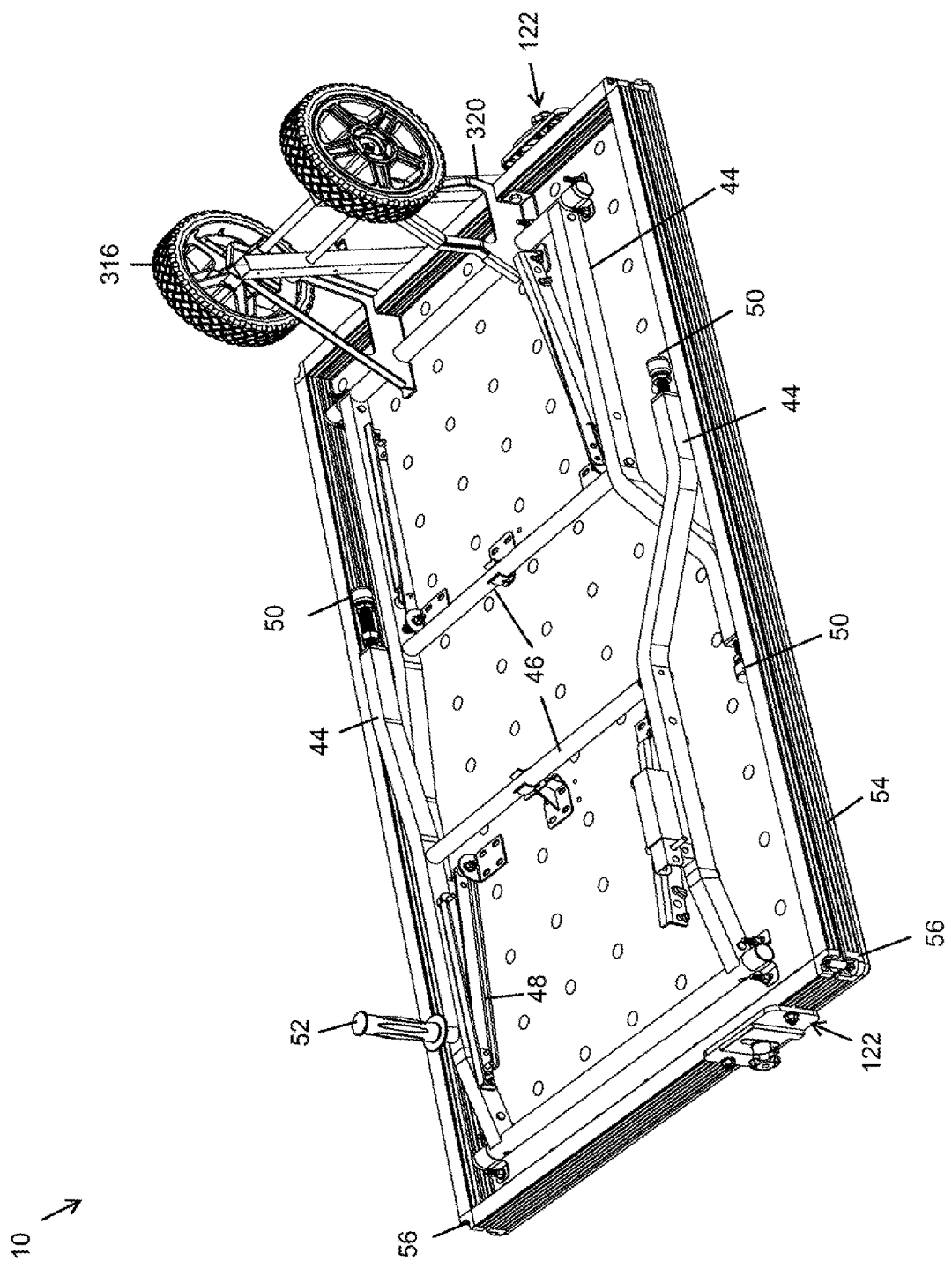
FIG. 9 is another perspective view of the adaptive cutting system shown in FIG. 1, the view showing the bottom side of the configuration shown in FIG. 8, the view showing the two pairs of legs in a folded positon and latched in place, the view showing mounting plates of hinge members connected to the edge tracks at the ends of the benchtop.
Figure 10:
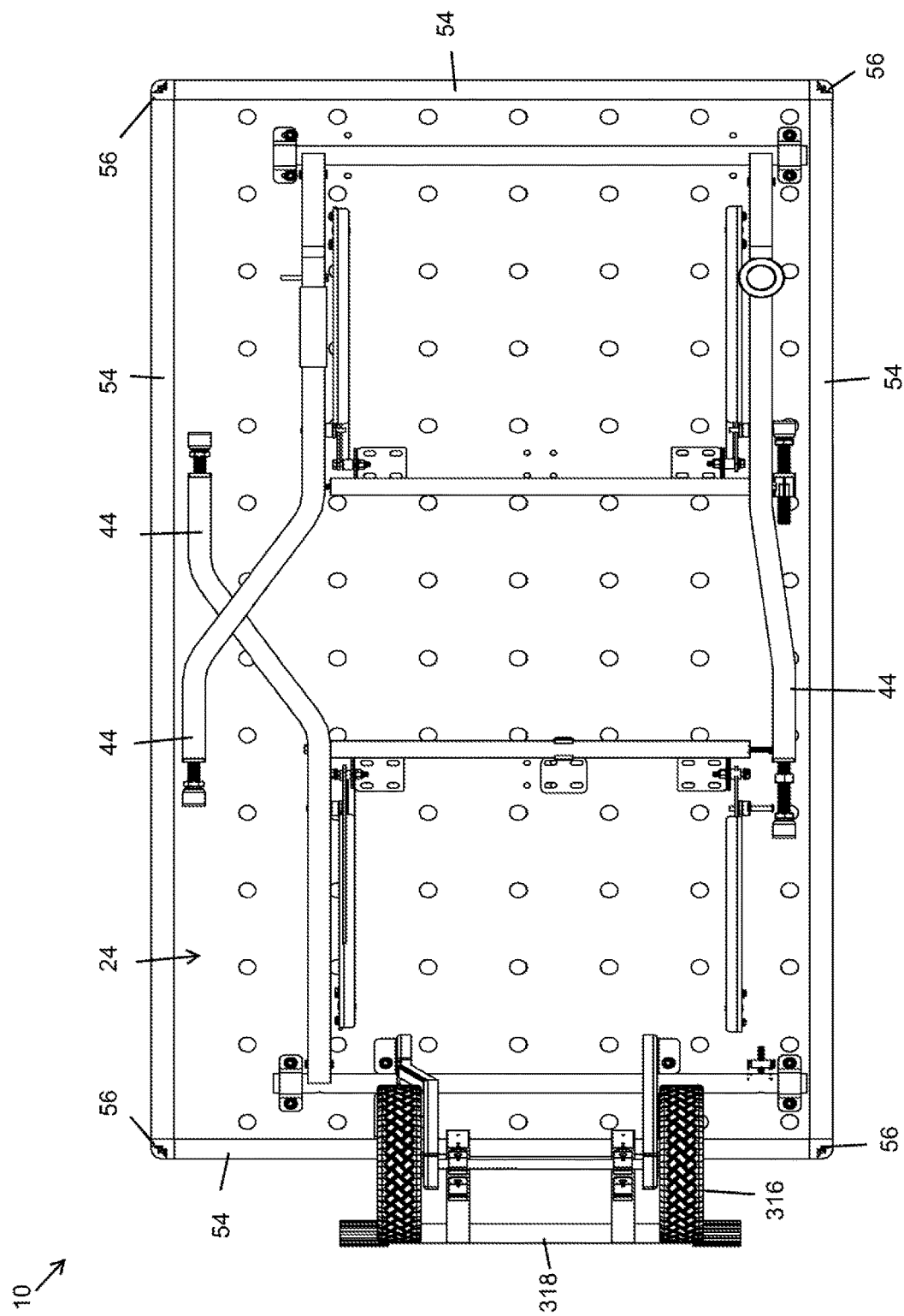
FIG. 10 is a bottom elevation view of the configuration shown in FIG. 9, the view showing the mounting plates removed.
Figure 11:
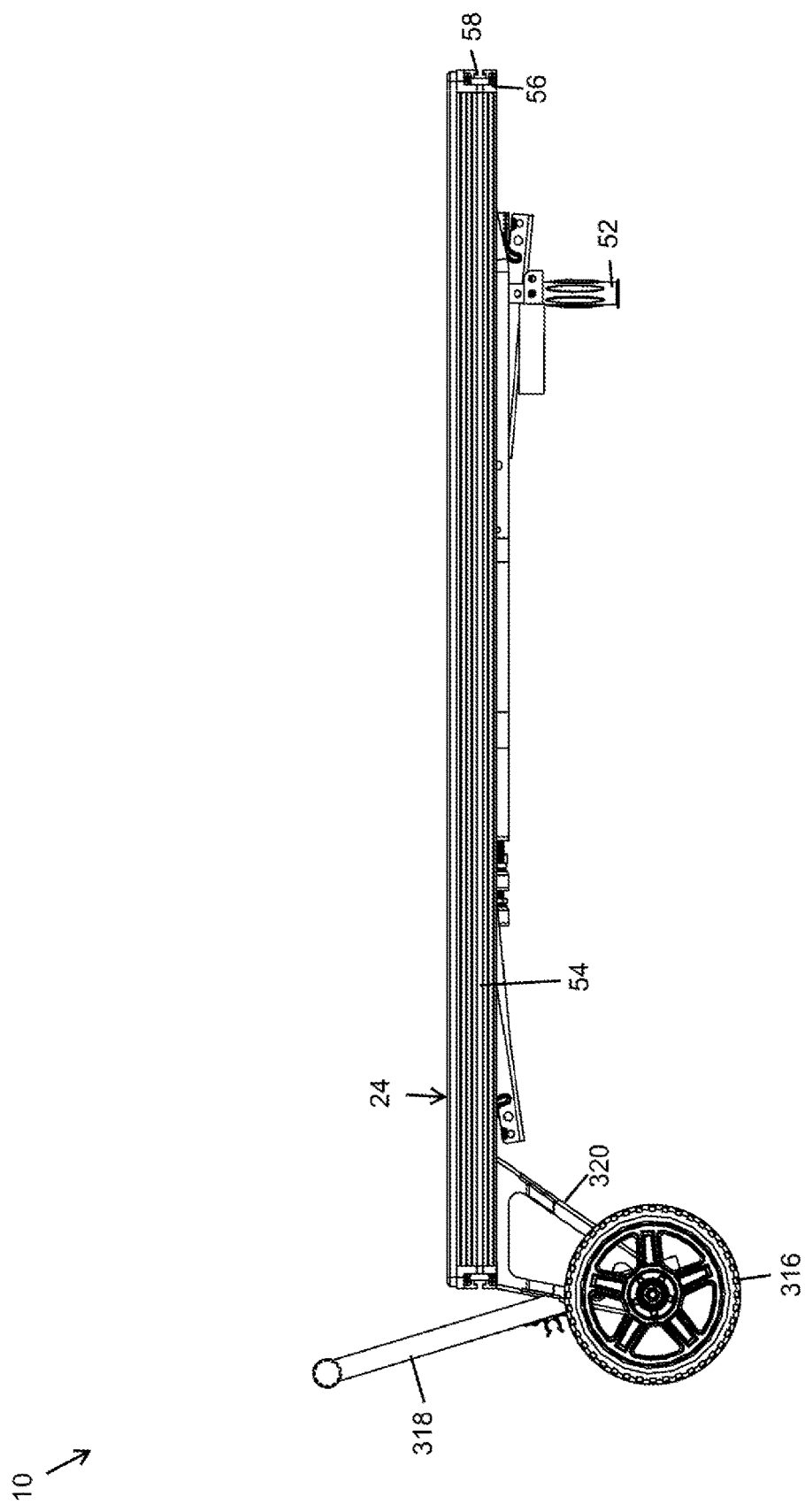
FIG. 11 is a side elevation view of the configuration shown in FIG. 9.
Figure 12:
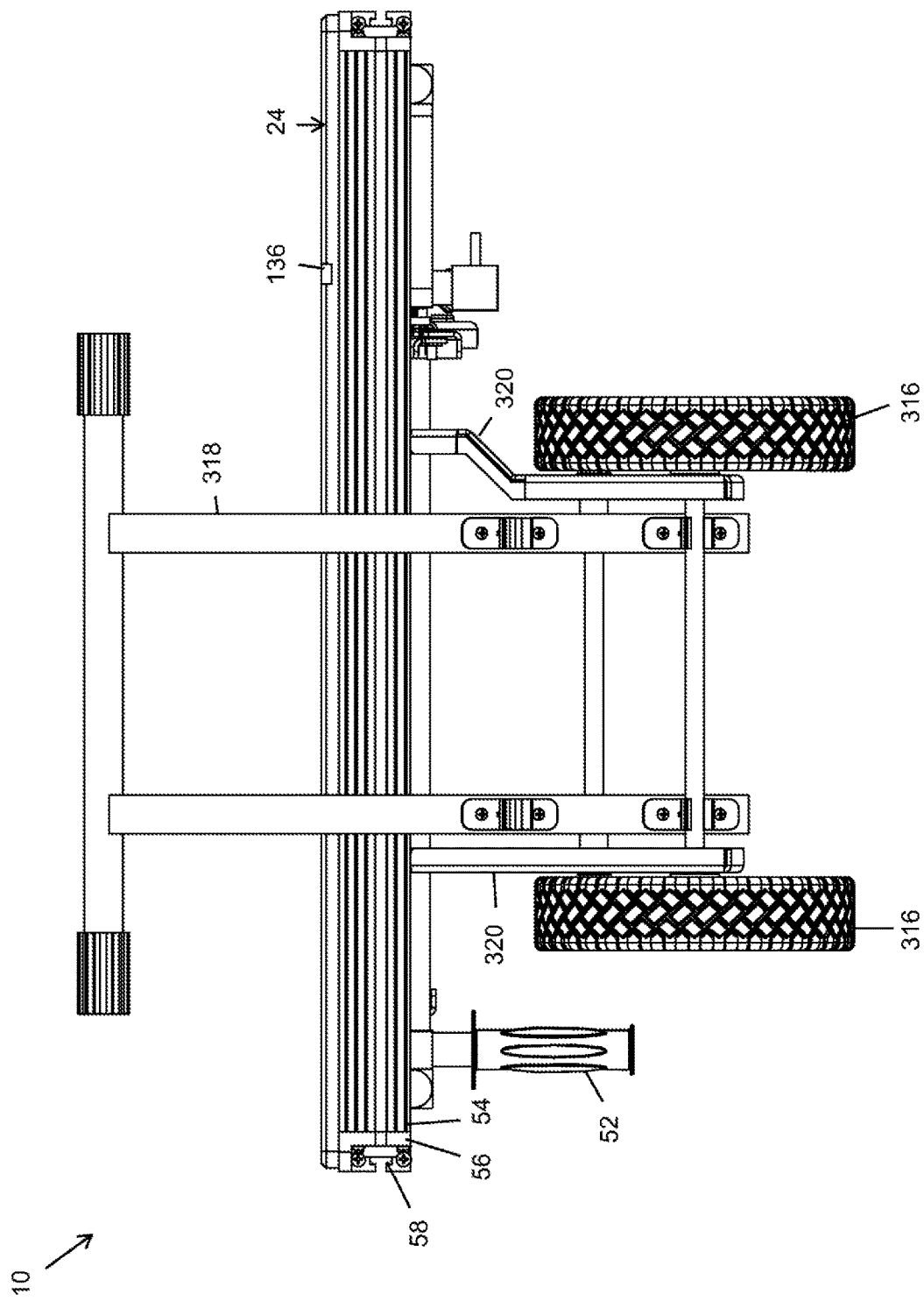
FIG. 12 is an end elevation view of the configuration shown in FIG. 9.
Figure 13:
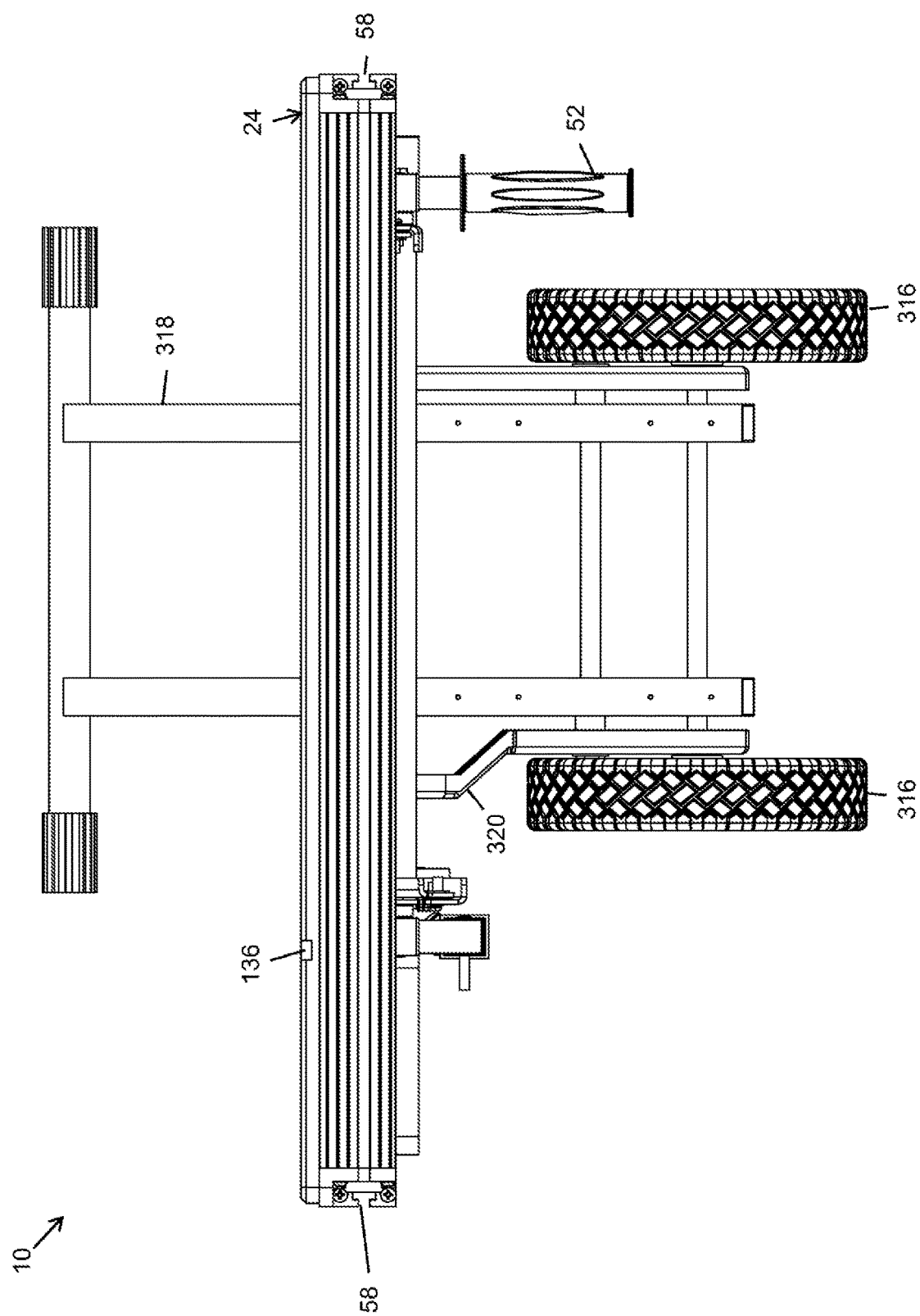
FIG. 13 is an end elevation view of the configuration shown in FIG. 9, the view showing the opposite end of that shown in FIG. 12.
Figure 14:
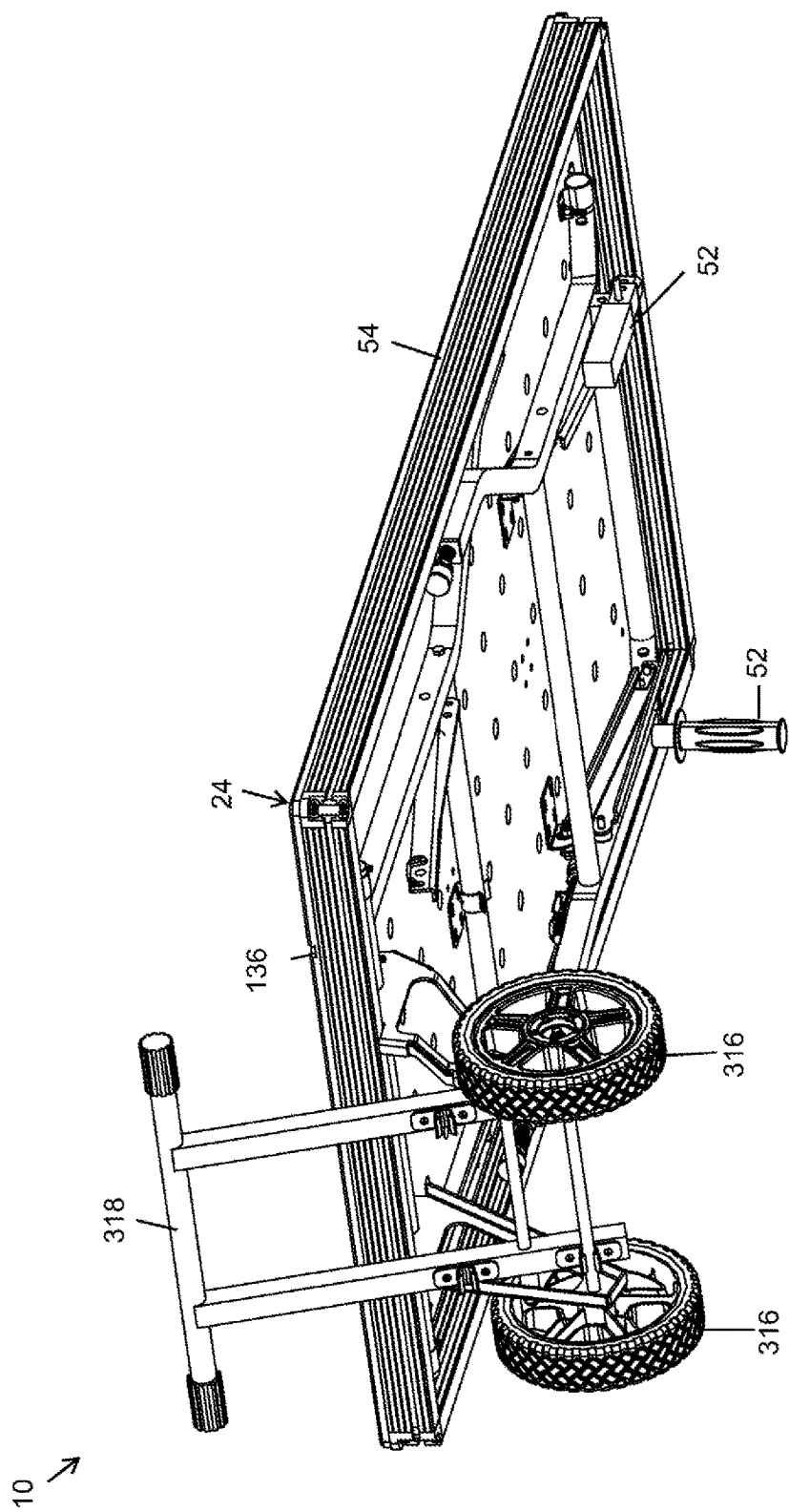
FIG. 14 is a bottom perspective view of the configuration shown in FIG. 9.
Figure 15:
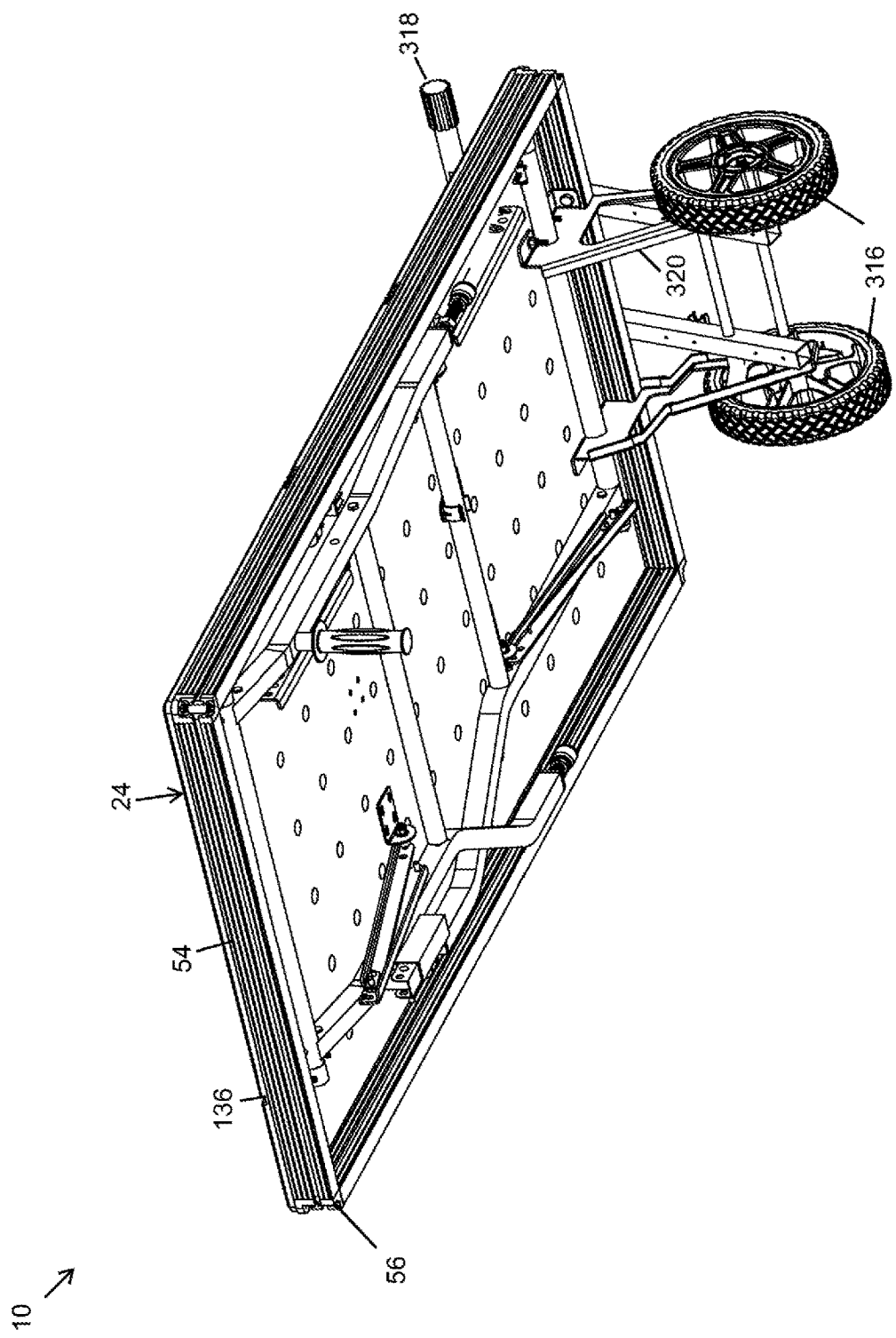
FIG. 15 is another bottom perspective view of the configuration shown in FIG. 9.
Figure 17:
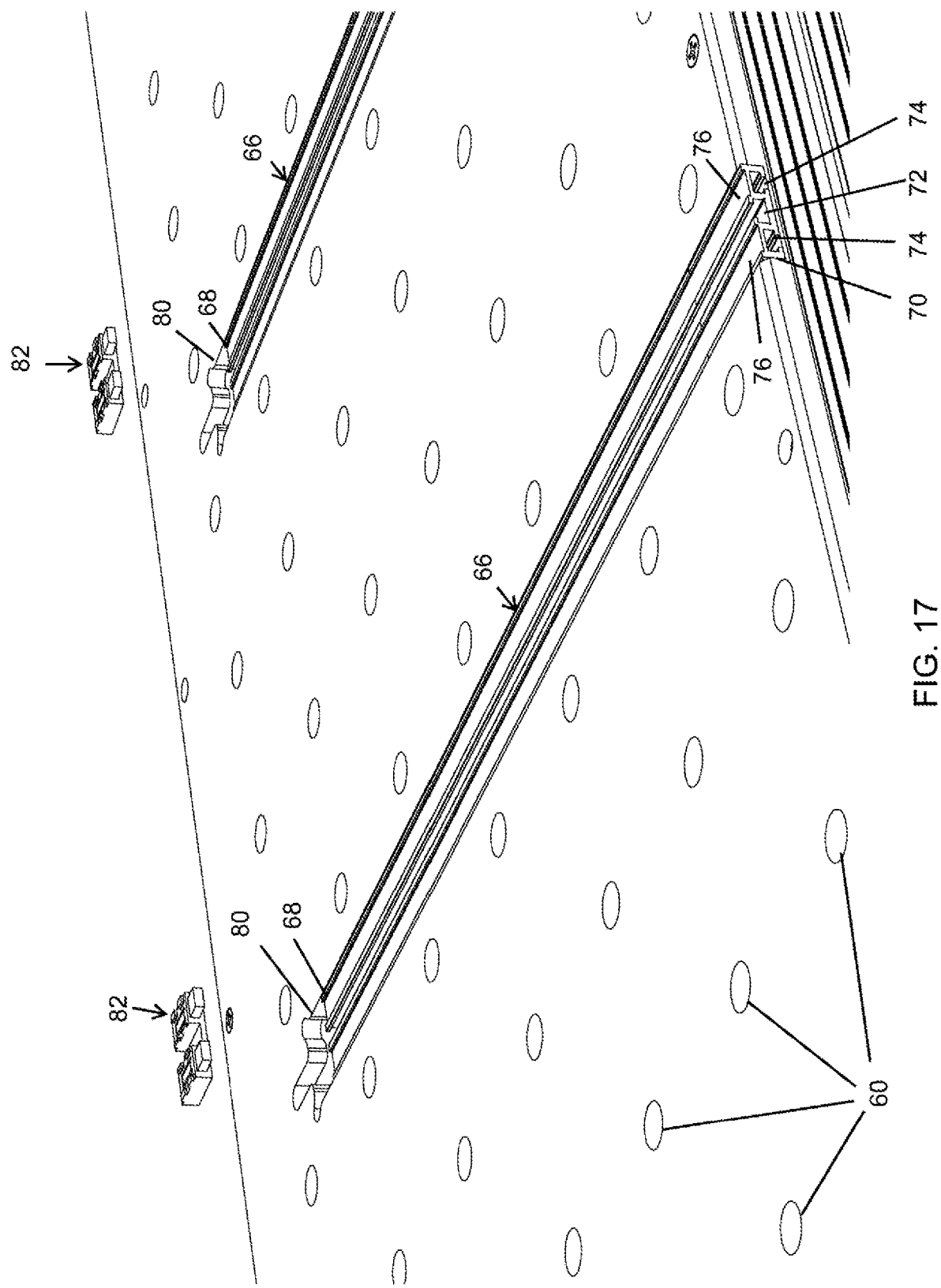
FIG. 17 is a perspective close-up view of a portion of the benchtop shown in FIG. 1, the view showing the benchtop having a grid pattern of bench dogs therein, the view showing a pair of table tracks inserted within the benchtop, the view showing the table tracks having a centrally positioned upwardly facing groove with a downward facing groove on each side of the centrally positioned groove, the view showing measuring grooves positioned on each outward side of the table track that face upward, the view showing lock members exploded off of the ends of the table tracks.
Figure 18:
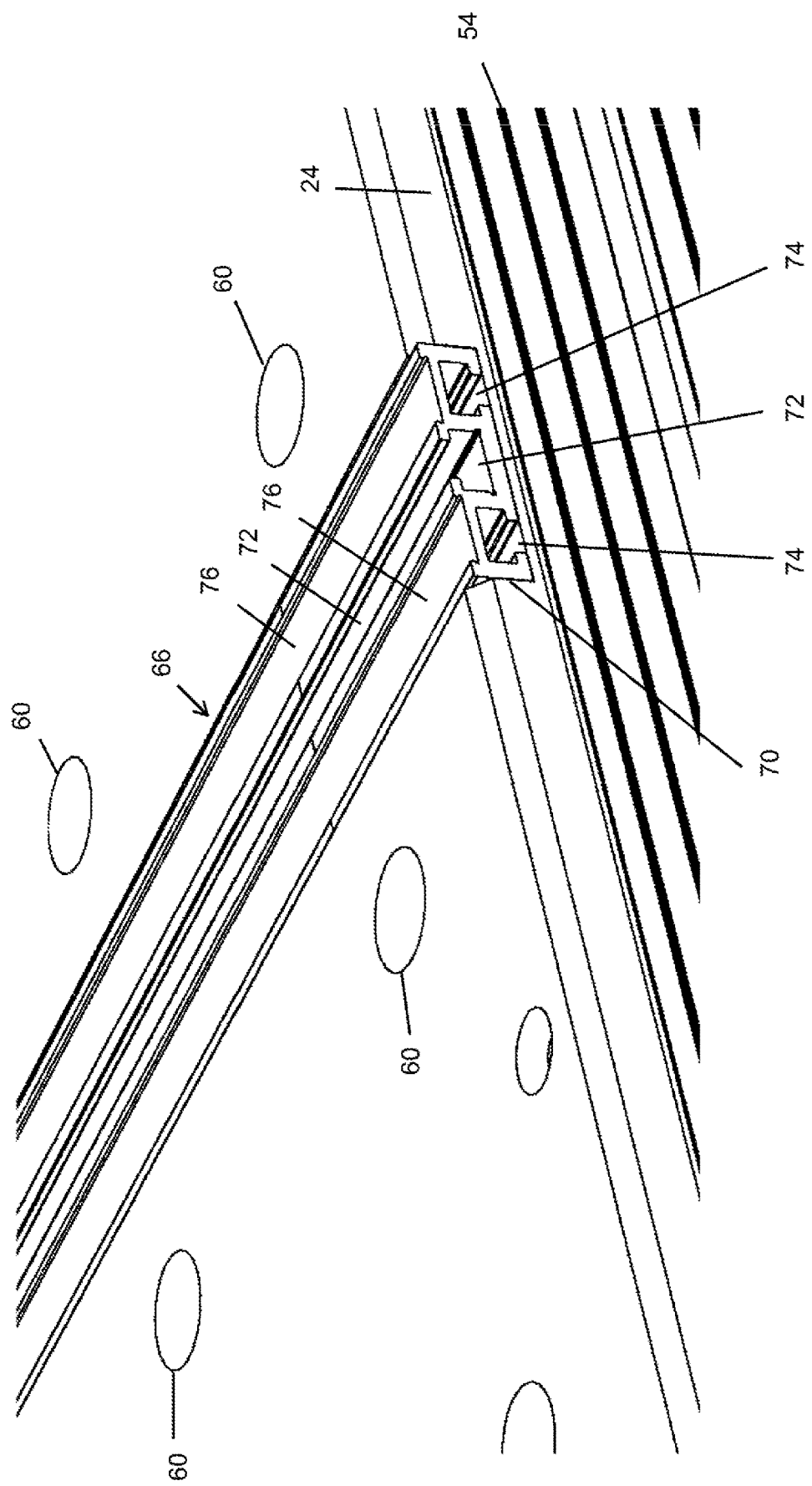
FIG. 18 is a close-up perspective view of an end of the table track shown in FIG. 17.
Figure 19:
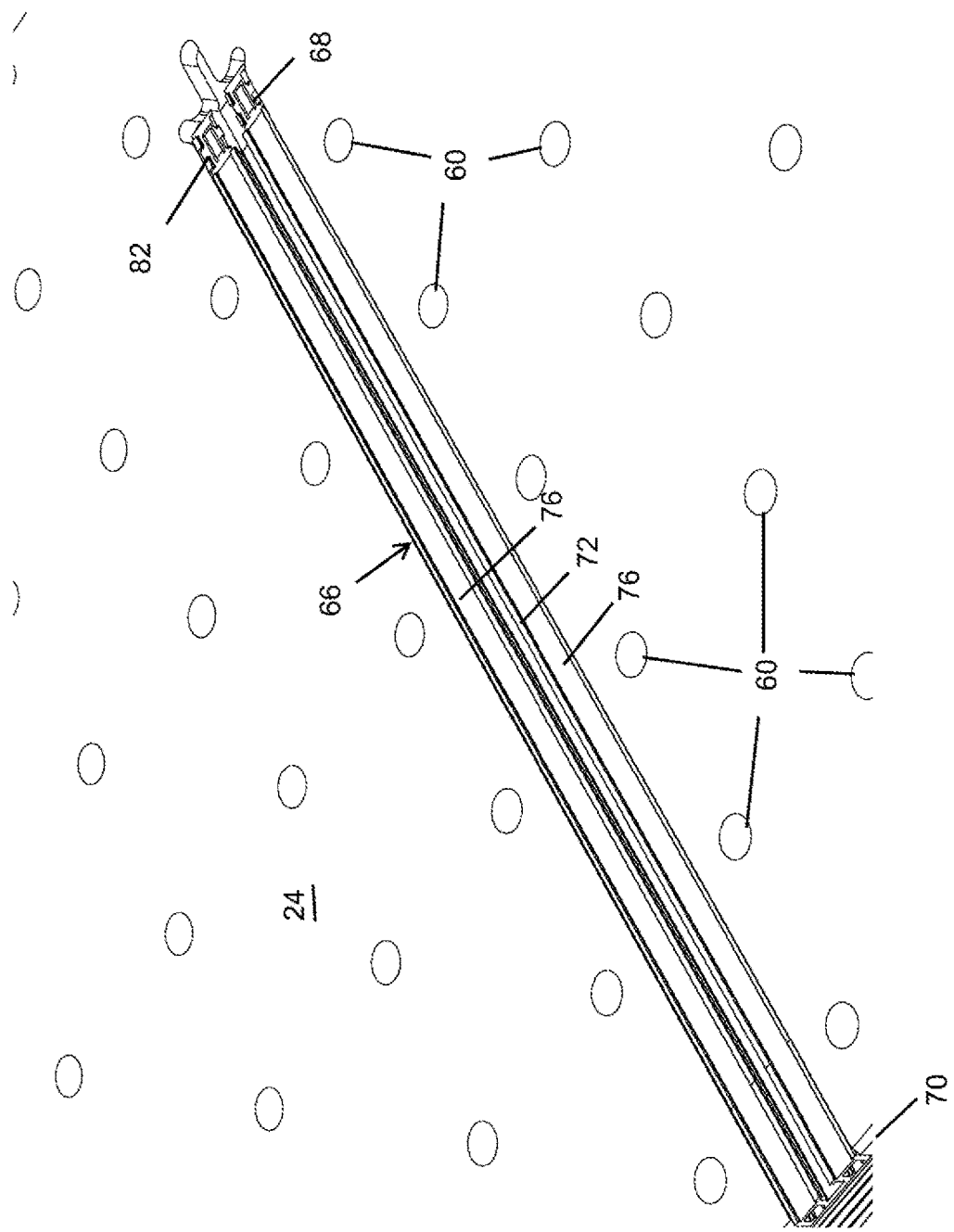
FIG. 19 is another perspective view of the table track shown in FIG. 17, the view showing the lock member connected to the end of the table track and positioned within the benchtop.
Figure 20:
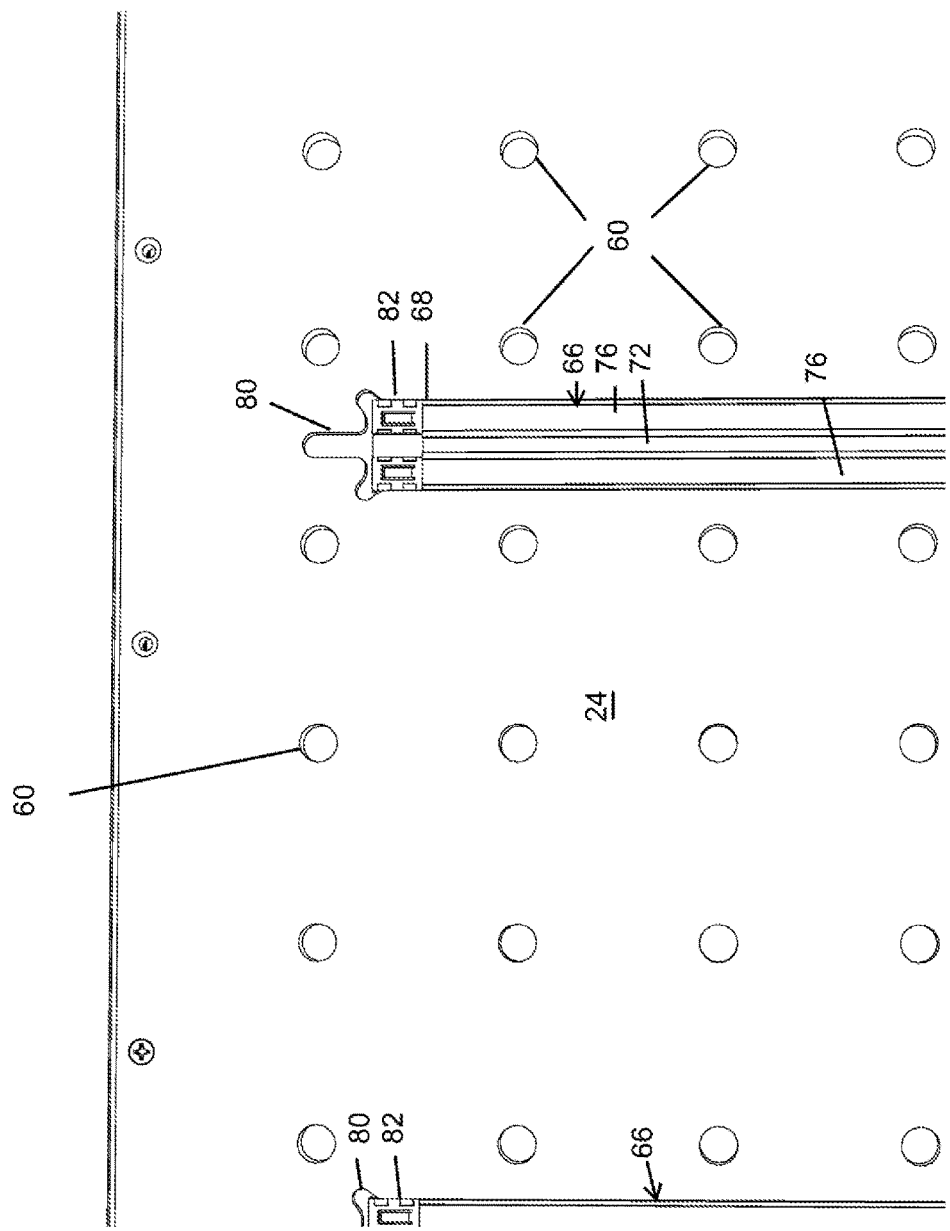
FIG. 20 is a top elevation view of a portion of the benchtop shown in FIG. 17, the view showing the lock member connected to the end of the table track and positioned within the benchtop.
Figure 21:
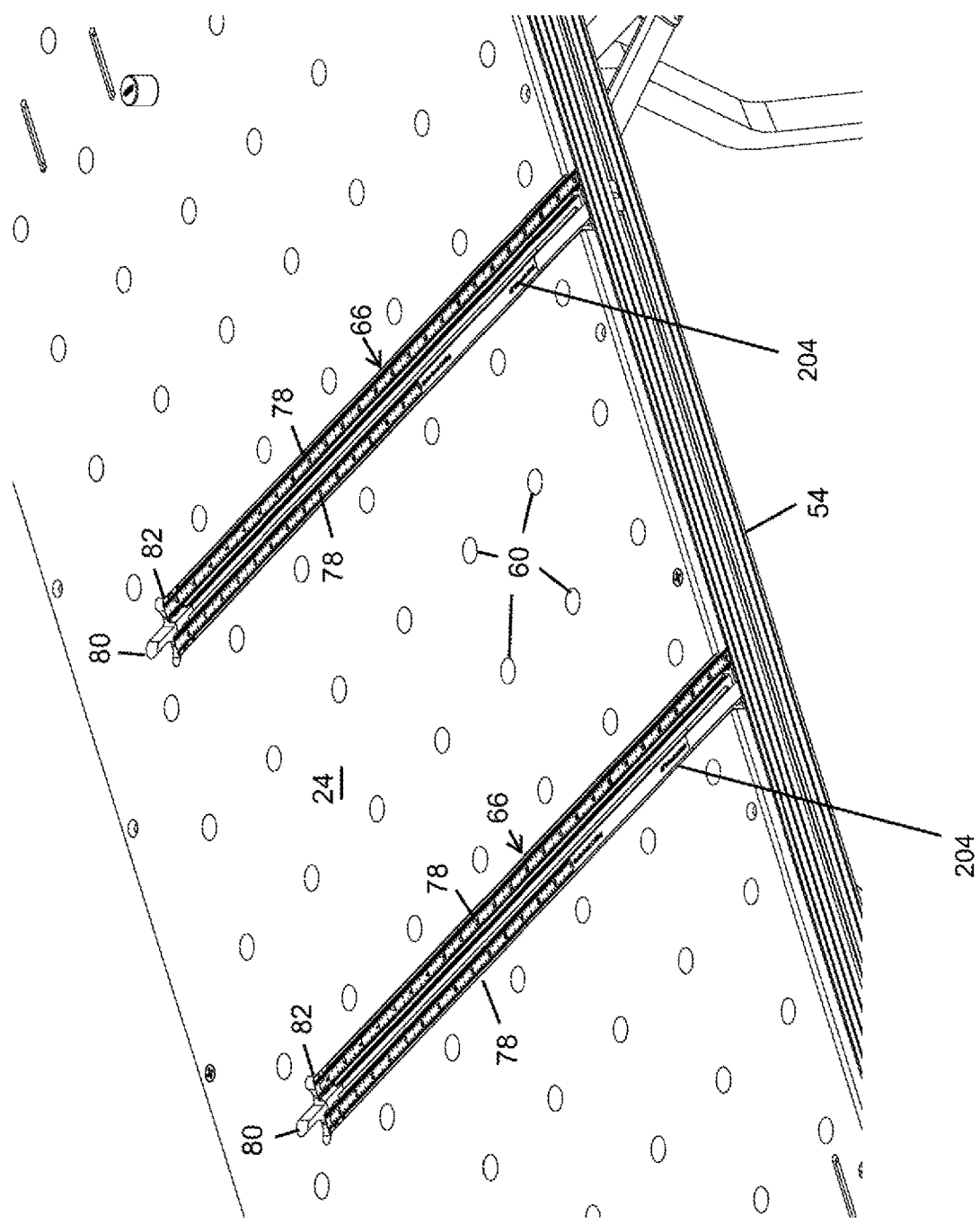
FIG. 21 is another perspective view of a portion of the benchtop shown in FIS. 17, the view showing measuring members positioned within the measuring grooves of the table tracks.
Figure 22:
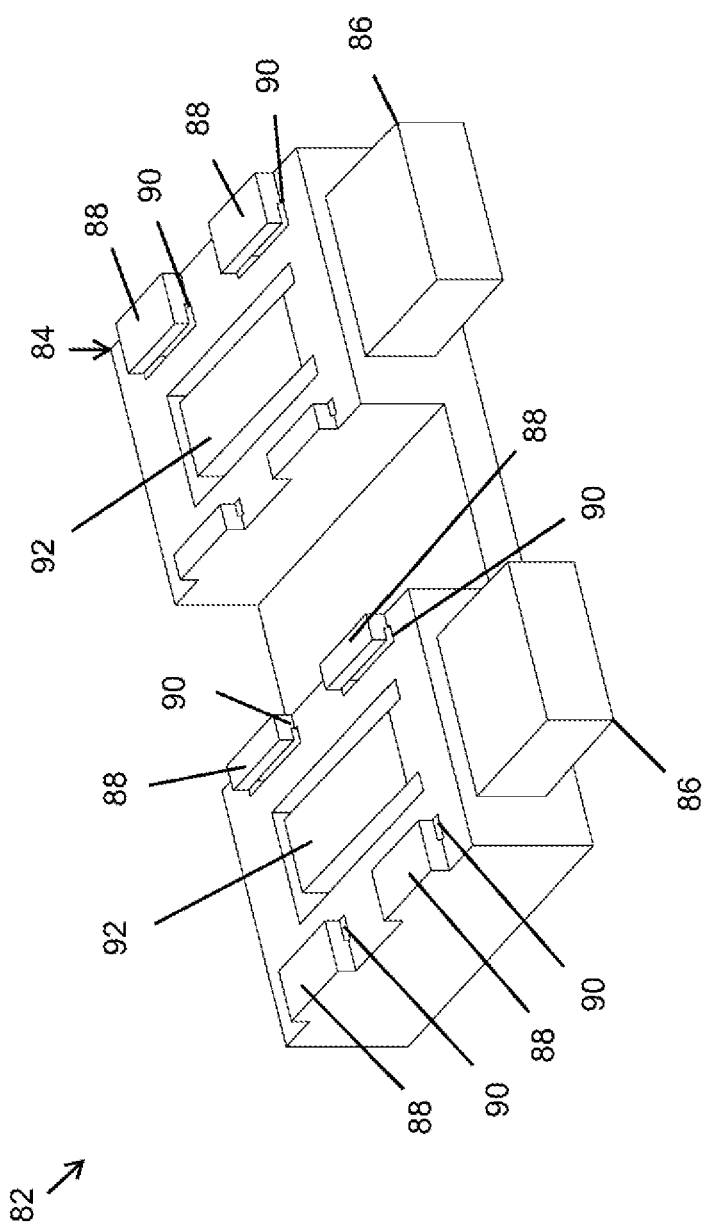
FIG. 22 is a perspective view of a lock member shown in FIG. 17.
Figure 23:
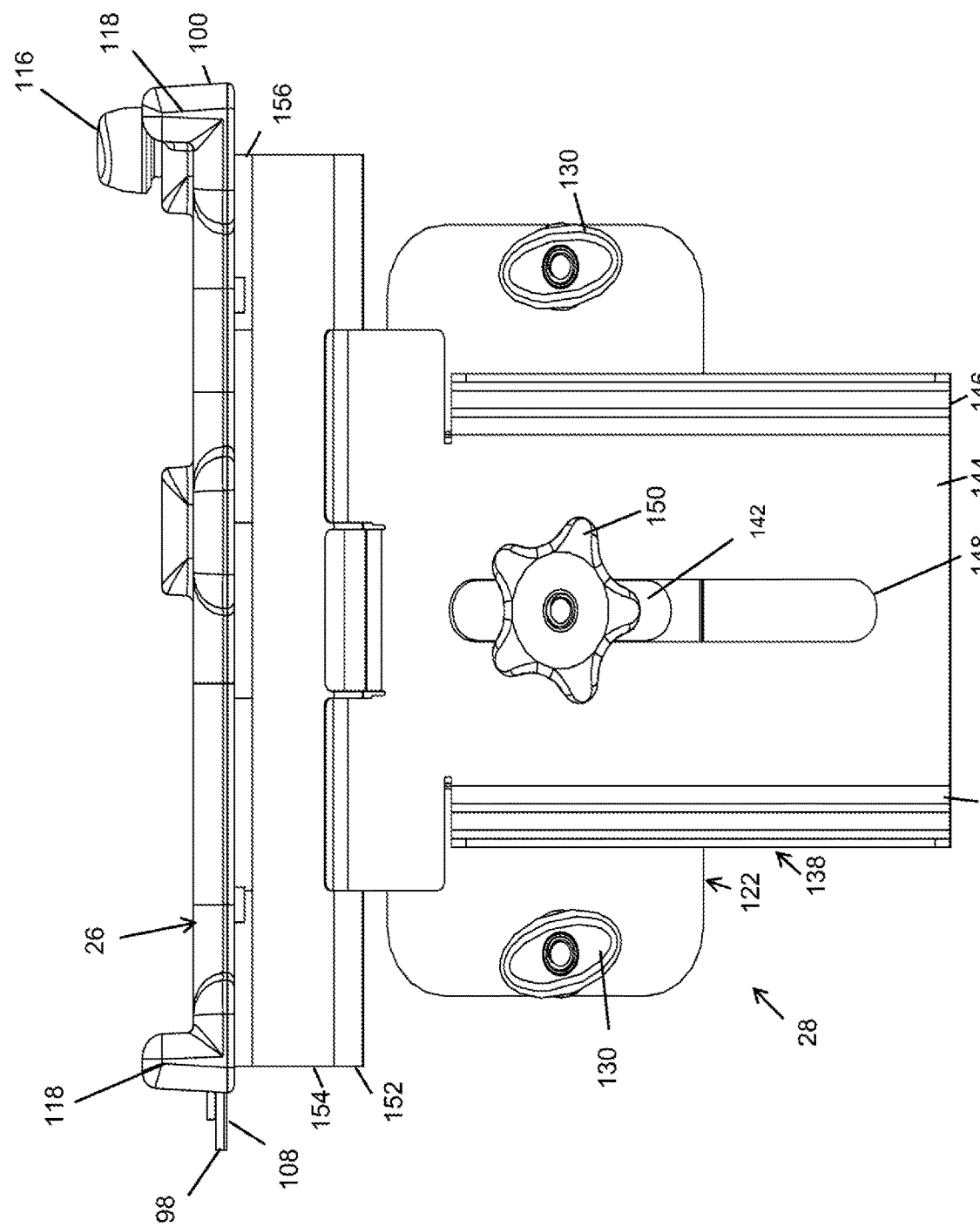
FIG. 23 is a side elevation view of a hinge member and saw track that is configured to connect to an edge track of the benchtop shown in FIG. 1, the view showing a mounting plate with an end plate connected to the mounting plate, the view showing a saw track connected to the upper end of the end plate by a first hinge, center member and second hinge, the view showing a chip strip extending outward from a cutting side of the saw track that forms the cutting edge, the view showing the chip strip having a hard upper layer and a softer lower layer that has a high coefficient of friction.
Figure 24:
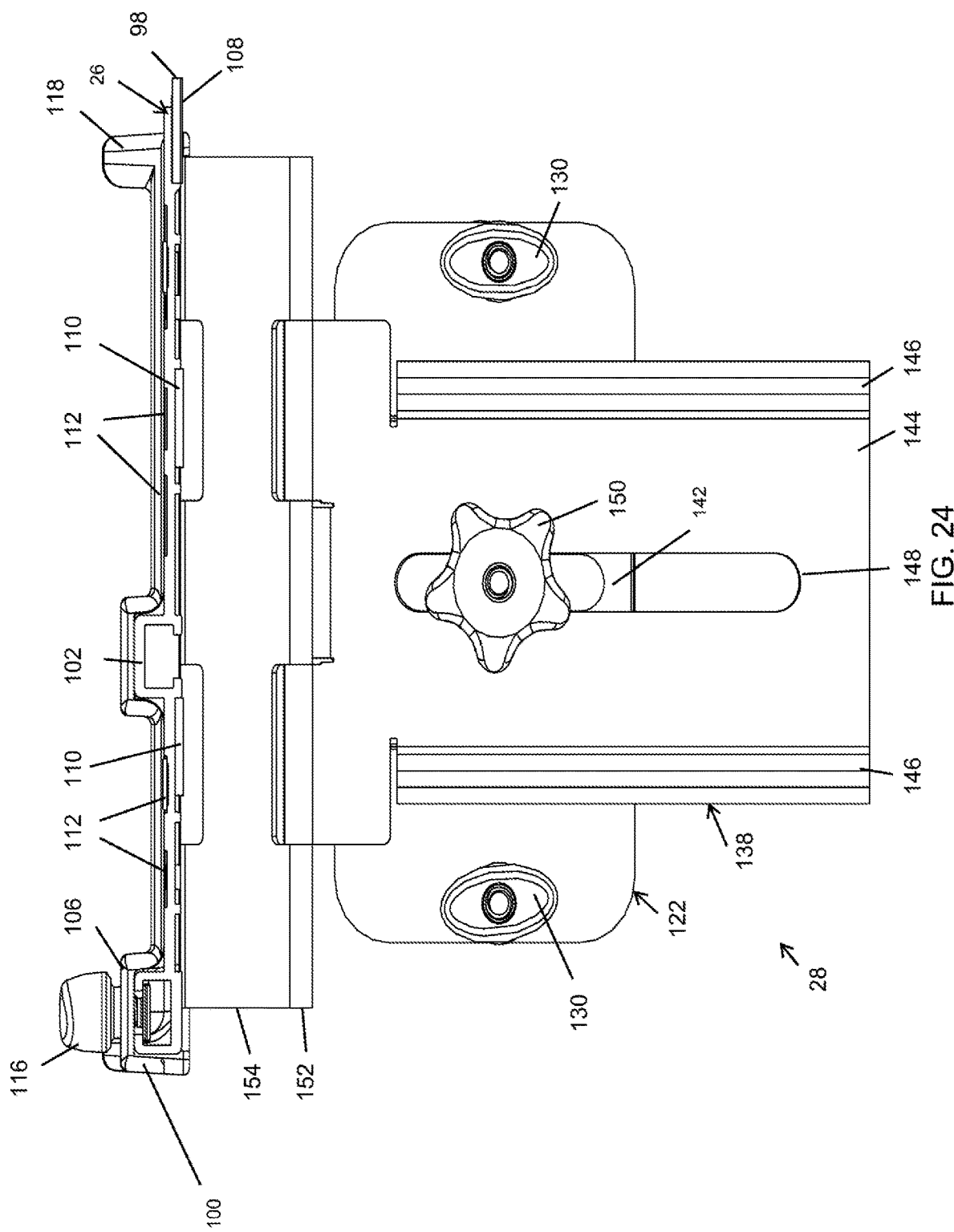
FIG. 24 is another side elevation view of the hinge member and saw track that is configured to connect to an edge track of the benchtop as is shown in FIG. 23, the view showing the other side of the hinge member and saw track as is shown in FIG. 23.
Figure 25:
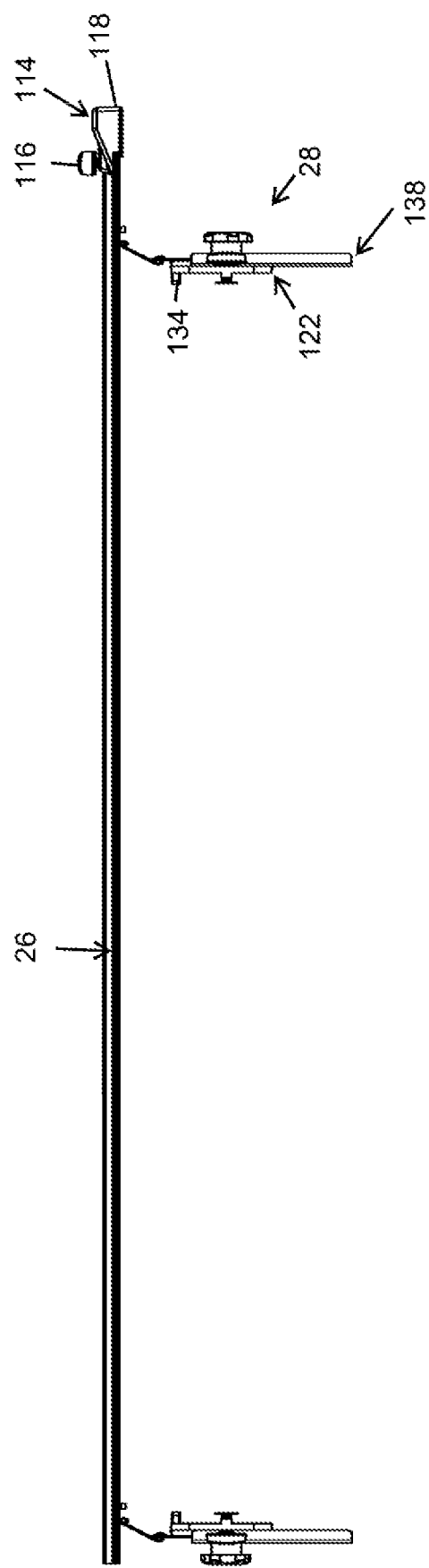
FIG. 25 is a front elevation view of the hinge member and saw track that is configured to connect to an edge track of the benchtop as is shown in FIG. 23.
Figure 26:
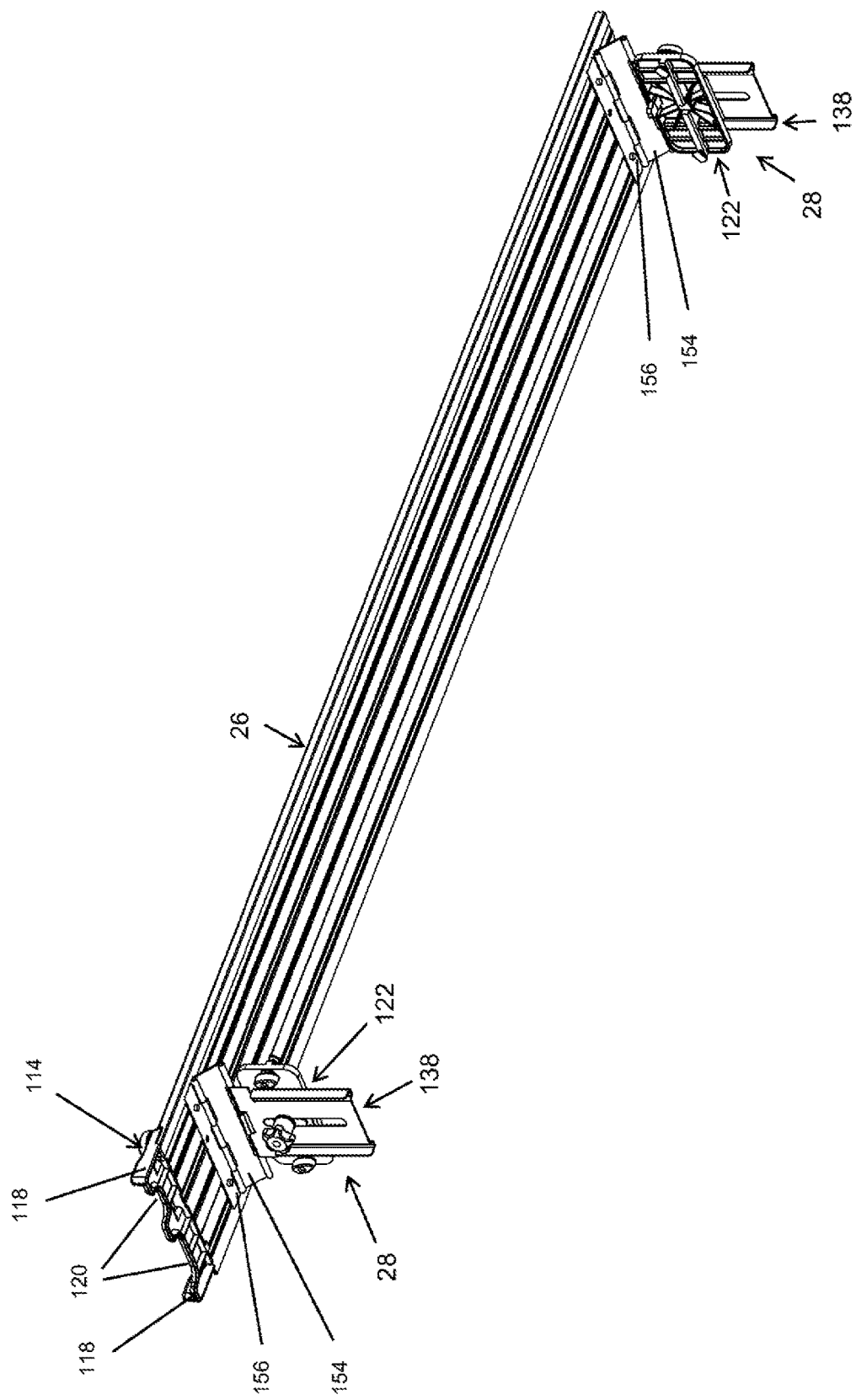
FIG. 26 is a bottom perspective view of the hinge member and saw track that is configured to connect to an edge track of the benchtop as is shown in FIG. 23, the view showing the recesses of the cord manager connected to an end of the saw track; the view showing the second hinge connected to the bottom surface of the saw track and the center member connecting the second hinge to the end plate.
Figure 27:
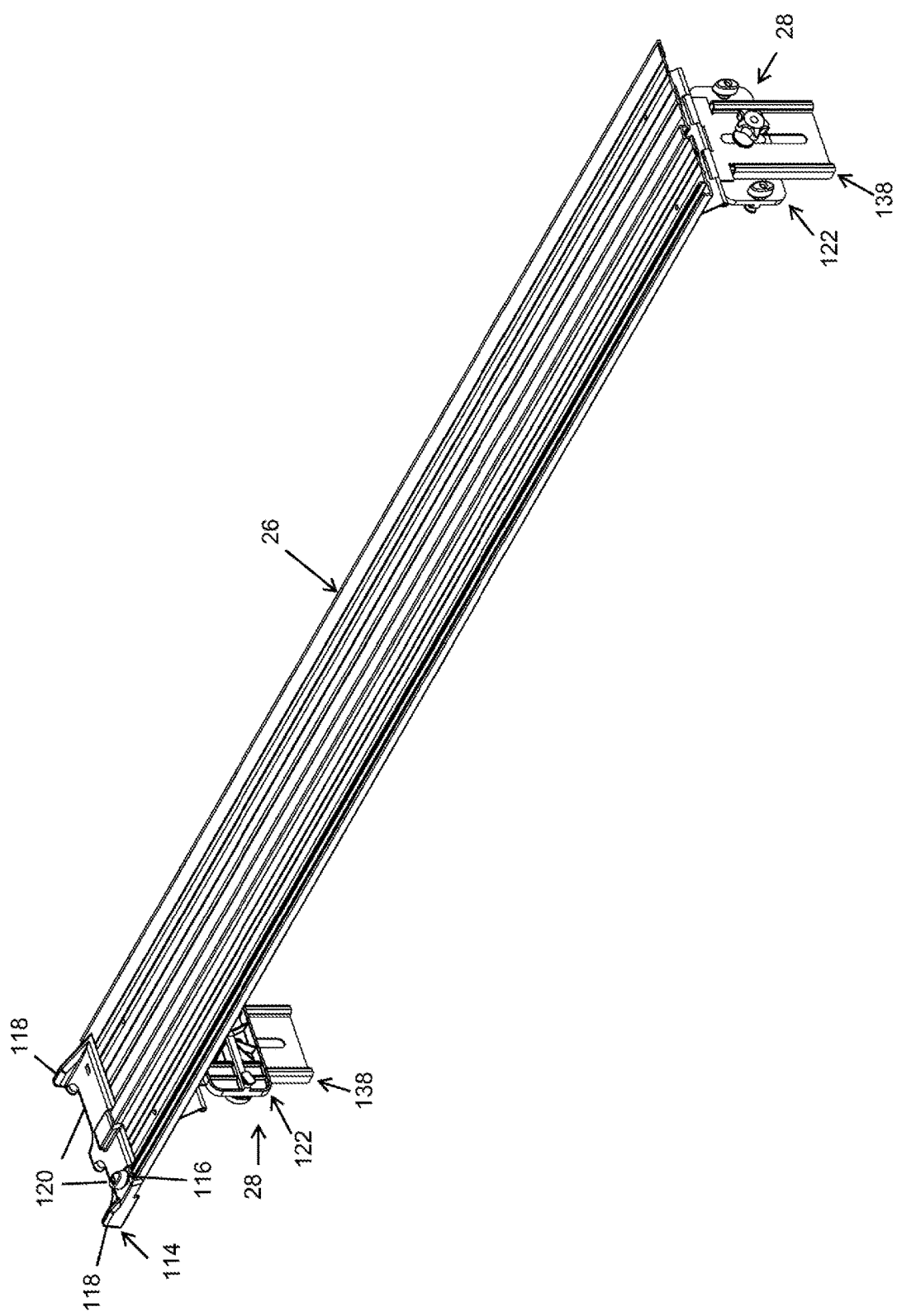
FIG. 27 is a top perspective view of the hinge member and saw track that is configured to connect to an edge track of the benchtop as is shown in FIG. 23.
Figure 28:
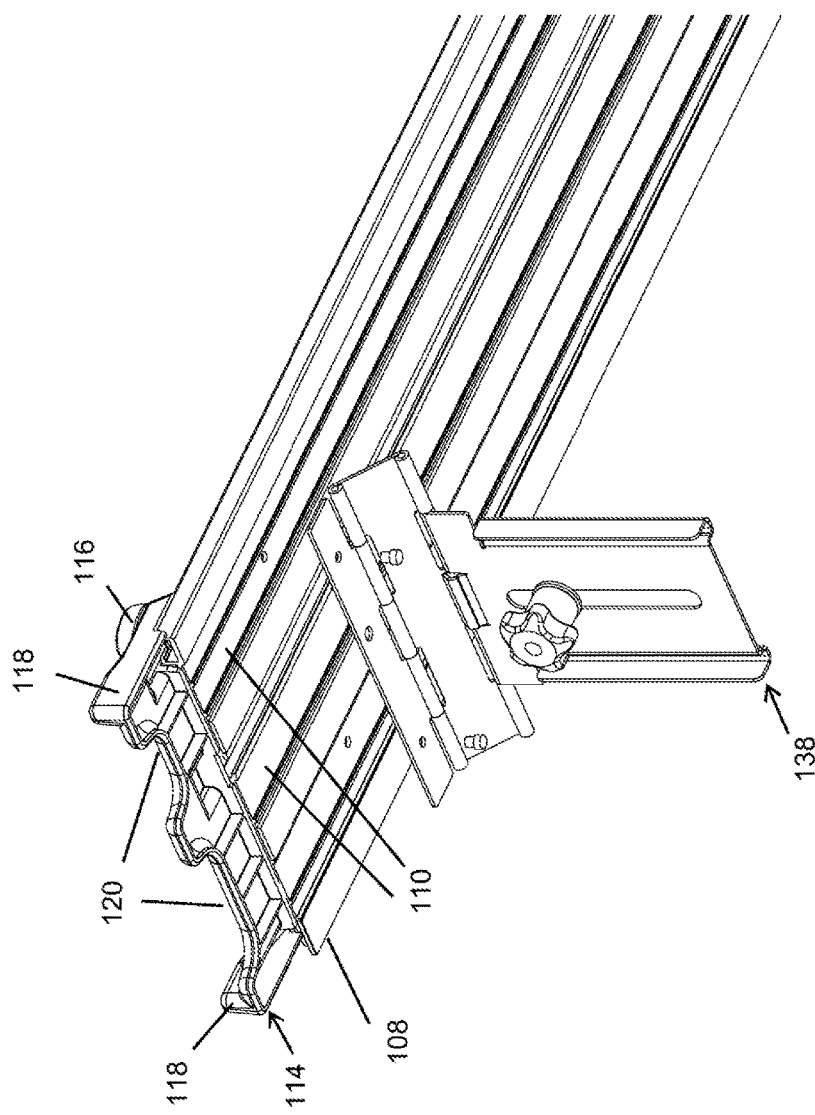
FIG. 28 is a close up bottom perspective view of one end of the hinge member and saw track that is configured to connect to an edge track of the benchtop as is shown in FIG. 23, the view showing the end of the saw track that has the cord manager connected to the saw track as is shown in FIG. 26.
Figure 29:
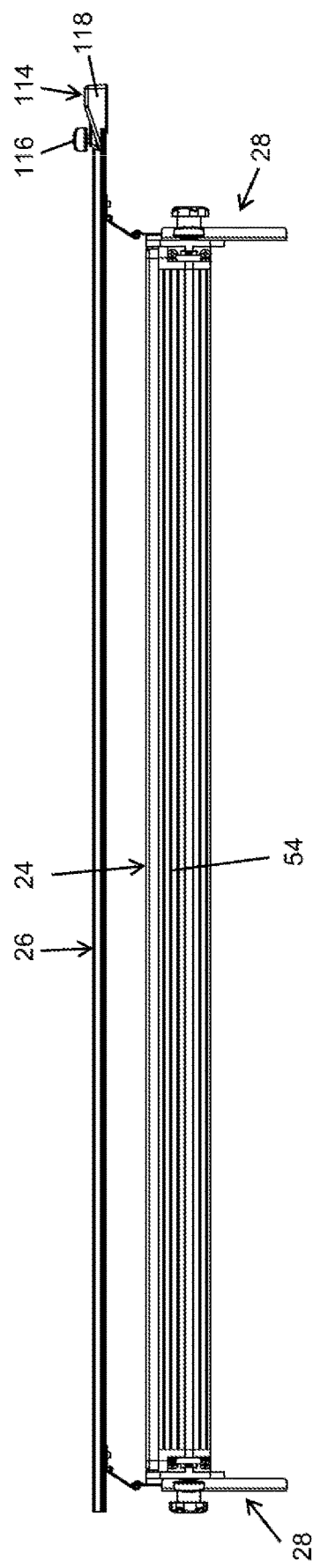
FIG. 29 is a front elevation view of the hinge member and saw track that is configured to connect to an edge track of the benchtop as is shown in FIG. 23, the view showing the hinge member and saw track connected to the edge track of a benchtop, the view showing the hinge members in a raised and over center position so as to allow workpieces to be inserted under and removed from below the saw track.
Figure 30:
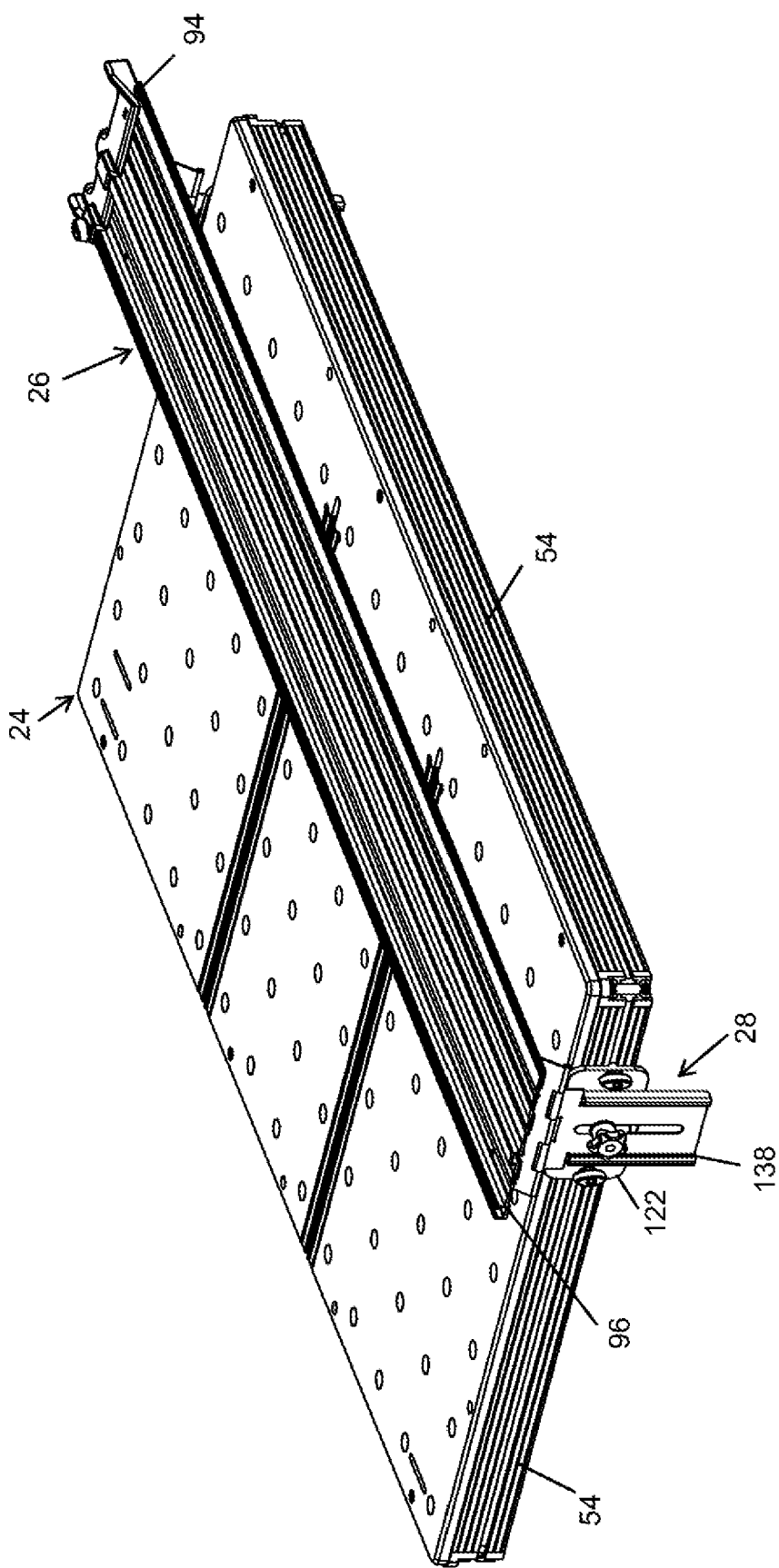
FIG. 30 is a top perspective view of the view shown in FIG. 29.
Figure 31:
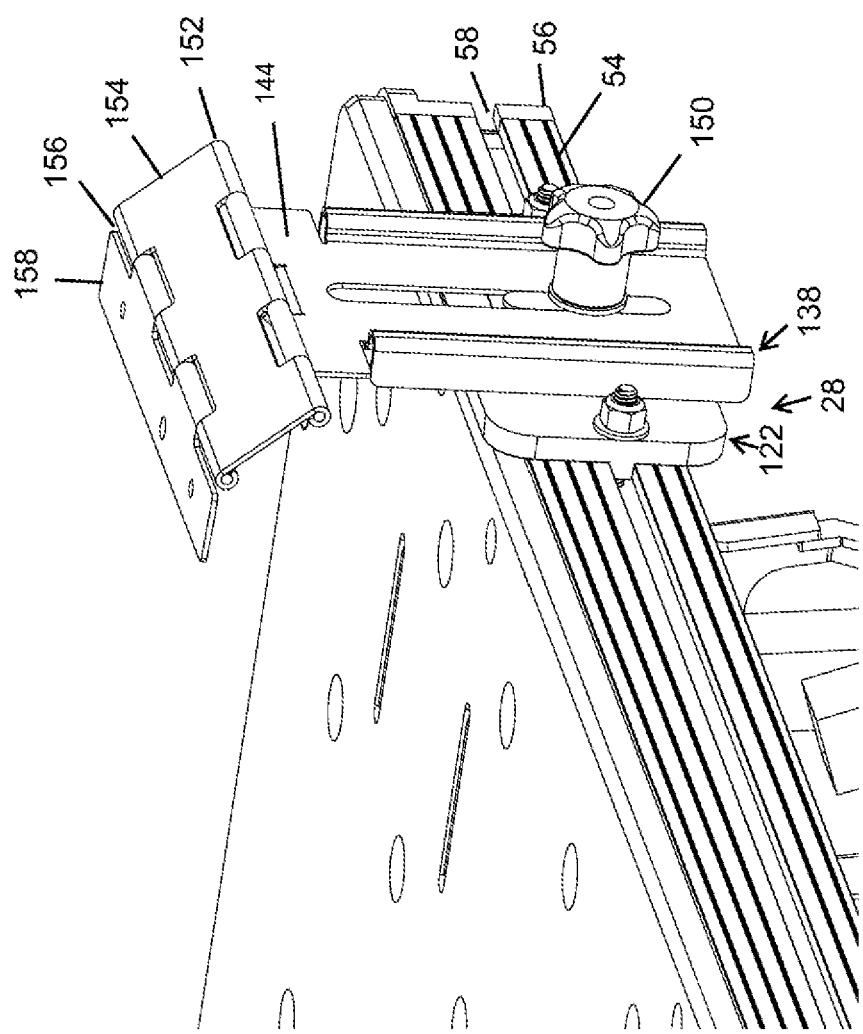
FIG. 31 is a close up perspective view of a hinge member connect to an edge track of the benchtop shown in FIG. 1, the view showing a mounting plate with an end plate connected to the mounting plate, the view showing the saw track removed from the upper end of the end plate; the view showing the center member and second hinge in a raised position, the view showing the end plate in a fully raised position with respect to the mounting plate.
Figure 32:
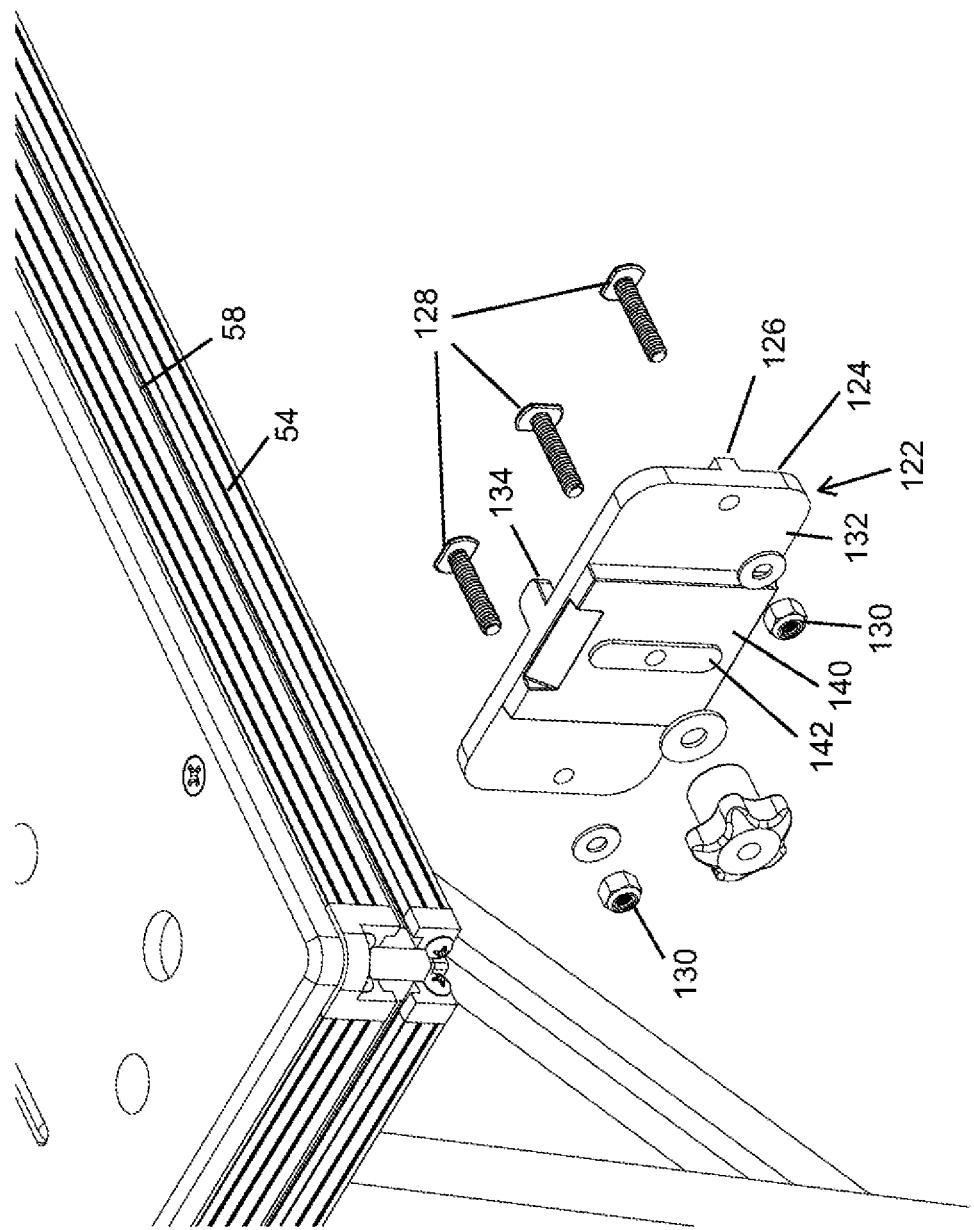
FIG. 32 is an exploded perspective view of the mounting plate shown in FIG. 31, the view showing the mounting plate removed from the edge track of the benchtop, the view showing three fasteners that attach the mounting plate to the groove of the edge track exploded from the mounting plate, the view showing second protrusion formed of a single solid feature machined onto the exterior surface of the first protrusion.
Figure 33:
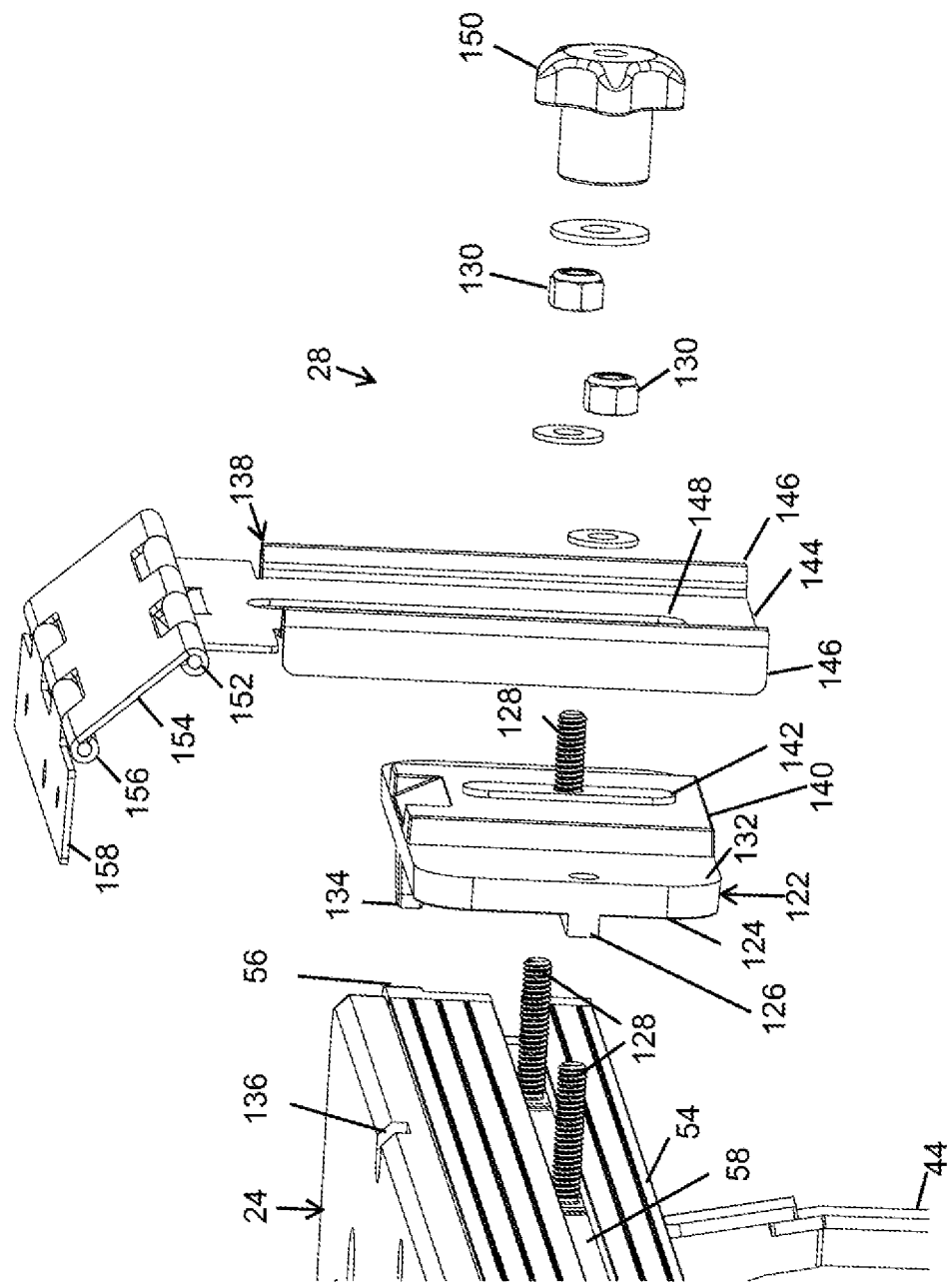
FIG. 33 is a perspective exploded view of the hinge member that is configured to connect to an edge track of the benchtop as is shown in FIG. 23, the view showing the mounting plate exploded from the edge track, the view showing the end plate exploded from the mounting plate, the view showing the two exterior-positioned fasteners positioned within the groove of the edge track, the view showing the centrally-positioned fastener positioned within the mounting plate, the view showing the alignment feature of the mounting plate aligned with the alignment receiver of the benchtop.
Figure 34:
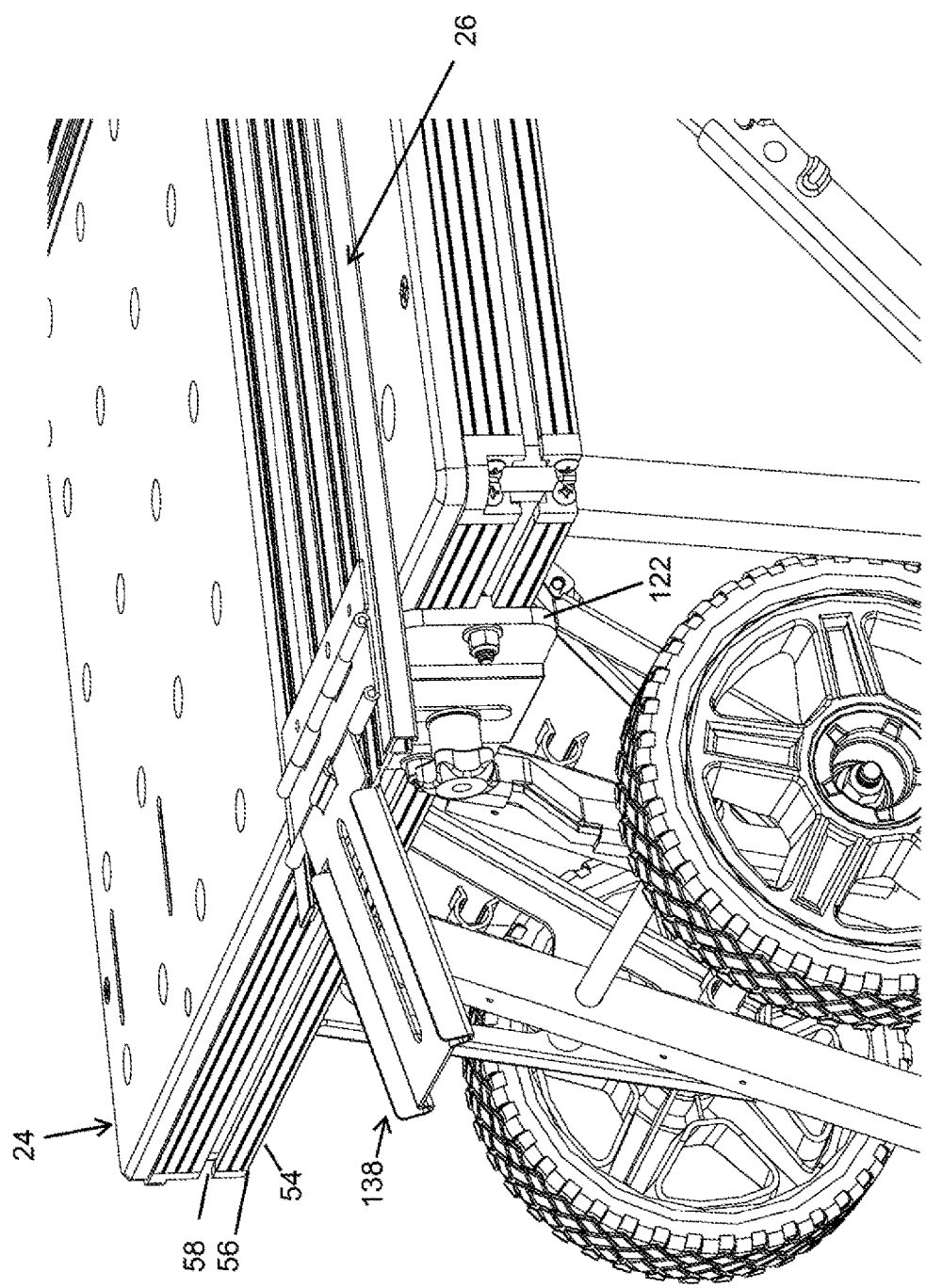
FIG. 34 is a perspective view of the saw track upside down and placed on the benchtop, the view showing the second hinge connected to the bottom surface of the saw track and the end plate connected to the second hinge by a center member, the view showing the mounting plate attached to the edge track of the benchtop.
Figure 35:
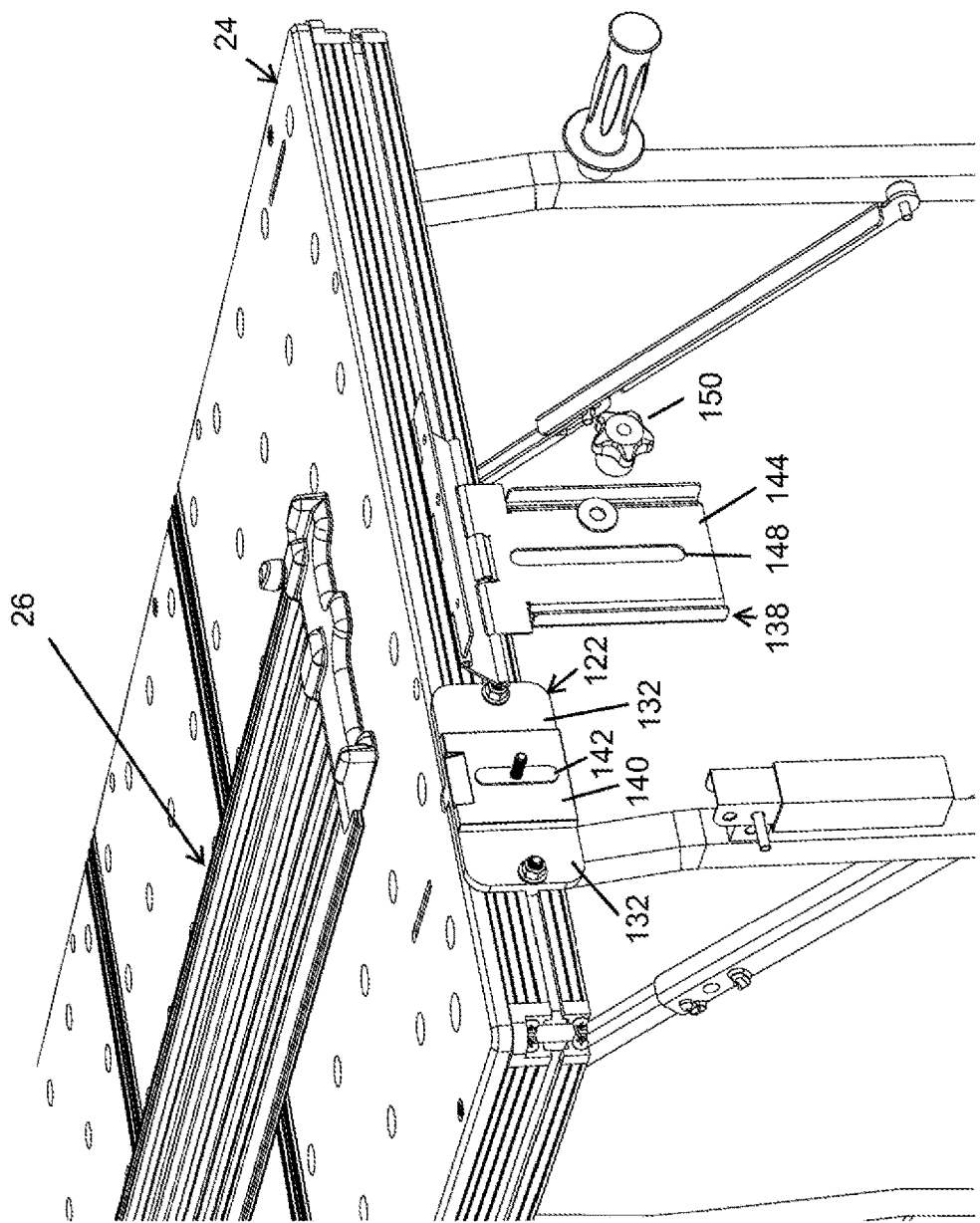
FIG. 35 is a perspective exploded view of the benchtop having an edge track positioned around the benchtop, the view showing a mounting plate connected to the edge track, the view showing the end plate exploded off of the mounting plate, the view showing the saw track positioned on the upper surface of the benchtop and unconnected to the end plate.
Figure 36:
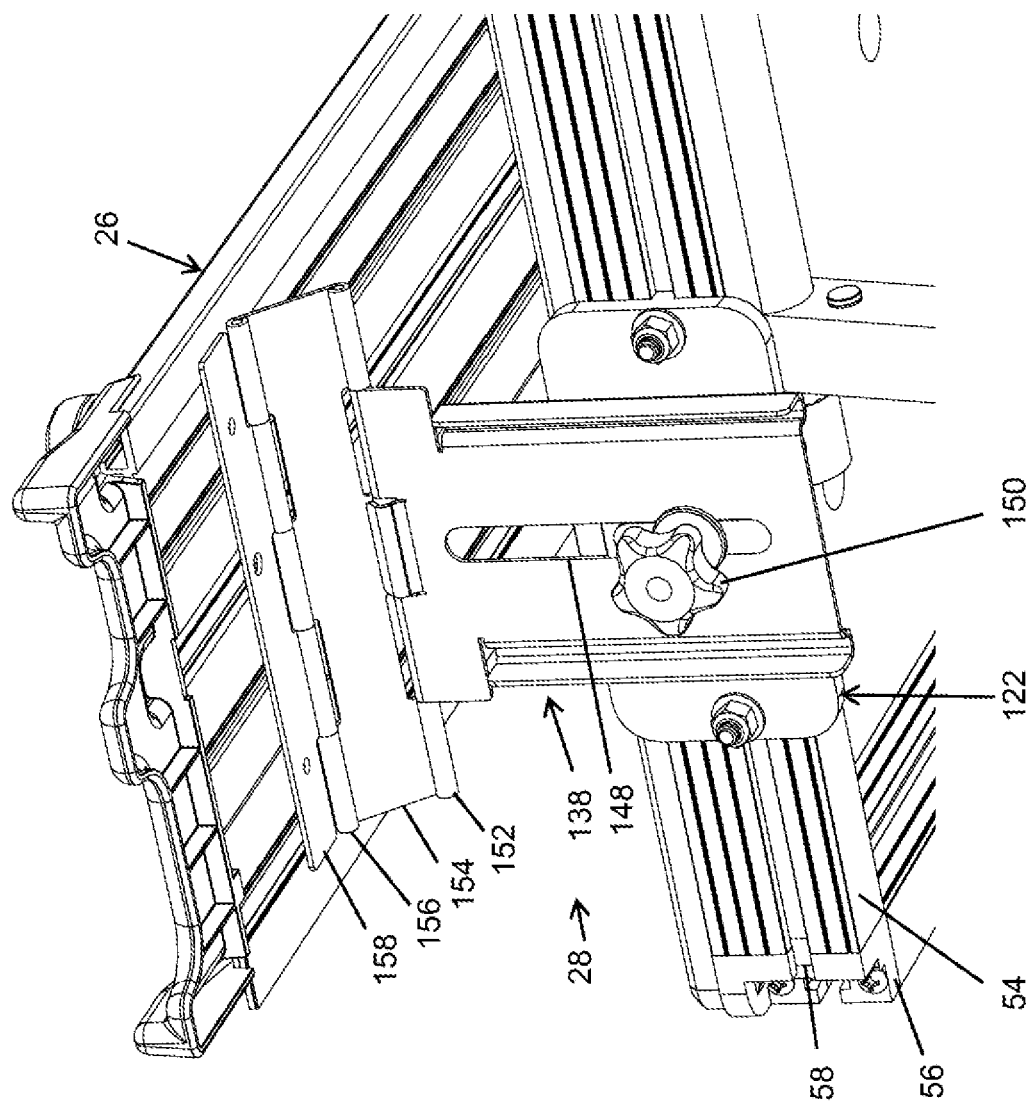
FIG. 36 is a close up perspective view of a hinge member connect to an edge track of the benchtop shown in FIG. 31, the view showing a mounting plate with an end plate connected to the mounting plate, the view showing the saw track connected to the upper end of the end plate; the view showing the center member and second hinge in a raised position, the view showing the end plate in a fully raised position with respect to the mounting plate.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

System:

With reference to the figures, an adaptive cutting system 10 (system 10) is presented. System 10 is formed of any suitable size, shape and design and is configured to facilitate the safe cutting of large and small workpieces in a quick, easy, safe, accurate and fun manner. In the arrangement shown, as one example, the adaptive cutting system 10 has a top side 12, a bottom side 14, a front side 16, a back side 18, a left side 20 and a right side 22. In the arrangement shown, as one example, the adaptive cutting system 10 includes the following component pieces, among others: a benchtop 24, a saw track 26, a pair of hinge members 28, a plurality of bench dogs 32, stop members including narrow rip stops 34, wide rip stops 36 and a miter gauge 38, a saw 40 and one or more workpieces 42, among other components.

Benchtop:

Adaptive cutting system 10 includes a benchtop 24. Benchtop 24 is formed of any suitable size, shape and design and is configured to provide a flat upper surface that is configured to support workpiece 42 during a cutting operation as well as provide alignment and measurement for the cutting operation. With reference to FIGS. 1-15, in the arrangement shown, as one example, benchtop 24, when viewed from above or below is formed of a generally square or rectangular member, however any other shape is hereby contemplated for use.

Legs: In one arrangement, benchtop 24 is supported by a plurality of legs 44. Legs 44 are formed of any suitable size, shape and design and are configured to support benchtop 24 at a desired height. In one arrangement, as is shown, four legs 44 support benchtop 24, with one leg 44 positioned adjacent each corner, however any number of legs 44 are hereby contemplated for use. These legs 44 are connected in pairs by cross braces 46, with one pair of legs 44 positioned along each side of the benchtop 24. Each pair of legs 44 are connected to benchtop 44 by a pair of hinged supports 48 that allow each pair of legs 44 to move between a folded position, wherein the pairs of legs 44 extend in a generally parallel manner to the plane of benchtop 24 along its bottom side which facilitates easy storage, and an extended position, wherein the pairs of legs 44 extend in a generally perpendicular manner to the plane of benchtop 24 which facilitates standing upright.

In an alternative arrangement, benchtop 24 is connected to a plurality of non-folding legs 44, or a non-folding base, such as is the arrangement of most conventional tables. In an alternative arrangement, benchtop 24 rests upon another supporting member or members such as a pair of saw horses, a frame member or any other supporting device or structure.

Feet: In some applications it is important that benchtop 24 be flat, level and stable. To ensure a level and stable work surface, the lower ends of legs 44 include feet 50 that are adjustable. These adjustable feet 50 allow the length of legs 44 to be adjusted so as to accommodate for variations in the workshop floor so as to ensure a flat, level and stable work surface. In one arrangement, adjustable feet 50 are threaded into the lower end of legs 44 so that adjustment may be easily made by simply rotating the feet 50.

Handles: In one arrangement, in the example shown, one side of benchtop 24, the left side of benchtop 24, includes one or more handles 52. In the arrangement shown, a handle 52 is connected to the forward-positioned leg 44 positioned a distance below benchtop 24 that is collapsible. That is, this handle 52 folds between an extended position, wherein it extends outward from leg 44 in a horizontal manner when leg 44 is itself in an extended position so that that the handle 52 may be easily grasped, and a collapsed position, wherein the handle 52 folds parallel to leg 44 so as to be out of the way. In the arrangement shown, a handle 52 is also connected to the rearward-positioned leg 44 positioned a distance below benchtop 24 that is rigidly affixed. That is, this handle 52 remains in an extended position, wherein it extends outward from leg 44, and away from benchtop 24 in a generally horizontal manner when the legs are in an extended position, so that the handle 52 may be easily grasped. The combination of these two handles 52 provides two convenient grips for a user to move the benchtop 24. The collapsible handle 52 allows this handle to fold away so that it is not in the way during a cutting operation. In an alternative arrangement, both handles 52 may be collapsible or both handles may be rigidly affixed, or any other combination of rigid or collapsible handles 52 is hereby contemplated for use as is any number of handles 52 as well as any placement or orientation of handles 52.

In one arrangement, benchtop 24 is formed of a manufactured wood product such as a particle board, melamine, hardboard, medium-density fiberboard, plywood, or any other wood product, or sheet product or planks of wood or the like, or any combination thereof. Alternatively, benchtop 24 may be formed of any other material such as plastic, composite or any other non-wood material or any combination thereof. Manufactured wood products, such as particle board or medium density fiberboard or the like, have the benefits of being relatively inexpensive, being durable and providing a flat surface for measuring and cutting. One disadvantage of using a wood product for benchtop 24 is that the wood will actually swell and shrink as the temperature and humidity changes, which may cause alignment and measurement issues. That is the dimensions of benchtop 24 are dynamic and dynamic enough to affect the accuracy of measurements based on features or components that are placed on, connected to or part of benchtop 24. It is for these reasons that measurement and alignment on the benchtop 24 a of this nature cannot be performed. While the benchtop 24 may vary somewhat in dimension, these dimensional changes can be addressed or accounted for through proper calibration, adjustment and other practices as is described herein.

Edge Track: In the arrangement shown, as one example, benchtop 24 includes an edge track 54 that extends across all or a portion of some or all of the edges of benchtop 24. In the arrangement shown, as one example, an edge track 54 extends across the entire length of the front edge, left edge, back edge and right edge of benchtop 24. In the arrangement shown, as one example adjacent edge tracks 54 connect to one another at corners 56. Edge tracks 54 are formed of any suitable size, shape and design and are configured to connect to the edges of benchtop 24 and provide a convenient place to mount tools and accessories to benchtop 24. In one arrangement, as one example, edge tracks 54, when viewed from their end are generally rectangular members, with generally flat and square upper and lower edges and generally flat inward and outward facing surfaces. In the arrangement shown, as one example, the outward facing surface of edge tracks 54 have a groove 58 that also faces outward and away from the benchtop 24 along the end-to-end length of the edge track 54. In one arrangement, as is shown, the groove 58 in edge track 54 is a T-slot, however any other shape is hereby contemplated for use as groove 58 as is any number of grooves 58 and any placement of grooves 58 which may include a groove 58 in the upper surface and/or lower surface of edge track 54. In the arrangement wherein groove 58 in edge track 54 is a T-slot that extends the entire end-to-end length of edge track 54, this T-shaped groove allows the insertion of an anchor of a tool or accessory into the groove 58 and sliding the position of the tool or accessory along the length of the groove 58 while preventing unintentional disengagement of the tool or accessory from the groove 58, as is further described herein.

Corners: In the arrangement shown, as one example, adjacent edge tracks 54 connect to one another at corners 56. Corners 56 are formed of any suitable size, shape and design and are configured to wrap around the corners of benchtop 24 and connect to the corner of benchtop 24 and connect adjacent edge tracks 54 to one another on either side of the corner of benchtop 24. In one arrangement, as is shown, to facilitate insertion of an anchor of a tool or accessory into the groove 58, corners 56 have a similar groove to that of edge tracks 54 that aligns with the groove 58 of edge tracks 54 when edge tracks 54 are attached to corners 56. In this way, the attachment of edge tracks 54 to corners 56, and the alignment of their respective grooves 58 do not inhibit the insertion of anchors of tools or accessories into the groove 58 of edge tracks 54. Said another way, corners 56 connect adjacent edge tracks 54 while still allowing access to grooves 58 of edge tracks 54.

In one arrangement, edge tracks 54 are formed of an aluminum metal or metal alloy. This arrangement has been tested with success as aluminum or an aluminum metal alloy is light weight and strong. However, in the event that a saw engages an aluminum or aluminum alloy edge track 54, the saw should cut right through the aluminum and not damage the saw or the operator. Alternatively, any other material is hereby contemplated for use as edge tracks 54 such as a ferrous metal, such as steel or iron, or a plastic, a composite or any other non-metallic material or the like or a combination thereof.

One benefit of having edge tracks 54 extend all the way around the benchtop 24, and connecting the edge tracks 54 to one another using corners 56 is that this arrangement forms a complete and connected square frame member around the benchtop 24. This square frame member provides increased strength and rigidity to benchtop 24. In this way, edge tracks 54 help to prevent deformation of the benchtop 24 which provides better cutting results, a sturdier device, greater strength and improved safety while also providing a convenient place for attaching a tool or accessory to benchtop 24 at any position around the periphery of benchtop 24. In the arrangement shown, as one example, the upper surface of edge tracks 54 are positioned a distance below the upper surface of benchtop 24 so as to not interfere with the sliding of workpieces 42 across the upper surface of benchtop 24. In the arrangement shown, benchtop 24 is easily removed and replaced within the frame formed by edge tracks 54 and corners 56.

Bench Dog Holes: In the arrangement shown, as one example, benchtop 24 includes a plurality of bench dog holes 60. In the arrangement shown, as one example, bench dog holes 60 are formed of cylindrical holes that extend through the benchtop 24 from the top surface to the bottom surface and are vertically aligned to extend perpendicularly to the top surface of benchtop 24. While round bench dog holes 60 are shown for use, any other shape of bench dog holes 60 are hereby contemplated for use such as square, rectangular, triangular, octagonal, oval or any other shape or combination thereof. One benefit of round bench dog holes 60 is that they are non-directional. One benefit of non-round bench dog holes is that they may provide direction or alignment to a bench dog 32 which may provide direction and alignment to a workpiece 42. In contrast, two bench dogs 32 in round bench dog holes 60 are needed to provide alignment and direction to a workpiece 42. In one arrangement, some or all of bench dog holes 60 do not extend all the way through the benchtop 24 and instead they extend only a portion of the way into benchtop 24. In this way, these bench dog holes 60 form recesses in the benchtop 24, but not through-holes. Any other configuration of bench dog holes 60 is hereby contemplated for use.

In the arrangement shown, as one example, bench dog holes 60 extend across benchtop in a pattern. In one arrangement, this pattern of bench dog holes 60 is a squared pattern or grid pattern where the plurality of bench dog holes 60 extend in aligned rows and aligned columns across the benchtop 24 with each bench dog hole 60 being aligned with one another and/or equally spaced from its vertically and horizontally adjacent bench dog holes 60. This squared pattern of bench dog holes 60 is also aligned or squared to the edges of the benchtop 24, such as the edge that runs along the front side of the benchtop 24, the edge that runs along the back side of the benchtop 24, the edge that runs along the left side of the benchtop 24 and/or the edge that runs along the right side of the benchtop 24. That is the outward positioned rows or columns extend in a parallel spaced manner to the edges of benchtop 24. As such, adjacent bench dog holes 60 are aligned in rows that extend in approximate perpendicular alignment or approximate parallel alignment with the edges of benchtop 24. Or, said another way, when a square grid pattern of bench dog holes 60 is used in association with a square or rectangular benchtop 24, the sides or edges of the benchtop extend either in parallel spaced alignment or perpendicular alignment to the rows and columns formed by the grid of bench dog holes 60.

As the grid of bench dog holes 60 extend in a square pattern, various other angles can be formed by connecting various bench dog holes 60. As one example, a 45 degree angle (and conversely a 135 degree angle) may be formed with respect to an edge by connecting diagonally positioned bench dog holes 60. The grid of equally spaced and precisely aligned bench dog holes 60 positioned across benchtop 24 allows for precise alignment of workpieces 42 on the benchtop 24 by placing a bench dog 32 in two bench dog holes 60 and aligning an edge of a workpiece 42 against the two bench dogs 32, thereby aligning the workpiece 42 to the benchtop 24.

To be clear, bench dog holes 60 may be placed in any other pattern other than square or rectangular. These other patterns facilitate the positioning of workpieces 42 at various angles and positions. Other patterns may include a circular pattern, a diamond pattern, a spiral pattern, or any other form of a pattern.

Calibration Features: In one arrangement, benchtop 24 includes one or more calibration features 62. Calibration features 62 are formed of any suitable size, shape and design and are configured to facilitate alignment and calibration of the saw track 26 to the benchtop 24, or more specifically to the grid of bench dog holes 60 in the benchtop 24. In one arrangement, as is shown, calibration features 62 sized and shaped just like the other bench dog holes 60 in benchtop 24. In one arrangement, as is shown, two calibration features 62 are presented, one calibration feature 62 is positioned adjacent each end of the front side of the benchtop 24 which is located between the saw track 26 and the edge on the front side of the benchtop 24, however any other number of calibration features 62 are hereby contemplated for use such as one, three, four, five, six, seven, eight, nine, ten or more, as is any other position. In one arrangement, as is shown, these calibration features 62 while aligned with the grid of bench dog holes 60, the calibration features 62 are separate from the grid of bench dog holes 60. In an alternative arrangement, calibration features 62 are simply one or more of the grid of bench dog holes 60. In one arrangement, calibration features 62 are formed of the same, size, shape and design as the bench dog holes 60, whereas in an alternative arrangement, calibration features 62 are formed of a different size, shape and/or design as the bench dog holes 60.

To calibrate a saw track 26 to the benchtop 24, the saw track 26 is connected to the benchtop 24, but not tightened down. Two bench dogs 32 are placed in the calibration features 62. Next, the saw track 26 is moved until a cutting edge 62 of the saw track 26 engages the edges of the two bench dogs 32 positioned within the calibrating features 62. Once in this position, the saw track 26 is tightened in place thereby locking the saw track 26 in alignment with the grid of bench dog holes 60. More specifically, the cutting edge 98 of the saw track 26 is in approximate parallel spaced alignment to the front side and back side of the squares that form the grid of bench dog holes 60, and is in approximate perpendicular alignment to the left side and right side of the squares that form the grid of bench dog holes 60. In this way, saw track 26 can quickly and easily be calibrated specifically to the benchtop 24. This allows removal and replacement of the saw track 26 in the precise alignment it was in before removal. In addition, recalibration is quick and easy. As such enhanced accuracy and alignment is provided.

By machining calibration features 62 at the same time as the bench dog holes 60 are machined in the benchtop 24, and by forming the calibration features 62 out of the same size, shape and design as the bench dog holes 60 this means that the calibration features 62 will behave in like-kind or similar-fashion to the similar bench dog holes 60. That is, as the benchtop 24 swells and shrinks, expands and contracts, the calibration features 62 should move accordingly with the grid of bench dog holes 60 and thereby maintain their relative accuracy to the grid pattern of bench dog holes 26.

Table Tracks: Benchtop 24 includes one or more table tracks 66. Table tracks 66 are formed of any suitable size, shape and design and is configured to facilitate on table measurement as well as provide a convenient on table connection of tools and accessories for use during the cutting operations. With reference to FIGS. 17-22, in the arrangement shown, as one example, table tracks 66 extend a length from a forward end 68 to a rearward end 70 in a generally flat and straight manner. When viewed from an end, table track 66 has a generally square or rectangular shape with a generally flat upper surface, a generally flat bottom surface, and generally flat sides, however any other shape is hereby contemplated for use.

In the arrangement shown, as one example, when viewed from an end, table track 66 includes an groove 72 that is generally centrally positioned that connects to the upper surface of table track 66 and a pair of grooves 74 that are positioned on either side of the centrally positioned groove 72 that connect to the lower surface of table track 66. In one arrangement, groove 72 and grooves 74 are formed of a T-slot, meaning that the width of the access slot into the groove 72 through the top surface of the table track 66 in the case of groove 72 and the width of the access slot into the grooves 74 through the lower surface of table track 66 in the case of grooves 74 are narrower than the width of these grooves 72, 74 within table track 66. In this way, grooves 72, 74 are configured to receive the head of a bolt, or screw or other anchor mechanism of an accessory or tool within the wide portion of the groove 72, 74 while allowing lateral positioning of the head of a bolt, or screw or other anchor mechanism of an accessory or tool within along the length of the table track 66 while preventing vertical pull out. In one arrangement, as is shown, grooves 74 in the lower surface of table track 66 are used to mount table track 66 to benchtop 24 through the use of fasteners such as screws, bolts, or the like wherein the head of the fastener is inserted within the groove 74 and the shaft of the fastener extends through the benchtop 24. Any other number of grooves are hereby contemplated for use in table track 66.

In the arrangement shown, as one example, the upper surface of table track 66 includes a pair of measuring grooves 76, wherein one measuring groove 76 is positioned on either side of the centrally positioned groove 72 in the upper surface of table track 66. In the arrangement shown, as one example, these measuring grooves 76 occupy the space above grooves 74. Measuring grooves 76 are formed of any suitable size, shape and design and are configured to receive a measuring member 78 having measuring indicia thereon, such as a measuring tape or ruler or other measuring device therein. In the arrangement shown, as one example, measuring grooves 76 are shallow rectangular grooves that are sized and shaped to receive a thin elongated measuring tape therein. In the arrangement shown, the outward sides of the measuring grooves 76 have arms that extend upward a distance before extending inward a distance. These arms form a channel and a lip that help to hold the measuring member 78 within the measuring grooves 76 in a secure manner while allowing the measuring member 78 to be laterally adjusted within and/or along the length of measuring groove 76. The purpose of having two measuring grooves 76 is to have one measuring groove 76 configured to measure narrow cuts, wherein the workpiece 42 fits on benchtop 24, and the other measuring groove 76 configured to measure wide cuts, wherein the workpiece 42 extends past the surface of the benchtop 24.

In the arrangement shown, as one example, a pair of table tracks 66 are positioned within a groove of benchtop 24 such that the upper surface of the table track is flush with, or slightly recessed to, the upper surface of benchtop 24. This positioning prevents the presence of table tracks 66 from interfering with sliding workpieces 42 on the upper surface of the benchtop 24. In the arrangement shown, table tracks 66 fit within these grooves within close and tight tolerances.

In the arrangement shown, as one example, each table track 66 is positioned a distance inward from the outward sides of the benchtop 24 and extends in approximate perpendicular relation to the front and back sides of benchtop 24, and extends in approximate parallel spaced relation to the sides of benchtop 24. As the table tracks 66 are in either parallel or perpendicular alignment to the edges of benchtop 24, table tracks 66 are inherently aligned with the grid of bench dog holes 60, or, said another way, the table tracks 66 are squared to the grid of bench dog holes 60. In the arrangement shown, table tracks 66 are equally positioned between two rows of bench dog holes 60 that extend between the front side and back side of the benchtop 24, however any other placement is hereby contemplated for use. In this way, table tracks 66 fit within the grid of bench dog holes 60 and do not interfere with or interrupt the grid of bench dog holes 60. In one arrangement, a centrally positioned table track 66 is hereby contemplated for use.

In one arrangement, the grooves that receive table tracks 66 are machined into the benchtop 24 at the same time as the other features of benchtop 24 are machined, such as the bench dog holes 60. As such, by simultaneous or contemporaneous machining of all features of benchtop 24 insures maximum accuracy between features, such as between bench dog holes 60 and table tracks 66. In the arrangement shown, as one example, the grooves that are machined into benchtop 24 when viewed from an end are generally square or rectangular shaped grooves that are sized and shaped to receive the profile of table tracks 66 with close and tight tolerances, and in some cases with tight frictional tolerances so that the grooves provide precise alignment to the table tracks 66 when they are positioned within these grooves. In the arrangement shown, as one example, these grooves only extend a distance into the material of benchtop 24 and as such the presence of these grooves do not interrupt the structural integrity of the benchtop 24. In the arrangement shown, as one example, the bottom surface of the grooves that receive table tracks 66 is approximately aligned with the upper surface of edge tracks 54 or is positioned just above the upper surface of edge tracks 54. This alignment provides full access to the end of table tracks 66 so as to allow insertion of tools or accessories into the grooves 72, 74, 76 of table tracks 66.

In the arrangement shown, where two table tracks 66 are shown in use, each table track 66 is positioned between the outward side of the benchtop 24 and the center of benchtop 24, however any other number of table tracks 66 are hereby contemplated for use, such as one, three, four, five, six or more.

In the arrangement shown, the rearward end of table tracks 66 intersect with the back edge of benchtop 24. In this way, access is provided to the groove 72 and grooves 74 and measuring grooves 76. That is, the head of a bolt, or screw or other anchor mechanism of an accessory or tool and/or the accessory or tool itself may be inserted within any of the grooves 72, 74, 76 from the back side of benchtop 24 and moved along any portion of the groove 72, 74, 76.

In the arrangement shown, as one example, the forward end of the grooves that receive table tracks 66 therein include reliefs 80 that are configured to receive lock member 82 therein. Lock members 82 are formed of any suitable size, shape and design and is configured to connect to table tracks 66 and allow adjustment of measuring members 78 with respect to table tracks 66 while also locking measuring members 78 in place once measuring members 78 are properly adjusted or calibrated. Said another way, lock members 82 hold measuring members 78 in place while also allowing for the selective adjustment of measuring members 78 with respect to table tracks 66.

In one arrangement, as is shown, lock members 82 are formed of a main body 84 that is formed of a single unitary member, however a multiple piece part is hereby contemplated for use, as is multiple independent pieces. Main body 84 of lock members 82 largely emulates the size and shape of table track 66, and merely extends the length of table tracks 66 a distance at the forward end of table tracks 66. In the arrangement shown, as one example, main body 84 includes a pair of protrusions 86 that are sized and shaped to fit within grooves 74 and/or groove 72 with close and tight tolerances such that insertion of protrusions 86 into grooves 74, 72 locks lock member 82 to table track 66. Like table tracks 66, the upper surface of lock members 82 include arms 88 that form grooves 90 that are configured to receive the forward end of measuring members 78 therein. In one arrangement, as is shown, these arms 88 and grooves 90 largely mirror the arms and grooves of measuring grooves 76 of table track 66.

In one arrangement, lock members 82 include a bias member 92 that is configured to engage and hold measuring member 78 in place while facilitating adjustment of measuring member 78 with respect to table track 66. In one arrangement, biasing member 92 is an arm positioned approximately in the middle of the groove of lock member 82 between opposing pairs of arms 88 and grooves 90 which is connected at its rearward end and extends upward slightly as it extends forward. In this arrangement, as the bias member 92 extends forward it rises upward out of the plane that forms the bottom of the groove between opposing pairs of arms 88 and grooves 90. In this way, the vertical rise of bias member 92 engages the measuring member 76 thereby frictionally locking the measuring member 76 in place by forcing the measuring member 76 in frictionally held engagement between bias member 92 and the grooves 90 and arms 88 of lock member 82. By pressing downward on the forward end of bias member 92 this causes the bias member 92 to rotate upon the hinge at the rearward end of bias member 92 that connects bias member 92 to the main body 84 of lock member 82.

To adjust the position of the measuring member 76 with respect to the table track 66, in one arrangement, sufficient force is applied the measuring member 76 that overcomes the friction between bias member 92 and measuring member 78 thereby causing relative movement (e.g. sliding the measuring member 78 within measuring groove 76 despite the engagement of bias member 92 on the bottom side of measuring member 78). In another arrangement, a force is applied downward upon bias member 92, through measuring member 76 causing the bias member 92 to retract and freeing the engagement between bias member 92 and the grooves 90 and arms 88 of lock member 82 thereby allowing free movement of measuring member 76. Once measuring member 76 is in its desired position, the bias member 92 is allowed to again push up on measuring member 76 thereby locking the measuring member 76 in place again.

In an alternative arrangement, table tracks 66 include measuring indicia affixed onto and/or into table track 66. In this arrangement, this measuring indicia is not adjustable and as such the table track 66 is adjustable relative to the cutting edge 98 and relative to the benchtop 24. In one arrangement, in this arrangement wherein the table tracks 66 include affixed measuring indicia thereon, the table tracks 66 slide within a groove in the benchtop 24 and is tightened in place once properly adjusted.

In one arrangement lock members 82 are connected to the forward end of table tracks 66 and are positioned below the saw track 26 that is connected to benchtop 24. Lock members 82 may be screwed, bolted, friction fitted, welded, glued, adhered, pinned, riveted, or connected to the forward end of table tracks by any other manner, method or means.

Saw Track:

In one arrangement system 10 includes a saw track 26. Saw track 26 is formed of any suitable size, shape and design and is configured to receive and guide a saw 40 to perform a cutting operation in association with benchtop 24. With reference to FIGS. 23-30, in the arrangement shown, as one example, saw track 26 extends a length between an opposing first end 94 and second end 96 and extends a width between a cutting edge 98 or front edge and a non-cutting edge 100 or back edge. In the arrangement shown, as one example, saw track 26 is formed of an extruded member, meaning that the features of saw track 26 extend in a consistent or relatively consistent manner from first end 94 to second end 96.

First Protrusion: In the arrangement shown, as one example, saw track 26 has a generally flat upper surface that extends in approximate parallel spaced relation to a generally flat bottom surface. In one arrangement, to help provide guidance to saw 40 as it slides along the length of saw track 26, saw track 26 includes a first protrusion 102 extends upward from the upper surface a distance. In the arrangement shown, as one example, first protrusion 102 is positioned between the cutting edge 98 and the non-cutting edge 100 of saw track, at or near the middle of saw track 26. When viewed from an end, first protrusion 102 is a generally square or rectangular shaped protrusion that extends upward from the upper surface of saw track 26. In the arrangement shown, first protrusion 102 forms a downward facing groove, or in the arrangement shown, a T-slot that may be used to receive fasteners for connecting tools and accessories to the saw track 26, such as hinge members 28. Protrusion 102 is configured to be received by a recess in a base 104 connected to saw 40 such that when saw 40 slides along saw track 26, the first protrusion 102 is received within the recess in the base 104 of saw 40 thereby providing precise alignment and guidance to saw 40 as saw 40 slides along the length of saw track 26.

Second Protrusion: In the arrangement shown, as one example, saw track 26 includes a second protrusion 106 that, like first protrusion 102, extends upward from the upper surface of saw track 26 a distance. In the arrangement shown, as one example, second protrusion 106 is positioned along the non-cutting edge 100 of saw track 26 and when viewed from an end is a generally square or rectangular protrusion that extends upward from the upper surface of saw track 26. In the arrangement shown, second protrusion 106 forms an upward facing groove, or in the arrangement shown, a T-slot, that may be used to receive fasteners for connecting tools and accessories to the saw track 26. In one arrangement, second protrusion 106 is also configured to be received by a recess in a base 104 connected to saw 40 such that when saw 40 slides along saw track 26, the second protrusion 106 is received within the recess in the base 104 of saw 40 thereby providing precise alignment and guidance to saw 40 as saw 40 slides along the length of saw track 26. In an alternative arrangement, second protrusion 106 is not used for alignment purposes and instead serves to strengthen saw track 26 and/or to facilitate attachment of components to saw track 26.

While two protrusions are shown extending upward from the upper surface of saw track 26, any number of protrusions are hereby contemplated for use, such as none, one, three, four, five, six or more. In the arrangement where no protrusions are present in saw track 26, other features may be present such as one or more grooves in saw track 26 that receive protrusions in the base 104 of saw 40 thereby providing guidance and alignment for saw 40.

Chip Strip: The cutting edge 98 of saw track 26 includes a chip strip 108. Chip strip 108 is formed of any suitable size, shape and design and is configured to be a consumable edge that is cut to precisely fit the blade of saw 40 to saw track 26 during a cutting operation. That is, in one arrangement, to provide durability and rigidity, saw track 26 is formed of a metallic material such as aluminum or an aluminum alloy or another metallic material. In contrast, chip strip 108 is formed of a plastic or composite or non-metallic material. Chip strip 108 extends past the outward edge of saw track 26 a distance. Upon the first cut using saw 40, the chip strip 108 is precisely cut to fit the blade of saw 40 with tight and close tolerances. This close fitting arrangement between the blade of saw 40 and the chip strip 108 of saw track 26 facilitates cutting clean and precise cuts in workpiece 42 and helps to prevent tear out and chipping of the workpiece 42 during cutting.

In one arrangement, when viewed from an end, chip strip 108 is a generally rectangular member that is adhered to the lower surface of saw track 26 adjacent its cutting edge 98. In one arrangement, as is shown, chip strip 108 extends all or a portion of the length of saw track 26 from end 94 to end 96. In one arrangement, as is shown, chip strip 108 is formed of two layers of non-metallic material. The upper layer is formed of a strong and rigid and hard non-metallic material. This hard material provides strength and rigidity to the chip strip 108. However, harder materials tend to have a lower coefficient of friction, which means that harder materials tend to slide over other objects easier than softer materials. As such, a lower layer of softer material or more-compressible material is placed below the upper layer. This lower layer is softer than the upper layer and as such it does not have the strength and rigidity of the upper layer. However, the softer material of the lower layer has a much higher coefficient of friction than the harder upper layer. As such, the addition of the softer lower layer of material of chip strip 108 helps to impart a higher level of friction upon workpiece 42 when saw track 26 is lowered onto workpiece 42. As such, the addition of the softer lower layer of material of chip strip 108 helps to hold a workpiece 42 in place during a cutting operation and helps to prevent a workpiece 42 from moving or shifting during a cutting operation, thereby improving the quality and accuracy of the cuts as well as helping to improve safety during cutting as a moving workpiece 42 is extremely dangerous. Another benefit of having the lower layer of softer material is that it helps impart friction on the workpiece 42 at the point of cutting. That is, the workpiece 42 is held where the cut occurs. This helps to hold small and narrow workpieces 42. In the arrangement shown, the softer lower layer of material of chip strip 108 is much thinner than the harder and more-rigid upper layer of chip strip 108. As such, the hard upper layer of chip strip 108 holds the rigidity and dimensional accuracy of chip strip 108 out to the forward most edge, or cutting edge 98, while the lower layer imparts grip on to workpiece 42. As such the combination of the two layers of material provide the desired mechanical properties that could not be accomplished by either material alone.

Upon the first pass of the saw 40 the chip strip 108 is cut to fit the saw 40. In the arrangement shown, as one example, to provide precise alignment, the inward edge of chip strip 108 is placed in engagement with a forward edge of a step-feature in the lower surface of saw track 26 while the upper surface of chip strip 108 is adhered to the bottom surface of saw track 26.

Grip Strip: In one arrangement, to further help hold a workpiece 42 in place, the lower surface of saw track 26 includes one or more grip strips 110. Grip strips 110 are formed of any suitable size, shape and design and are configured to engage and hold a workpiece 42 in place when saw track 26 is lowered onto the workpiece 42. In one arrangement, as is shown, grip strips 110 are formed of a compressible material having a high coefficient of friction such as a rubber, a foam, a rubberized foam or any other non-metallic material that has a high coefficient of friction. These grip strips 110 are generally rectangular in shape and are adhered to the lower surface of saw track 26 and extend all or a portion of the length of saw track 26 from end 94 to end 96. The presence of grip strips 110 on the lower surface of saw track 26 helps to impart friction on the workpiece 42 which helps to hold workpiece 42 in place during a cutting operation. Grip strips 110 may be adhered directly to a flat portion of the lower surface of saw track 26. Alternatively, grip strips 110 may be adhered to a recess or groove in saw track 26 that is configured to receive grip strips 110.

Glide Strip: In the arrangement shown, as one example, the upper surface of saw track 26 includes one or more glide strips 112. Glide strips 112 are formed of any suitable size, shape and design and are configured to facilitate smooth gliding of the base 104 of saw 40 over the upper surface of saw track 26. In one arrangement, as is shown, glide strips 112 are formed of a material having a low coefficient of friction. Or, said another way, glide strips 112 are formed of a material that facilitates smooth and easy sliding of the base 104 of saw 40 along the length of saw track 26. These glide strips 112 are generally rectangular in shape and are adhered to the upper surface of saw track 26 and extend all or a portion of the length of saw track 26 from end 94 to end 96. The presence of glide strips 112 on the upper surface of saw track 26 helps to reduce friction between the base 104 of saw 40 and the upper surface of saw track 26. As such, the presence of one or more glide strips 112 helps to make it easier to make a cut using saw 40 and saw track 26 by reducing the friction between saw 40 and saw track 26.

Glide strips 112 may be adhered directly to a flat portion of the upper surface of saw track 26. Alternatively, glide strips 112 may be adhered to a recess or groove in saw track 26 that is configured to receive glide strip 112.

Cord Manager: In one arrangement, as is shown, saw track 26 includes a cord manager 114. Cord manager 114 is formed of any suitable size, shape and design and is configured to be a safety feature that helps to hold and guide a power cord and/or a dust-collection vacuum tube connected to saw 40 during a cutting operation so that the power cord and/or vacuum tube does not interfere with the cutting operation or the user or cause a safety hazard. In one arrangement, as is shown, cord manager 114 is configured to fit over the first end 94 of saw track 26 and in doing so, cord manager 114 includes locking members that fit within the slots of first protrusion 102 and/or second protrusion 106 and/or any other feature or component of saw track 26. In the arrangement shown, cord manager 114 includes a knob 116 that is configured to facilitate tightening and loosening of cord manager 114 to the slot of the second protrusion 106 of saw track 26 for purposes of installation and removal. In the arrangement shown, cord manager 114 includes a fin 118 positioned at the front side of the cord manager 114 and a fin 118 positioned at the rear side of the cord manager 114 that extend upward from the main body of cord manager 114 a distance thereby creating a trough or valley between the opposing fins 118 that is configured to receive and hold the power cord and/or vacuum tube therein. In the arrangement shown, when viewed from above, the outward end of cord manager 114 forms one or more recesses 120 between the outward sides of cord manager 114. These recesses 120 are configured to receive and hold a power cord and prevent the power cord from sliding around to the front side or back side of the saw track 26 during use. In this way, cord manager 114 helps to facilitate guidance of the power cord of saw 40 down the length of the saw track 26 during a cutting operation. The recesses 120 in cord manager 114 also facilitates the guidance of a vacuum hose in applications wherein a vacuum hose is attached to saw 40.

Saw track 26 is configured to move between a raised position, wherein workpieces 42 may be removed and replaced under saw track 26, and a lowered position, wherein the lower surface of saw track 26 engages workpiece 42 and clamps the workpiece 42 in place between saw track 26 and benchtop 24. In one arrangement, saw track 26 is vertically movable by hinge members 30.

Hinge Members:

With reference to FIGS. 23-44 and 97-99, in one arrangement system 10 includes a pair of hinge members 28. Hinge members 28 are formed of any suitable size, shape and design and are configured to facilitate movement of saw track 26 between a raised position, wherein workpieces 42 may be removed and replaced under saw track 26, and a lowered position, wherein the lower surface of saw track 26 engages workpiece 42 and clamps the workpiece 42 in place between saw track 26 and benchtop 24. In the arrangement shown, two hinge members 28 are used in association with benchtop 24 and saw track 26, with one hinge member 28 connected adjacent each end 94, 96 of saw track 26 and connected to opposing edge tracks 54 connected to the left side and right side of the benchtop 24.

Mounting Plate: In the arrangement shown, as one example, hinge members 28 include a mounting plate 122. Mounting plate 122 is formed of any suitable size, shape and design and is configured to attach hinge member 28 to an edge track 54. In the arrangement shown, as one example, mounting plate 122, when viewed from the left side or right side, is generally square or rectangular in shape, and includes rounded corners. When viewed from the front or back, mounting plate 122 is a generally planar shaped member. The inward facing side 124 of mounting plate 122 includes a protrusion 126 that is configured to engage and fit within the groove 58 in the exterior facing surface of edge track 58 to which it connects. This engagement between groove 58 of edge track 54 and the protrusion 126 of mounting plate 122 helps to provide alignment and adds strength to the connection between mounting plate 122 and edge track 54. That is, when mounting plate 122 is installed onto benchtop 24, protrusion 126 is fully inserted within the groove 58 of edge track 54 and the inward facing surface 124 of mounting plate 122 is in flat and flush planar engagement with the exterior surface of edge track 54. In the arrangement shown, as one example, protrusion 126 is a generally square or rectangular shaped member that extends outward from the inward facing surface 124 in a generally perpendicular manner to the plane formed by inward facing surface 124. Also, in the arrangement shown, as one example, protrusion 126 extends all or most of the front-to-back length of mounting plate 122 thereby providing maximum alignment and stability to the connection between mounting plate 122 and edge track 54.

To further facilitate connection between mounting plate 122 and edge track 58, one or more fasteners 128 are inserted into the groove 58 of edge track 54 that extend outward from edge track 54 and through openings in mounting plate 122. In the arrangement shown, these fasteners are aligned with the protrusion 126 and/or extend through the protrusion 126 and are tightened into place using nuts 130 and/or handles positioned on the outward facing side 132 of mounting plate 122. In the arrangement shown, as one example, one opening and associated fastener 128 and nut 130 is positioned at the approximate center of mounting plate 122 as well as each outward end of mounting plate 122.

To provide lateral alignment of the mounting plate 122 on the edge track 54, and to facilitate positioning and re-positioning the saw track 26 in the same place time and time again, the inward facing side 124 of mounting plate 122 includes an alignment feature 134 that is configured to be received within an alignment receiver 136 positioned in benchtop 24. Alignment feature 134 is formed of any suitable size, shape and design and in the arrangement shown, is an inwardly extending protrusion positioned at the top inward edge of mounting plate 122. When viewed from above, alignment feature 134 is generally centrally positioned within the forward to back length of mounting plate 122 and includes straight sides and a rounded end, however any other arrangement or position is hereby contemplated for use.

In this arrangement, alignment receiver 136 is a similarly shaped recess or feature cut into the material of benchtop 24. That is, alignment receiver 136 has straight sides and a rounded end that is sized and shaped to receive alignment feature 134. However, as is described herein, the dimensions of benchtop 24 tend to vary slightly with changes in temperature and humidity. To provide maximum accuracy, and to assure to the extent possible that saw track 26 precisely aligns with the grid of bench dog holes 60 and table tracks 66, alignment receiver 136 is machined into benchtop 24 at the same time that the bench dog holes 60 and grooves that receive table tracks 66 are machined into the benchtop 24. Machining all of the features into benchtop 24 at the same insures dimensional accuracy between the features in the benchtop 24 at the time they are machined. This is because contemporaneous machining of the features ensures that the benchtop 24 did not expand or shrink between the time that different features are placed in benchtop 24.

Despite being machined at the same time, in some cases it is desirable to have some adjustability for the position of hinge members 28 and saw track 26. As such, in one arrangement, as is shown, alignment receiver 136 is slightly wider than alignment feature 134. As such, when alignment feature 134 is positioned within alignment receiver 136, hinge member 28 may be slightly laterally adjusted (forward to back) to ensure proper alignment of the saw track 26 with the grid of bench dog holes 60 and table tracks 66. To determine this proper precise alignment and positioning of alignment feature 134 within alignment receiver 136, the saw track 26 is installed, bench dogs 32 are placed within the calibration holes 62 and the hinge members 28 are slid forward until the cutting edge 98 of the saw track 26 is engaged with the calibration holes 62. Once in this position, the precise alignment of the saw track 26 (and the alignment member 136 within the alignment receiver 136) is determined and the hinge member 28 is tightened in place using nuts 130 and fasteners 128.

Due to the connection between protrusion 126 and groove 58 of edge track 54, the vertical position of mounting plate 122 is fixed. To provide vertical adjustment of saw track 26, an end plate 138 is connected to mounting plate 122 that vertically moves with respect to mounting plate 122. To facilitate this connection between mounting plate 122 and end plate 138, the outward facing side 132 of mounting plate 122 includes a first protrusion 140 and a second protrusion 142. In the arrangement shown, as one example, first protrusion 140, when viewed from the left side or right side, is a generally square or rectangular feature that extends outward from the outward facing side 132 of mounting plate 122, however any other shape is hereby contemplated for use. In the arrangement shown, as one example, second protrusion 142, when viewed from the left side or right side, is a generally elongated feature with straight sidewalls and rounded ends that extends outward from the outward facing side 132 of first protrusion 142, however any other shape is hereby contemplated for use. First protrusion 140 is generally centrally positioned between the ends of mounting plate 122 and extends vertically across the mounting plate 122. Second protrusion 142 is generally centrally positioned within first protrusion 140 and terminates before the upper and lower ends of first protrusion 140. First protrusion 140 and second protrusion 142 are configured to receive and guide end plate 138 while facilitating vertical adjustment of saw track 16.

End Plate: In the arrangement shown, as one example, hinge members 28 include an end plate 138 that connects to mounting plate 122 and facilitates sliding vertical movement of saw track 26. It is desirable to have saw track 26 be in flat and flush alignment between hinge members 28 when saw track 26 is in engagement with the upper surface of workpiece 42. To facilitate this alignment, end plates 138 vertically slide on mounting plates 122.

End Plate 138 is formed of any suitable size, shape and design and is configured to attach to mounting plate 122. In the arrangement shown, as one example, end plate 138 includes a generally flat and planar main body 144. Main body 144 includes a pair of arms 146, one positioned on each side of main body 144 that extend toward benchtop 24 and extend a vertical length of main body 144. The space between opposing arms 146 is sized and shaped to receive first protrusion 140 there between with close and tight tolerances while also allowing for sliding vertical movement. In the arrangement shown, arms 146 initially extend toward benchtop 24 before bending around to extend away from benchtop 24. This bending of arms 146 provides structural strength and rigidity to end plate 138 much like corrugation does to a sheet of material. Main body 144 of end plate 138 also includes a slot 148. Slot 148 is sized and shaped to receive second protrusion 142 therein with close and tight tolerances. Slot 148 is vertically longer than second protrusion 142 so as to facilitate vertical adjustment. In the arrangement shown, just like second protrusion 142, slot 148 includes straight sidewalls and curved ends. In a fully raised position, the lower edge of second protrusion 142 engages the lower edge of slot 148. In a fully lowered position, the upper edge of second protrusion 142 engages the upper edge of slot 148.

When mounting plate 122 is installed on edge track 54, end plate 138 is installed on mounting plate 122 by placing the interior facing surface of main body 144 on the outward facing surface 132 of mounting plate 122 such that the first protrusion 140 is received in the recess formed between arms 146 and the second protrusion 142 is received within slot 148. In this position, the fastener 128 that extends through second protrusion 142 also extends through slot 148 and is connected to a handle 150. In this position, end plate 138 is vertically adjustable until the upper end of second protrusion 142 engages the upper end of slot 148, which defines the lowest available position, and until the lower end of the second protrusion 142 engages the lower end of the slot 148, which defines the upper most available position. Once end plate 138 is at its desired vertical position, handle 150 is tightened and the end plate 138 is locked in place with respect to mounting plate 122. In the arrangement shown, handle 150 is a knob that threads over the threaded shaft of fastener 128.

The upper end of main body 144 extends upward a distance from the upper end of arms 146 and slot 148 and connects to a first hinge 152. In the arrangement shown, first hinge 152 is what is known as a barrel hinge, however any form of a hinge is hereby contemplated for use. First hinge 152 connects a center member 154 to the main body 144 of end plate 138. The upper end of center member 154 connects to a second hinge 156. In the arrangement shown, like first hinge 152, second hinge 156 is what is known as a barrel hinge, however any form of a hinge is hereby contemplated for use. Second hinge 156 connects an upper member 158 to the center member 154 and main body 144. In the arrangement shown, center member 154 and upper member 158 are generally flat and planar members that connect to hinges 152, 156. Upper member 158 includes a plurality of openings that receive fasteners or other features that facilitate connection of upper member 158 to the lower surface of saw track 26.

Once hinge members 28 are fully assembled, that is, mounting plates 122 are installed on edge tracks 54, and end plates 138 are installed on mounting plates 122, and upper members 158 of end plates 138 are installed on the lower surface of saw track 26, the saw track 26 is easily and quickly moved between a raised position, which allows workpieces 42 to be inserted under the saw track 26, precisely positioned for a cutting operation, and removed from under the saw track 26, to a lowered position, wherein the lower surface of saw track 26 engages the upper surface of the workpiece 42 thereby clamping the workpiece 42 in place. Due to the close engagement of the chip strip 108 and the blade of the saw 40, when the saw track 26 lays upon the workpiece 42, the precise position of the cut is revealed at the intersection of the workpiece 42 and the cutting edge 98 of chip strip 108. This makes visually confirming the cut is in the desired position very easy. This also make using the system 10 very intuitive. This also makes it very easy to be extremely precise with cutting. The combined result of these features is a very safe cutting system that is extremely accurate and easy to use that reduces waste and errant cuts. In addition, the simple and easy raising and lowering of the saw track 26 makes positioning and repositioning workpieces 42 for cutting operations fast and easy. In one arrangement, to speed positioning of workpieces 42 for cutting operations stop members, such as narrow rip stops 34, wide rip stops 36 and a miter gauge 38 are used.

In one arrangement, the combination of a hinge member 28 connected adjacent the opposing ends of saw track 26 forms what is known as a four bar linkage. A four-bar linkage, also called a four-bar, is the simplest movable closed chain linkage. It consists of four bodies, called bars or links, connected in a loop by four joints. Generally, the joints are configured so the links move in parallel planes, and the assembly is called a planar four-bar linkage. This arrangement, wherein a four bar linkage is formed by the combination of hinge members 28, saw track 26 and benchtop 24 ensures that the saw track remains parallel to the plane of the top surface of benchtop 24 when in a raised position, in a lowered position, and throughout the range of movement. This contributes to more accurate cutting and measurement.

Figure 97:
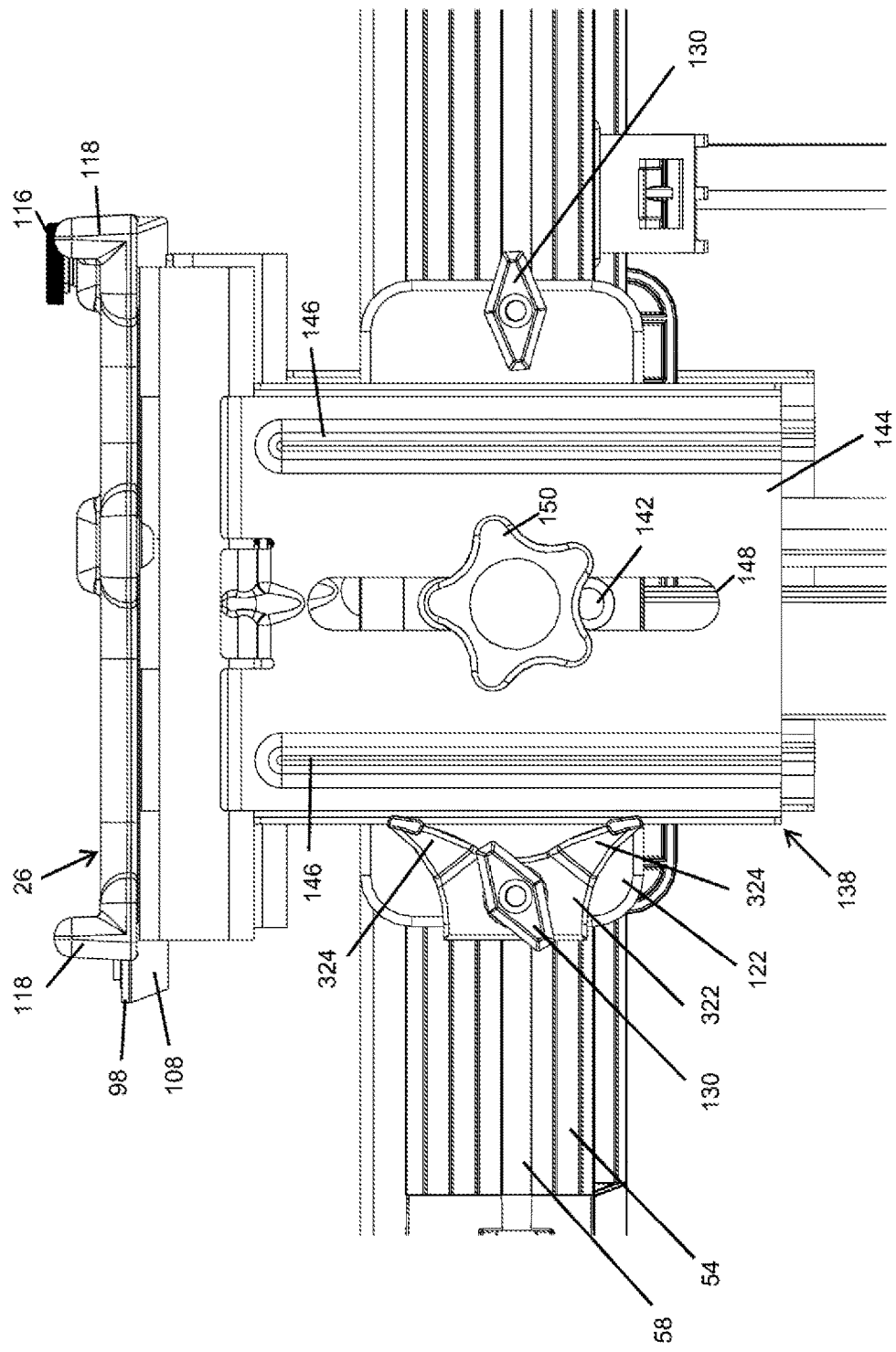
FIG. 97 is a side elevation view of one side of a benchtop, the view showing the benchtop having a hinge member having a mounting plate connected to an edge track of the benchtop, the view showing an end plate connected to the mounting plate, the view showing a saw track connected to the end plate, the view showing a biasing member positioned between the mounting plate and the end plate and configured to apply a bias force forcing the end plate forward relative to the mounting plate.
Figure 98:
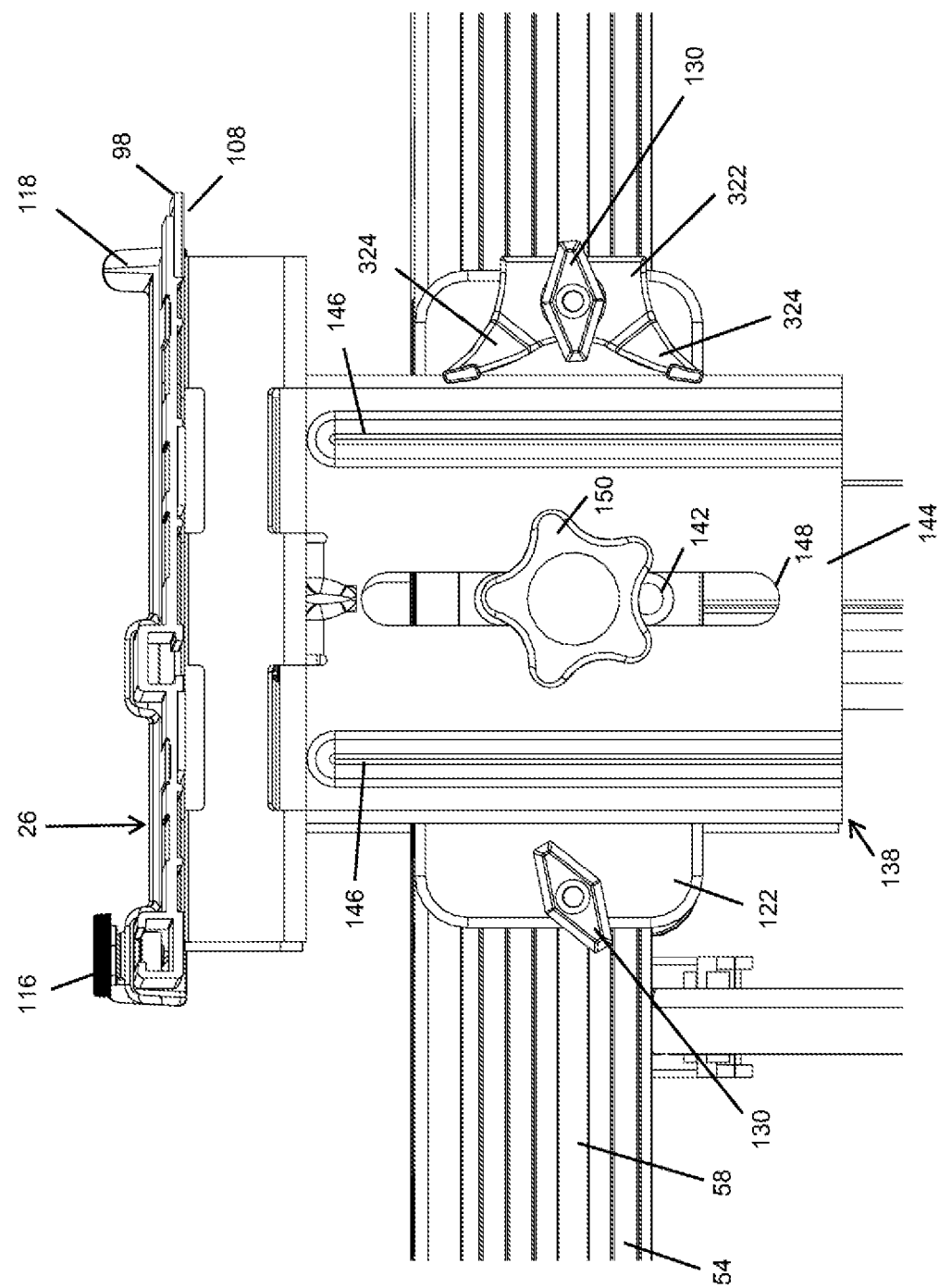
FIG. 98 is a side elevation view of the opposite side of the benchtop as shown in FIG. 97, the view showing the opposite hinge member having a biasing member positioned between the mounting plate and the end plate and configured to apply a bias force forcing the end plate forward relative to the mounting plate.
Figure 99:
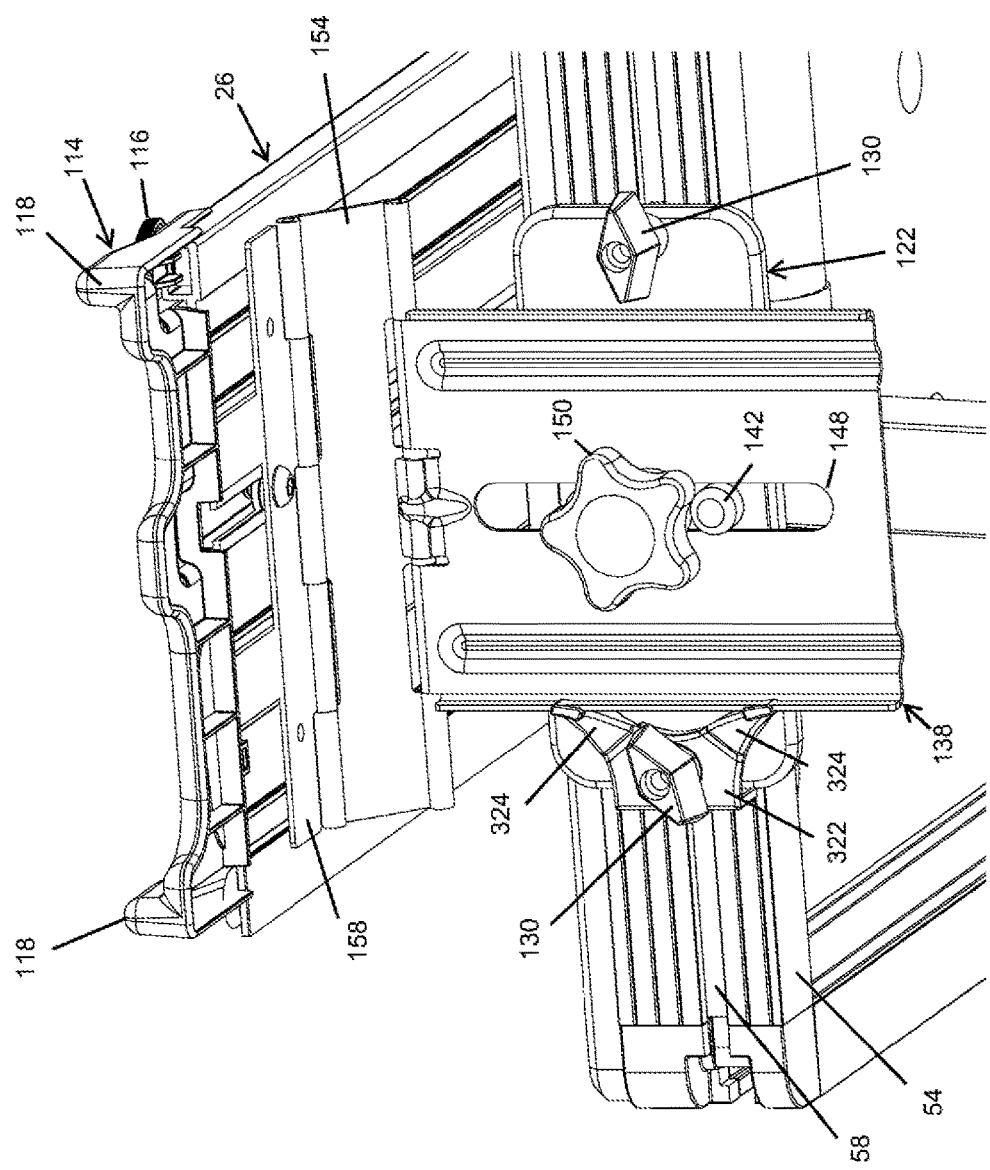
FIG. 99 is a perspective view of FIG. 97.
Figure 100:
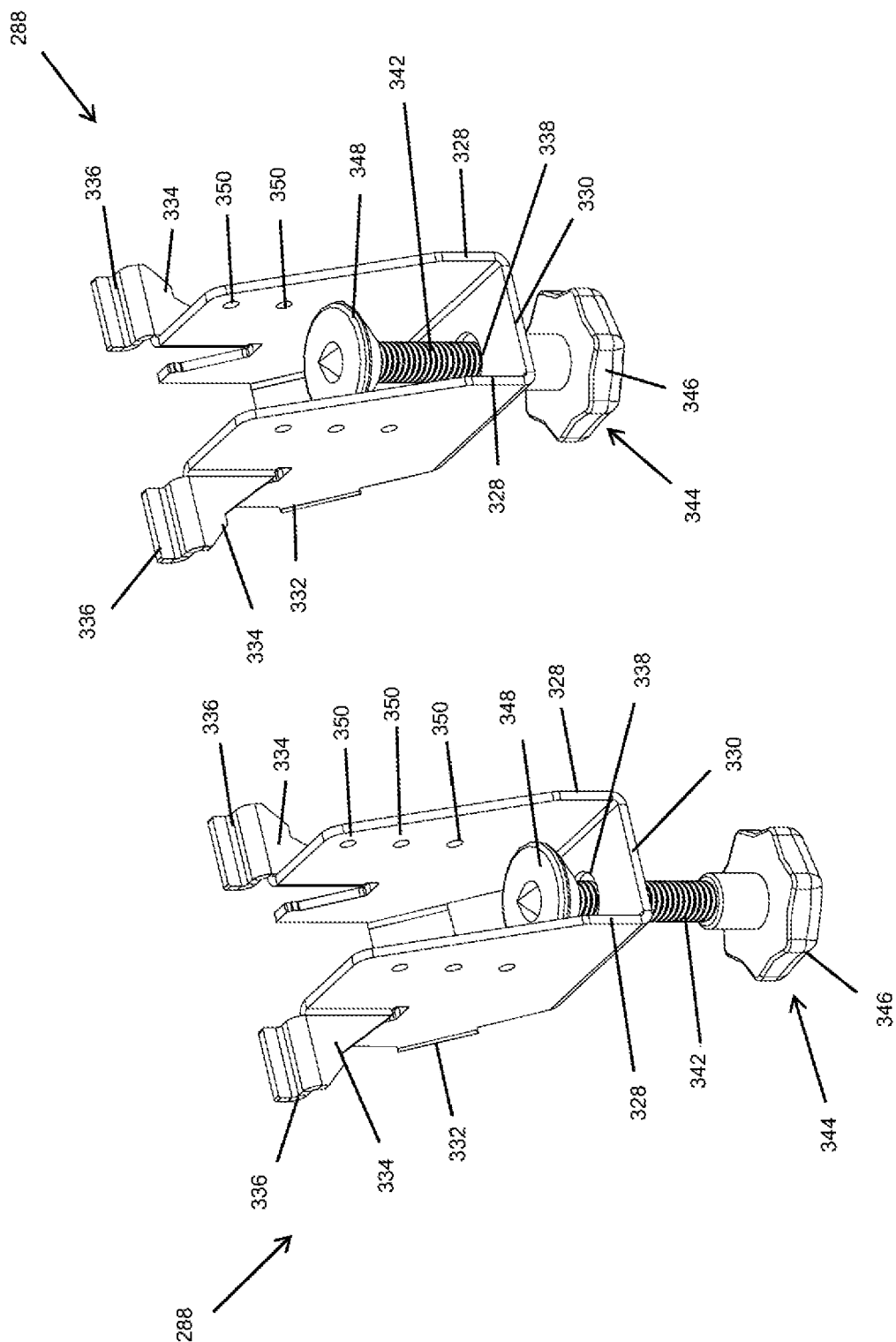
FIG. 100 is a perspective view of a pair of brackets configured to be connected to the edge track of a benchtop, the view showing the brackets having an adjustment member that is configured to adjust the height of a support board received within the brackets, the view showing the left-positioned bracket having a lowered adjustment member and the right-positioned bracket having a raised adjustment member.

Alternative Arrangement: With reference to FIGS. 97, 98 and 99 an alternative arrangement is presented wherein second protrusion 142 in mounting plate 122 is formed of a pair of fasteners that are connected to mounting plate 122 that define the upper and lower edges of second protrusion 142. In the arrangement shown, as one example, these fasteners that form second protrusion 145 of mounting plate 122 have a rounded head that extends outward from mounting plate 122 a distance and include a threaded shaft that threads into or otherwise connects to mounting plate 122. As such, when end plate 138 is in its fully lowered position, the upper edge of slot 148 engages the upper surface of the upper positioned fastener that forms second protrusion 142. As such, when end plate 138 is in its raised position, the lower edge of slot 148 engages the lower surface of the lower positioned fastener that forms second protrusion 142. In this way, the attachment of a pair of fasteners to mounting plate 122 to form second protrusion 142 define the upper and lower boundaries of movement for end plate 138. In addition the attachment of a pair of fasteners to the exterior surface of mounting plate 122 eliminates a substantial amount of machining and material waste as compared to machining second protrusion 142 into mounting plate 122. Otherwise, the use of two fasteners to form second protrusion 142 operates in the same manner as having a single machined feature.

Also shown in FIGS. 97, 98 and 99 a biasing member 322 is presented. Biasing member 322 is formed of any suitable size, shape and design and is configured to apply a bias-force upon end plate 138 so as to ensure optimum accuracy and repeatability by ensuring that end plate 138 seeks the same position. That is, biasing member 322 applies a bias force upon end plate 138 thereby taking up slack or gaps or dimensional variance between these components. In the arrangement shown, as one example, biasing member 322 is attached to the rearward position fastener 128 between the exterior side of mounting plate 122 the interior side of nut 130 and is tightened in place there between. In the arrangement shown, as one example, biasing member 322 includes a pair of flexible forward extending arms 324, one at its upper side and one at its lower side, that extend forward at an angle and engage the rearward side of end plate 138. The forward end of these arms 324 engage the rearward side of end plate 138 and apply a force forcing end plate 138 forward such that rearward side of slot 148 engages the rearward side of second protrusion 142. This bias force takes up the slack, give or dimensional variance between mounting pate 122 and end plate 138 thereby improving accuracy and repeatability. The alternative arrangement is also hereby contemplated wherein the biasing member 322 is attached to the forward positioned fastener 128.

Narrow Rip Stops:

With reference to FIGS. 45-65, in one arrangement system 10 includes one or more narrow rip stops 34. Narrow rip stops 34 are formed of any suitable size, shape and design and are configured to facilitate quick and easy and accurate placement and measurement of workpiece 42 on benchtop 24 for a cutting operation. In the arrangement shown, two narrow rip stops 34 are configured to be used in association with benchtop 24 and saw track 26, with one narrow rip stop 34 connected to each table track 66 either individually and in a standalone manner or joined with one another in a connected manner, as is further described herein.

In the arrangement shown, as one example, narrow rip stops 34 have a main body 160 that extends a length between a narrow stop end 162 and a wide stop end 164 and extend a width between opposing sides 166. In the arrangement shown, as one example, narrow stop end 162 and wide stop end 164 form an approximate flat and square surface that extend in approximate parallel spaced relation to one another. Similarly, in the arrangement shown, as one example, opposing sides 166 form an approximate flat and square surface that extend in approximate parallel spaced relation to one another. The planes formed by narrow stop end 162 and wide stop end 164 extend in approximate perpendicular alignment to the planes formed by opposing sides 166. In this way, when viewed from above or below, main body 160 of narrow rip stop 34 forms a generally square or rectangular member, although in the arrangement shown, main body 160 is much longer than it is wide.

The lower surface 168 of narrow rip stop 34 forms a generally flat plane that is configured to engage and sit in a generally flat manner on the upper surface of benchtop 24, although in the arrangement shown, the plane formed by the lower surface 168 is formed by a skeletonized framework of frame members as to reduce material costs and weight of the narrow rip stop 34 while providing strength and rigidity. The flat lower surface 168 of narrow rip stop 134 also includes a connection feature 170. Connection feature 170 is formed of any suitable, size, shape and design and is configured to be received within the centrally positioned groove 72 in the upper surface of table track 66. In this way, the engagement of connection feature 170 with groove 72 precisely aligns the narrow rip stop 34 with the table track 66, which precisely aligns the narrow rip stop 34 with the saw track 26, the grid of bench dog holes 60, the edge tracks 54 and the other features of the benchtop 24. In the arrangement shown, connection feature 170 is an elongated protrusion that extends downward from the lower surface 168 of narrow rip stop 34 a distance. In the arrangement shown, as one example, the elongated protrusion of connection feature 170 extends all or the majority of the length of the lower surface 168 of narrow rip stop 34 from narrow stop end 162 to wide stop end 164. The width of connection feature 170 is sized to fit within the groove 72 of table track 66 with close and tight tolerances thereby providing accurate alignment of the narrow rip stop 34 to the table track 54. Similarly, the extended length of connection feature 170 provides precise alignment of the narrow rip stop 34 to the table track 54.

In one arrangement, narrow rip stop 34 includes a fastener 172 that engages and locks to the groove 72 of table track 66 thereby locking the position of narrow rip stop 34 relative to the table track 66 and the benchtop 24. In one arrangement, this fastener 172 includes a head 173 that fits within the T-slot of the groove 72 of table track 66 and extends upward therefrom through the main body 160 of narrow rip stop 34 adjacent the wide stop end 164. The upper end of fastener 172 connects to a knob 174 that is used to tighten the narrow rip stop 34 to the table track 66 once the narrow rip stop 34 is in its desired position.

Figure 61:
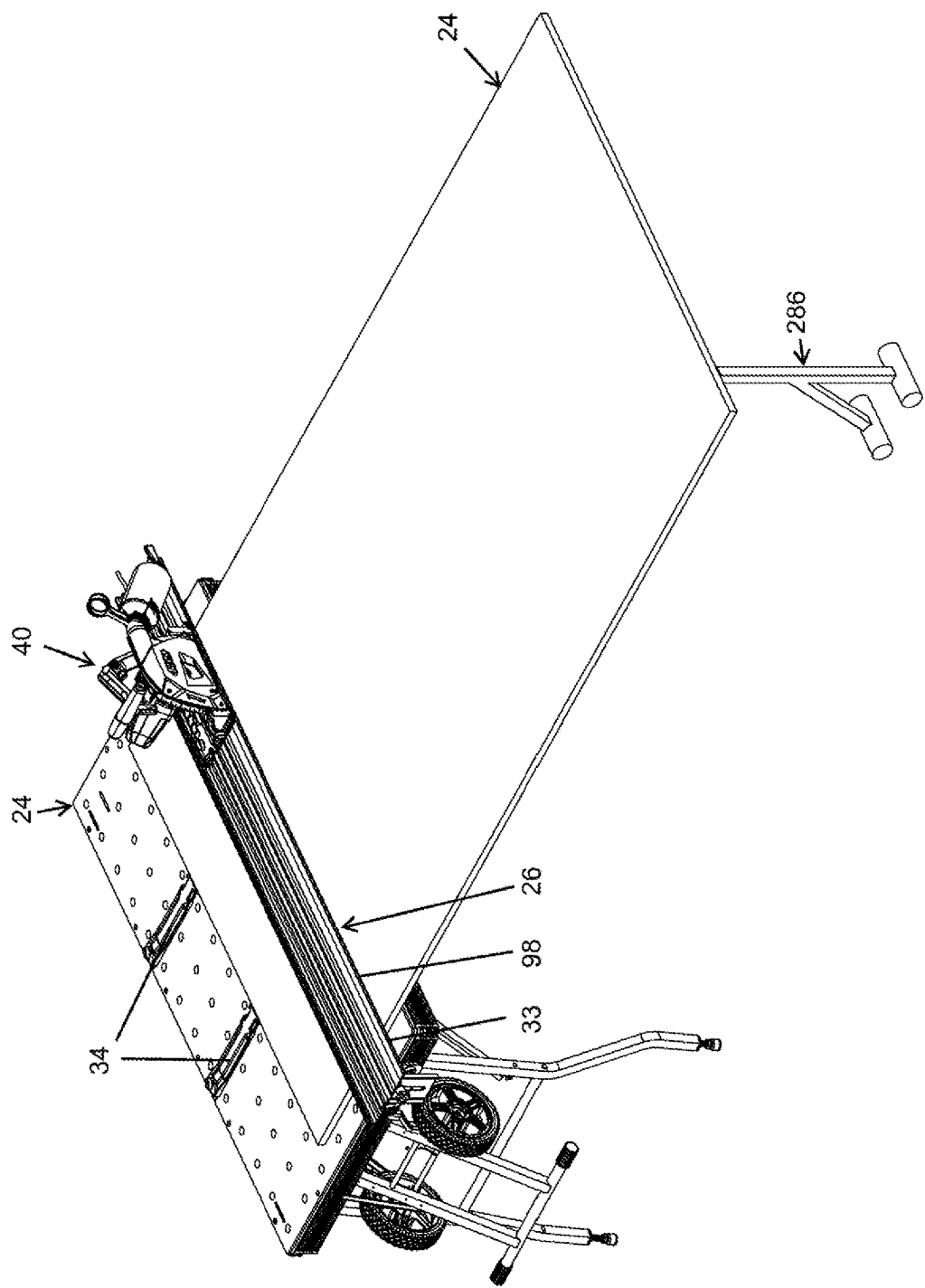
FIG. 61 is a perspective view of the adaptive cutting system that is similar to that shown in FIG. 60, the view showing a pair of narrow rip stops connected to the table tracks with the narrow stop end engaged with the rear edge of the workpiece, the view showing the saw track connected to the benchtop by a pair of hinge members, the view showing a saw placed on the saw track, the view showing the free end of the workpiece supported by a stand.
Figure 62:
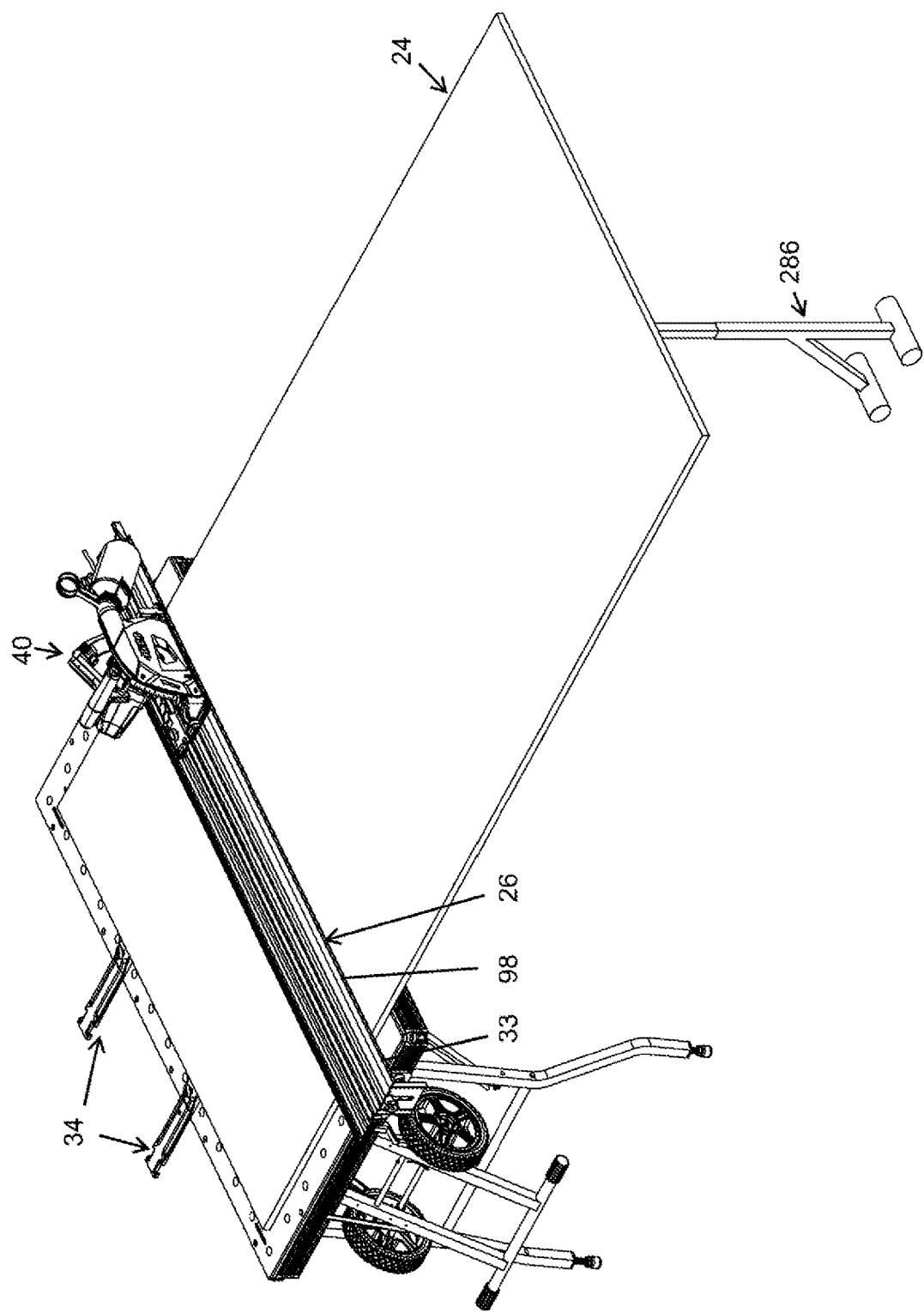
FIG. 62 is a perspective view of the adaptive cutting system that is similar to that shown in FIG. 61, the view showing a pair of narrow rip stops connected to the table tracks with the wide stop end engaged with the rear edge of the workpiece, the view showing the saw track connected to the benchtop by a pair of hinge members, the view showing a saw placed on the saw track, the view showing the free end of the workpiece supported by a stand.

Narrow rip stop 34 is reversible. That is, as is shown in FIG. 61, the narrow stop end 162 may extend toward the saw track 26 when cutting of a narrower workpiece 42. In contrast, as is shown in FIG. 62, the wide stop end 164 may extend toward the saw track 26 when cutting a wider workpiece 42. The narrow stop end 162 is has a narrower vertical height than the wide stop end 164. This narrower vertical height of narrow stop end 162 is narrower than the thickness of most workpieces 42. This narrow vertical height of narrow stop end 162 allows the narrow stop end 162 to extend under the saw track 26 during a cutting operation to engage and stop an rearward edge of a narrow workpiece 42. By the narrow stop end 162 being vertically narrower than the workpiece 42 that is being cut, this ensures that the saw track 26 engages the upper surface of the workpiece 42 and not the narrow rip stop 34, thereby ensuring that the saw track grips and holds onto the workpiece 42 ensuring the workpiece 42 does not move during a cutting operation. In some arrangements, ¼ inch sheet material is the narrowest commonly cut sheet material and in this arrangement the narrow stop end 164 is equal to or slightly less than this material thickness. In some arrangements, ⅜ inch sheet material is the narrowest commonly cut sheet material and in this arrangement the narrow stop end 164 is equal to or slightly less than this material thickness. In some arrangements, ½ inch sheet material is the narrowest commonly cut sheet material and in this arrangement the narrow stop end 164 is equal to or slightly less than this material thickness. Any other thickness for narrow stop end 164 is hereby contemplated for use to cut corresponding thicknesses of workpiece 42. The narrow stop end 162 extends forward a distance from the wide stop end 164 and knob 174 so as to facilitate cutting extremely narrow slices of workpiece 42.

The wide stop end 164 has a taller vertical height than the narrow stop end 162. In addition, the wide stop end 164 includes the knob 174 that extends upward therefrom as well. Because the wide stop end 164 does not extend under the saw track 26, the height of the wide stop end 164 is not restricted. However, by spinning narrow rip top 43 around such that the wide stop end 164 is toward the saw track 26, this allows wider workpieces 42 to be cut on the benchtop 24 using narrow rip stop 34.

In one arrangement, when using narrow rip stop end 162 workpieces 42 between 0" to 10" can be cut, whereas, when using wide rip stop end 164 workpieces 42 between 6" and 25" can be cut.

To facilitate on-table measurement, table track 66 includes two measuring members 78, which in the arrangement shown, as one example, are two measuring tapes, one received in each measuring groove 76 positioned on each side of the centrally positioned groove 72 that receives fastener 172 and head 173 of narrow rip stop 34. One of these measuring members 78 is configured and calibrated to measure the thickness of workpiece 42 when narrow rip stop 34 is used in an under the saw track 26 narrow workpiece configuration (where the narrow stop end 162 faces the saw track 26). Whereas the other of these measuring members 78 is configured and calibrated to measure the thickness of workpiece 42 when narrow rip stop 34 is not used in an under the saw track 26 narrow workpiece configuration (where the wide stop end 164 faces the saw track 26).

In the arrangement shown, as one example, narrow rip stop 34 includes an identifier 326 that indicates where the measurement reading should be taken. In the arrangement shown, as one example, identifier 326 is an arrow pointing toward one side of the wide stop end 164 that indicates where the measurement reading should be made on measuring members 78. That is, the measurement reading should be made at the overlapping intersection of the wide rip stop end 164 and the below-positioned measuring member 78. In the arrangement shown, as one example, identifier 326 is on the left side of knob 174, however any other position is hereby contemplated for use. As the identifier 326 is on one side of knob 174 as the narrow rip stop 324 is rotated from a narrow workpiece configuration to a wide workpiece configuration the identifier 326 changes sides and therefore changes measuring members 78. As the identifier 326 changes sides the different measuring members 78 have different readings so as to accommodate for the distance between the forward most point of narrow rip stop 34 (which is either narrow stop end 162 or wide stop end 164) and the cutting edge 98 of saw track 26. In this way, a precise measurement can be made on the tabletop itself, even when cutting a workpiece 42 that is completely under saw track 26. That is, in a narrow cut arrangement, the measurement reading is taken behind the narrow rip stop 34, whereas in a wide cut arrangement, the measurement reading is taken in front of the narrow rip stop 34. In both cases, the measurement reading is taken directly on the tabletop or benchtop 24 itself.

It is noted that identifier 326 may be on either side of narrow rip stops 34, or said another, way, the system 10 is agnostic as to which side of table track is for wide cuts and which side is for narrow cuts. In an alternative arrangement, instead of two tapes being used as measuring members 78 in two separate measuring grooves 76, it is hereby contemplated for use that only a single tape is used as measuring member 78 in a single measuring groove 76. In this arrangement, the single measuring member 78 has markings for both narrow cuts as well as wide cuts, as well as mark 204 for wide rip stops 36. In this arrangement, identifier 326 of narrow rip stops 34 accommodate this arrangement and point to the right position on this single measuring member 78 when used in a narrow cut arrangement as well as when used in a wide cut arrangement. This arrangement, using only a single measuring member 78 in a single measuring groove 76 provides the benefit that only a single measuring member 78 needs to be calibrated to the benchtop 24 and/or cutting edge 98.

In one arrangement, wherein two table tracks 66 are embedded within benchtop 24, two narrow rip stops 34 may be used independently of each other. That is, the two narrow rip stops 34 may be measured and set in place independently of one another and locked in place by tightening knob 174 which pulls connection feature 170 into groove 72 of table track 66 thereby securing the narrow rip stop 34 in place. Once tightened in place, the forward facing end of narrow rip stop 34 is used to engage an edge of a workpiece 42 thereby stopping the rearward movement of the workpiece 42 at the precise position that is read at the identifier 362 so that a cutting operation can be performed on the workpiece 42.

In an alternative arrangement, two narrow rip stops 34 may be connected together and used in unison by extending a connection member 176 across two narrow rip stops 34. Connecting connection member 176 across two narrow rip stops 34 provides an extended stop surface to engage narrow workpieces 42 and to provide increased alignment. Connection member 176 is formed of any suitable size, shape and design. In one arrangement, as is shown, connection member 176, when viewed from above or below, is a generally elongated rectangular member with straight sides 178 that extend in approximate parallel spaced relation to one another. In the arrangement shown, as one example, connection member 176 connects to the inward facing sides of the narrow ends of opposed narrow rip stops 34 such that the forward facing side 178 of connection member 176 is flat and in flush planar alignment to the narrow stop end 162.

In the arrangement shown, as one example, connection member 176 has approximately the same height as the narrow stop end 162 of narrow rip stop 34. By having the same height as narrow stop end 162, this allows connection member 176, like narrow stop end 162, to extend under the saw track 26 to cut narrow workpieces 42. In the arrangement shown, when assembled, the plane formed by one side 178 of the connection member 176 is in flat and flush engagement with the plane formed by the narrow stop end 162. In this way, the combination of the narrow stop ends 162 of the narrow rip stops 34 coupled with the side 178 of the connection member 176 provides an elongated stop surface for precisely engaging and guiding a workpiece 42. In the arrangement shown, the lower surface of connection member 176 forms a flat plane that is configured to slide over the top surface of benchtop 24, although in the arrangement shown, the plane formed by the lower surface is formed by a skeletonized framework of frame members to as to reduce material costs and weight of the connection member 176.

Connection member 176 connects to narrow rip stops 34 by any manner, method or means. In one arrangement, as is shown, as one example, a dovetail joint arrangement is used, however any other manner of connecting two components together is hereby contemplated for use such as screws, bolts or other fasteners, snap fitting features, or any other locking or friction-fitting or engagement arrangement or the like or any combination thereof. In the arrangement shown, wherein a dovetail joint is used, recesses 180 (also known as tail cut sections of a dovetail joint) are positioned in each side of the narrow stop end 162 of narrow rip stop 34 that are configured to receive a protrusion 182 in the ends 182 of connection member 176.

This arrangement, wherein a dovetail joint is used to connect connection member 176 to narrow rip stops 34 provides the benefits of fast and easy attachment of the connection member 176 to the narrow rip stops 34, as well as quick and easy removal of the connection member 176 from the narrow rip stops 34. In addition, by placing a recess 180 in each side of the narrow rip stop 34 this allows attachment of the connection member 176 to either side of the narrow rip stop 34 and it also facilitates the connection of two connection members 176 to a single narrow rip stop 34 (in the arrangement wherein benchtop 24 includes three table tracks 66, or the like arrangement). Another benefit of using a dovetail joint arrangement is that there are no additional parts to use or misplace, such as is the case with the use of screws, bolts or other fasteners.

In one arrangement, wherein dovetail joints are used to connect the connection member 176 to narrow rip stops 34, the recesses 180 and the protrusions 182 narrow as they extend downward. When this arrangement is used, the farther the connection member 176 is inserted into the narrow rip stops 34 the tighter the connection. In addition, in one arrangement, this narrowing of the dovetail features as they extend downward prevents the connection member 176 from passing through the recesses 180 in the narrow rip stops 34. This allows a user to pick up the narrow rip stop 34 and the connection member 176 will move with the narrow rip stop 34. Another benefit of using a dovetail joint arrangement is that it is strong and provides precise alignment of the connection member 176 with the narrow rip stop 34.

Figure 65:
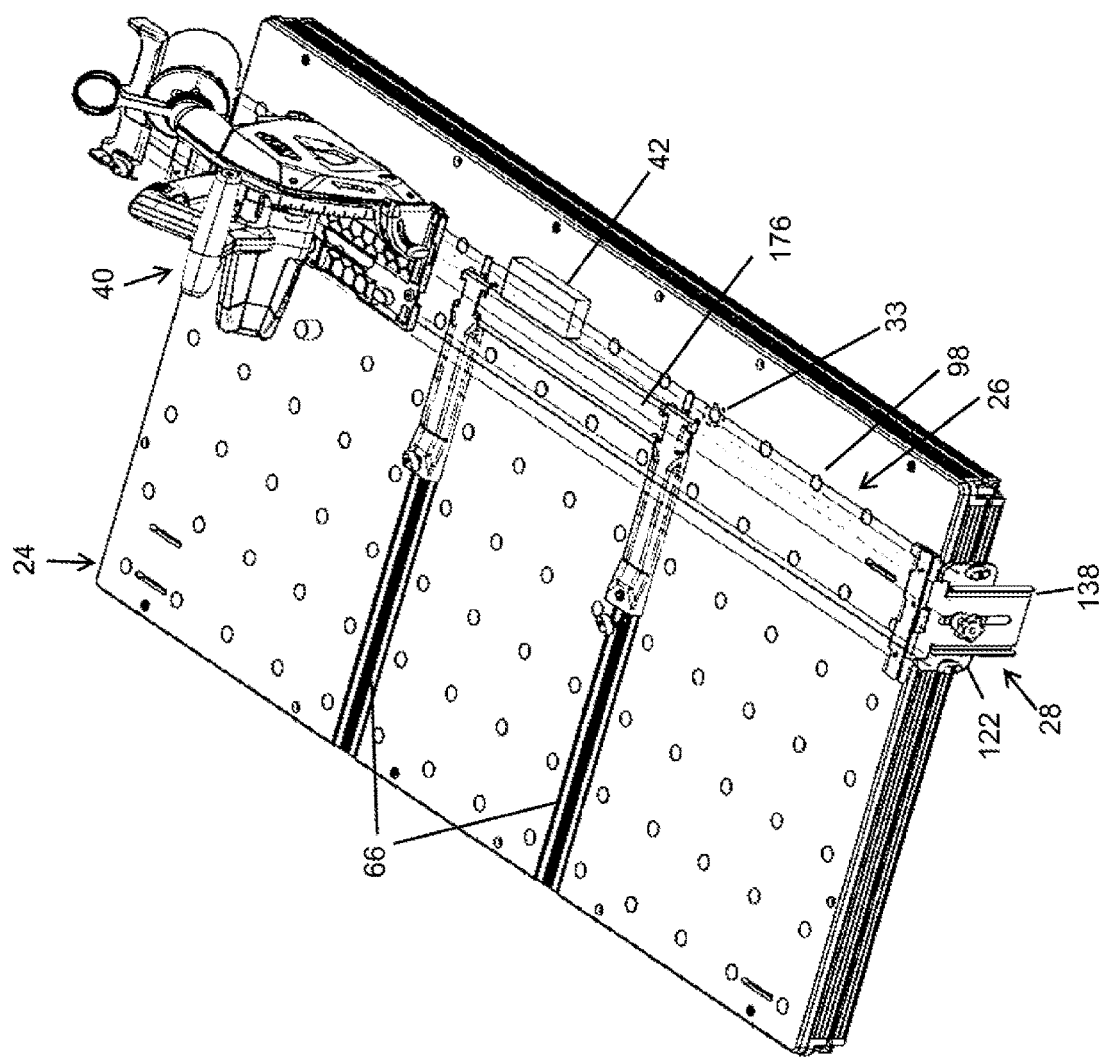
FIG. 65 is a perspective view of a pair of narrow rip stops that are joined together by a connection member as is shown in FIG. 50, the pair of narrow rip stops are placed on a benchtop and connected to a pair of table tracks, the view showing the narrow stop end of the narrow rip stops and connection member placed under the saw track, the view showing a very small workpiece placed in engagement with the forward side of the connection member between the narrow rip stops, the view showing a narrow bench dog placed under the saw track that is to be engaged with an edge of the workpiece that is opposite the cutting direction, the view showing a saw track in hidden lines attached to the benchtop by a pair of hinge members, the view showing a saw attached to the saw track.
Figure 66:
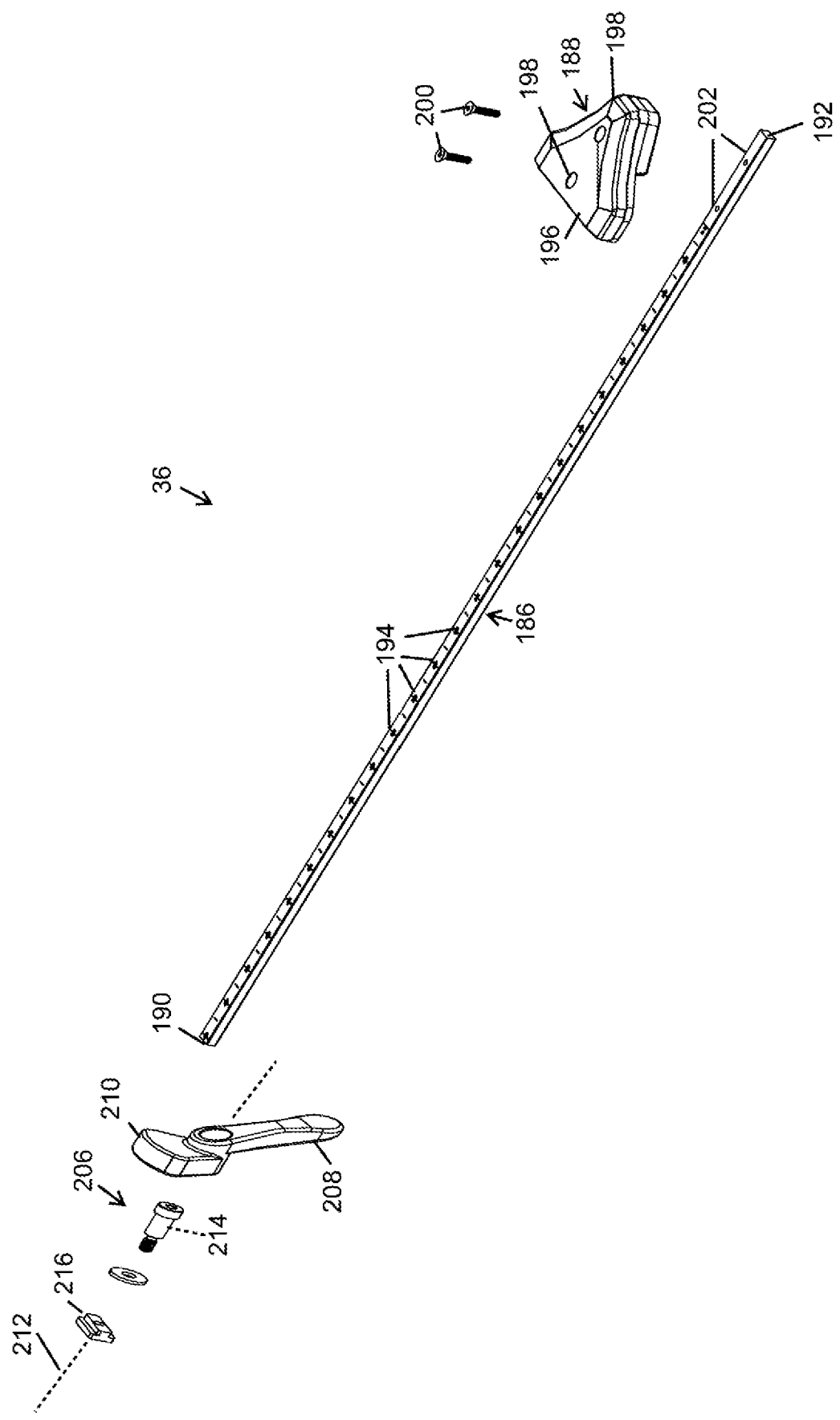
FIG. 66 is a perspective exploded view of a wide rip stop, the view showing an arm that is formed of an elongated bar having measuring indicia in its upper surface, the view showing a head to be connected to the rearward end of the arm, the view showing a lock member having a handle and a cam surface that is to be connected to the edge track of a benchtop positioned at the forward end of the arm that is configured to lock the arm in place.
Figure 67:
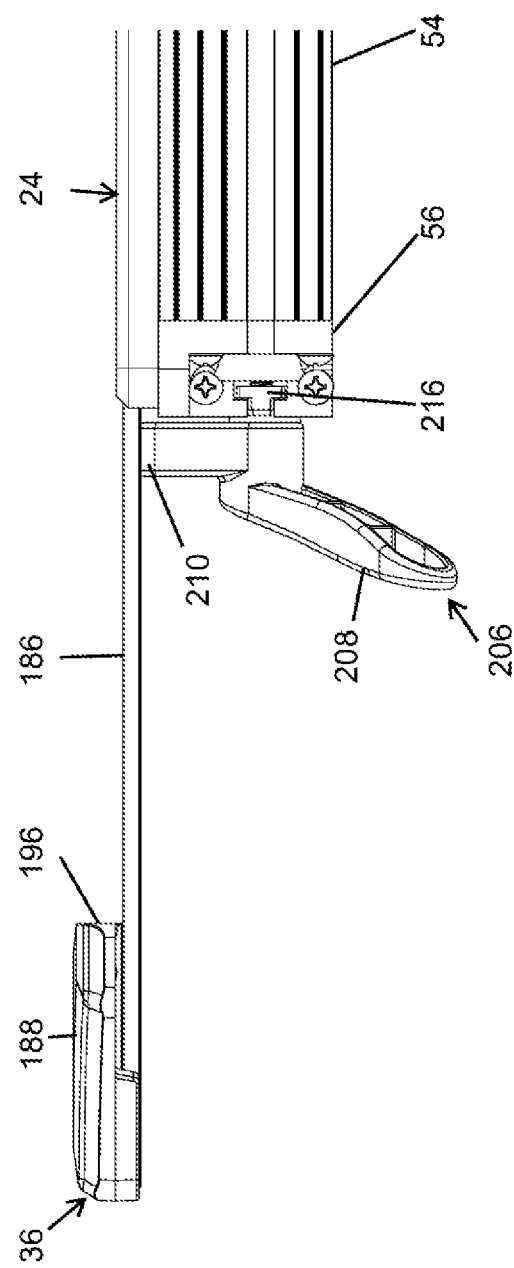
FIG. 67 is a side elevation view of the wide rip stop and lock member shown in FIG. 66, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.
Figure 68:
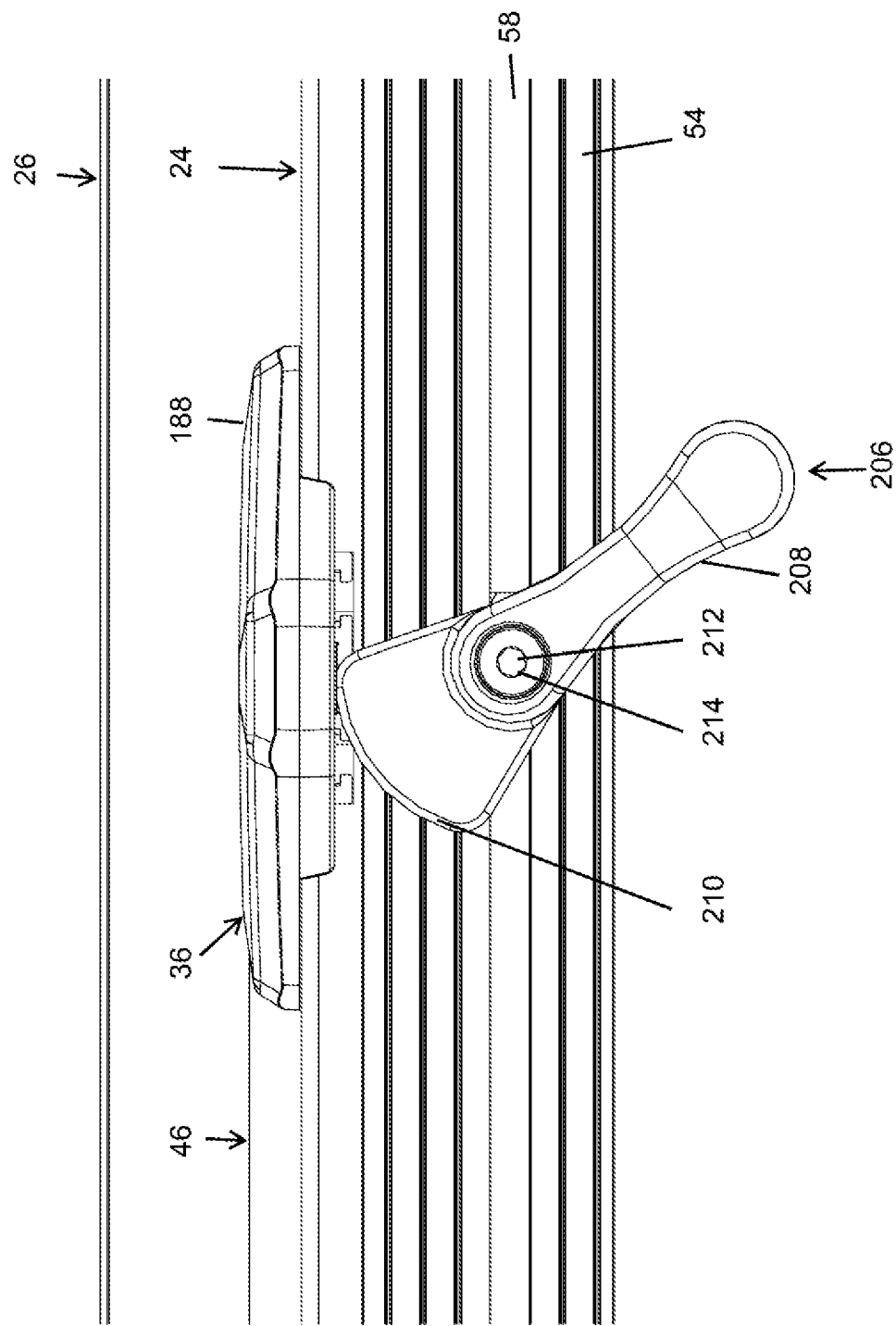
FIG. 68 is a rear elevation view of the wide rip stop and lock member shown in FIG. 67, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.
Figure 69:
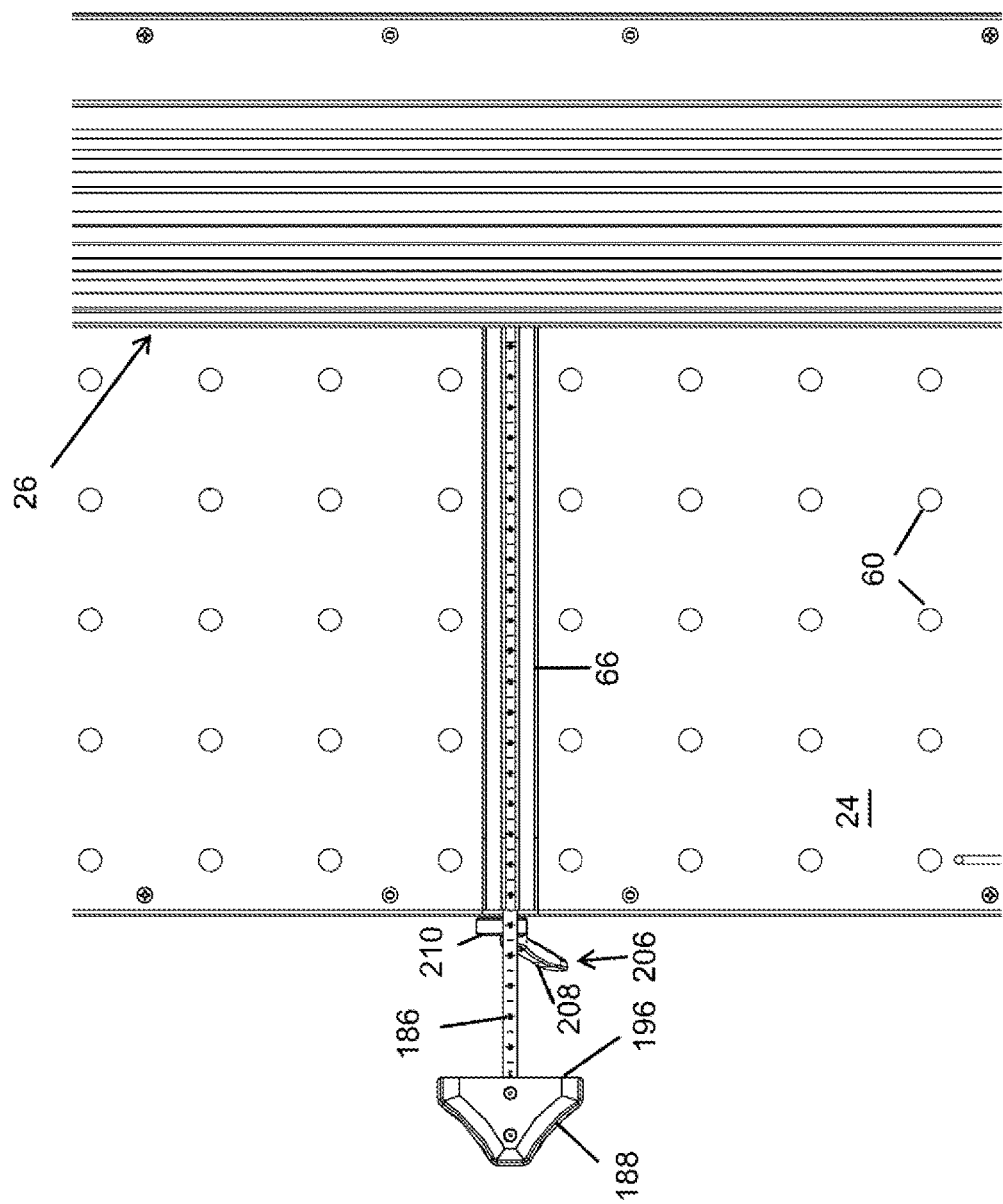
FIG. 69 is a top elevation view of the wide rip stop and lock member shown in FIG. 67, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.
Figure 70:
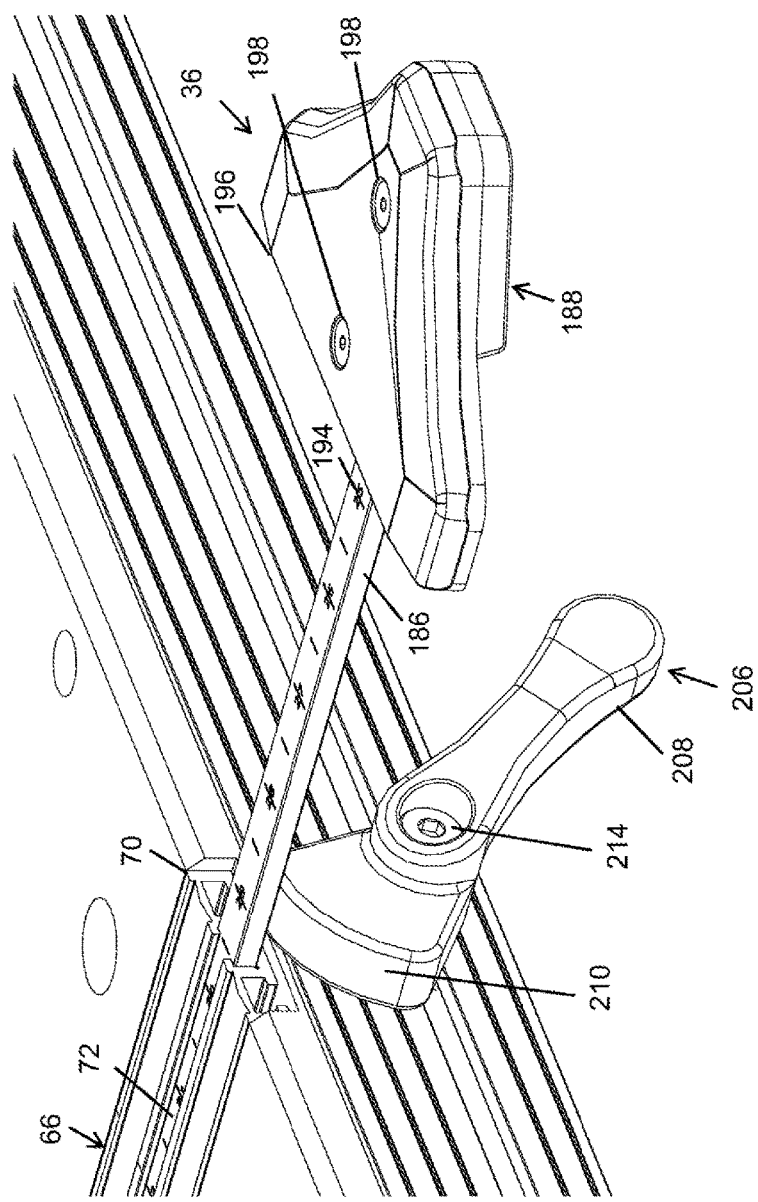
FIG. 70 is a rear perspective view of the wide rip stop and lock member shown in FIG. 67, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.
Figure 71:
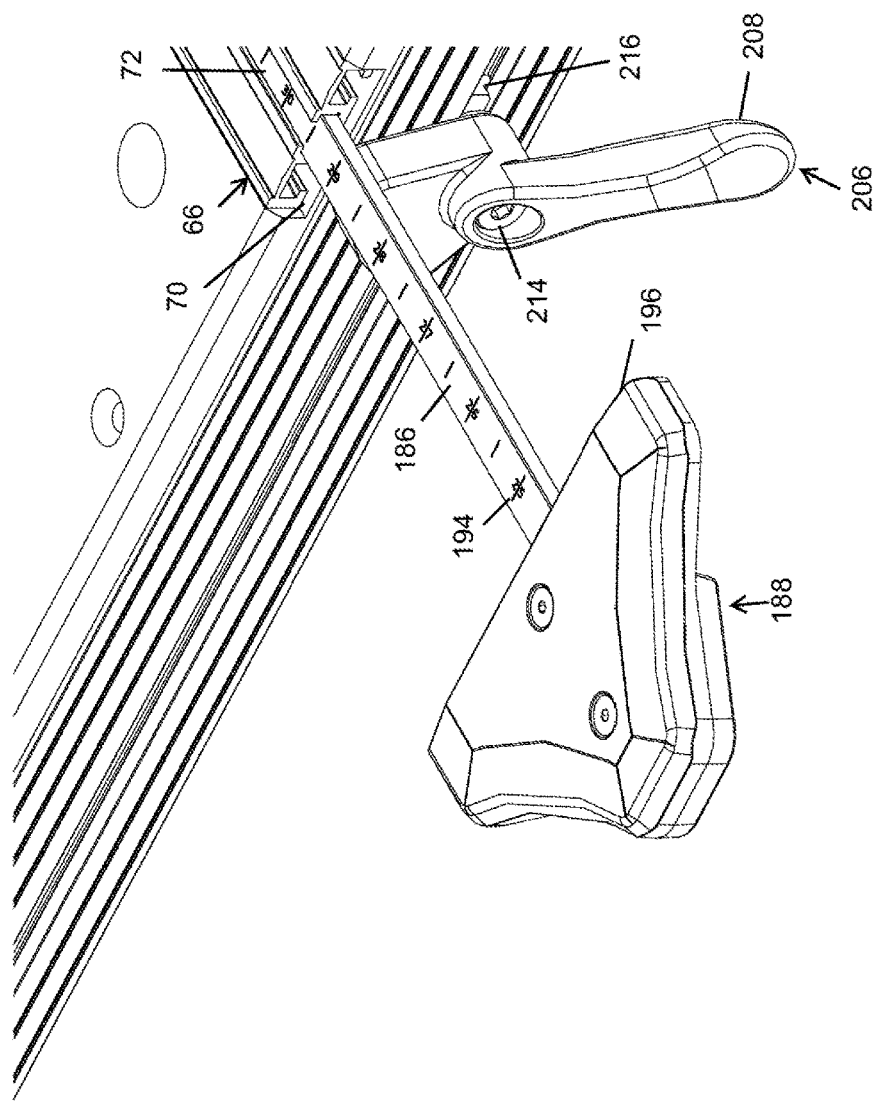
FIG. 71 is another rear perspective view of the wide rip stop and lock member shown in FIG. 67, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.
Figure 72:
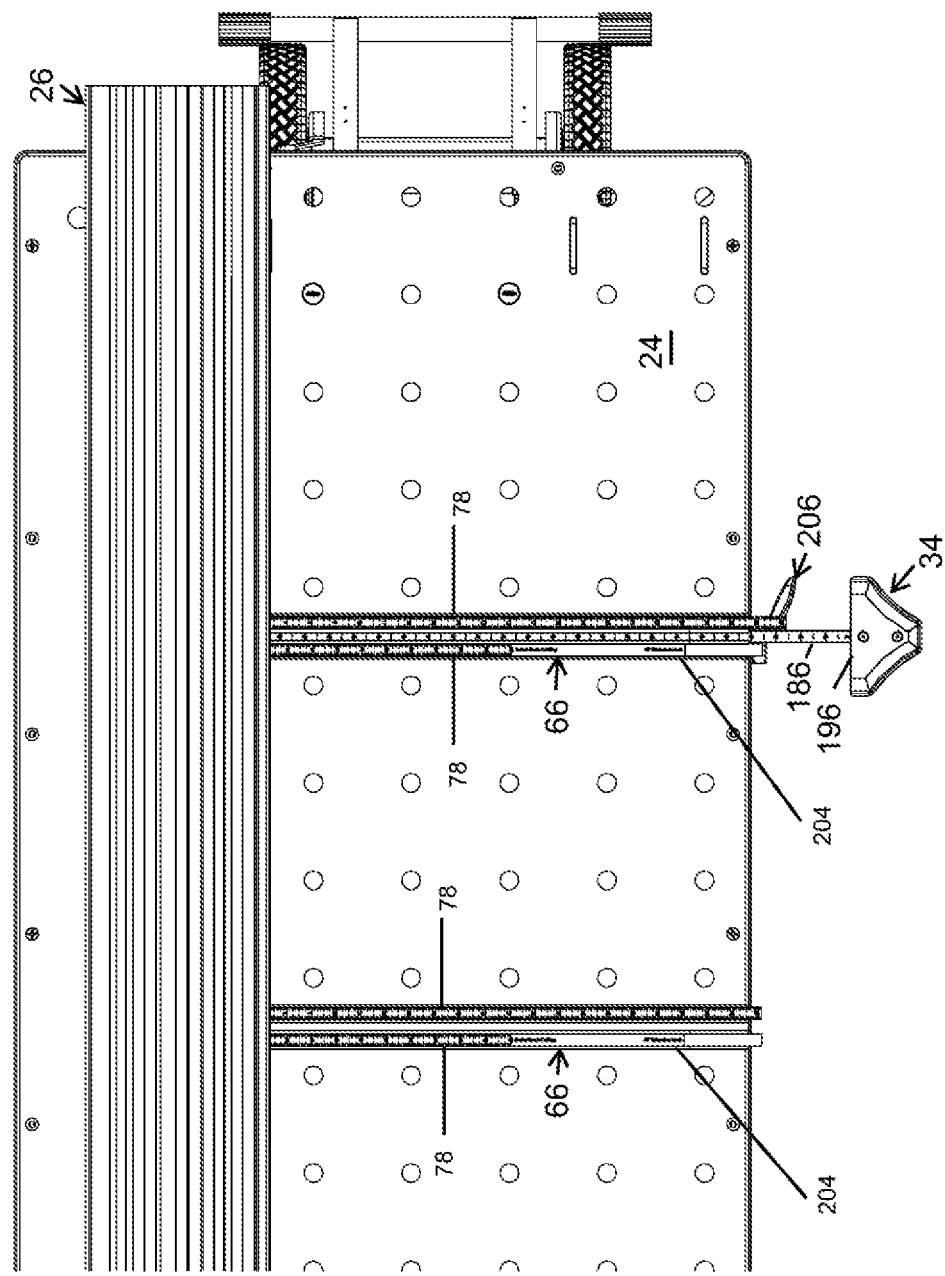
FIG. 72 is a top elevation view of the wide rip stop and lock member shown in FIG. 67, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.
Figure 73:
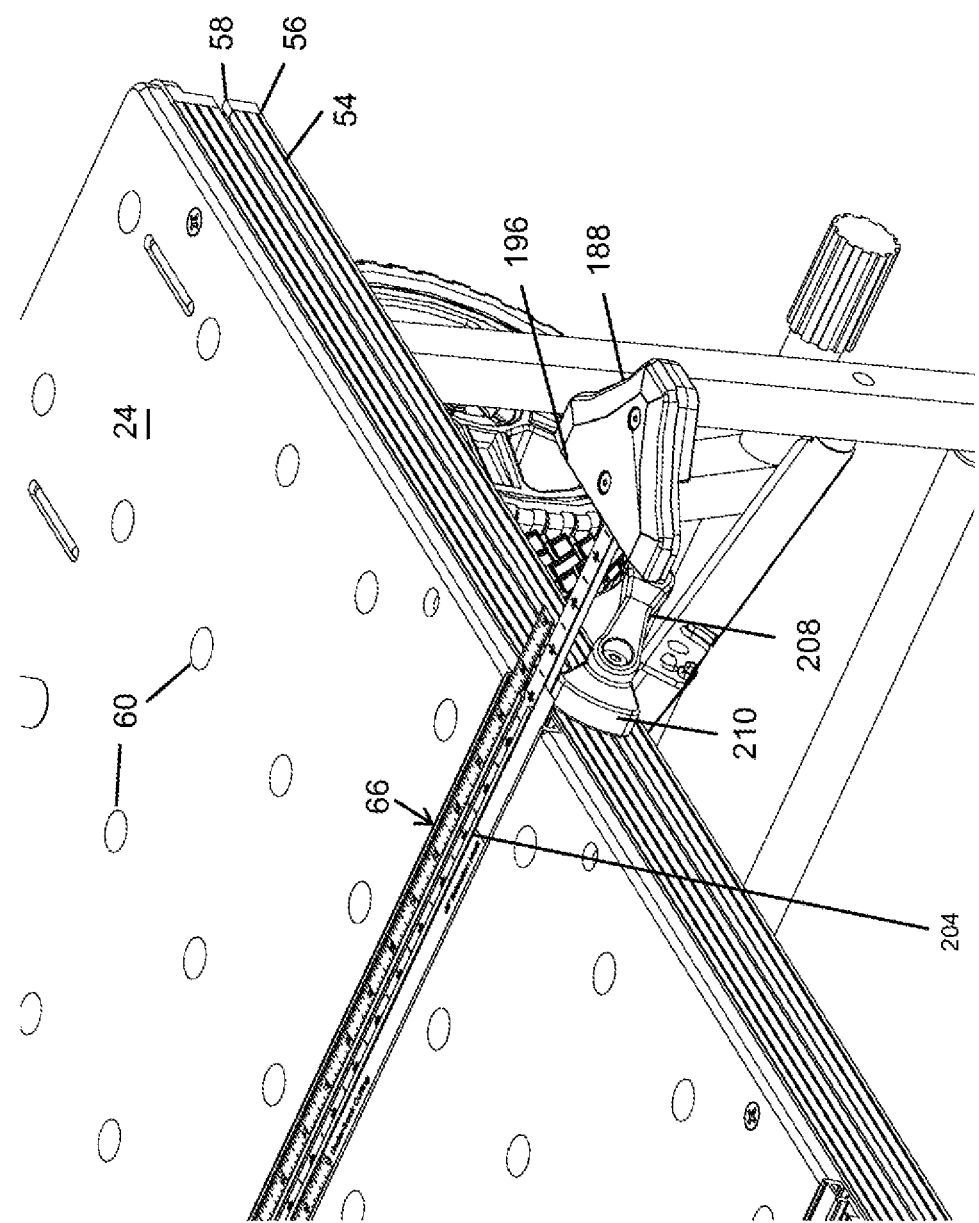
FIG. 73 is another rear perspective view of the wide rip stop and lock member shown in FIG. 67, the view showing the wide rip stop inserted within a table track of the benchtop, the view showing the lock member connected to the edge track of the benchtop positioned below the wide rip stop, the view showing the cam surface of the lock member engaged with the lower surface of the arm of the wide rip stop.

It is desirable to use three points of contact to secure a workpiece 42 during cutting. This most often takes the form of engaging the workpiece 42 with two bench dogs 60, one bench dog positioned under the saw track 26 and one bench dog 60 positioned rearward of the saw track 36, and a stop member, such as narrow rip stop 34. However, two bench dogs 60 cannot be used in the example of cutting a narrow workpiece 42. This arrangement, with the use of connection member 176 extending across two narrow rip stops 34, is useful and provides stable support for a narrow workpiece 42 and takes the place of engaging the workpiece 42 with two bench dogs 60 as there is an elongated area or plane of engagement between the rearward edge of the workpiece 42 and the forward facing edge of the narrow rip stops 34 and connection member 176. This arrangement of using connecting member 176 also is helpful for cutting small workpieces 42 that are small laterally and width-wise (such as is shown in FIG. 65) as the connection member 176 supports an entire side of the narrow workpiece 42.

By placing a bench dog 32, 33 under the saw track, as close to the cutting edge 98 as possible, this provides a stop surface for workpiece 42 to push against. The farther this stop surface is away from the cutting edge 98 the greater the potential for the workpiece 42 to rotate during cutting. Said another way, the closer the stop surface is to the cutting edge 98 the less moment there is and the less potential there is for the workpiece 42 to rotate and therefore the more accurate the cut is.

Wide Rip Stops:

With reference to FIGS. 66-75, in one arrangement, system 10 includes one or more wide rip stops 36. Wide rip stops 36 are formed of any suitable size, shape and design and are configured to facilitate quick and easy and accurate placement and measurement of workpiece 42 that is longer than the forward to back length of benchtop 24 for a cutting operation. In the arrangement shown, two wide rip stops 36 are configured to be used in association with benchtop 24 and saw track 26, with one wide rip stop 36 connected to each table track 66 as is further described herein.

In the arrangement shown, as one example, wide rip stops 36 include an arm 186 and a head 188. Arm 186 is formed of any suitable size shape and design and is configured to facilitate extension of head 188 beyond the rearward edge of benchtop 24. In the arrangement shown, as one example, arm 186 is an elongated member that extends from a forward end 190 to a rearward end 192. Arm 186 is sized and shaped to fit within groove 72 of table track 66 with close and tight tolerances while allowing arm 186 to slide in and slide out of groove 72 of table track 66. In the arrangement shown, as one example, arm 186 is a generally rectangular shaped elongated bar formed of a solid metallic material such as aluminum, however any other size, shape and configuration is hereby contemplated for use. Head 188 is connected adjacent the rearward end 192 of arm 186. In the arrangement shown, as one example, the cross-sectional shape of arm 186 is rectangular and matches the cross-sectional shape of groove 72. In one arrangement, as is shown, the upper surface of arm 186 includes measuring indicia 194 thereon, such as measurement markings, a measuring tape or any other indicia, that is used to measure the width of a cut using wide rip stop 36. In one arrangement, measuring indicia 194 is a tape, tape measure, sticker or other marking that is attached or adhered to the upper surface of arm 186, alternatively measuring indicia 194 is printed directly onto the upper surface of arm 186, alternatively measuring indicia 194 is etched directly into the upper surface of arm 186. Any other arrangement or configuration is hereby contemplated for use as measuring indicia 194. However directly printing or directly etching the measuring indicia 194 into the upper surface of arm 186 has been found to provide optimum accuracy.

Head 188 is connected to the rearward end 192 of arm 186. Head 188 is formed of any suitable size shape and design and is configured to engage a rearward edge of a workpiece 42 so that the width of the cut may be measured by measuring indicia 194 of arm 186. In the arrangement shown, as one example, head 188 includes a stop surface 196 positioned at its forward side. In the arrangement shown, as one example, stop surface 196 is a generally flat surface that extends in approximate perpendicular alignment to the length of arm 186, which when in place within table track 66 extends in approximate parallel spaced alignment to cutting edge 98 of saw track 26. This stop surface 196 extends upward from the upper surface of arm 186 so as to engage an edge of workpiece 42.

Head 188 is connected to arm 186 by any manner, method or means. In the arrangement shown, as one example, head 188 includes two openings 198 that are configured to receive fasteners 200 therein that are configured to engage openings 202 in arm 186 thereby connecting head 188 to arm 186 in a precise manner so as to ensure accurate measurement. Fasteners 200 may be formed of any fastening device such as screws, bolts, snap features, lock members or any other device. Head 188 and arm 186 may be connected by any other rigid and durable connection method or means.

Arm 186 is configured to be inserted within groove 72 of table track 66. In one arrangement, arm 186 extends forward from the stop surface 196 of head 188 approximately the length of table track 66, so as to provide maximum extension of wide rip stop 36 beyond the upper surface of benchtop 24. That is, in one arrangement, when wide rip stop 36 is in a fully retracted state, arm 186 is fully inserted within groove 72 of table track 66, the forward end 190 of arm 186 is near or adjacent the forward end 68 of table track 66. In contrast, when wide rip stop 36 is in a fully extended state, the majority of arm 186 extends past the rearward end 70 of table track 66 with only a small portion of overlap between the forward end 190 of arm 186 and groove 72 of table track 66. By having arm 186 have approximately the same length as table track 66, this allows the maximum range of motion and extension and allows workpieces 42 to be measured approximately twice as wide as the forward to back length of table track 66, which is substantially wider than the forward to back width of benchtop 24. In this way, the use of wide rip stops 36 allows for measurement of wide workpieces 42 using a much smaller benchtop 24. As such, the space requirements for the benchtop 24 are much smaller than the measuring capabilities and cutting capabilities of the benchtop 24. In one arrangement, when using wide rip stops 36 workpieces 42 up to 48" can measured and cut accurately.

The cut width of workpieces 42 is measured using wide rip stops 36 by first calibrating the measuring members 78 of table tracks 66 to the benchtop 24 in the manners described herein. One of the measuring members 78 includes a wide rip stop mark 204. The width of the cut of workpiece 42 is measured from this mark 204. That is, once the measuring member 78 of table tracks 66 are properly calibrated to benchtop 24 and cutting edge 98, a user measures the width of the cut using wide rip stops 36 by setting the desired cut width by the reading of the measuring indicia 194 in the upper surface of the arm 186 adjacent to the mark 204. The further wide rip stop 36 is inserted within table track 66 the narrower the cut width, the further wide rip stop 36 is extended out of table track 66 the wider the cut width.

A lock member 206 is used in association with wide rip stop 36 to secure the position of the wide rip stop 36 once wide rip stop 36 is set at its desired position. Lock member 206 is formed of any suitable size, shape and design and is configured to lock the position of wide rip stop 36 in place such that it does not move once the proper measurement is set. In the arrangement shown, as one example, lock member 206 includes a handle 208 having a cam surface 210 on an opposite side of an axis of rotation 212 from handle 208. A fastener 214 extends through the handle 208 at the axis of rotation 212 and establishes the point at which lock member 206 rotates. Fastener 214 extends through handle 208 and connects to a block 216. Block 216 is configured to fit within and slide along the groove 58 in the side of edge track 54.

Lock member 206 is used by sliding the block 216 of lock member 206 into the groove 58 of edge track 54 until the lock member 206 is positioned below the arm 186 of wide rip stop 36. Once lock member 206 is in this positon below arm 186 of wide rip stop 36 fastener 214 is tightened in place within groove 58 of edge track 54 thereby locking the position of wide rip stop 36. Next, the wide rip stop 36 is set to its desired position by pulling the head 188 outward from the table track 66 such that the arm 186 slides within the groove 72 of table track 66. The head 188 is moved rearward until the measuring indicia 194 in the upper surface of the arm 186 at the precise point of mark 204 reads the desired width of cut. Once in this position, the handle 208 is rotated downward upon the fastener 214 and axis of rotation 212. This causes the cam surface 210 to engage the bottom surface of the arm 186. As the handle 208 is rotated downward, the cam surface 210 increasingly pushes upward on the arm 186 which causes increased engagement between arm 186 and groove 72, thereby locking the arm 186 in place at the desired measurement. Once in this position, the position of wide rip stop 36 is firmly locked in place and as such it will not move when engaged by the edge of a workpiece 42 during cutting thereby allowing for multiple and repeated accurate cuts on multiple workpieces 42. In the arrangement shown, as one example, the cam surface 210 is at its fullest engagement when handle 208 is in a vertical, downward, orientation, however any other arrangement is hereby contemplated for use. One benefit of this arrangement is that the handle 208 may be rotated in either direction, clockwise or counterclockwise, to engage and disengage the lock member 206.

One wide rip stop 36 may be used with each table track 66. That is, in the arrangement shown, as one example, for narrow workpieces 42 a single wide rip stop 36 may be used.

For wider workpieces 42 two wide rip stops 36 may be used. Any number of table tracks 66 and wide rip stops 36 are hereby contemplated for use.

Miter Gauge:

In one arrangement system 10 includes a miter gauge 38. Miter gauge 38 is formed of any suitable size, shape and design and are configured to facilitate quick and easy and accurate angular cuts of workpiece 42 in association with benchtop 24. In the arrangement shown, two configurations of a miter gauge 38 are presented. With reference to FIGS. 76, 77, 78, 79, 80, 83 and 84 a miter gauge 38 is presented that is configured to connect to benchtop 24 through connection to bench dog holes 60. While this arrangement is effective, in the event that benchtop 24 swells or shrinks or otherwise dimensionally changes, these dimensional changes can affect the accuracy of a miter gauge 38 connected to bench dog holes 60 in the benchtop 24. As such, with reference to FIGS. 81, 82 and 88 a miter gauge 38 is presented that connects to table tracks 66, which may be a more-accurate manner of connecting miter gauge 38 to benchtop 24 as compared to the use of bench dog holes 60.

Connected To Bench Dog Holes: With reference to FIGS. 76, 77, 78, 79, 80, 83 and 84, a miter gauge 38 is presented that is configured to connect to benchtop 24 through connection to bench dog holes 60. In this arrangement, the miter gauge 38 includes the component parts of a base 218 and a guide 220. Base 218 is formed of any suitable size, shape and design and is configured to be attached to benchtop 24. Guide 220 is formed of any suitable size, shape and design and is configured to rotate upon base 218 to the desired angle of a cut of workpiece 42.

In the arrangement shown, as one example, base 218 has a generally planar main body 222 that is configured to be attached to benchtop 24 by way of the insertion of bench dogs 32 through the main body 222 and into the benchtop 24. In the arrangement shown, as one example, main body 222 includes a pair of ears 224 that include openings 226 that are spaced apart so as to match the spacing of bench dog holes 60 in benchtop 24 and are sized and shaped to receive bench dogs 32 there through with close and tight tolerances. In this arrangement, base 218 is attached to benchtop 24 by aligning the openings 226 of ears 224 of base 218 with two bench dog openings 60 in benchtop 24 and inserting bench dogs 32 there through. In this way not only is the base 218 attached to the benchtop 24, but the base 218 is aligned with the grid of bench dog holes 60 and as the base 222 is aligned with the grid of bench dog holes 60, the base 218 is aligned with the saw track 26, edge tracks 54, table tracks 66 and the other aligned features of system 10.

Base 218 includes an opening 228 that receives a fastener 230 that extends through a similar opening 228 in guide 220 and is configured to connect guide 220 to base 218 as well as act as an axis of rotation thereby facilitating rotation of guide 22 with respect to base 218 thereby setting the angle of cut of workpiece 42. Base 218 includes a slot 232 and associated measuring indicia 234. In the arrangement shown, slot 232 is a curved slot the extends in curved fashion along a rearward edge of main body 222 and is configured to receive a lock member 236 therein that is configured to lock the position of guide 220 with respect to base 218 when guide 220 is placed at the desired angular positioning for a cut. Measuring indicia 234 is configured to identify the angle at which guide 220 is positioned with respect to base 218. In the arrangement shown, lock member 236 includes a fastener 238 that extends through both an opening 239 in guide 220 as well as the slot 232 of base 218 and connects to a knob 240 that is used to tighten the guide 220 to the base 218.

Guide 220 includes a main body 242 having an arm 244. An indicator 246 is connected to arm 244 and is configured to indicate the angle at which guide 220 is positioned with respect to base 218. In the arrangement shown, indicator 246 is an adjustable member with a pointer 248 that is configured to point at the measuring indicia 234 of base 218 that indicates the angle of guide 220 with respect to base 218. In the arrangement shown, indicator 246 includes a slot 250 that is configured a fastener 252 that extends through the indicator 246 and anchors in the arm 244 of guide 220 so as to allow slight adjustment of the indicator 246 so as to facilitate calibration of the indicator 246 to the precise alignment of the benchtop 24.

Guide 220 includes a stop arm 254 on a side opposite arm 244 and indicator 246. In the arrangement shown, as one example, stop arm 254 is an elongated member that extends a length between opposing ends 256 and forms an elongated stop surface 258 that extends on a side opposite arm 244 and indicator 246. In the arrangement shown, as one example, stop surface 258 forms a flat and straight surface that extends in a continuous and perpendicular manner to the surfaces formed by ends 256 of stop arm 254. In the arrangement shown, as one example, when viewed from above or below, stop arm 254 has a generally rectangular shape, however any other shape is hereby contemplated for use.

In the arrangement shown, as one example, an upper groove 260 and lower groove 262 extend along all or a portion of the stop arm 254 adjacent the stop surface 258. The upper groove 260 is positioned in the upper surface of stop arm 254 and the lower groove 262 is positioned in the lower surface of stop arm 254. A stop member 264 is connected to stop arm 254 by engagement with upper groove 260 and lower groove 262.

That is, in the arrangement shown, stop member 264 includes a main body 266 having a channel 268 that extends between opposing ends 270 of stop member 264. In one arrangement, as is shown, channel 268 extends in approximate perpendicular alignment between opposing ends 270, and ends 270 form planes that extend in approximate parallel spaced planar alignment with one another. In the arrangement shown, channel 268 is sized and shaped to receive and slide over the end of stop arm 254 that forms stop surface 258. When stop member 264 is in place on stop arm 254, flanges 272 at the upper and lower sides of channel 268 are engaged with and received within the upper groove 260 and lower groove 262. In this position, stop member 264 may slide along the length of upper groove 260 and lower groove 262.

Stop member 264 includes an opening 274 that is configured to receive a fastener 276, such as a screw, bolt or other fastening member. Opening 274 and fastener 276 cooperate to selectively lock stop member 264 in place along stop arm 254 when stop member 264 is in its desired position. That is, when fastener 276 is tightened it presses against stop arm 254 thereby locking the stop member 264 in place. By doing so, multiple workpieces 42 may be cut at the same length at the same angle.

Figure 81:
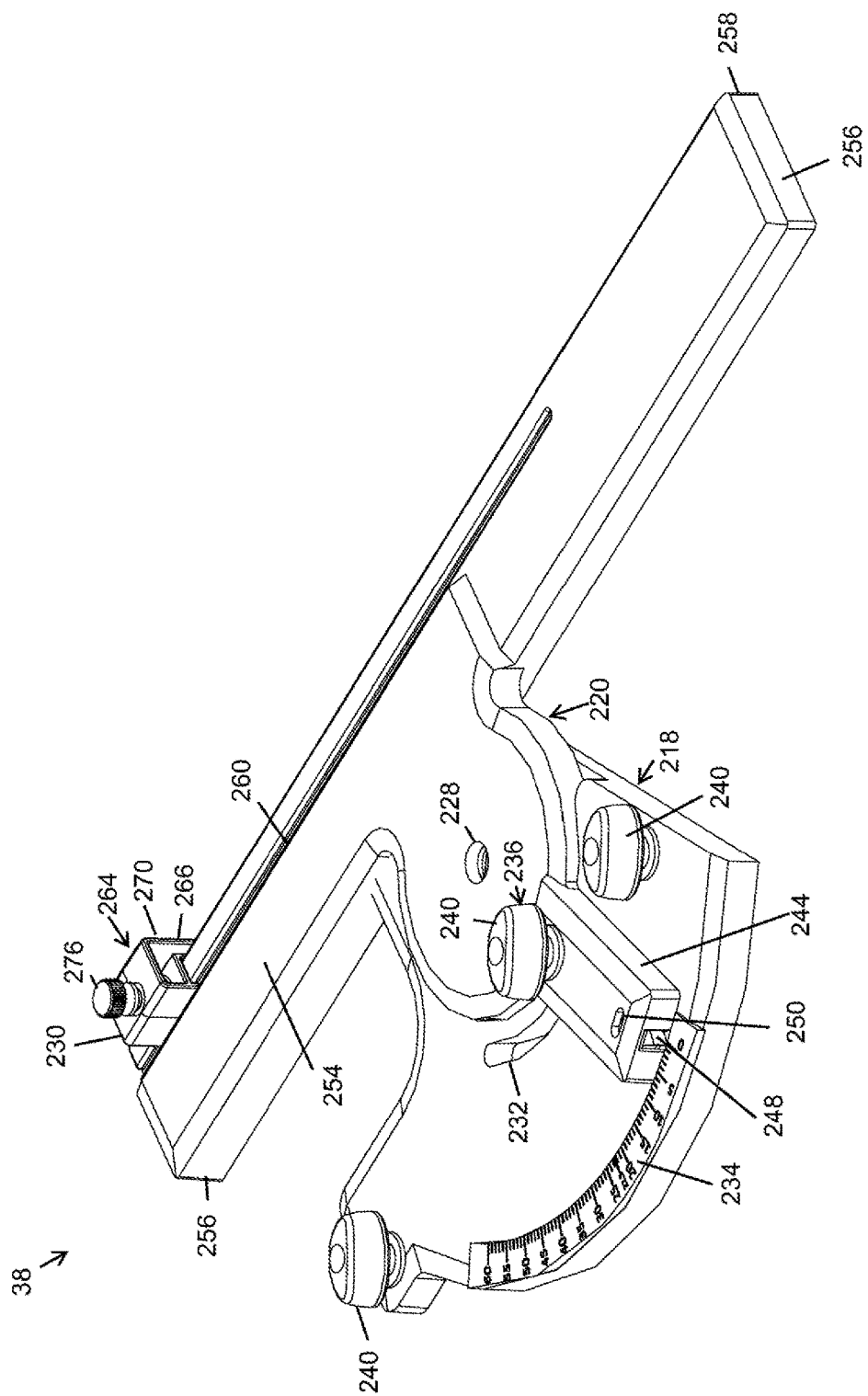
FIG. 81 is a perspective view of a miter gauge that connects to the benchtop shown in FIG. 1 by connecting to a table track positioned within the benchtop.
Figure 82:
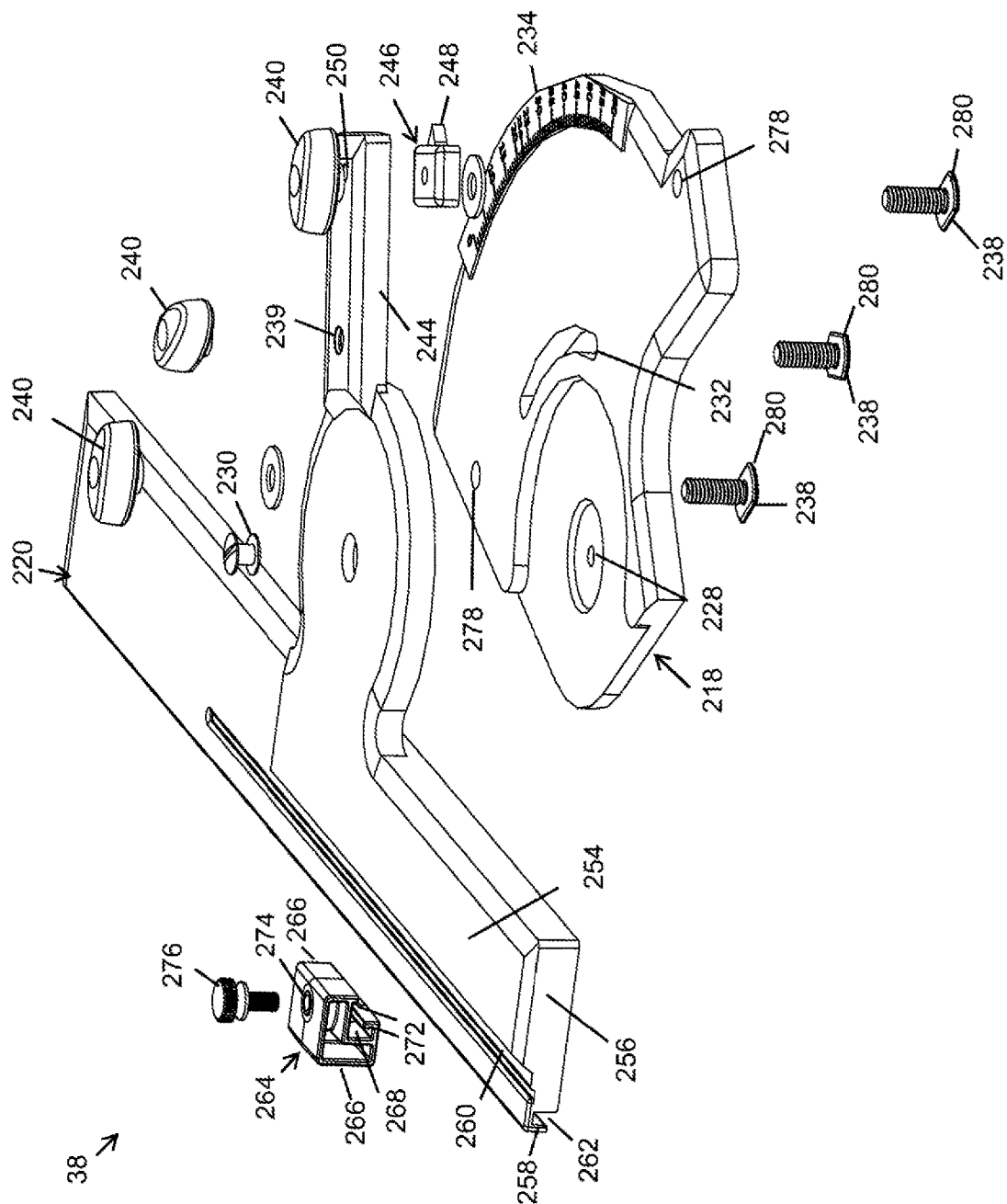
FIG. 82 is an exploded perspective view of the miter gauge shown in FIG. 81
Figure 83:
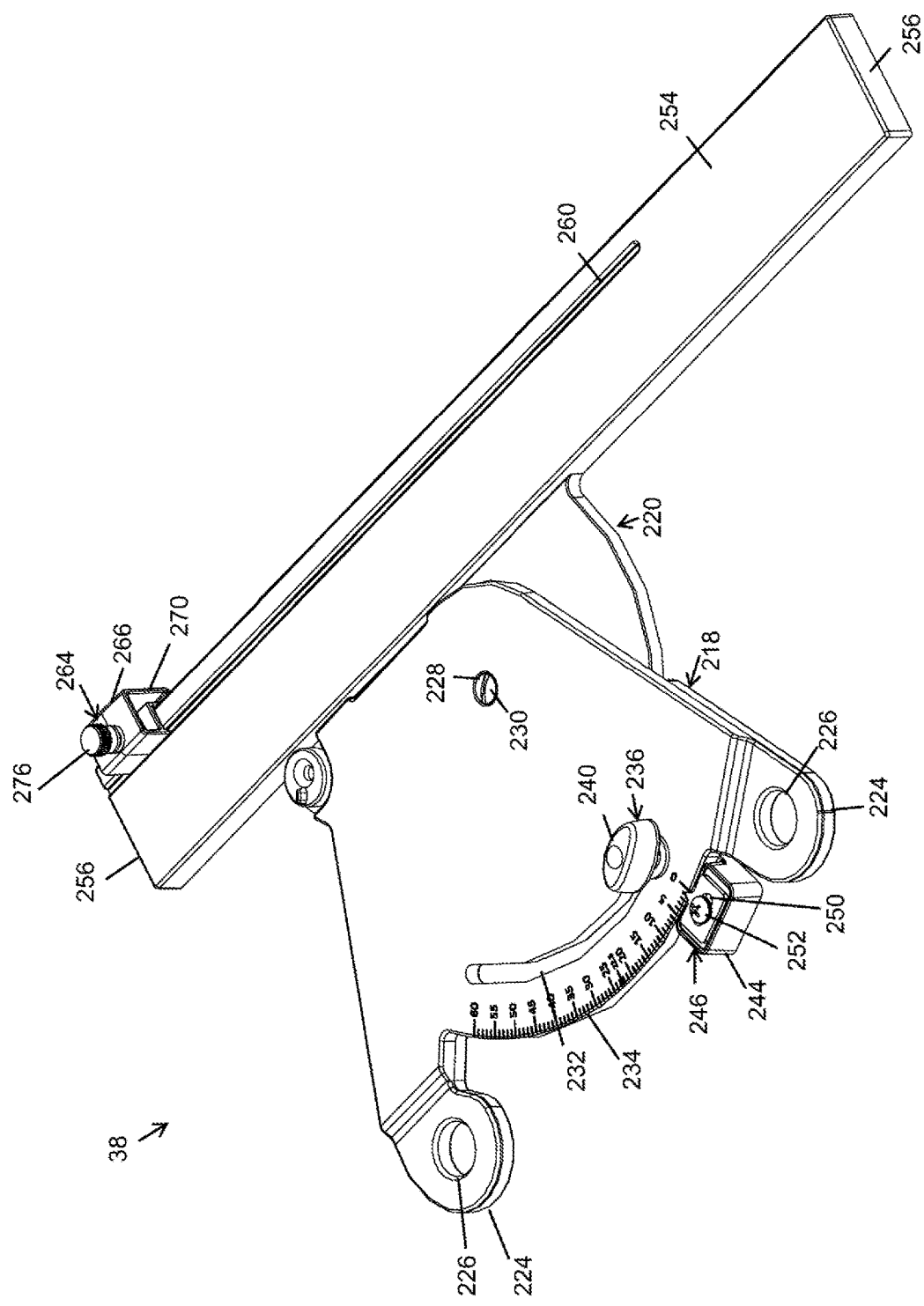
FIG. 83 is another perspective view of the miter gauge shown in FIG. 76.
Figure 84:
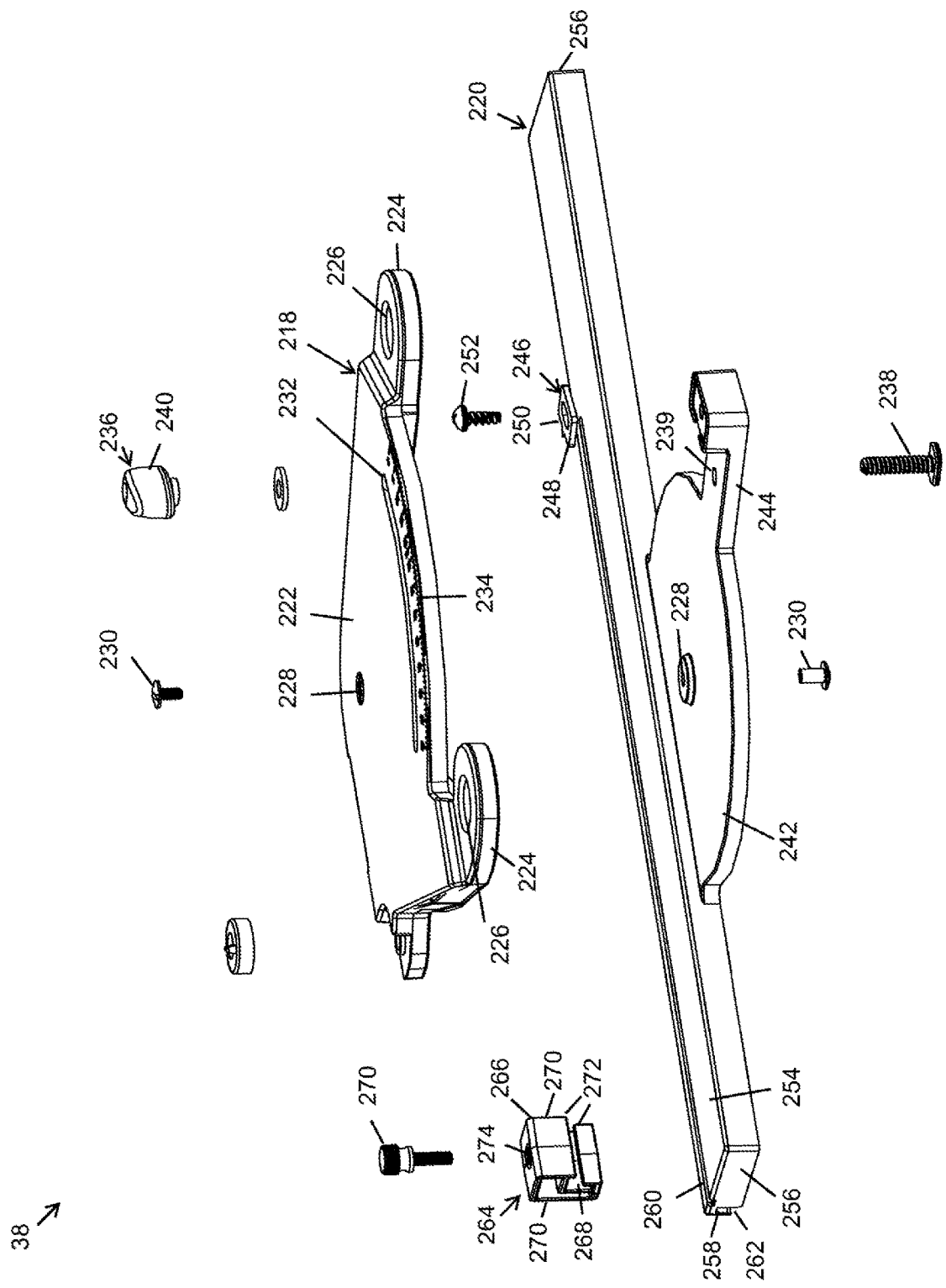
FIG. 84 is an exploded perspective view of the miter gauge shown in FIG. 76.

Connected To Bench Table Tracks: With reference to FIGS. 81 and 82, a similar miter gauge 38 is presented to that shown in FIGS. 76, 77, 78, 79, 80, 83 and 84. The miter gauge 38 shown in FIGS. 81 and 82 is configured to connect to benchtop 24 through connection to the groove 72 in a table track 66 (instead of connecting to dog holes 60). In this arrangement, the miter gauge 38 includes the same or a similar arrangement of parts as that presented above, with the difference being that base 218 includes a pair of openings 278 that are configured to receive a fastener 238 there through that connects the base 218 to a table track 66. As such, unless specifically stated otherwise, the teachings of the bench dog miter gage 38 apply to and are incorporated into the table track miter gage 38.

In the arrangement shown, as one example, fasteners 238 include a head 280 that is sized and shaped to fit within the groove 72 of table track 66 and slide along the groove 72 in table track 66. Once the miter gauge 38 is in its desired position, knobs 240 connected to both fasteners 238 that extend through both openings 278. As knob 240 is tightened upon fastener 238, base 218 is tightened against table track 266 thereby locking miter gauge 38 in place on benchtop 24. By using table track 66 to affix miter gauge 38 to benchtop 24 this provides a more accurate connection than using bench dog holes 60. Another advantage of attaching the miter gauge 38 to table tracks 66 is that the miter gauge 38 has infinite adjustability when attached to a table track 66 as the miter gauge 38 may be slid to any positon along the length of table track 66.

Figure 85:
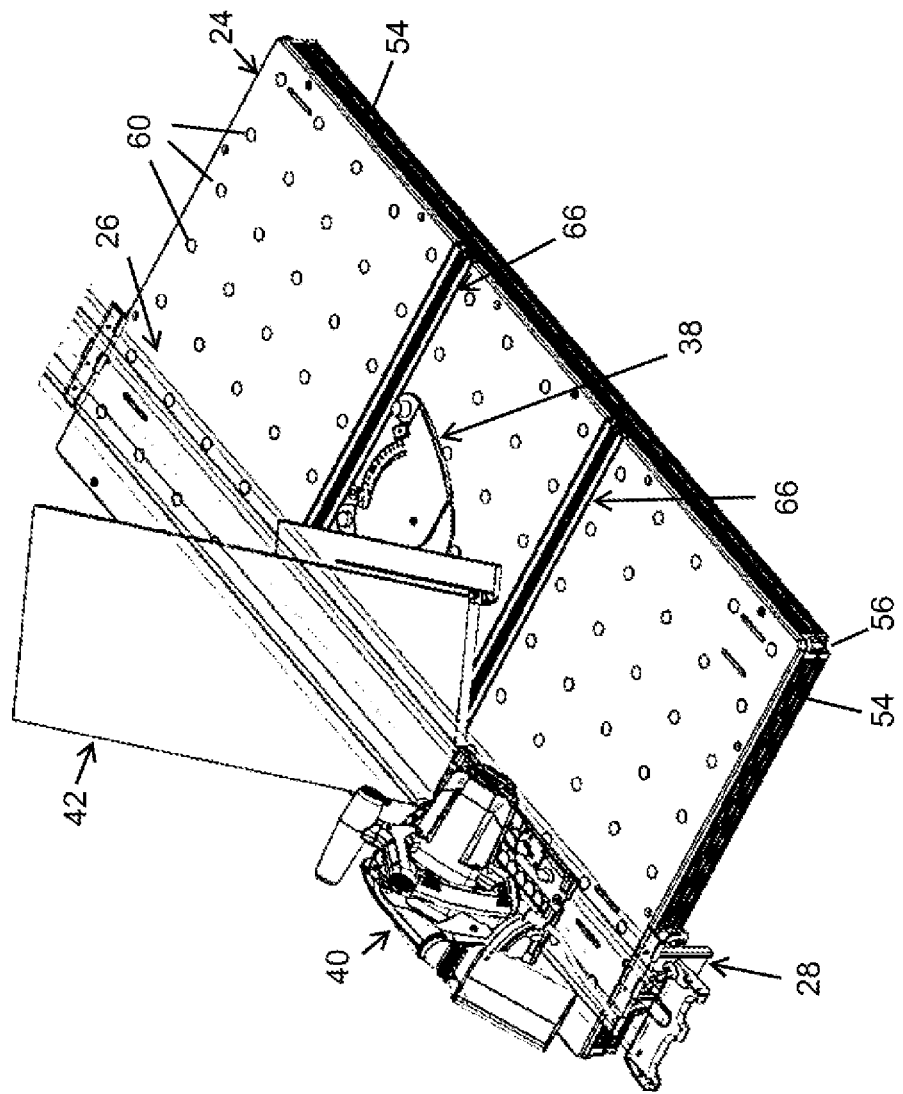
FIG. 85 is a top perspective view of the miter gauge shown in FIG. 76 used in association with the benchtop shown in FIG. 1, the view showing the miter gauge attached to the benchtop by a pair of bench dogs, the view showing the miter gage placed at an angle to the front edge of the benchtop and cutting edge of the saw track, the view showing a workpiece connected in flush alignment to the front stop surface of the stop arm of the miter gauge, the view showing the front end of the stop arm of the miter gauge extending under the saw track a distance, the view showing the saw track connected to the benchtop by a pair of hinge members, the view showing a saw connected to the saw track, the view showing the saw track in hidden lines.

In one arrangement, regardless of the manner of connection of the miter gauge 38 to benchtop 24, the forward end of stop arm 254 has a narrow height, similar to the height of the narrow stop end 162 of narrow rip stop 34, so that the forward end of stop arm 254 may be inserted under the saw track 26 without interfering with engagement between the saw track 26 and the workpiece 42 for most common thicknesses of workpieces 42. This use case is shown in FIG. 85 as one example. The thin vertical height of the forward end of stop arm 254 allows for the stop arm 254 to provide support and guidance to the workpiece 42 up to close to the cutting edge 98 of saw Track 26. This allows precise alignment and guidance as well as facilitates cutting of narrow workpieces 42 at an angle using the system 10. This provides a great benefit as it is desirable to provide support to workpiece 42 as close to the cutting edge 98 as possible. This is especially true for angled cuts. This enhances the accuracy of angled cuts and helps to prevent and/or limit movement of workpiece 42 during cutting. In the arrangement shown, as one example, the upper groove 260 and lower groove 262 of stop arm 254 do not extend down to the forward end of stop arm 254 so as to allow the forward end of stop arm 254 to extend under the saw track 26 without engagement or interference by the presence of stop member 264.

Bench Dogs: Bench dogs 32 are used in association with benchtop 24 and are configured to provide stop surfaces for workpieces 42 while also providing alignment to workpieces 42 by way of being aligned with the grid of bench dog holes 60 in benchtop 24 which are aligned to the saw track 26, edge tracks 54, table tracks 66 and other features of benchtop 24. Bench dogs 32 are formed of any suitable size, shape and design. In the arrangement shown, with reference to FIG. 16, bench dogs 32 include a cylindrical shaft 282 that is sized and shaped to fit within bench dog holes 60 in benchtop 24 within close and tight tolerances and a wider cylindrical head 284. In view of these tight tolerances, between the shaft 282 and the diameter of bench dog holes 60, in one arrangement, as is shown, bench dogs 32 include a chamfered lower edge that helps to facilitate the insertion of the bench dog 32 into a bench dog hole 60. The head 284 of bench dog 32 is wider than the shaft 282 and therefore the intersection of the head 284 and shaft 282 form a perpendicular shoulder that engages the upper surface of the benchtop 24 in flat and flush engagement upon insertion of the bench dog 32 into a bench dog hole 60.

In the arrangement shown, there are two forms of a bench dog 32, a standard bench dog 32 (or simply "bench dog 32") and a short bench dog 33. Standard bench dogs 32 are configured to be used in open space on the benchtop 24 and therefor the height of head 284 is not restricted. As such, in one arrangement, the head 284 may be any height, and it may be as tall as the shaft 282.

In contrast, short bench dogs 33 are configured to be used under saw track 26 so as to provide a stop surface for workpiece 42 as close to cutting edge 98 as possible while not interfering with the lowering of saw track 26. This placement provides optimum accuracy and a minimum moment on workpiece 42 during cutting. As short bench dogs 33 are configured to be placed under saw track 26, the head 284 of short bench dogs 33 are configured to be equal to or shorter than the thickness of most workpieces 42. This shorter or narrower vertical height of head 284 of short bench dog 32 allows the short bench dog 32 to be placed under the saw track 26 during a cutting operation to engage a side of a short or thin or narrow workpiece 42 without interfering with the saw track 26 engaging and holding the workpiece 42. By the head 284 of short bench dog 32 being vertically equal to or shorter or narrower than the workpiece 42 that is being cut, this ensures that the saw track 26 engages the upper surface of the workpiece 42, thereby ensuring that the saw track grips and holds onto the workpiece 42 ensuring the workpiece 42 does not move during a cutting operation. In some arrangements, ¼ inch sheet material is the thinnest or narrowest commonly cut sheet material and in this arrangement the head 284 of short bench dog 32 is equal to or slightly less than this material thickness. In some arrangements, ⅜ inch sheet material is the thinnest or narrowest commonly cut sheet material and in this arrangement the head 284 of short bench dog 32 is equal to or slightly less than this material thickness. In some arrangements, ½ inch sheet material is the thinnest or narrowest commonly cut sheet material and in this arrangement the head 284 of short bench dog 32 is equal to or slightly less than this material thickness. Any other thickness for narrow stop end 164 is hereby contemplated for use. In one arrangement, the head 284 of short bench dog 33 is half or less than half the height of the head 284 of standard bench dog 32. In one arrangement, head 284 of short bench dog 32 is of approximately equal height to the height of other components of the system 10 that are configured to be used under saw track 26 including narrow stop end 162 of narrow rip stop 34 and the narrow end 256 of stop arm 254 of miter gage 38.

Under Saw Track Measurement and Alignment: One of the substantial benefits of the system 10 presented herein is its ability to accurately measure and cut workpieces 42 on the benchtop 24 or tabletop itself. This includes measuring and cutting thin or narrow workpieces 42. To accomplish this, alignment and measurement of workpieces 42 is facilitated as close to the cutting edge 98 as possible. To accomplish this, in some applications, the measurement member or alignment member is positioned beneath the saw track 26 and near the cutting edge 98 of saw 40. More specifically, the system 10 allows a workpiece 42 to be stopped close to the cutting edge 98 by placing a short bench dog 33 under the saw track 26, which is shown in FIG. 65. As is shown in FIG. 65, the system 10 also allows a workpiece 42 to be precisely measured and cut, under the saw track 26, by having the narrow stop end 162 of narrow rip stop 34 extend under the saw track 26, either individually and in association with connection member 176 that also extends under the saw track 26 and connects a pair of narrow rip stops 34. The system 10 also allows for the forward end of stop arm 254 of miter gauge 38 to extend under saw track 26 and guide workpiece 42 to ensure optimum accuracy during an angle cut, which is shown in FIG. 85. As such, the combination of the these components and their heights that are coupled to the narrowest workpiece 42 or narrowest standard workpiece 42 (such as ¼ inch, ⅓ inch, 3.8 inch, ½ inch or the like) facilitates optimum accuracy and the broadest range of capabilities.

Use Case: Installation and Calibration of Saw Track to Benchtop, and Calibration of Measuring Members of Table Tracks to Benchtop:

With reference to FIGS. 37, 38, 39 and 40 one manner or method of calibrating the saw track 26 to the features of benchtop 24 (such as table tracks 66, edge tracks 54 and the grid of bench dog holes 60) is presented.

The saw 40 is calibrated to the saw track 26 by making an initial pass of the blade of saw 40 along the length of saw track 26. This initial pass is done off of and away from the benchtop 24. This cuts a portion of the chip strip 108 to fit precisely with the blade of saw 40. Having the blade of saw 40 fit precisely to the outward end of chip strip 108 means that the outward end of chip strip 108 supports the material of workpiece 42 as close as possible to the blade of saw 40. This has the result of reducing chipping or what is known as "tear out" during cutting which provides accurate and desirable cuts in workpiece 42

Figure 37:
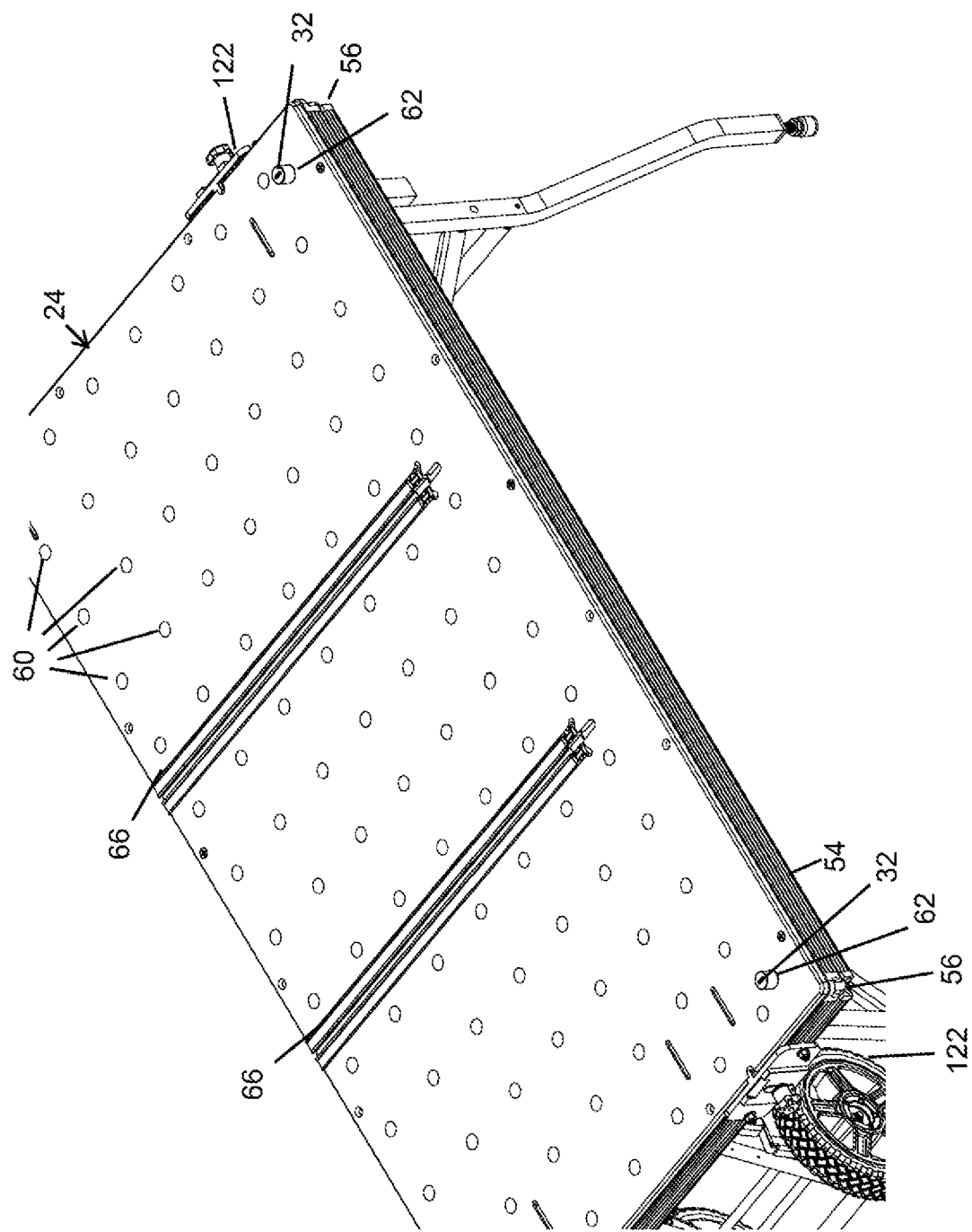
FIG. 37 is a perspective view of the benchtop of FIG. 1 having a grid pattern of bench dogs in the upper surface of the benchtop, the view showing mounting plates connected to each end of the benchtop, the view showing bench dogs placed within calibration features in the forward side of the benchtop with one bench dog adjacent each forward corner of the benchtop.

With reference to FIG. 37, bench dogs 32 are placing in calibration holes 62, which in the arrangement shown, includes one calibration hole 62 in each of the outward forward corners of benchtop 24. Mounting plates 122 of hinge members 28 are installed onto the left and right edge tracks 54 by inserting fasteners 128 into groove 58 of edge tracks 54 and inserting the alignment feature 134 into the alignment receiver 136 of benchtop 24 and tightening the mounting plate 122 using nuts 130.

Figure 38:
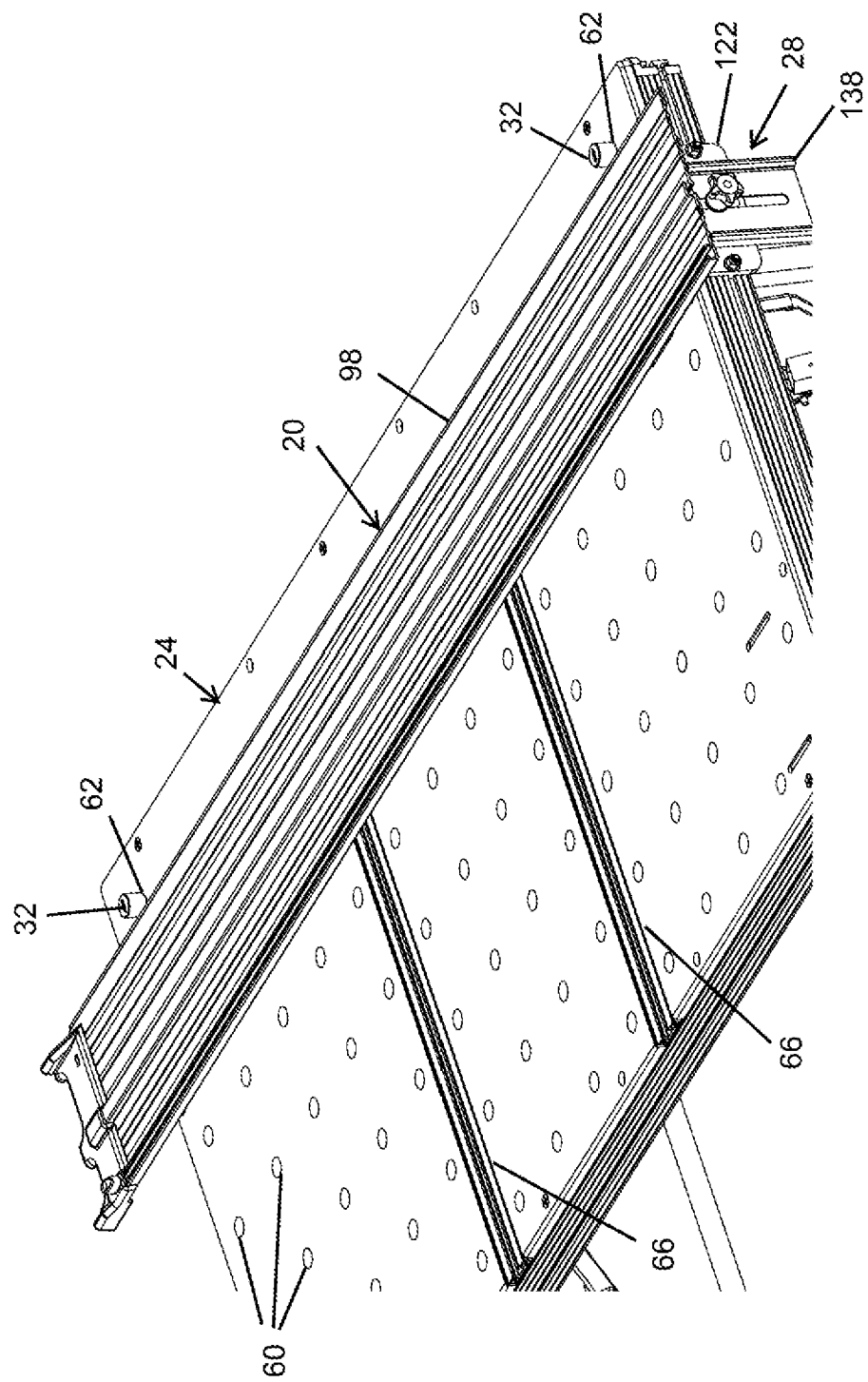
FIG. 38 another perspective view of the benchtop shown in FIG. 37 with bench dogs placed in the calibration holes, the view showing the saw track attached to the benchtop by end plates attached to mounting plates, the view showing the saw track in a calibration position wherein the cutting edge is placed against the bench dogs placed in the calibration features.
Figure 39:
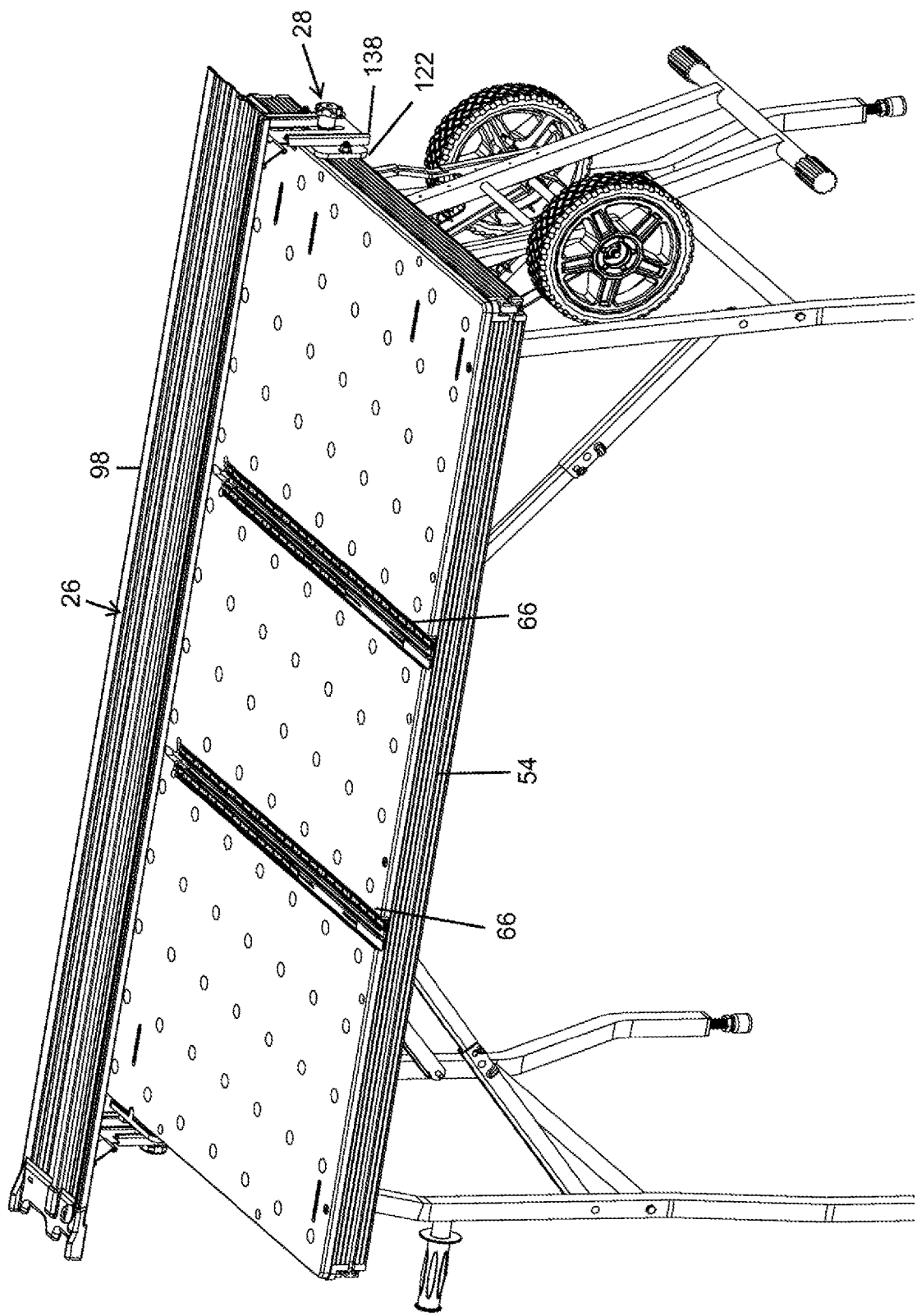
FIG. 39 is a perspective view of the benchtop shown in FIG. 1, the view showing mounting plates connected to edge tracks of the benchtop, the view showing end plates connected to the mounting plates, the view showing the saw track connected to the mounting plates, the view showing the end plates in a fully raised position, the view showing the saw track in a fully raised position upon center members and second hinges of the end plates.

With reference to FIGS. 38 and 39, once the mounting plate 122 is installed on benchtop 24, end plates 138, with the attached saw track 26 are installed on mounting plates 122. This is accomplished by aligning the slot 148 of main body 144 of end plates 138 with the second protrusion 142 of mounting plates 122. Once the second protrusion 142 of mounting plate 122 is positioned within the slot 148 of end plate 138 the knob 150 is tightened upon the fastener 128 that extends through slot 148.

The height of the end plates 138 are adjusted such that the bottom surface of the saw track 26 engages the top surface of the benchtop 24 when the hinge members 28 are in a lowered position. This is accomplished by vertically sliding the end plates 138 upon mounting plates 122 and locking the end plates 138 in vertical position by tightening knob 150 once end plates 138 are in their desired vertical position.

Next, with the saw track 26 in a lowered position, the saw track 26 is slid forward until the calibrated cutting edge 98 of the chip strip 108 of saw track 26 engages the edges of the bench dogs 32 in calibration holes 62. This movement causes the alignment feature 134 to move forward within the alignment receiver 136. When bias member 322 is present, this is partially accomplished by the bias force applied by biasing member 322. Once in this position, with cutting edge 98 in engagement with the bench dogs 32 in calibration holes 62, the nuts 130 passing through the mounting plates 122 are tightened thereby locking the lateral or forward-to-back position of the mounting plates 122, the end plates 138 and the saw track 26 with respect to benchtop 24 by tightening the lateral position of these components to edge tracks 54.

Figure 40:
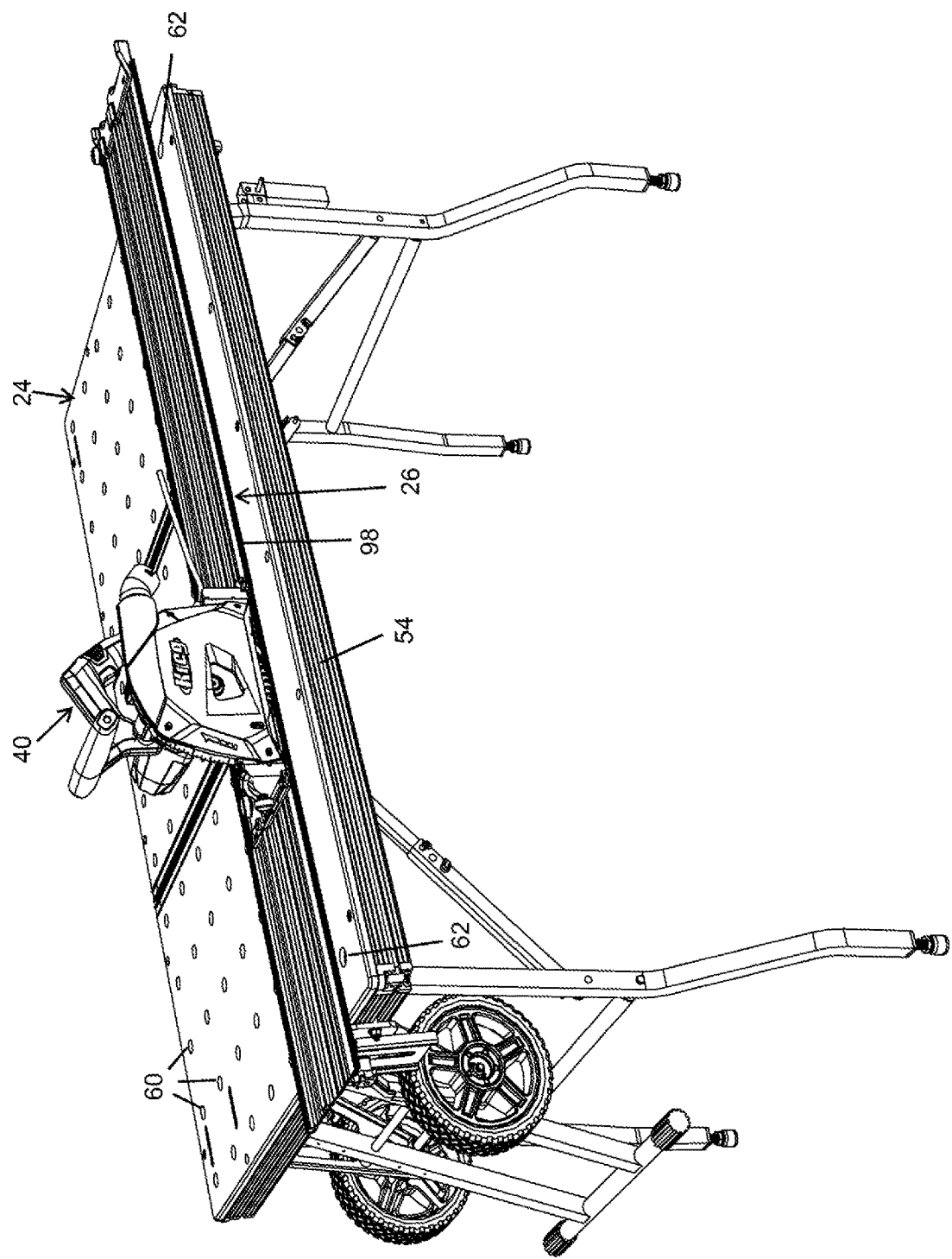
FIG. 40 is a perspective view of the benchtop shown in FIG. 1, the view showing mounting plates connected to edge tracks of the benchtop, the view showing end plates connected to the mounting plates, the view showing the saw track connected to the mounting plates, the view showing the end plates in a lowered raised position, the view showing the saw track in a lowered raised position upon center members and second hinges of the end plates, the view showing a plunge cut saw positioned on the saw track.

With reference to FIG. 40, once the position of the saw track 26 is calibrated, a test cut is made by passing the saw 40 along the saw track 26 thereby cutting a first groove in the top surface of the sacrificial benchtop 24. The rearward edge of this cut in the benchtop 24 is then used to calibrate the measuring members 78 of table tracks 66. Alternatively, the cutting edge 98 itself can be used to calibrate the measuring members 78 of table tracks 66. More specifically, a measurement is made from the rearward edge of the cut in the tabletop 24 rearward, and the measuring members 78 are adjusted to cause the measurements on the measuring members 78 to correspond to the distance from the rearward edge of the cut in the benchtop 24. This may be accomplished by using a tape measure in the groove of the cut in the benchtop 24 and then adjusting the measuring members 78, by sliding them within the measuring grooves 76 until the readings on the tape measure align with the measurements in the measuring members 78. Movement of the measuring members 78 may be accomplished by depressing the bias member 92 of lock member 82 of table track 66 and sliding the measuring member 78 to the desired location. Once the user has moved the measuring members 78 to the proper calibrated position, the user releases the bias member 92 of lock members 82 of table tracks 66 which then presses up on the measuring member 78 thereby locking the measuring members 78 in their precisely calibrated position. In this way, the measurements of the measuring members 78 of table tracks 66 are calibrated to the benchtop 24 and the cutting edge 98 of saw track 26. Simultaneously, the measurements of the narrow rip stops 34 and wide rip stops 36 are calibrated as they depend upon the calibration of the table tracks 66.

Figure 41:
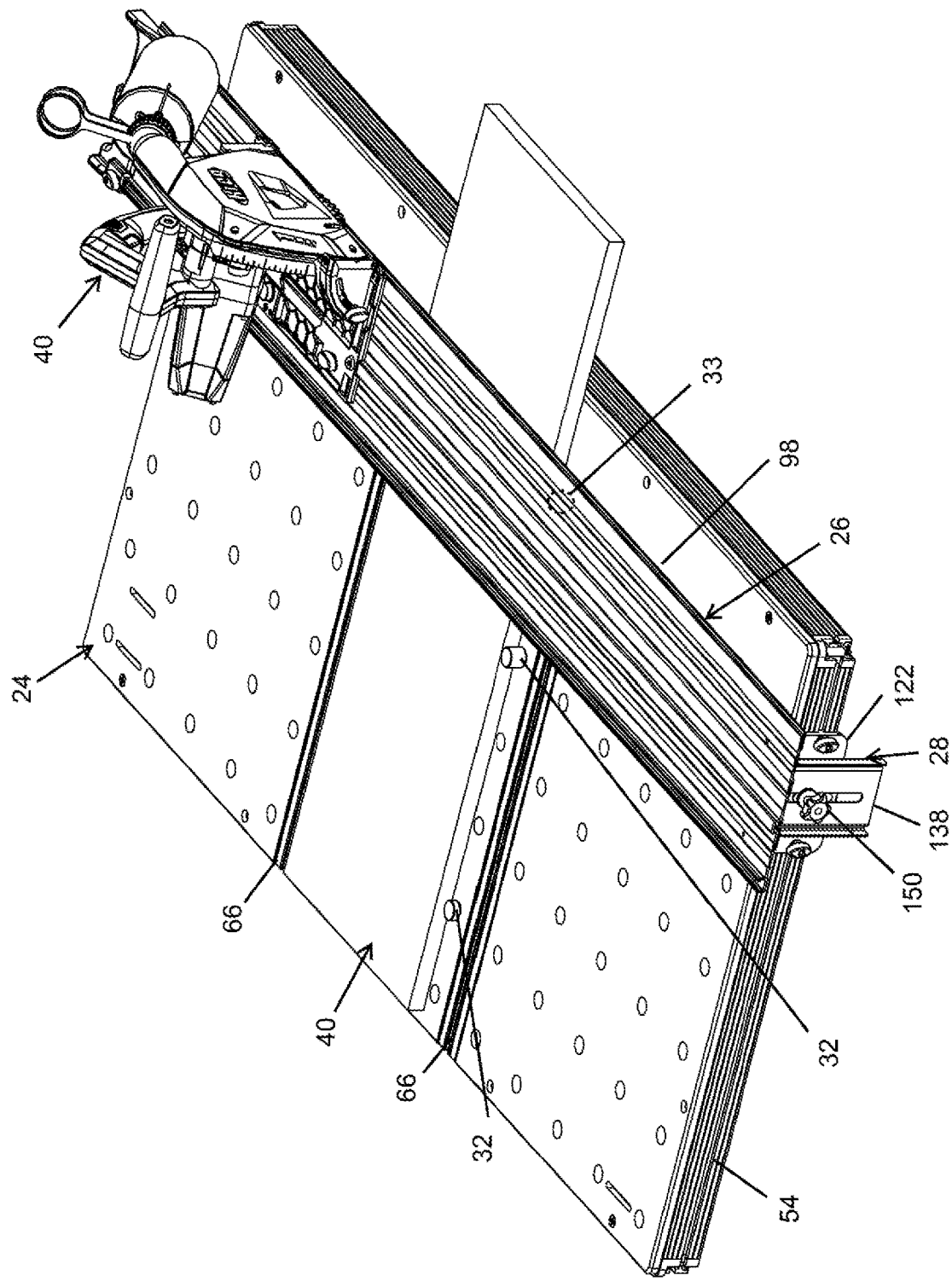
FIG. 41 another perspective view of the benchtop shown in FIG. 1, the view showing a configuration similar to that shown in FIG. 40, the view additionally showing a workpiece placed under the saw track and the saw track placed on top of the upper surface of the workpiece, the view showing the workpiece positioned against three bench dogs, one under the saw track near the cutting edge and two positioned rearward of the saw track, the bench dogs positioned on a side of the workpiece opposite the cutting direction, the view showing an example of how a perpendicular cut is performed using the system, the view showing the portion of the workpiece rearward of the saw track fitting on the upper surface of the benchtop.
Figure 42:
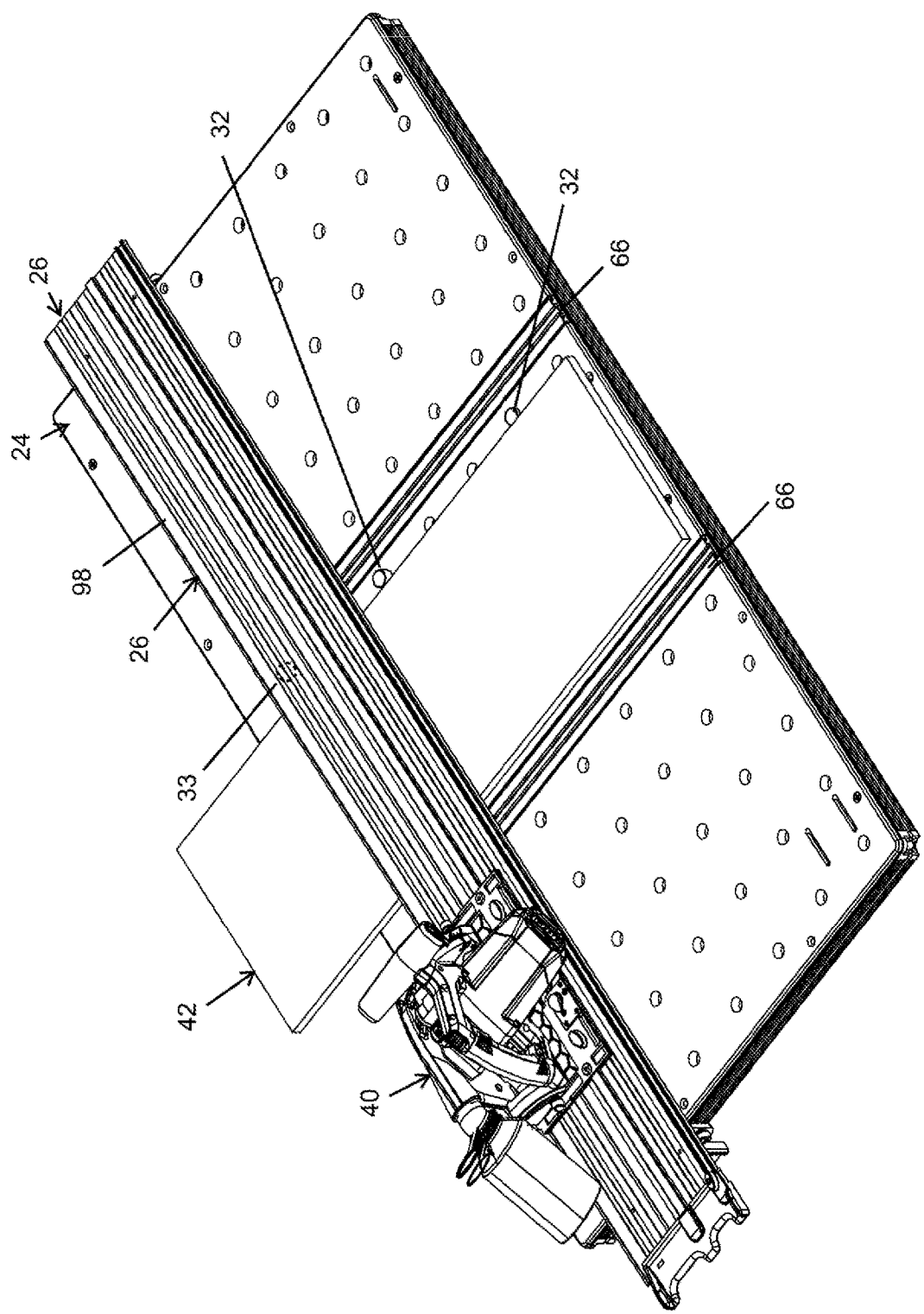
FIG. 42 is another perspective view of the arrangement shown in FIG. 41.
Figure 43:
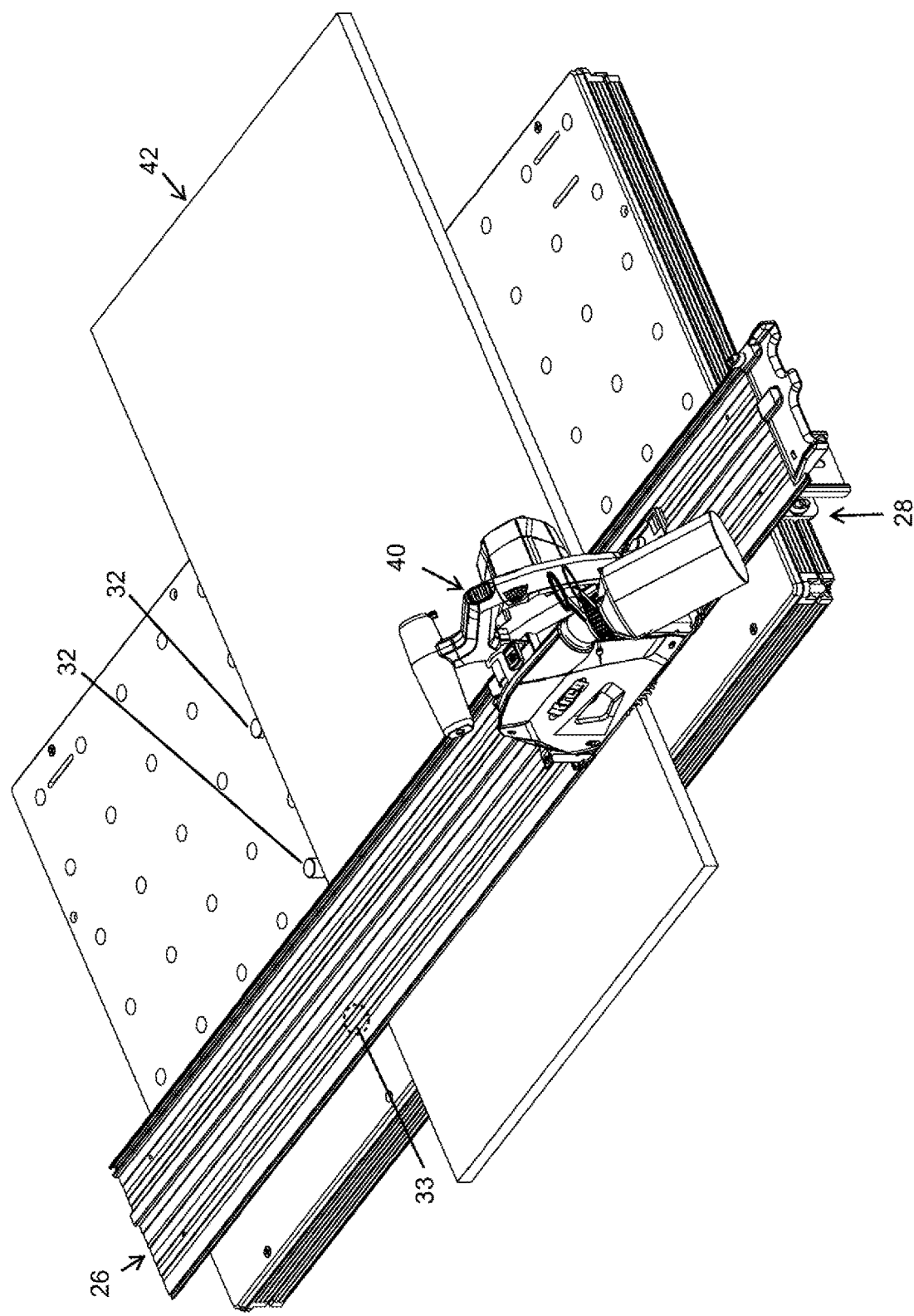
FIG. 43 a perspective view of the benchtop shown in FIG. 1, the view showing a configuration similar to that shown in FIG. 41 with the difference being the workpiece is much larger than the workpiece shown in FIG. 41 with a portion of the workpiece extending past the rearward edge of the benchtop, this arrangement shows that the workpiece will be maintained in position after the cut is performed.

Use Case: Standard Cutting of Sheet Material: With reference to FIGS. 41, 42 and 43, a standard perpendicular cutting operation is shown being performed using a workpiece 42. In this arrangement, three bench dogs 32 are used to support an edge of the workpiece 42 positioned on an opposite side of the workpiece 42 from the cutting direction (the direction the saw 40 comes from). In this arrangement, the bench dogs 32 are spaced along the length of the edge of the workpiece 42 in a wide-stance. That is, one bench dog 32 is positioned near the rearward edge of the workpiece 42. One bench dog 32 is positioned near the middle of the workpiece 42. And one bench dog 33 (not visible as it is hidden by the saw track 26, but is shown in dotted lines) is positioned near the cutting edge 98. In this way, optimum support is provided to the workpiece 42 during cutting, including support positioned adjacent the cutting edge 98. These bench dogs 32 are placed in bench dog holes in the same forward, to back row.

To perform this cutting operation, first the saw track 26 is moved to a raised position by rotating the saw track 26 upon first hinge 152 and second hinge 156 to a raised position. If additional space is required, the handles 150 of end plates 138 of hinge members 28 are loosened and the end plates 138 are slid upon the mounting plates 122 until the lower end of the slot 148 of end plate 138 engages the lower end of the second protrusion 142 of mounting plate 122. In this position the end plates 138 and saw track 26 are in a fully raised position and workpiece 42 can be easily inserted under saw track 26 as well as removed from under saw track 26.

Next, the bench dogs 32 are installed in the three aligned bench dog holes 60, with standard bench dogs 32 being installed rearward of the saw track 26, and a narrow bench dog 32 installed in the bench dog hole 60 under the saw track 26.

Next, with the bench dogs 32 installed, the workpiece 42 is slid under the saw track 26 between the hinge members 28 when the saw track 26 is in a raised position. The edge of the workpiece 42 is aligned and engaged with the three bench dogs 32 in a flat and flush arrangement. The workpiece 42 is slid also slid front to back until the placement of the cutting edge 98 is precisely at the desired position of the cut.

Next, once the workpiece 42 is precisely positioned, the vertical position of the saw track 26 is adjusted for the thickness of workpiece 42. This is accomplished by first moving the saw track 26 to a lowered position by rotating the saw track 26 from a raised position to a lowered position upon first hinge 152 and second hinge 156. Next, the handles 150 of the end plates 138 are loosened and the saw track 26 is lower until the lower surface of the saw track 26 engages the upper surface of the workpiece 42. Once in this position, where the saw track 26 extends in a generally horizontal manner between opposing hinge members 28 the handles 150 are tightened thereby locking the vertical height of the hinge members 28. This sets the height of the saw track 26 precisely for the thickness of workpiece 42.

With the bottom surface of saw track 26 in flat and flush engagement with the upper surface of the workpiece 42 the user can visually verify that the cut will be placed in the precise desired position. This is because the cut will be performed precisely at the intersection of the cutting edge 98 and workpiece 42. This provides an immense benefit as the user can visually see, double check and verify that the cut is in the precise position.

Next, with the bottom surface of saw track 26 in flat and flush engagement with the upper surface of the workpiece 42, the saw 40 is connected to the saw track 26 by aligning the base 104 of saw 40 with the features in the upper surface of saw track 26. Once properly aligned the saw 40 is passed along the length of the saw track 26 such that the blade of the saw 40 cuts along the cutting edge 98 and cuts the workpiece 42 at the intersection of the blade of saw 40 and the cutting edge 98 of saw track 26. As the saw 40 pushes down upon the saw track 26 during a cutting operation, the saw track 26 presses down upon workpiece 42 thereby clamping the workpiece 42 in place between the saw track 26 and the benchtop 24. The use of the grip layer of the chip strip 108 as well as the grip strips 110, with their high coefficient of friction, help to hold the workpiece 42 in place during cutting operation and as the saw 40 presses down upon workpiece 42 this pressure reinforces the grip of these grip layers which is self-reinforcing and thereby helps to prevent any relative movement during cutting.

Once the cut is made, the saw 40 is removed from saw track 26 and the saw track 26 is quickly and easily raised by lifting up on the saw track 26 which causes the saw track 26 to rotate upon first hinge 152 and second hinge 156 thereby moving the hinges 152, 156 from a lowered position to a raised position. Once in a raised position, the saw track 26 is in an over-center condition and remains in a raised position until the saw track 26 is intentionally lowered again by the user. While in the raised position, the cut workpiece 42 may be removed and a new workpiece 42 may be inserted. In this way, hinge members 28 and saw track 26 may be used to quickly cut multiple workpieces 42.

Figure 44:
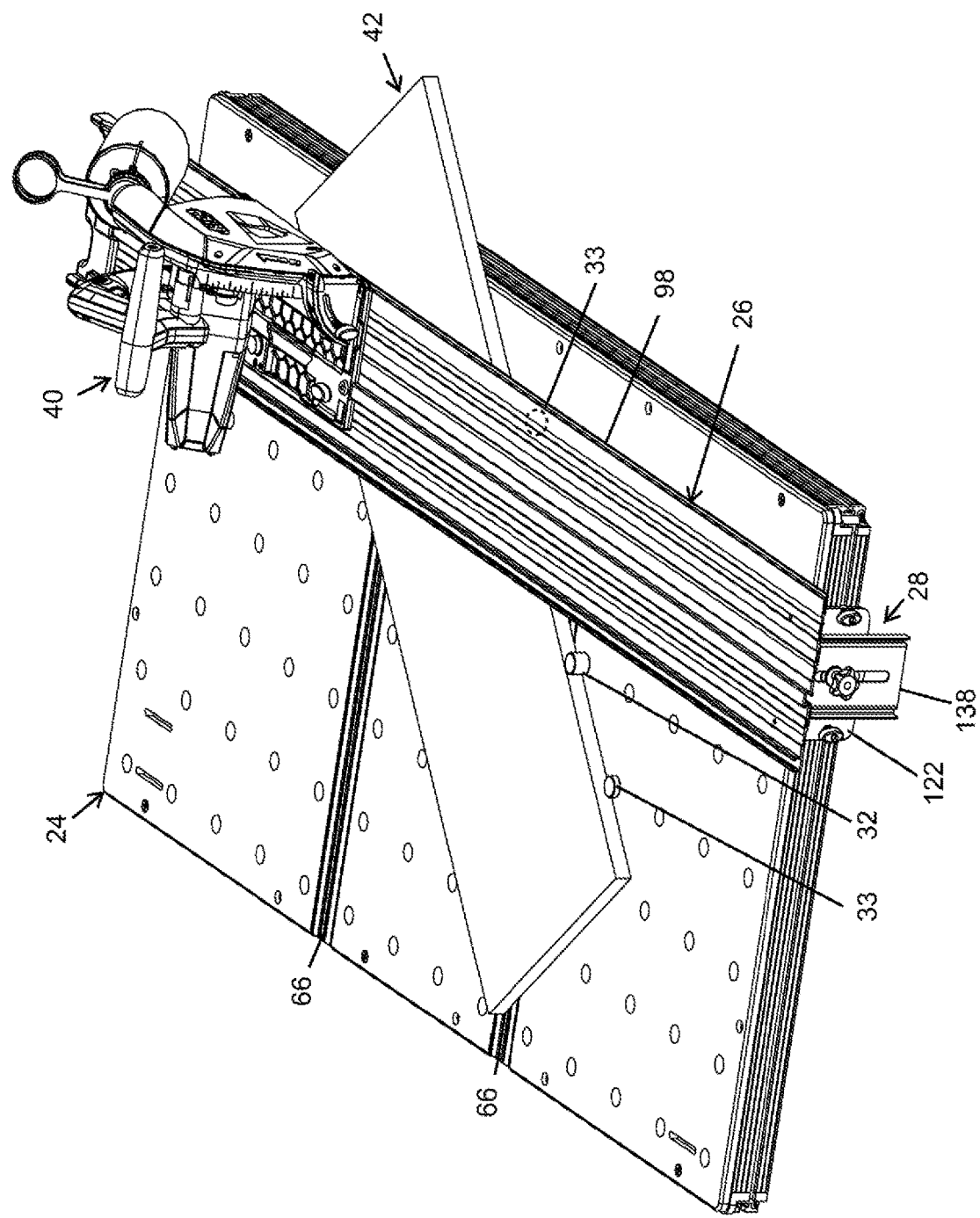
FIG. 44 is a perspective view of the benchtop shown in FIG. 1, the view showing a configuration similar to that shown in FIG. 43 with the difference being the workpiece is placed at a 45° angle to the cutting edge as opposed to a perpendicular alignment, the view showing a narrow bench dog placed under the saw track near the cutting edge with two bench dogs placed rearward and at a 45° angle from the forward most under-track bench dog, the view showing an example of how the system is used to easily perform a 45° cut.
Figure 45:
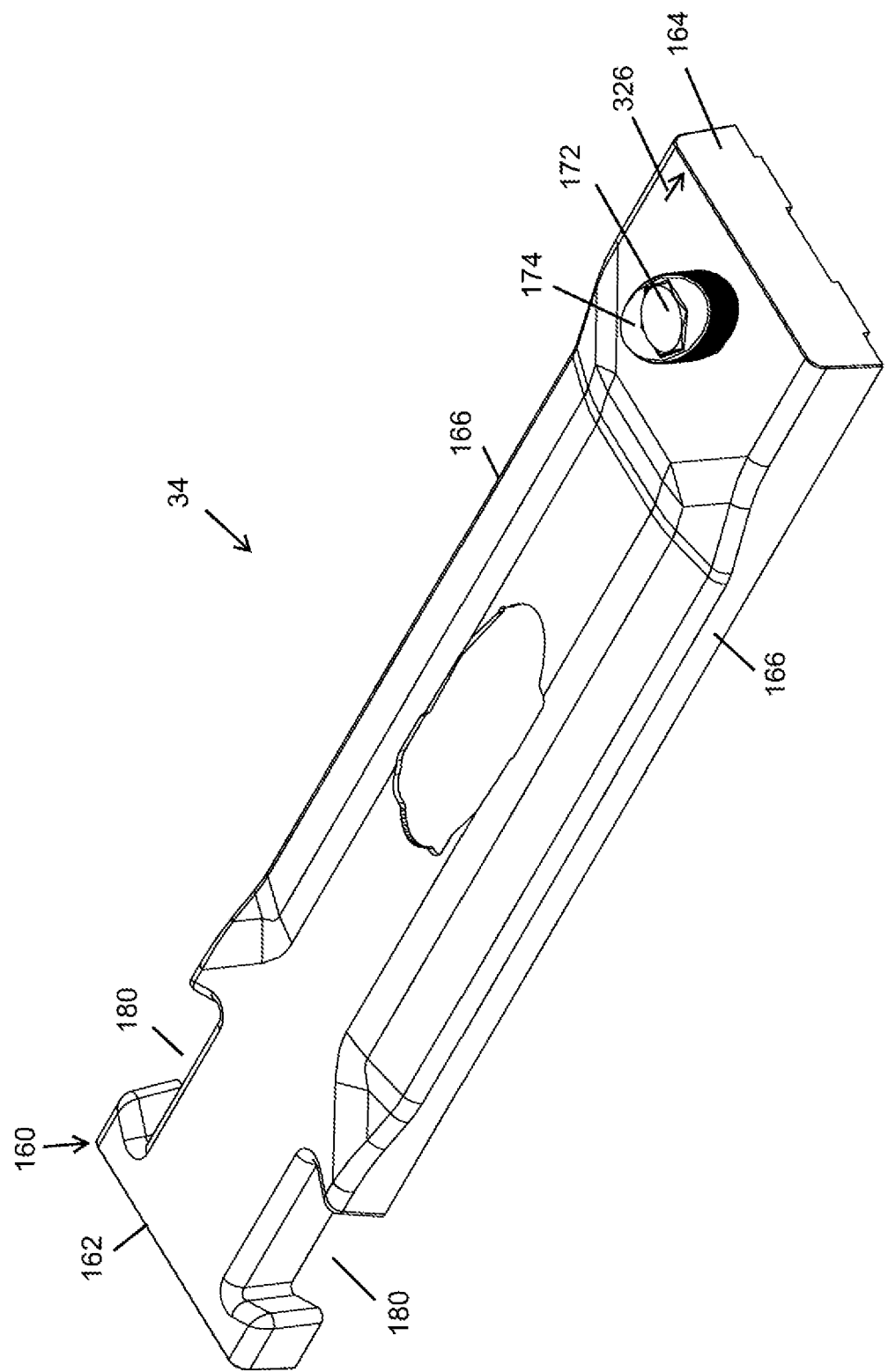
FIG. 45 is a perspective view of a narrow rip stop, the view showing the wide stop end of the narrow rip stop.
Figure 46:
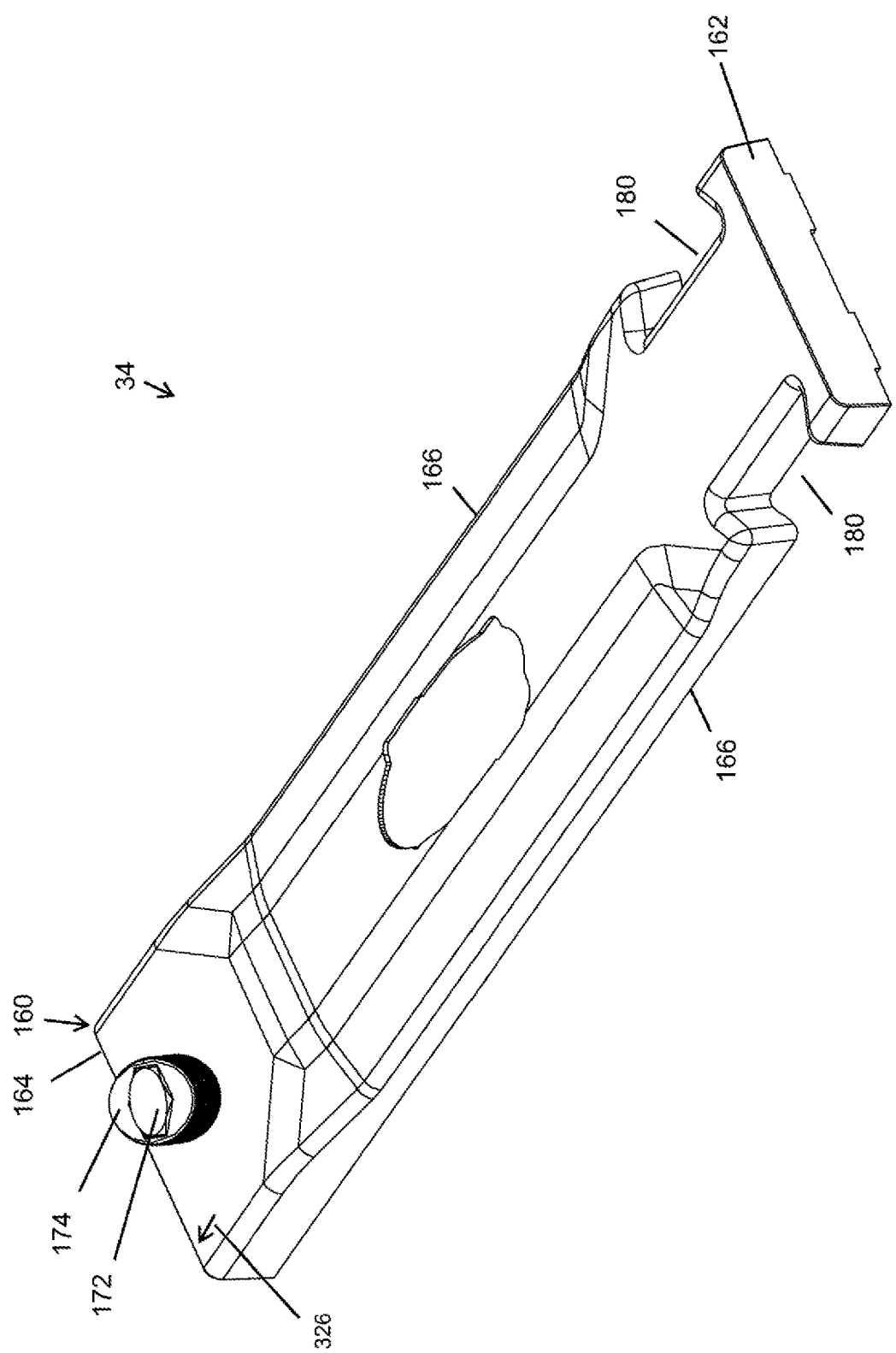
FIG. 46 is another perspective view of the narrow rip stop shown in FIG. 45, the view showing the narrow stop end of the narrow rip stop.
Figure 47:
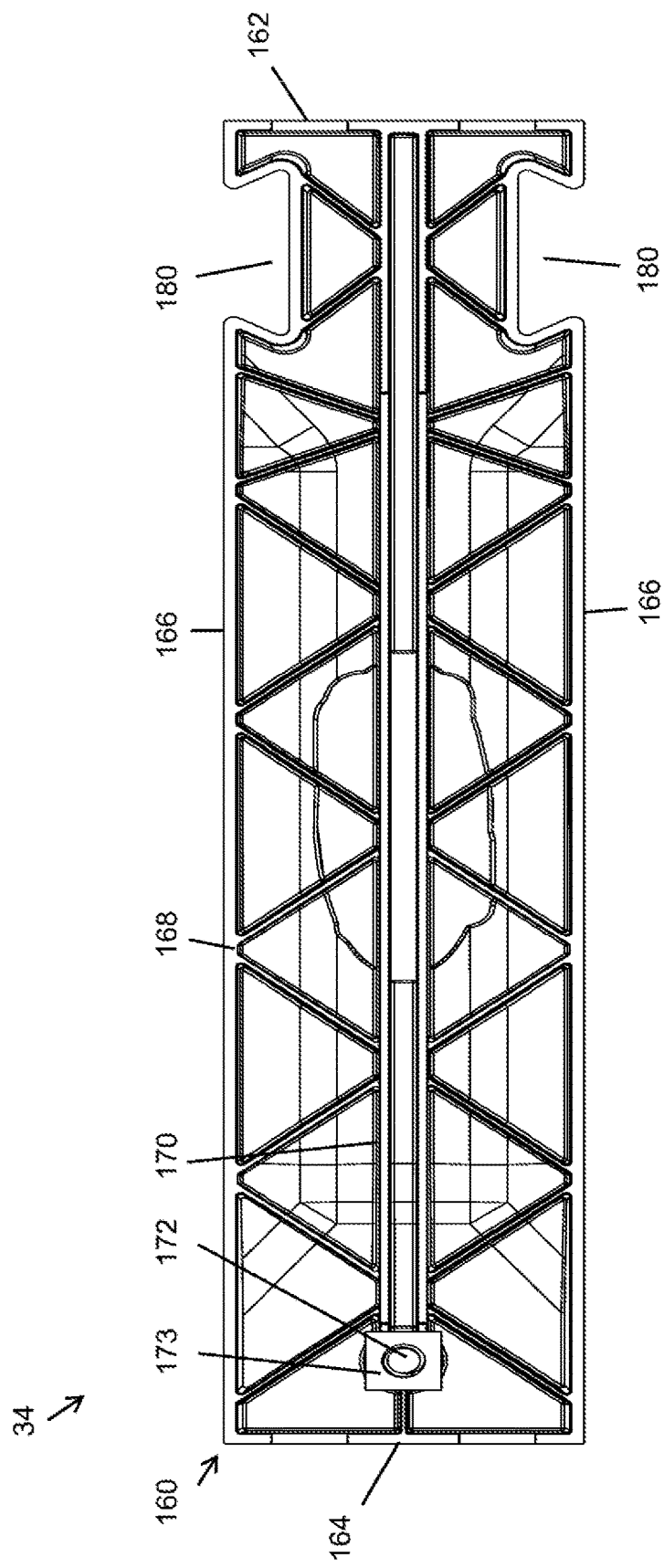
FIG. 47 is a bottom elevation view of the narrow rip stop shown in FIG. 45, the view showing the connection feature and structural features in the bottom side of the narrow rip stop, the view also showing the fastener and head that connect the narrow rip stop to the center-positioned groove of the table tracks.
Figure 48:
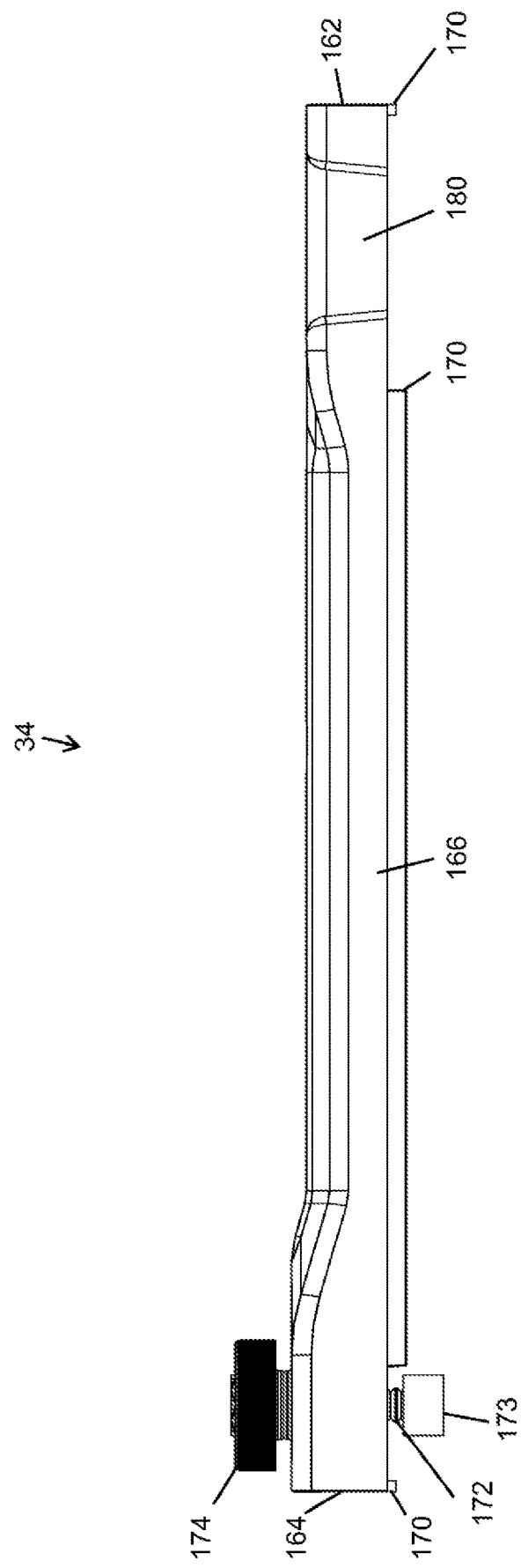
FIG. 48 is a side elevation view of the narrow rip stop shown in FIG. 45.
Figure 49:
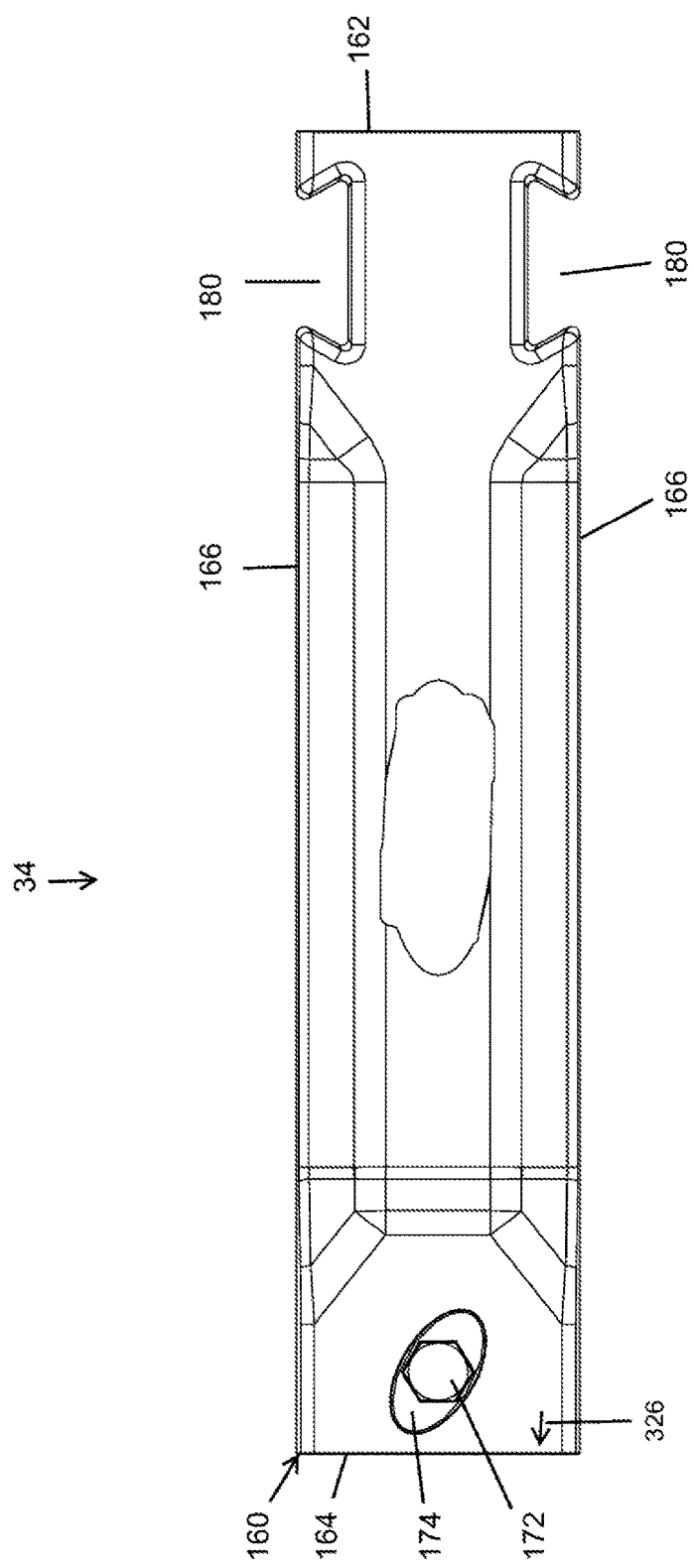
FIG. 49 is a top elevation view of the narrow rip stop shown in FIG. 45.
Figure 50:
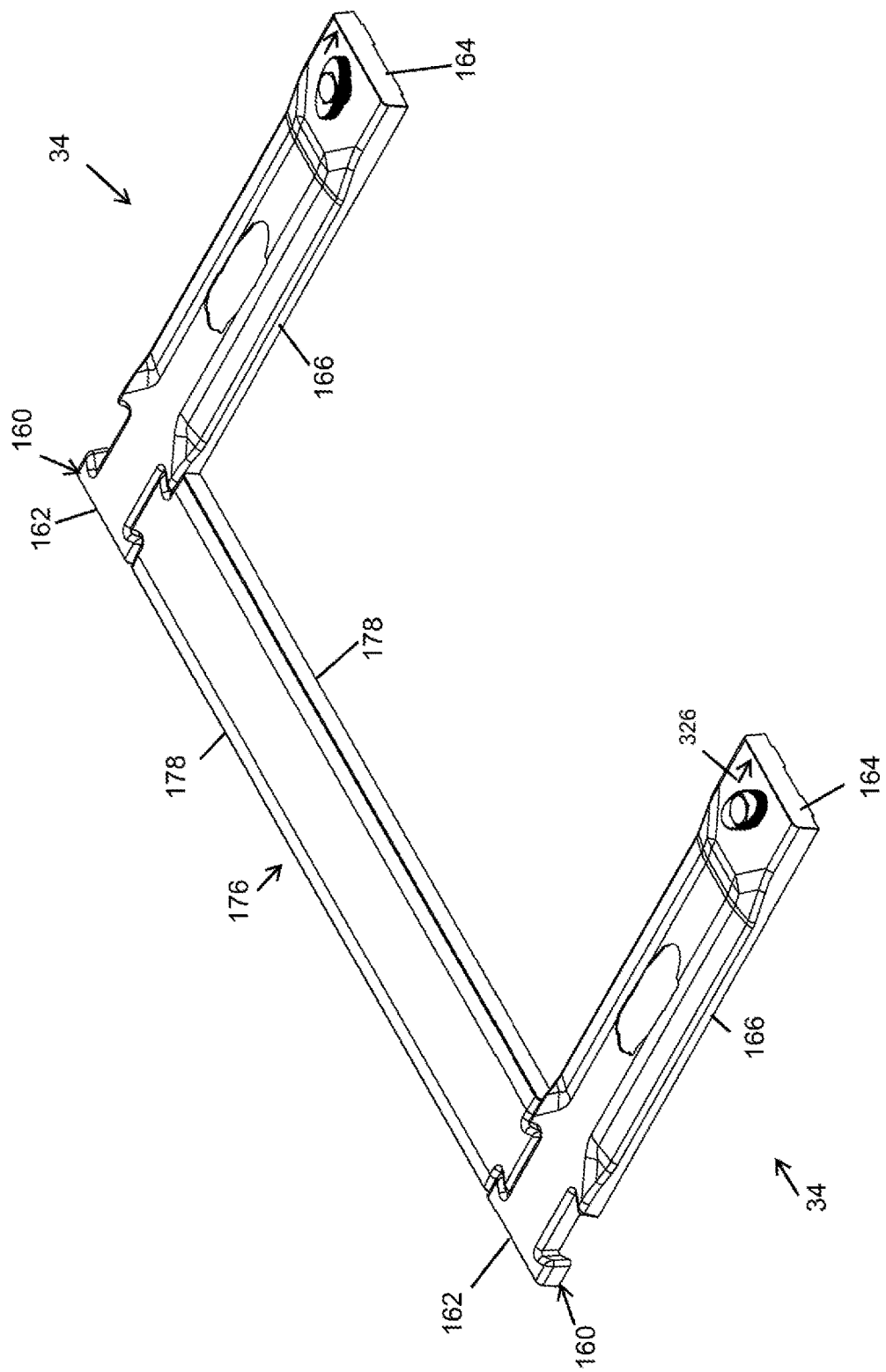
FIG. 50 is a perspective view of a pair of narrow rip stops as shown in FIG. 45, the narrow rip stops connected by a connection member that extends across and between the narrow stop ends of the narrow rip stops.
Figure 51:
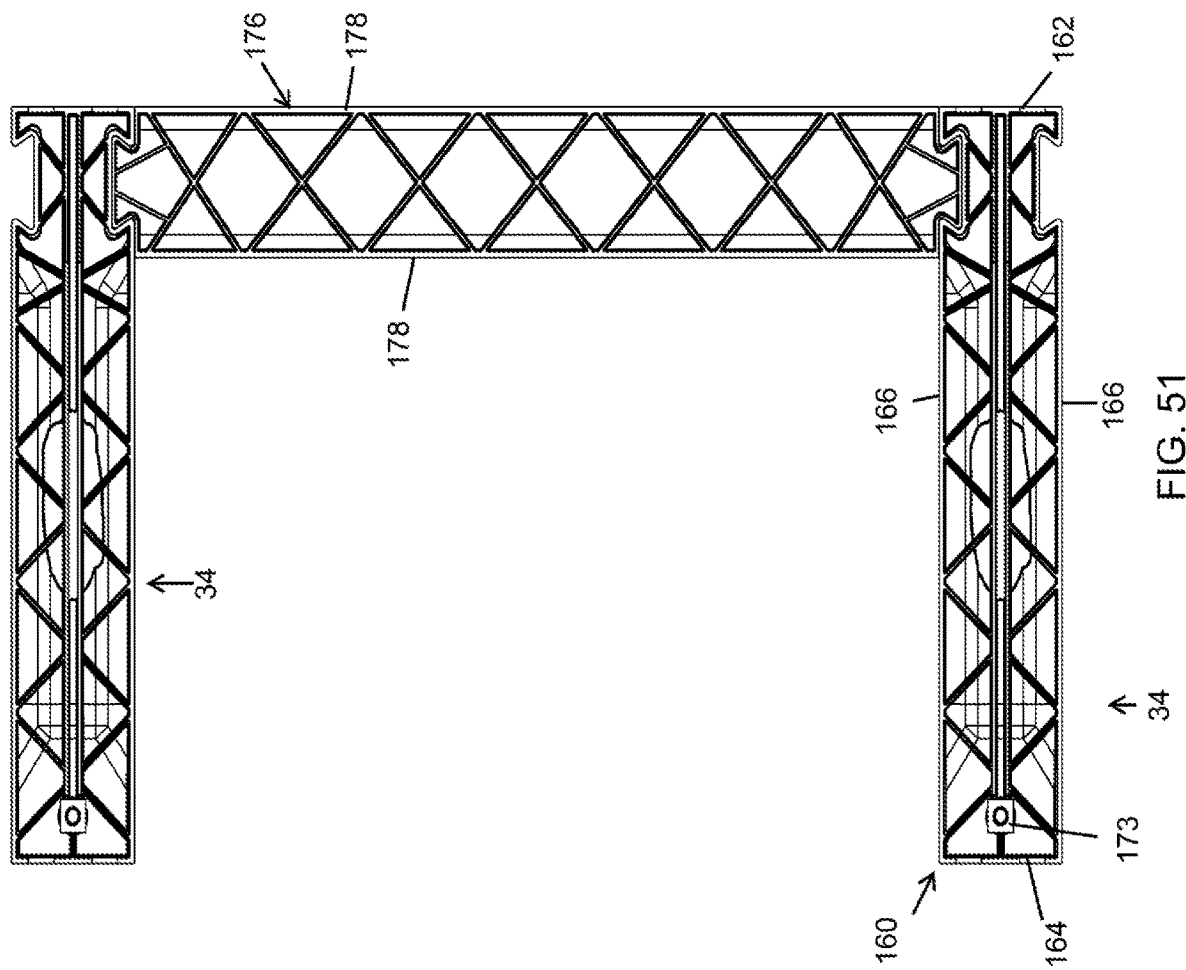
FIG. 51 is a bottom elevation view of the narrow rip stops connected by a connection member shown in FIG. 50.
Figure 52:
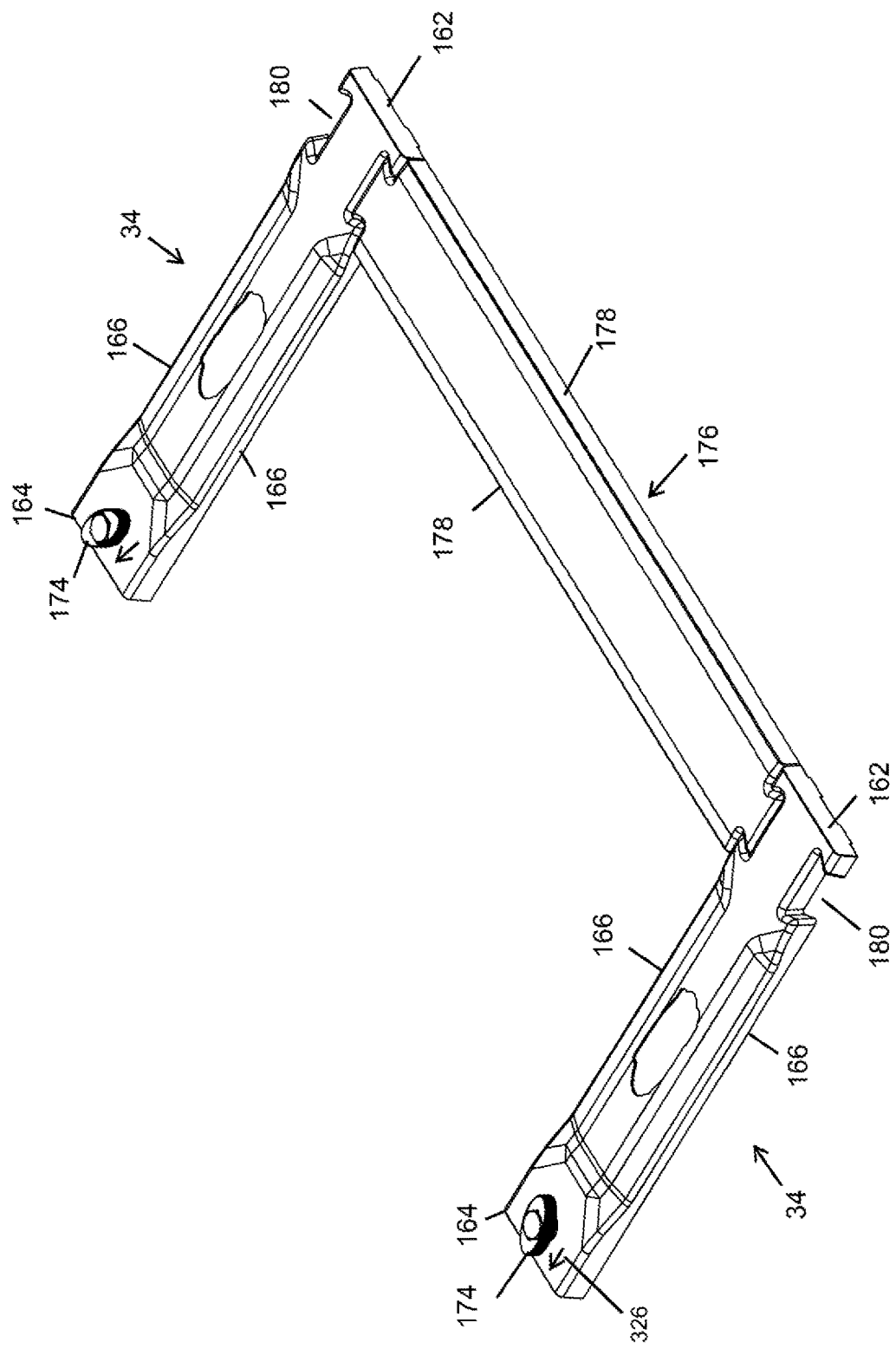
FIG. 52 is a another perspective view of the narrow rip stops connected by a connection member shown in FIG. 50.
Figure 53:
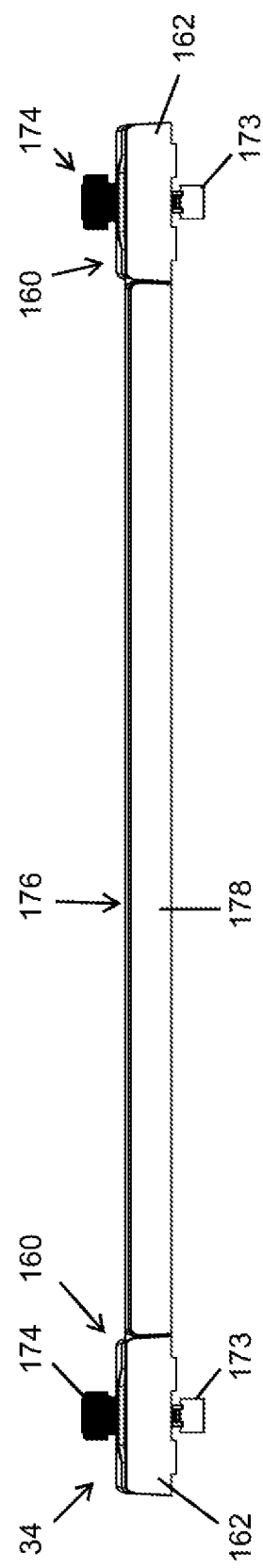
FIG. 53 is a front elevation view of the narrow rip stops connected by a connection member shown in FIG. 50.
Figure 54:
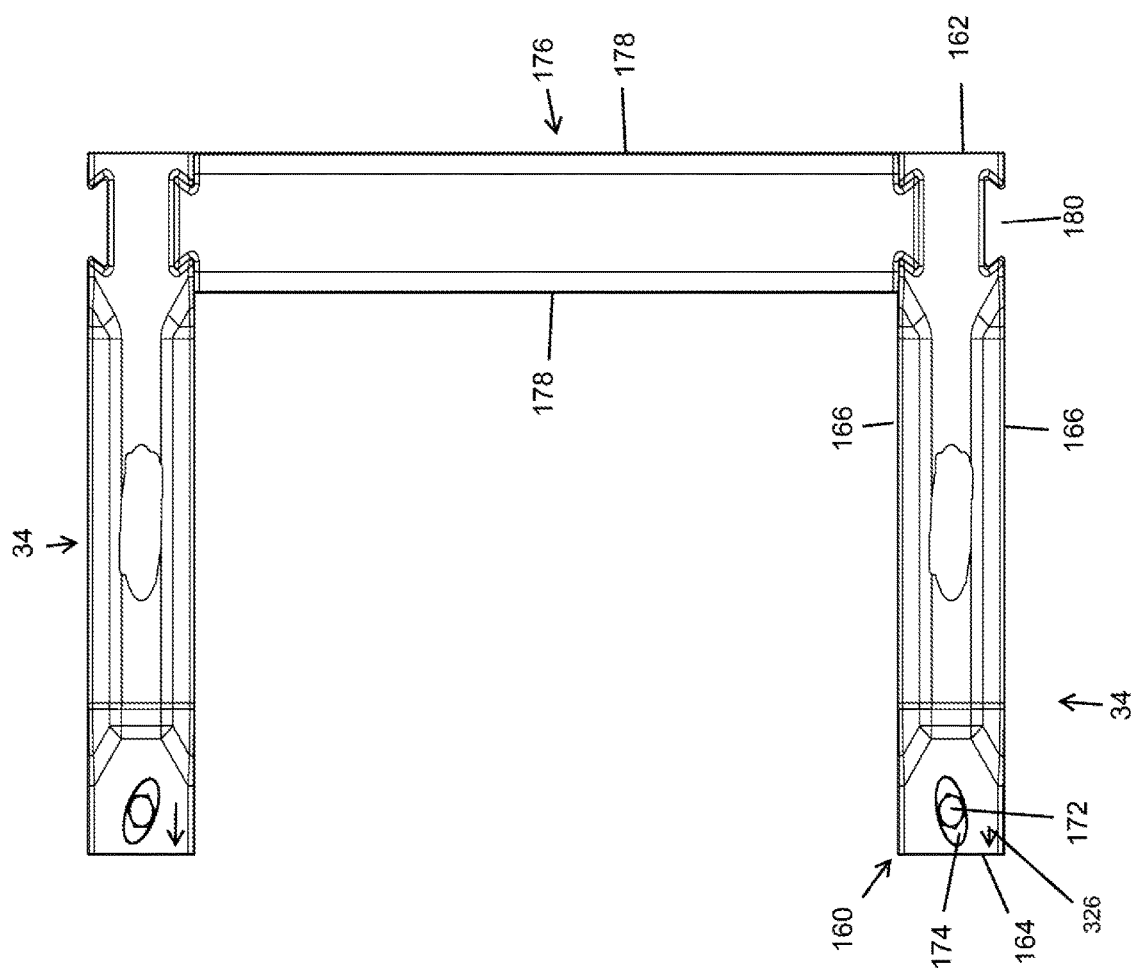
FIG. 54 is a top elevation view of the narrow rip stops connected by a connection member shown in FIG. 50.
Figure 55:
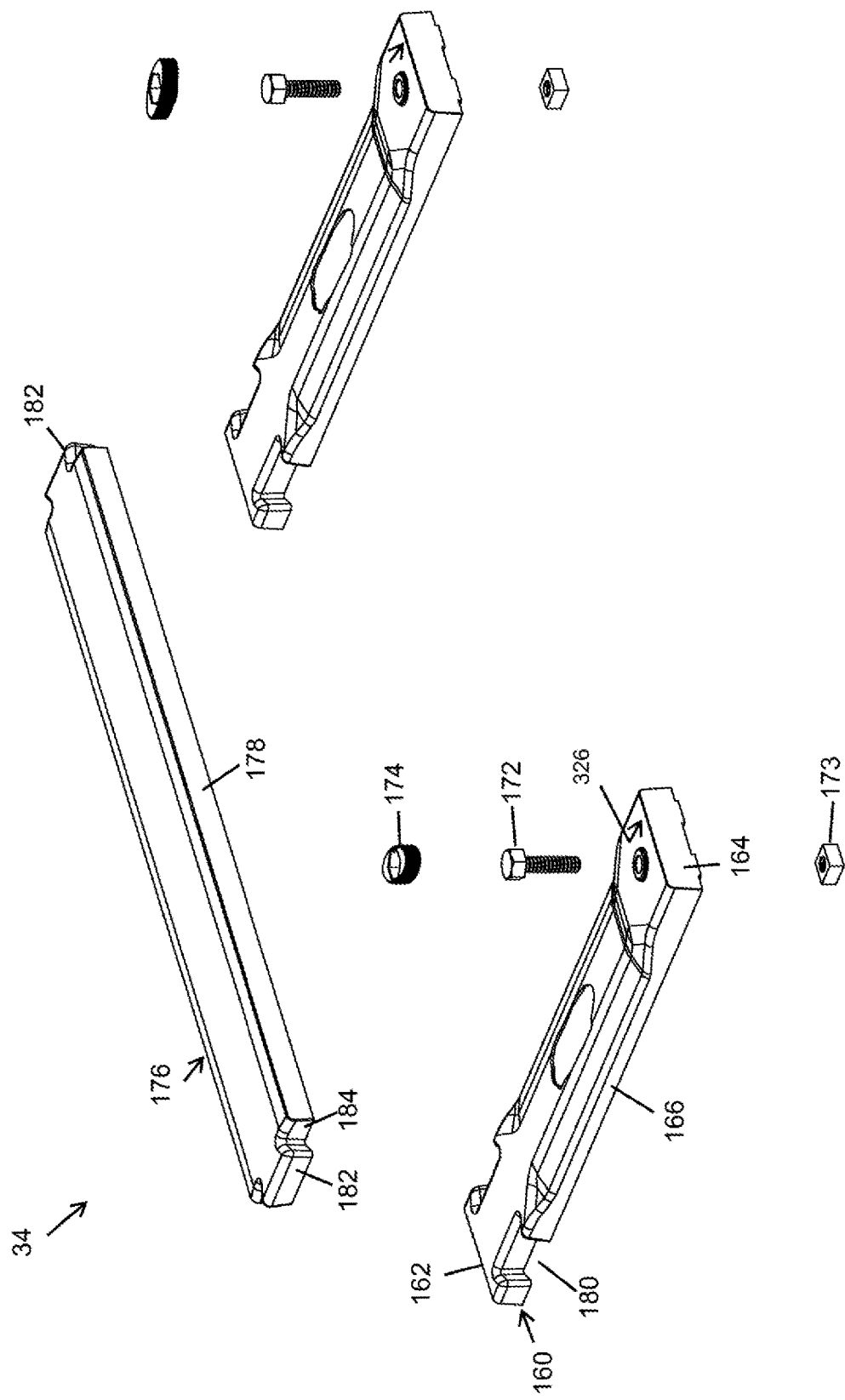
FIG. 55 is an exploded perspective view of the narrow rip stops connected by a connection member shown in FIG. 50.
Figure 56:
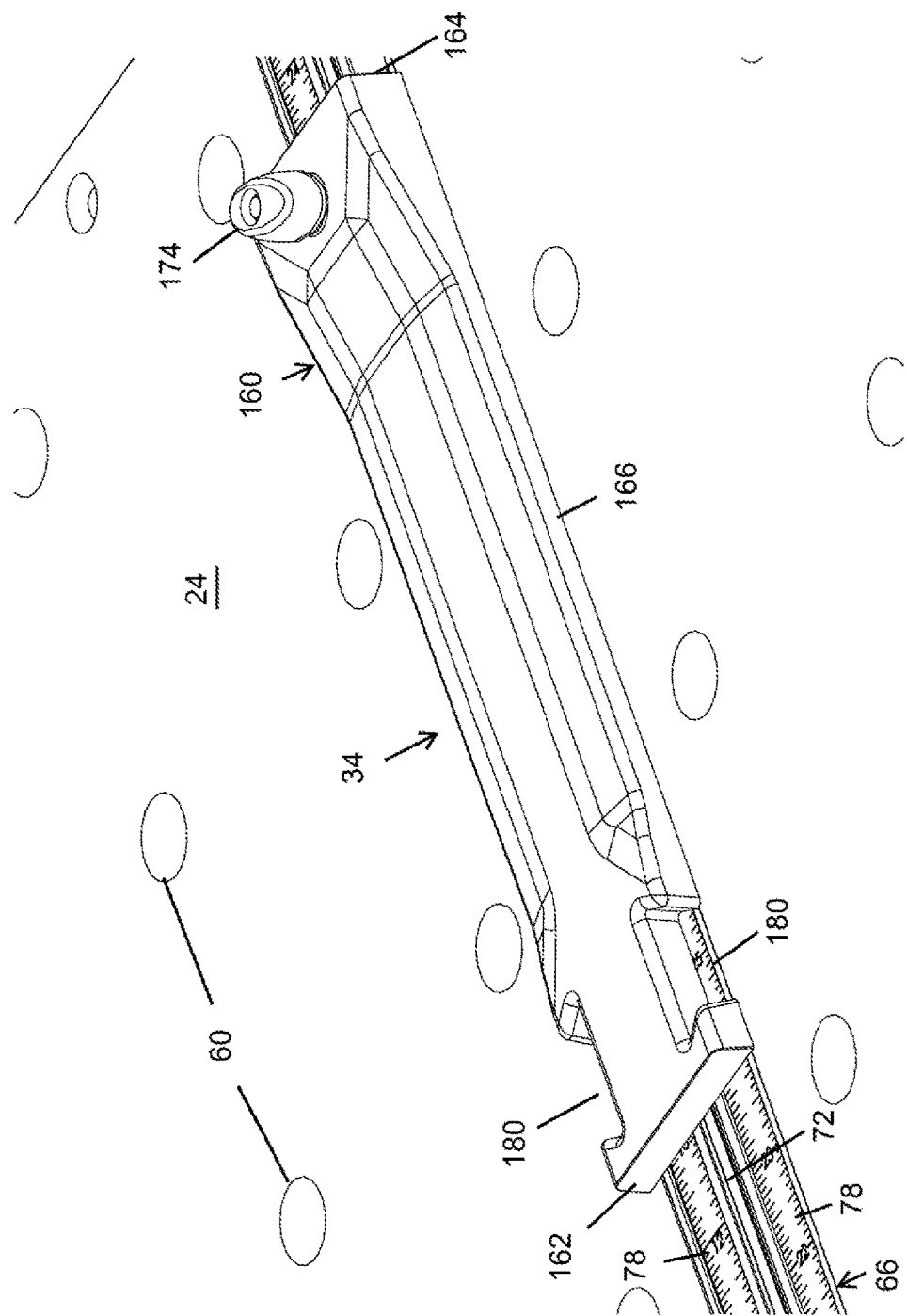
FIG. 56 is a close-up perspective view of the narrow rip stop shown in FIG. 45, the view showing the narrow rip stop connected to the center groove of a table track, the view showing the narrow stop end of the narrow rip stop facing forward toward the saw track.
Figure 57:
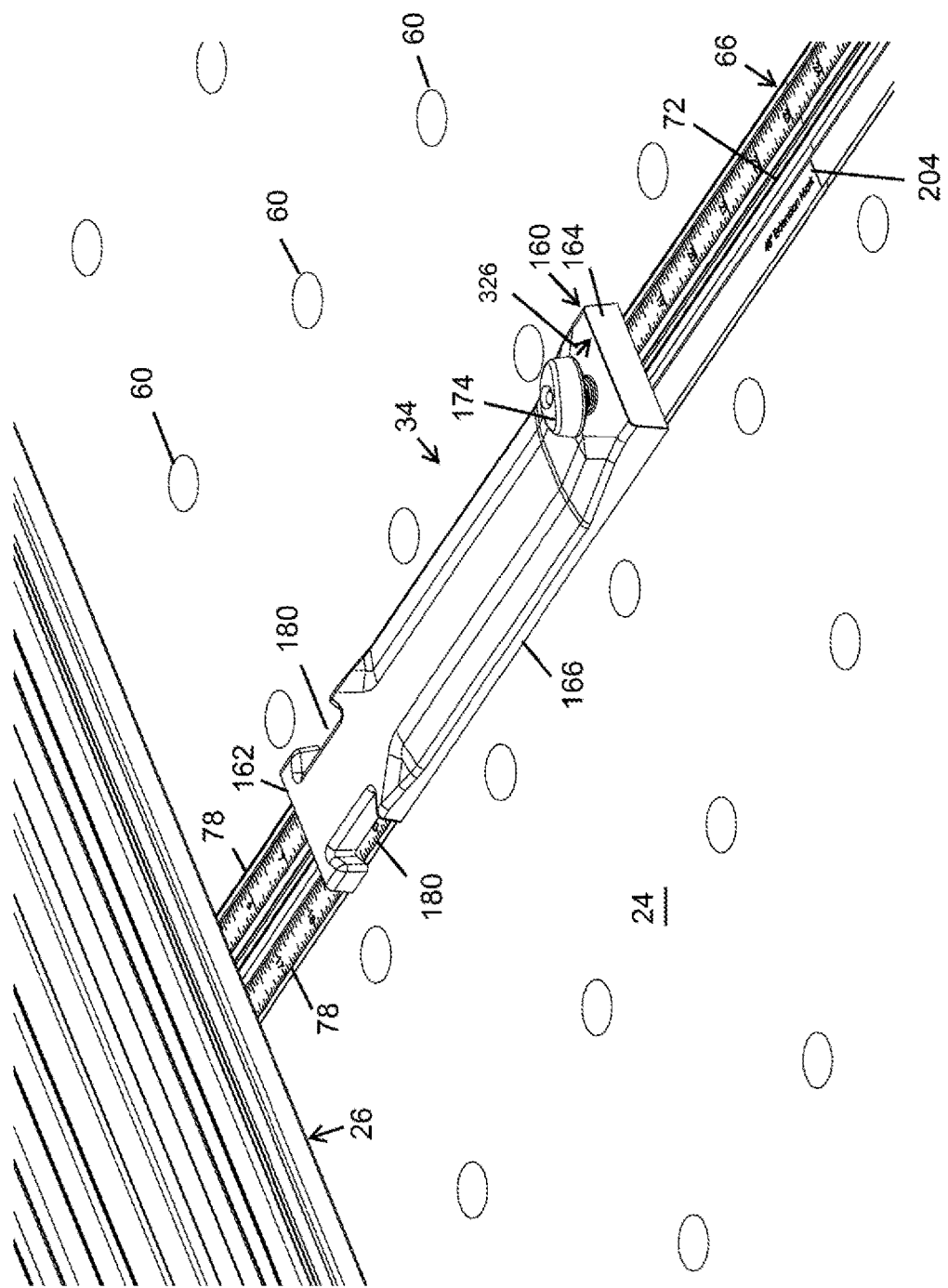
FIG. 57 is another close-up perspective view of the narrow rip stop as shown in FIG. 56, the view showing the narrow rip stop connected to the center groove of a table track, the view showing the narrow stop end of the narrow rip stop facing forward toward the saw track.
Figure 58:
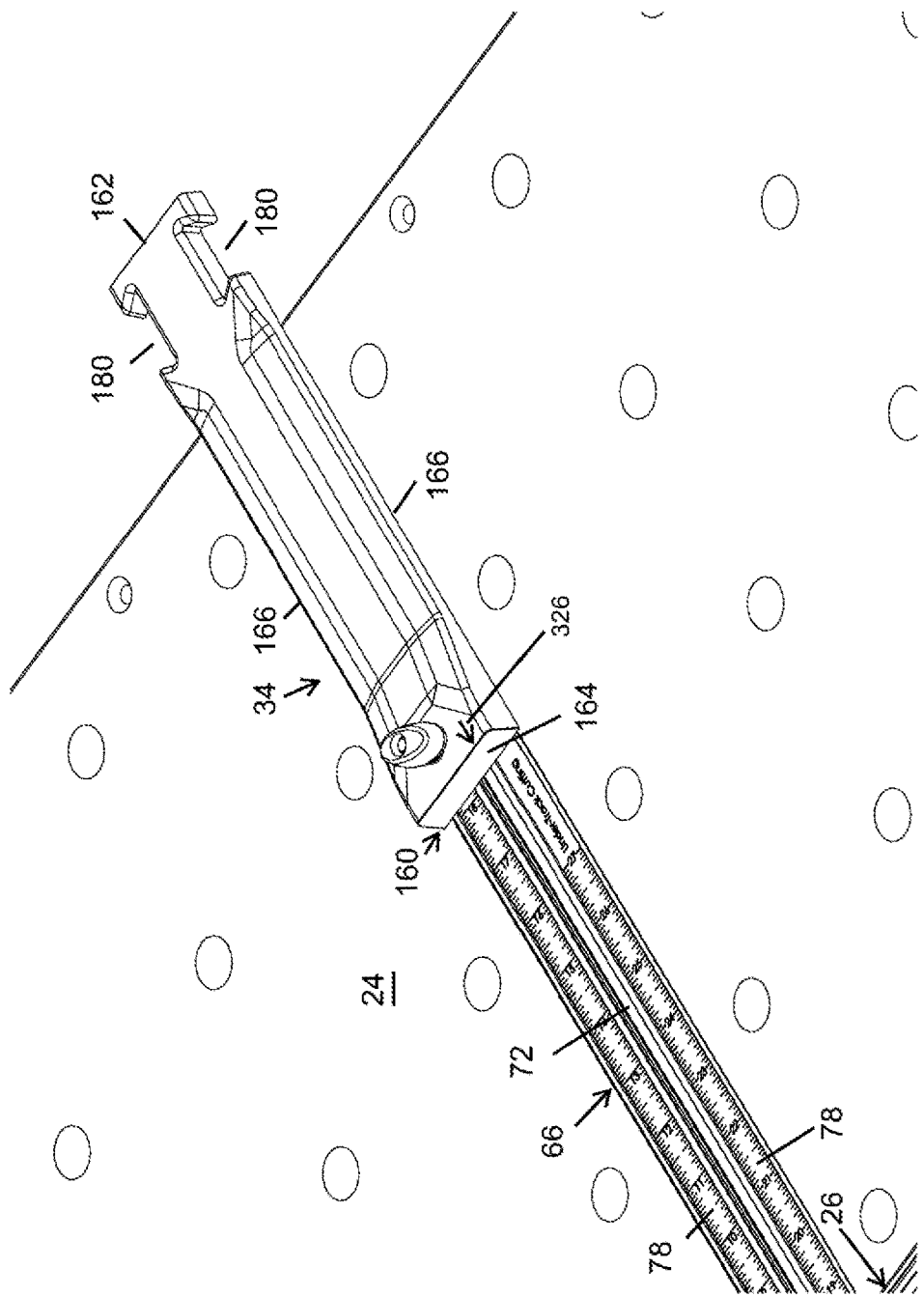
FIG. 58 is a close-up perspective view of the narrow rip stop shown in FIG. 45, the view showing the narrow rip stop connected to the center groove of a table track, the view showing the wide stop end of the narrow rip stop facing forward toward the saw track.
Figure 59:
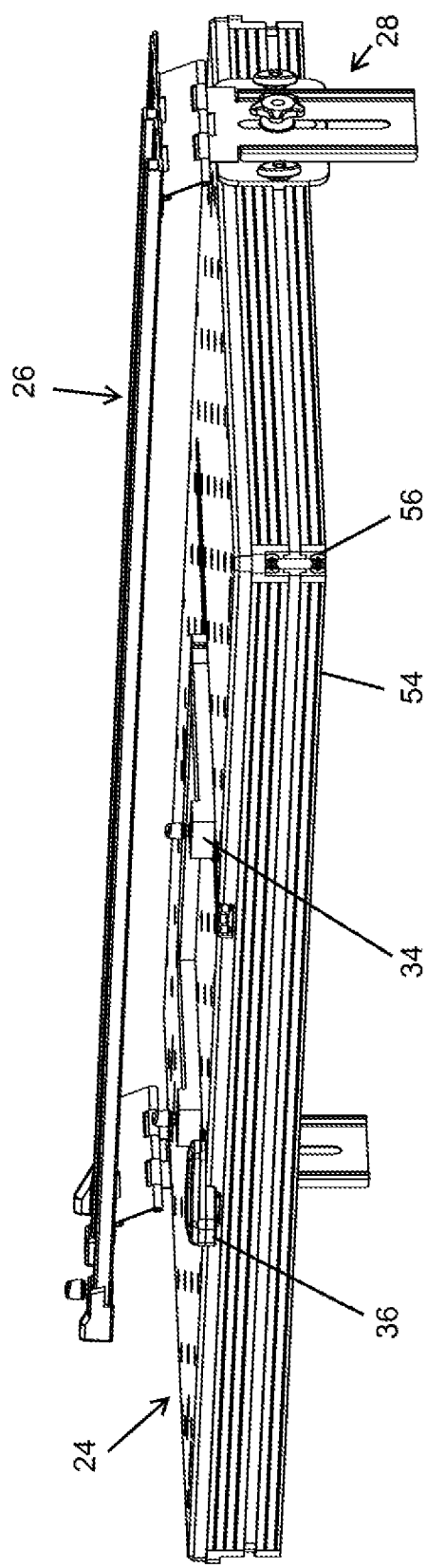
FIG. 59 is a perspective view of a pair of narrow rip stops that are joined together by a connection member as is shown in FIG. 50, the pair of narrow rip stops are placed on a benchtop and connected to a pair of table tracks, the view shows the saw track in a raised position and the end plates attached to mounting plates which are attached to edge tracks of the benchtop in a lowered position.

Use Case: Cutting Sheet Material at a 45° Angle: With reference to FIG. 44 a 45° angle cutting operation is shown being performed using a workpiece 42. This example is similar to the perpendicular cut example provided above and as such, unless specifically stated otherwise, the teachings of the prior use case example apply to and are incorporated into this use case example.

In this arrangement, three bench dogs 32 are used to support an edge of the workpiece 42 positioned on an opposite side of the workpiece 42 from the cutting direction (the direction the saw 40 comes from). In this arrangement, the bench dogs 32 are spaced along the length of the edge of the workpiece 42 in a wide-stance. That is, one bench dog 32 is positioned near the rearward edge of the workpiece 42. One bench dog 32 is positioned near the middle of the workpiece 42. And one bench dog 33 (not visible as it is hidden by the saw track 26, but is shown in dotted lines) is positioned near the cutting edge 98. In this way, optimum support is provided to the workpiece 42 during cutting. These bench dogs 32 are placed in bench dog holes 60 one row over and one row back from the adjacent bench dog 32. In this way, when the workpiece 42 is positioned in engagement with the bench dogs 32, the workpiece 42 is positioned at a 45° angle to the cutting edge 98.

Figure 60:
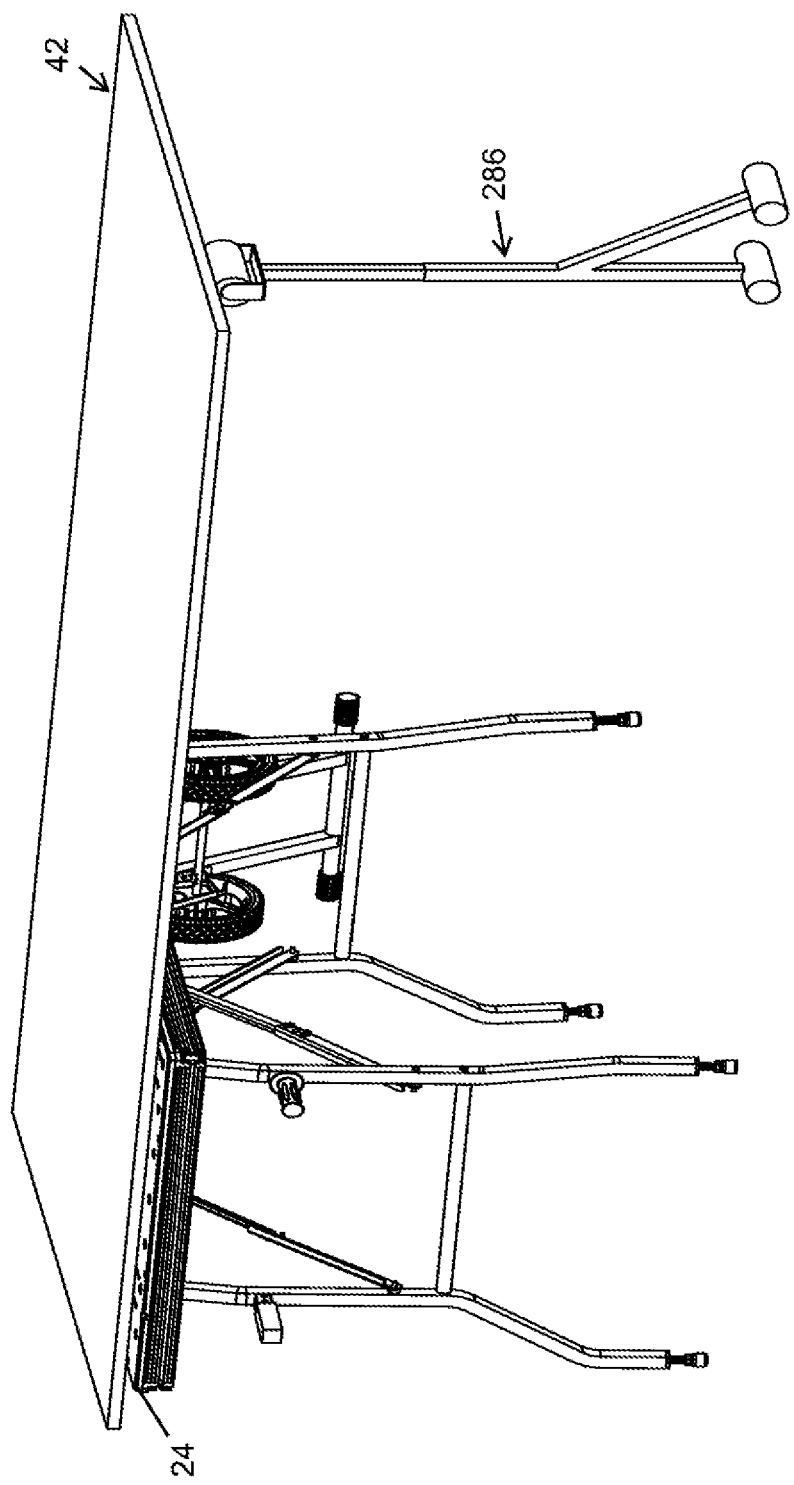
FIG. 60 is a perspective view of the adaptive cutting system shown in FIG. 1, the view showing the legs in an extended position, the view showing a large sheet workpiece placed on the upper surface of the benchtop with the free end of the workpiece supported by a stand.

Use Case: Narrow Rip Stops Cutting Narrow Sheet Material: With reference to FIGS. 60 and 61, a workpiece 42, which is a large sheet of material, is shown being cut using system 10. This example is similar to the perpendicular and 45° angle cut examples provided above and as such, unless specifically stated otherwise, the teachings of the prior use case examples apply to and are incorporated into this use case example.

In this arrangement, to eliminate the need for an additional helper to perform the cuts, the outward end of workpiece 42 is supported by a stand 286. Stand 286 is any device which supports workpiece 42 during a cutting operation. One of the benefits of using stand 286 is that the portion that is cut off workpiece 42 does not fall, instead the cut edge remains supported on benchtop 24. This improves safety and the accuracy and quality of the cut. In the arrangement shown, a narrow rip stop 34 is attached to each table track 66. Due to the cut width of the workpiece 42, the narrow stop end 162 of narrow rip stop 34 faces the cutting edge 98 and workpiece 42, but in the example shown in FIG. 61 the narrow rip stop 34 does not extend under saw track 26, but they could if the narrow rip stops 34 were slid forward upon table tracks 66.

To perform this cutting operation, the narrow rip stops 34 are attached to the groove 72 in table tracks 66 by pointing the narrow stop end 162 toward the saw track 26 and inserting the connection feature 170 within the groove 72 of table track 66 while inserting the head 173 of narrow rip stops 34 into the rearward end 70 of table track 66. Once aligned in this manner, the narrow rip stops 34 are slid forward within groove 72 of table tracks 66 until they reach their desired position. In one arrangement, the measurement reading of the measuring member 78 of table track 66 may be made on the rearward side of the narrow rip stop 34, taking account for the length of the narrow rip stop 34. In another arrangement, the measurement reading of the measuring member 78 of table track 66 may be made on the forward side of the narrow rip stop 34, which does not account for the length of the narrow rip stop 34. Each narrow rip stop 34 may be measured independently upon their own table track 66. Or, alternatively if a connection member 176 is used only a single measurement may be needed as the connection member 176 may maintain the relative alignment of the connected narrow rip stops 34, however it is better to precisely measure each of the narrow rip stops 34.

Once the narrow rip stops 34 are in the desired positon, the knob 174 is tightened thereby locking the narrow rip stop 34 to the table track 66. Once in this locked position, the workpiece 42 is slid under the saw track 26 until the rearward edge of the workpiece 42 is engaged with the forward edges of the narrow rip stops 34. In addition, the edge of the workpiece 42 opposite the cutting direction is placed in engagement with a bench dog 33 positioned under the saw track 26. Once in this secured position, which is secured by three points of contact (the under the saw track bench dog 33 and the two narrow rip stops 34), the saw track 26 is lowered on hinge members 28 thereby clamping the workpiece 42 in place and the saw 40 is slid along the saw track 26 thereby cutting the workpiece 42 at the desired length. Note, additional bench dogs 32 may be used rearward of saw track 26.

Once the cut is performed, the saw track 26 is again raised by the hinge members 28 and the workpiece 42 is removed. This process may be repeated for any number of workpieces 42.

In the arrangement shown, the connection member 176 could be used without affecting the manner of operating.

Use Case: Narrow Rip Stops Cutting Wide Sheet Material: With reference to FIG. 62, a similar arrangement is shown to that shown in FIG. 61, however in this arrangement, the cut-width of the workpiece 42 is greater and requires the wide stop end 164 of narrow rip stops 34 to face the workpiece 42 and saw track 26, otherwise the cutting operation is similar if not identical to that descried with respect to FIG. 61 as such, unless specifically stated otherwise, the teachings of the prior use case examples apply to and are incorporated into this use case example. That is, the wide rip stop end 164 engages the edge of the workpiece 42.

Figure 63:
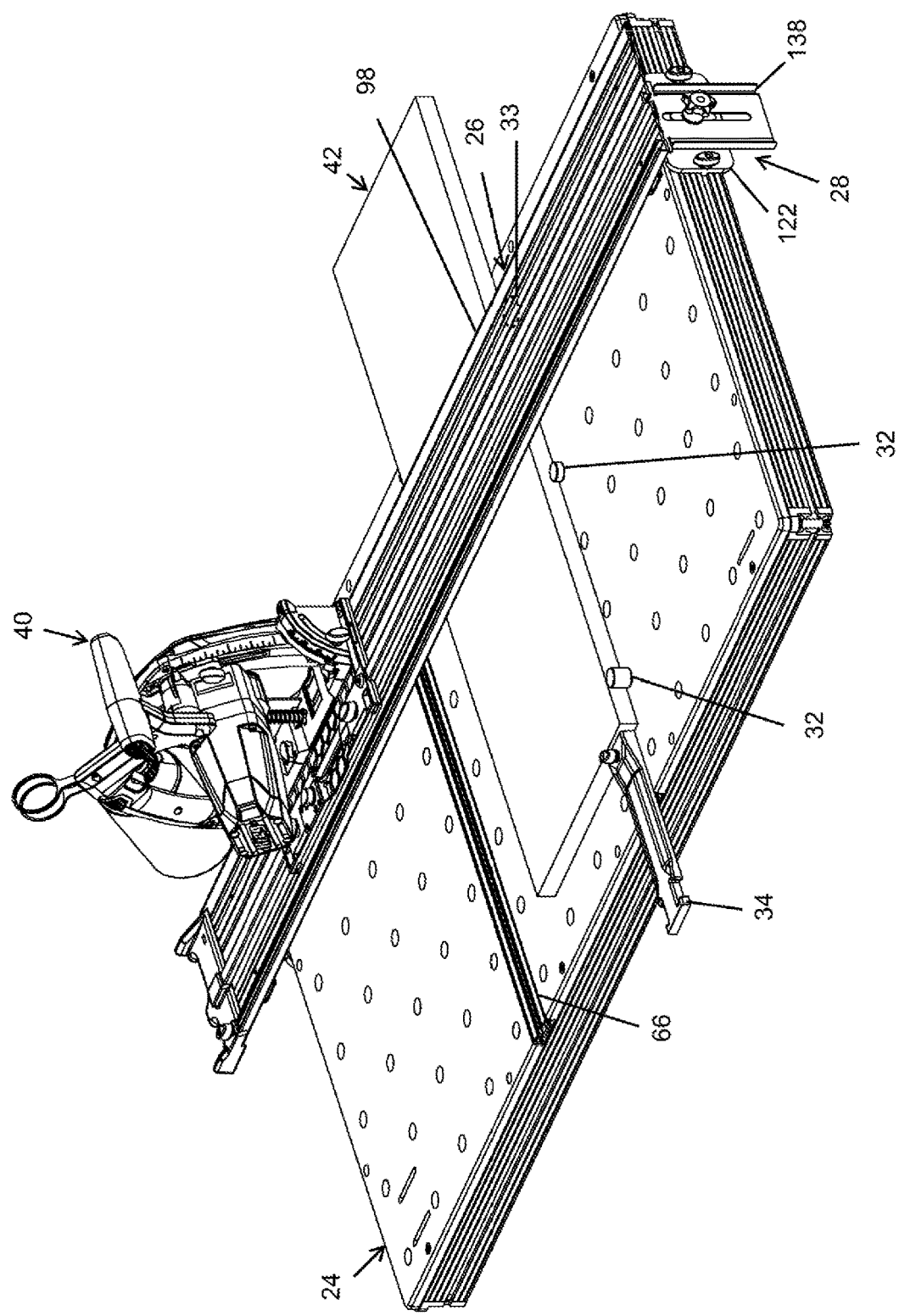
FIG. 63 is a perspective view of the adaptive cutting system that is similar to that shown in FIG. 62, the view showing a single narrow rip stop connected a the table tracks with the wide stop end engaged with the rear edge of the workpiece, the view showing the saw track connected to the benchtop by a pair of hinge members, the view showing a saw placed on the saw track, the view showing the free end of the workpiece unsupported and hanging forward off of the front edge of the benchtop, the view showing a pair of bench dogs engaged with an edge of the workpiece on the side opposite of the cutting direction and rearward of the saw track, the view showing a single narrow rip stop positioned under the saw track and engaged with the edge of the workpiece in a direction opposite the cutting direction.

With reference to FIG. 63, a similar arrangement is shown to that shown in FIG. 62, as such, unless specifically stated otherwise, the teachings of the prior use case examples apply to and are incorporated into this use case example. In this arrangement, the workpiece 42 is laterally narrower than that shown in FIG. 62. Due to the laterally narrow width, the workpiece 42 only engages a single narrow rip stop 34. As it is desirable to have the workpiece 42 engage at least three points of contact, two bench dogs 32 are shown, engaging the edge opposite the cutting direction. In addition, a bench dog 33 is shown in use under the saw track 26. In this way, the proper amount of stabilization is provided to the workpiece 42. The greater width of this workpiece requires the wide stop end 164 of narrow rip stops 34 to face the workpiece 42 and saw track 26, otherwise the cutting operation is similar if not identical to that descried with respect to FIG. 62.

Figure 64:
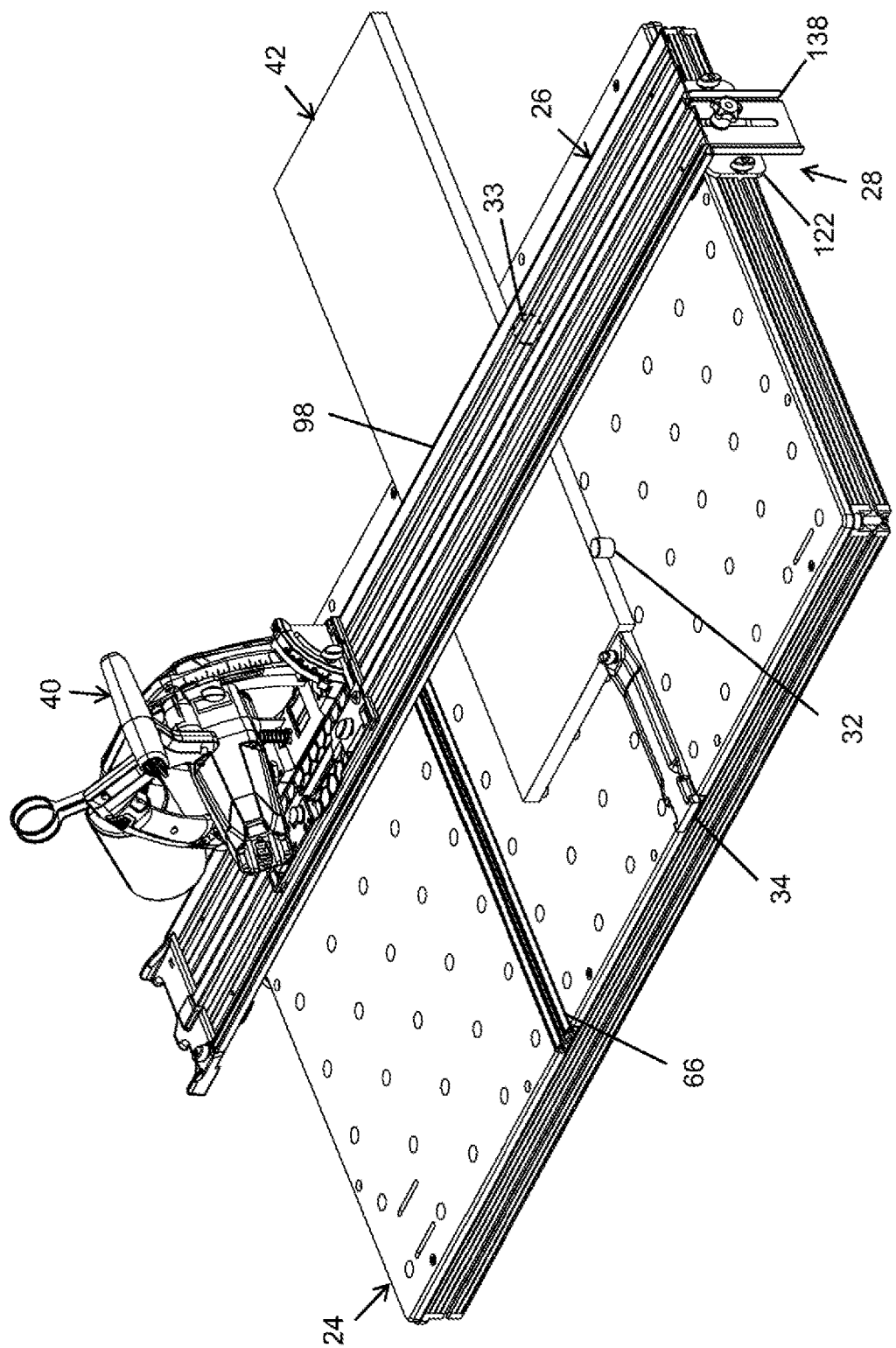
FIG. 64 is a perspective view of the adaptive cutting system that is similar to that shown in FIG. 63, the view showing a single narrow rip stop connected a the table tracks with the wide stop end engaged with the rear edge of the workpiece, the view showing the saw track connected to the benchtop by a pair of hinge members, the view showing a saw placed on the saw track, the view showing the free end of the workpiece unsupported and hanging forward off of the front edge of the benchtop, the view showing a single bench dog engaged with an edge of the workpiece on the side opposite of the cutting direction and rearward of the saw track, the view showing a single narrow rip stop positioned under the saw track and engaged with the edge of the workpiece in a direction opposite the cutting direction.

With reference to FIG. 64, a similar arrangement is shown to that shown in FIG. 63, however in this arrangement, the cut width (the distance between the rearward positioned stop surface and the cutting edge 98) of workpiece 42 is narrower. Due to the laterally narrow width, the workpiece 42 only engages a single narrow rip stop 34. Due to the narrow cut width, the workpiece 42 only engages a single bench dog 32 rearward of the saw track 26 otherwise the cutting operation is similar if not identical to that descried with respect to FIG. 63.

Use Case: Narrow Rip Stops Under Saw Track Cutting: With reference to FIG. 65, a small workpiece 42 is shown being cut using system 10. This example is similar to the prior examples, as such, unless specifically stated otherwise, the teachings of the prior use case examples apply to and are incorporated into this use case example. In the arrangement shown, two narrow rip stops 34 are connected together using connection member 176 and each of which are attached to a table track 66. Due to the cut width of the workpiece 42, the narrow stop end 162 of narrow rip stop 34 faces the cutting edge 98 and workpiece 42 and the narrow stop end 162 and connection member 176 of narrow rip stops 34 extends under the saw track 26.

To perform this cutting operation, the connection member 176 is connected to the adjacent narrow rip stops 34 by inserting the protrusions 182 of the connection member 176 into the recesses 180 of the narrow rip stops 34. Next, the narrow rip stops 34 are attached to the groove 72 in table tracks 66 by pointing the narrow stop end 162 toward the saw track 26 and inserting the connection feature 170 within the groove 72 of table track 66 while inserting the head 173 of narrow rip stops 34 into the rearward end 70 of table track 66. Once aligned in this manner, the narrow rip stops 34 are slid forward within groove 72 of table tracks 66 until they reach their desired position, which is under the saw track 26. The proper position of the narrow rip stops 34 is set by making a measurement reading of the measuring member 78 of table track 66 on the rearward side of the narrow rip stop 34, which, in one arrangement, is at identifier 326, which takes account for the length of the narrow rip stop 34. Despite being connected by connection member 176, each narrow rip stop 34 should be measured independently upon their own table track 66 to ensure optimum accuracy.

Once the narrow rip stops 34 are in the desired positon, the knob 174 is tightened thereby locking the narrow rip stop 34 to the table track 66. Once in this locked position, the workpiece 42 is slid under the saw track 26 until the rearward edge of the workpiece 42 is engaged with the forward edges of the narrow rip stops 34 and/or connection member 176. In addition, where possible, the edge of the workpiece 42 opposite the cutting direction is placed in engagement with a bench dog 33 positioned under the saw track 26. Once in this secured position, which is secured by a point (the bench dog 33 under the saw track 26) and a plane (the forward surface of the connection member 176 and narrow rip stops 34), the saw track 26 is lowered on hinge members 28 thereby clamping the small workpiece 42 in place and the saw 40 is slid along the saw track 26 thereby cutting the workpiece 42 at the desired length.

Once the cut is performed, the saw track 26 is again raised by the hinge members 28 and the workpiece 42 is removed. This process may be repeated for any number of workpieces 42.

Figure 74:
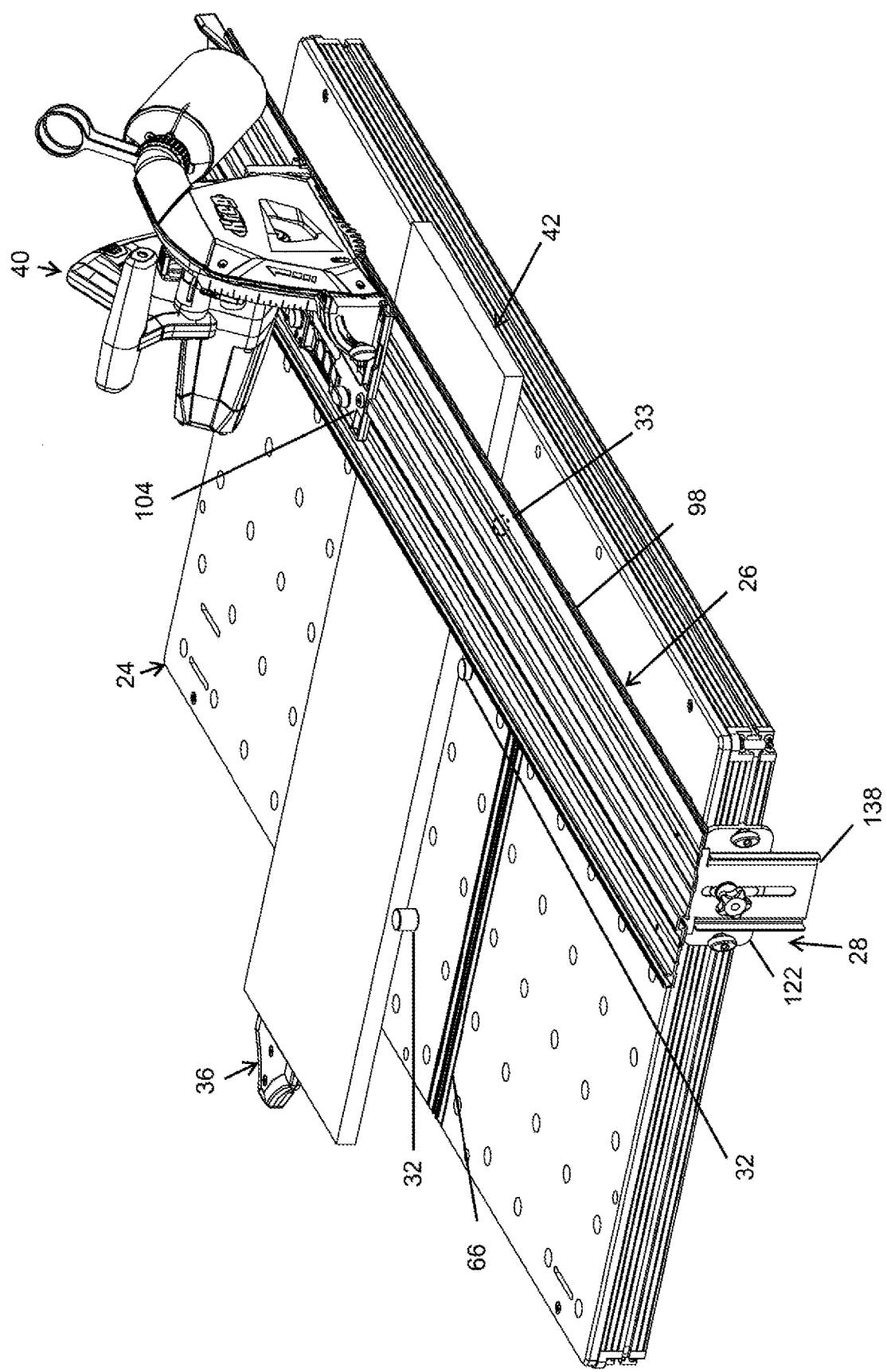
FIG. 74 is a perspective view of the wide rip stop as is shown in FIG. 66, the view showing the wide rip stop inserted within a table track of the benchtop, the view showing the stop surface of the head of the wide rip stop engaged with the rearward edge of the workpiece well rearward of the rearward edge of the benchtop, the view showing a pair of bench dogs engage with an edge of the workpiece opposite of the cutting direction positioned rearward of the saw track, the view showing a single narrow bench dog engaged with an edge of the workpiece opposite of the cutting direction positioned under of the saw track, the view showing a saw track connected to the benchtop by a pair of hinge members, the view showing a saw connected to the saw track.

Use Case: Wide Rip Stops Cutting Wide Sheet Materials: With reference to FIG. 74, a workpiece 42 with a cut width (the distance between the rearward positioned stop surface and the cutting edge 98) greater than the distance between the cutting edge 98 and the rearward edge of benchtop 24 is shown. This example is similar to the prior examples, as such, unless specifically stated otherwise, the teachings of the prior use case examples apply to and are incorporated into this use case example. To facilitate the use of benchtop 24 to make these wide cuts, a wide rip stop 36 is used, which extends rearward a distance from the rearward edge of benchtop 24 thereby extending the length that a workpiece 42 may be measured.

To perform this cutting operation, the forward end 190 of arm 186 of wide rip stop 36 is inserted within the groove 72 in table track 66 and is slid forward. The cut width is measured by aligning the desired reading on the upper surface of the arm 186 of wide rip stop 36 with the mark 204 of the measuring member 78 of table track 66. Once in this position, the handle 208 of lock member 206 is rotated downward thereby causing the cam surface 210 to force upward upon the lower surface of the arm 186 thereby locking the arm 186 in place within table track 166.

Once the wide rip stop 36 is in the desired positon, the workpiece 42 is slid under the saw track 26 until the rearward edge of the workpiece 42 is engaged with the forward facing stop surface 196 of the head 188 of the wide rip stop 36. In addition, where possible, as is shown, the edge of the workpiece 42 opposite the cutting direction is placed in engagement with one or more bench dogs 32, 33 positioned in perpendicular alignment to the cutting edge 98. Once in this secured position, which is secured by engagement with the bench dogs 32 and the wide rip stop 36, the saw track 26 is lowered on hinge members 28 thereby clamping the workpiece 42 in place and the saw 40 is slid along the saw track 26 thereby cutting the workpiece 42 at the desired length.

Once the cut is performed, the saw track 26 is again raised by the hinge members 28 and the workpiece 42 is removed. This process may be repeated for any number of workpieces 42.

Figure 75:
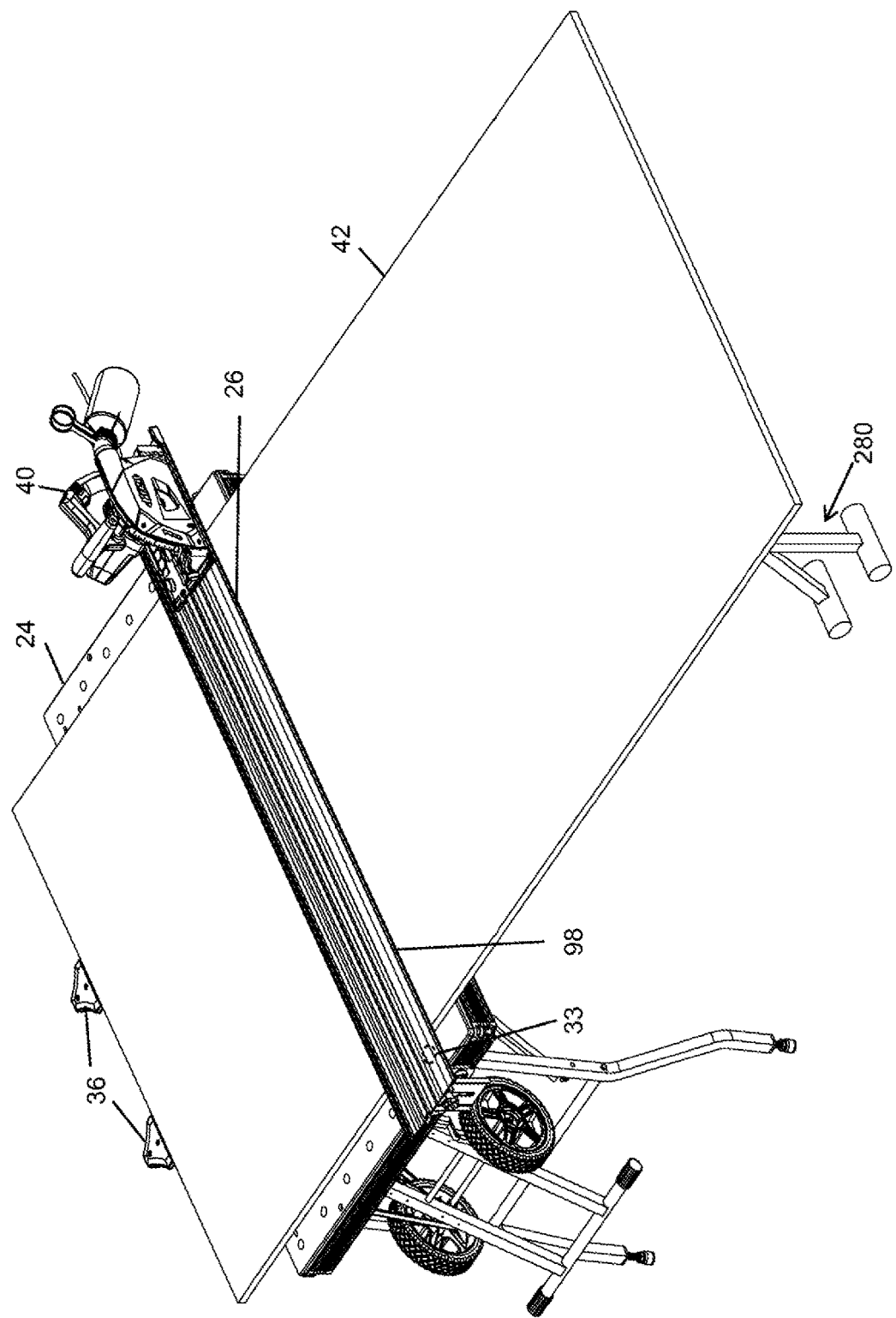
FIG. 75 is a perspective view of a pair of wide rip stops as is shown in FIG. 66, the view showing the wide rip stops inserted within table tracks of the benchtop, the view showing the stop surfaces of the heads of the wide rip stops engaged with the rearward edge of the workpiece well rearward of the rearward edge of the benchtop, the view showing a single narrow bench dog engaged with an edge of the workpiece opposite of the cutting direction positioned under of the saw track, the view showing a saw track connected to the benchtop by a pair of hinge members, the view showing a saw connected to the saw track, the view showing the free end of the workpiece supported by a stand.
Figure 76:
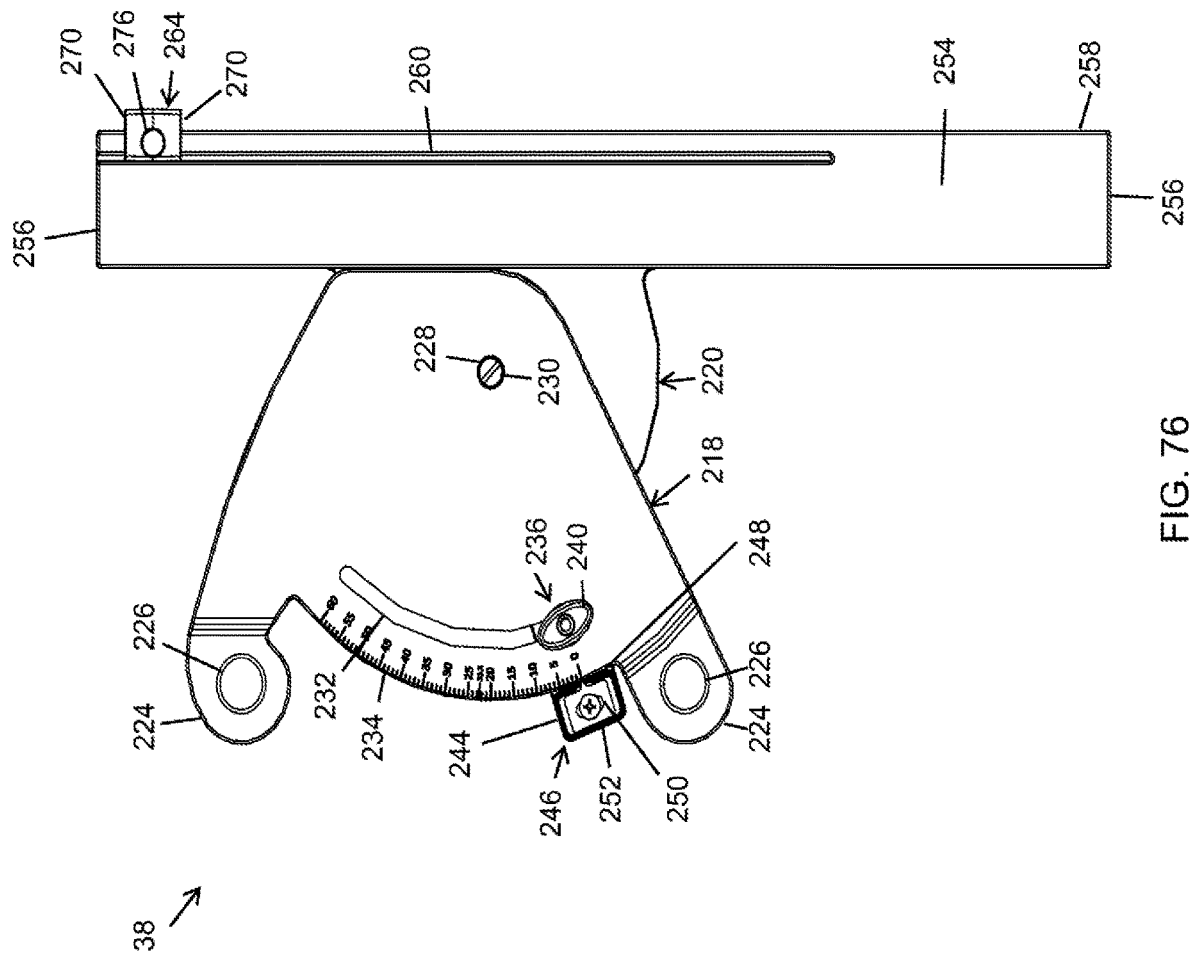
FIG. 76 is a top elevation view of a miter gauge that connects to the benchtop shown in FIG. 1 through a pair of bench dogs that connect to a pair of ears in the miter gauge.
Figure 77:
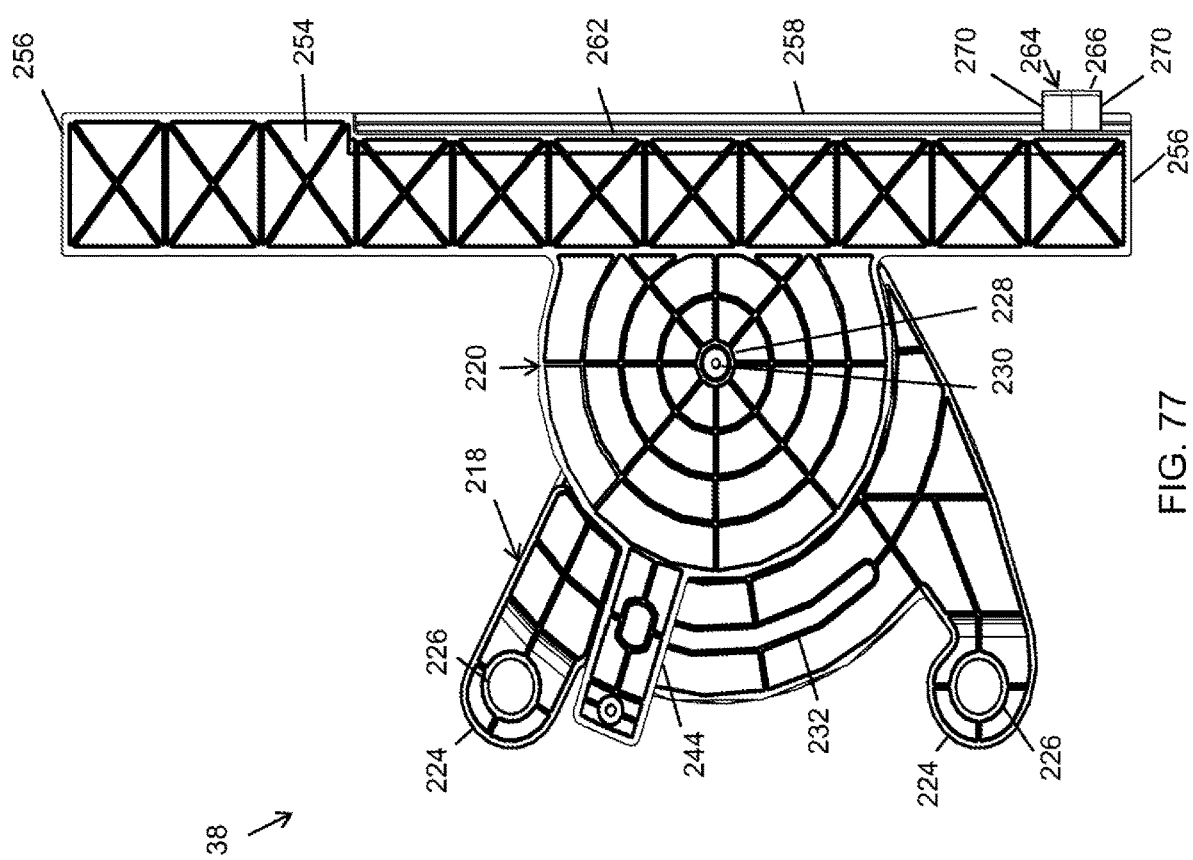
FIG. 77 is a bottom elevation view of the miter gauge shown in FIG. 76.
Figure 78:
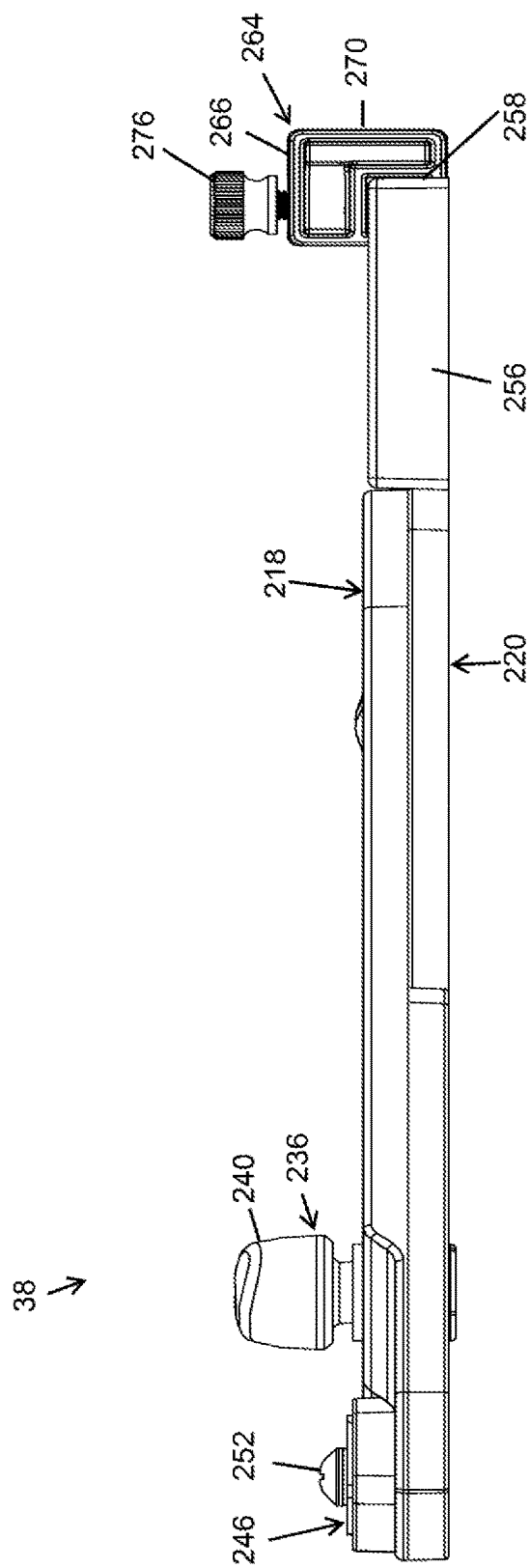
FIG. 78 is a side elevation view of the miter gauge shown in FIG. 76.
Figure 79:
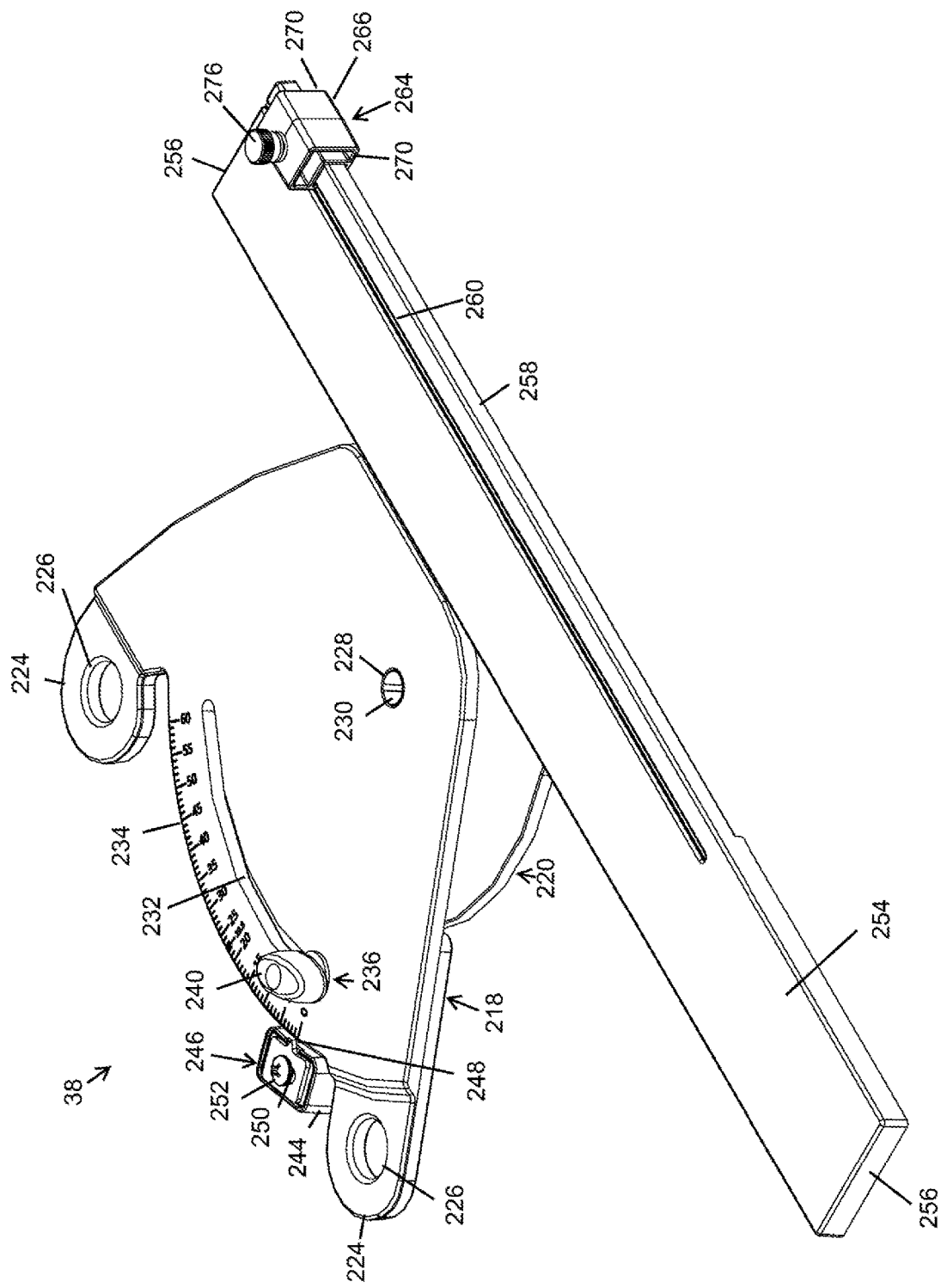
FIG. 79 is perspective view of the miter gauge shown in FIG. 76.
Figure 80:
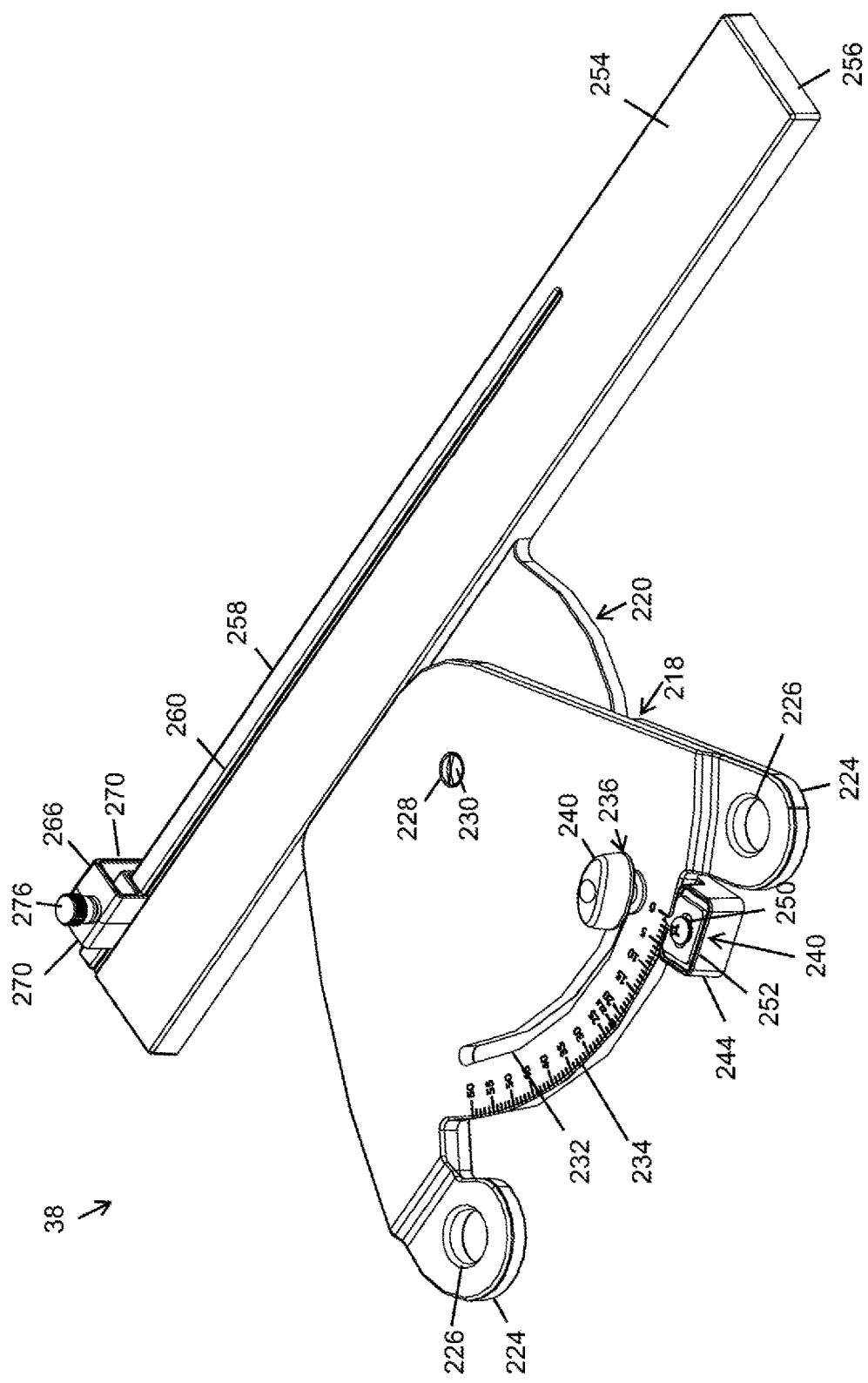
FIG. 80 is another perspective view of the miter gauge shown in FIG. 76.

Use Case: Wide Rip Stops Cutting Wide Sheet Materials With Support: This example is similar to the prior examples, as such, unless specifically stated otherwise, the teachings of the prior use case examples apply to and are incorporated into this use case example. With reference to FIG. 75, a similar arrangement is presented to that shown in FIG. 74, however in this arrangement, the lateral width of the workpiece allows for the use of two wide rip stops 36 and the use of a stand 286 to support the large workpiece 42. All other aspects remain the same or similar to that presented with respect to FIG. 75.

Use Case: Miter Gauge Cutting At An Angle: This example is similar to the prior examples, as such, unless specifically stated otherwise, the teachings of the prior use case examples apply to and are incorporated into this use case example. With reference to FIG. 85, miter gauge 38 is shown in use with benchtop 24 to facilitate cutting workpiece 42 at an angle. In this arrangement, miter gauge 38 is attached to benchtop 24 by aligning the ears 224 of base 218 with two bench dog holes 60 in benchtop 24 and inserting bench dogs 32 therein. Once the miter gauge 38 is attached to the benchtop 24, the angle of the cut is set by rotating the guide 220 upon base 218 until the desired angle is achieved, as is indicated by indicator 246 and measuring indicia 234, at which point the lock member 236 is tightened and the angle of the guide 220 is locked in place. Once the angle is set, the depth of cut is set by sliding the stop member 264 along the length of the stop arm 254 until the desired position is achieved, at which point the fastener 276 is tightened and the stop member 264 is locked in place.

Next, the workpiece 42 is slid under the saw track 26 and the edge opposite the cutting direction is placed along the stop surface 258 of the stop arm 254 and the workpiece 42 is slid rearward until the edge of the workpiece 42 engages the stop member 264. Once in this position, the workpiece 42 is ready to be cut. Notably, in this position, the forward end of the stop arm 254 extends under the saw track 26. This provides optimum alignment to the workpiece 42 up to the cutting edge 98. The cutting operation is performed in the manner described herein.

Figure 86:
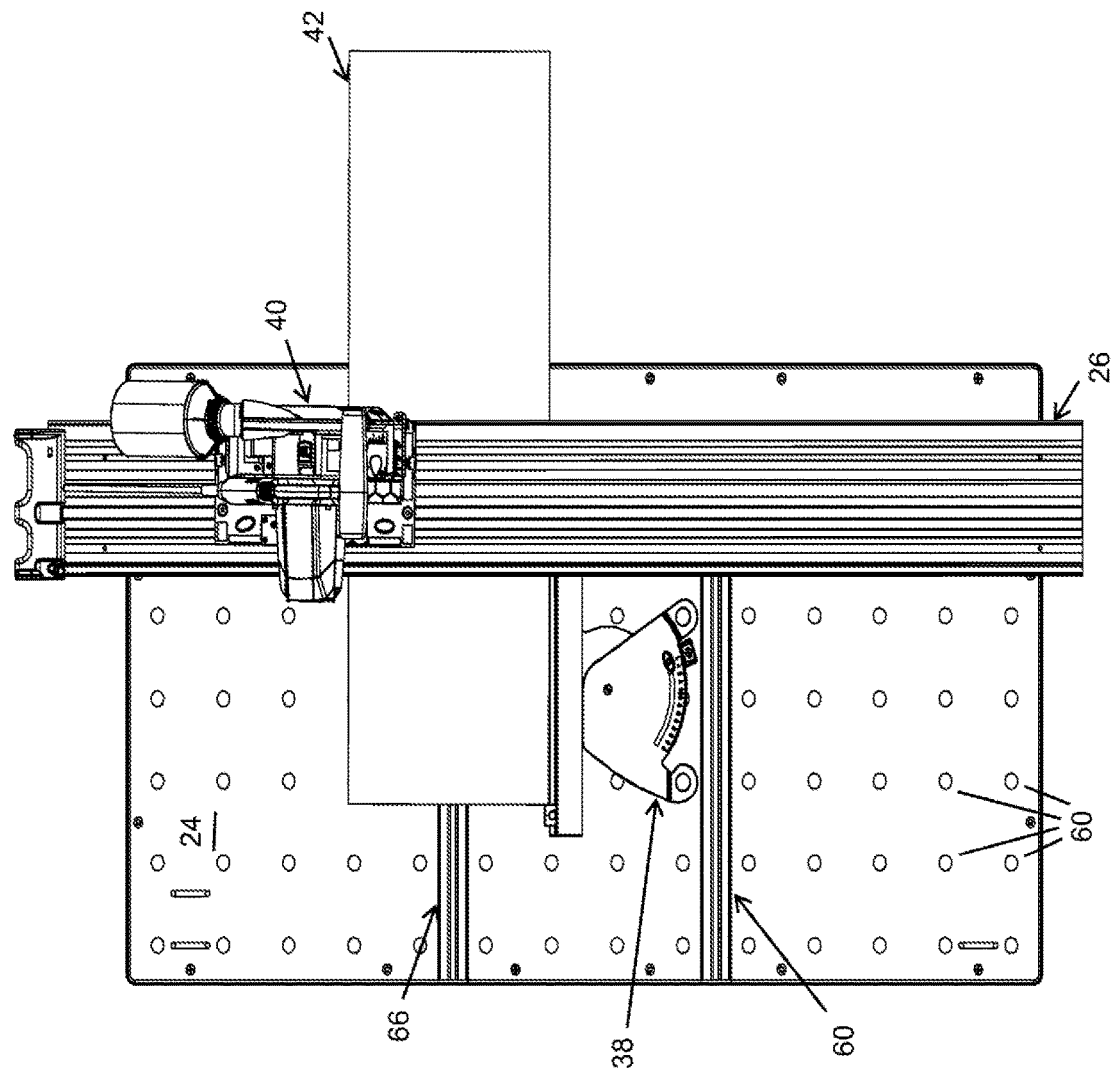
FIG. 86 is a top elevation view of the miter gauge shown in FIG. 76 used in association with the benchtop shown in FIG. 1, the view showing the miter gauge attached to the benchtop by a pair of bench dogs, the view showing the miter gage placed at a perpendicular angle to the front edge of the benchtop and cutting edge of the saw track, the view showing a workpiece connected in flush alignment to the front stop surface of the stop arm of the miter gauge, the view showing the front end of the stop arm of the miter gauge extending under the saw track a distance, the view showing the saw track connected to the benchtop by a pair of hinge members, the view showing a saw connected to the saw track.

A similar arrangement is presented with reference to FIG. 86, however in this arrangement, the miter gauge 38 is positioned at a perpendicular alignment to the cutting edge 98 of saw track 26.

Figure 87:
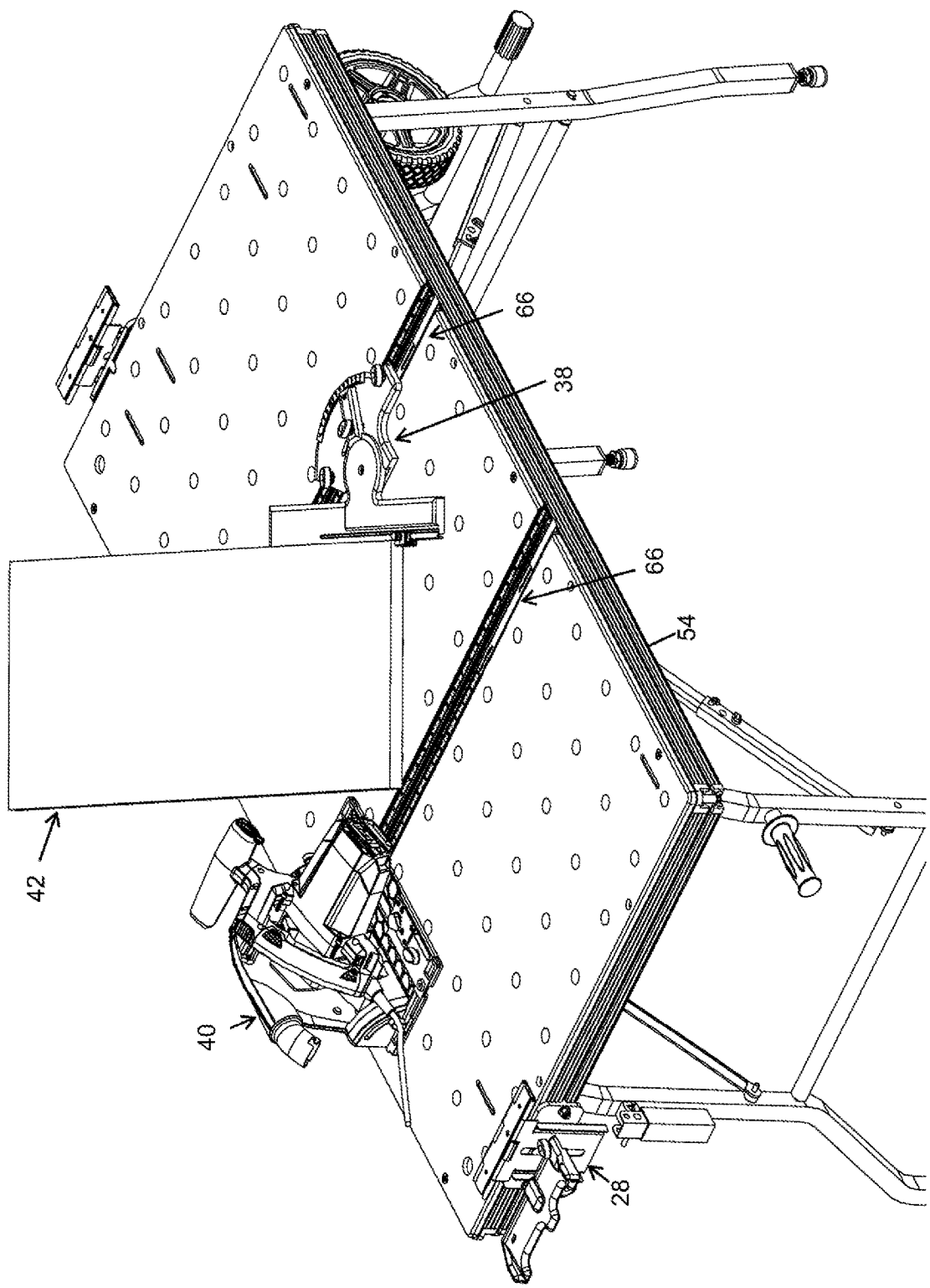
FIG. 87 is a top perspective view of the miter gauge shown in FIG. 81 used in association with the benchtop shown in FIG. 1, the view showing the miter gauge attached to the benchtop by a pair connections to the center-positioned groove of a table track, the view showing the miter gage placed at an angle to the front edge of the benchtop and cutting edge of the saw track, the view showing a workpiece connected in flush alignment to the front stop surface of the stop arm of the miter gauge, the view showing the front end of the stop arm of the miter gauge extending toward but not under the saw track, the view showing the saw track connected to the benchtop by a pair of hinge members, the view showing a saw connected to the saw track, the view showing the saw track in hidden lines.

A similar arrangement is presented with reference to FIG. 87, however in this arrangement, the forward end of stop arm 254 does not extend under the saw track 26. In addition, in the arrangement shown in FIG. 87 the miter gauge 38 attaches to table track 66 and is slid to the desired position along the length of table track 66.

Figure 88:
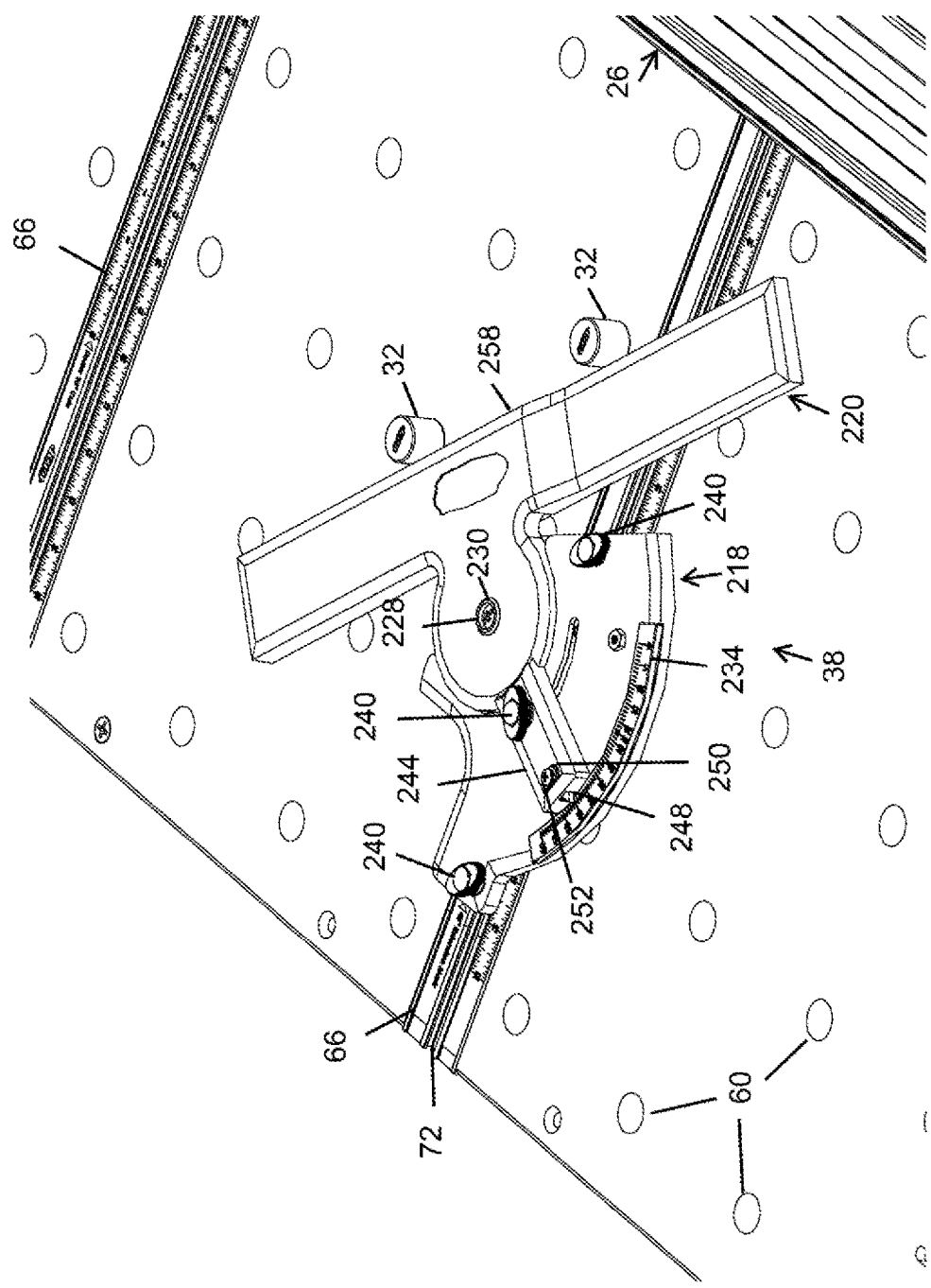
FIG. 88 is a close-up top perspective view of the miter gauge shown in FIG. 81 used in association with the benchtop shown in FIG. 1, the view showing the miter gauge attached to the benchtop by a pair connections to the center-positioned groove of a table track, the view showing the miter gage placed at a 45° angle to the front edge of the benchtop and cutting edge of the saw track, the view showing a calibration being performed wherein the front stop surface of the stop arm of the miter gauge is placed in flat and flush engagement with two bench dogs positioned at a 45° angle to the front edge of the benchtop and the cutting edge of the saw track, the view showing the front end of the stop arm of the miter gauge extending toward but not under the saw track, the view showing the pointer pointing to the precise reading on the measuring indicia of the miter gauge.

Use Case: Installation and Calibration of Miter Gauge to Benchtop:

With reference to FIG. 88, as one example, one manner or method of calibrating the miter gauge 38 to the features of benchtop 24 (such as table tracks 66, edge tracks 54 and the grid of bench dog holes 60) is presented.

In this example, miter gauge 38 is calibrated to the saw track 26 and benchtop 24 by first inserting the head 280 of fasteners 238 into the center-positioned groove 72 of table track 66 and sliding the miter gauge 38 onto the benchtop 24. Two or more bench dogs 32 are inserted into bench dog holes 60 in benchtop 24 that are positioned at a forty-five degree angle from one another. Next, the miter gauge 38 is slid along table track 66 until the stop surface 258 of stop arm 254 engages the two or more bench dogs 32. As the stop surface 258 of stop arm 254 engages the bench dogs 32 the guide 220 is allowed to rotate on the pivot point formed by opening 228 and fastener 230 that connects guide 220 and base 218. By engaging the bench dogs 32 positioned at a forty-five degree angle and allowing guide 220 to rotate with respect to base 218 allows miter gauge 38 to assume a forty-five degree angle. That is, in this way, miter gauge 38 is being calibrated to the on-table features of benchtop 24 (which in this case are two bench dogs 32 placed in bench dog holes 60 of benchtop 24).

In this position, the guide 220 is positioned at a forty-five degree angle to the saw track 26 and the other features of the benchtop 24. Calibration of the miter gauge 38 to the benchtop 24 for other angles is accomplished by loosening the fastener 252 in slot 250 of arm 244 which allows for relative movement of indicator 246. Once fastener 252 is loosened, the indicator 246 is adjusted by sliding fastener 252 along slot 250 until the pointer 248 precisely points to the forty-five degree angle mark on measuring indicia 234. Once pointer 248 precisely points to the forty-five degree angle mark on measuring indicia 234, fastener 252 is again tightened thereby locking pointer 248 in place.

In this way, the miter gauge 38 is precisely calibrated to the features of benchtop 24. Once calibrated, as the guide 220 is rotated with respect to the base 218 the pointer 248 will precisely point to the angle at which the guide 220 is positioned as is indicated on the angular measuring indicia 234. Once calibrated, miter gauge 38 may be positioned at practically any angle with respect to benchtop 24 and saw track 26. The miter gauge 38 may also be slid infinitely along the table tracks 66 to any position. In addition, the forward end of arm 244 may be positioned under saw track 26 to ensure that the angle of workpiece 42 is supported as close to the cutting edge 98 as possible to ensure optimum accuracy.

Notably, miter gauge 38 may be calibrated at any other angle besides forty-five degrees using the same or a similar process as is described herein. In addition, when the miter gauge 38 is removed from benchtop 24 and table tracks 66 and later reinstalled, the calibration of miter gauge 38 may be quickly and easily checked by setting the miter gauge 38 to a forty-five degree angle and dropping two bench dogs 32 into bench dog holes 60 at a forty-five degree angle. If the miter gauge 38 reads true, no adjustment is needed. Alternatively, if the miter gauge 38 is off, adjustment is simply, quickly and easily made in the manners described herein.

Figure 89:
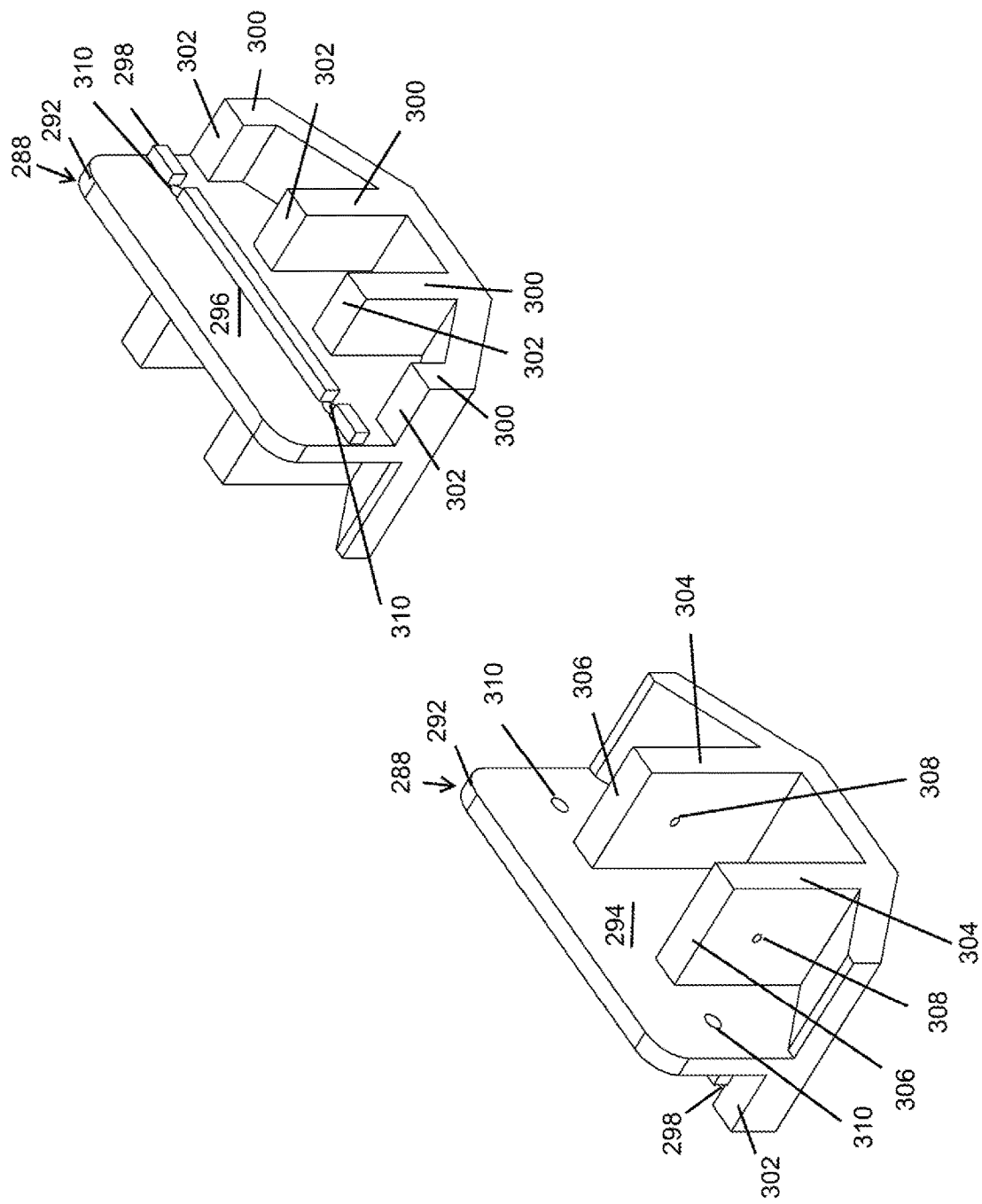
FIG. 89 is a perspective view of a pair of brackets that are configured to connect a support board to the benchtop shown in FIG. 1 by way of connection to an edge track connected to the benchtop.
Figure 90:
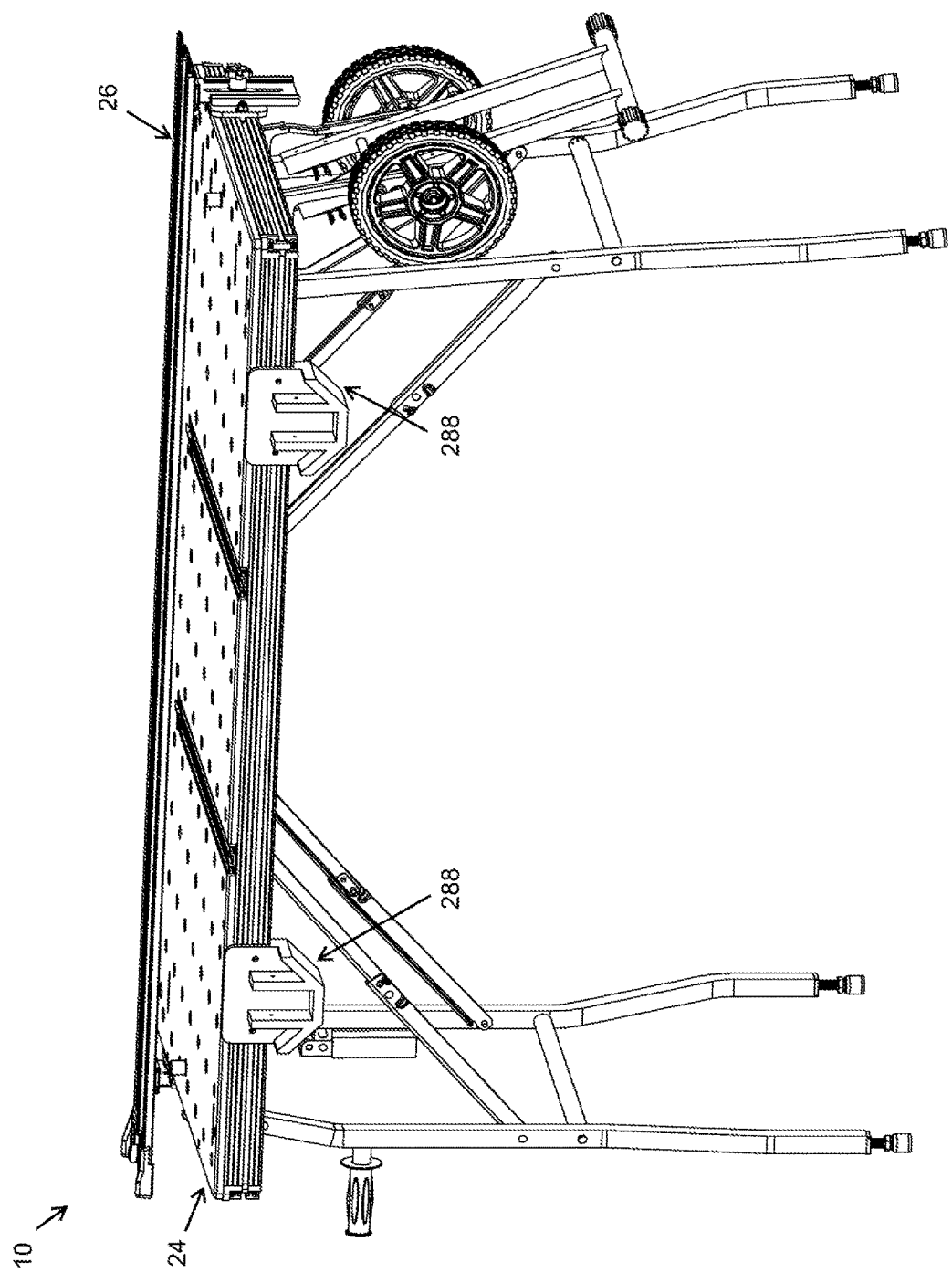
FIG. 90 is a perspective view of the pair of brackets shown in FIG. 89 connected to an edge track of the benchtop.
Figure 91:
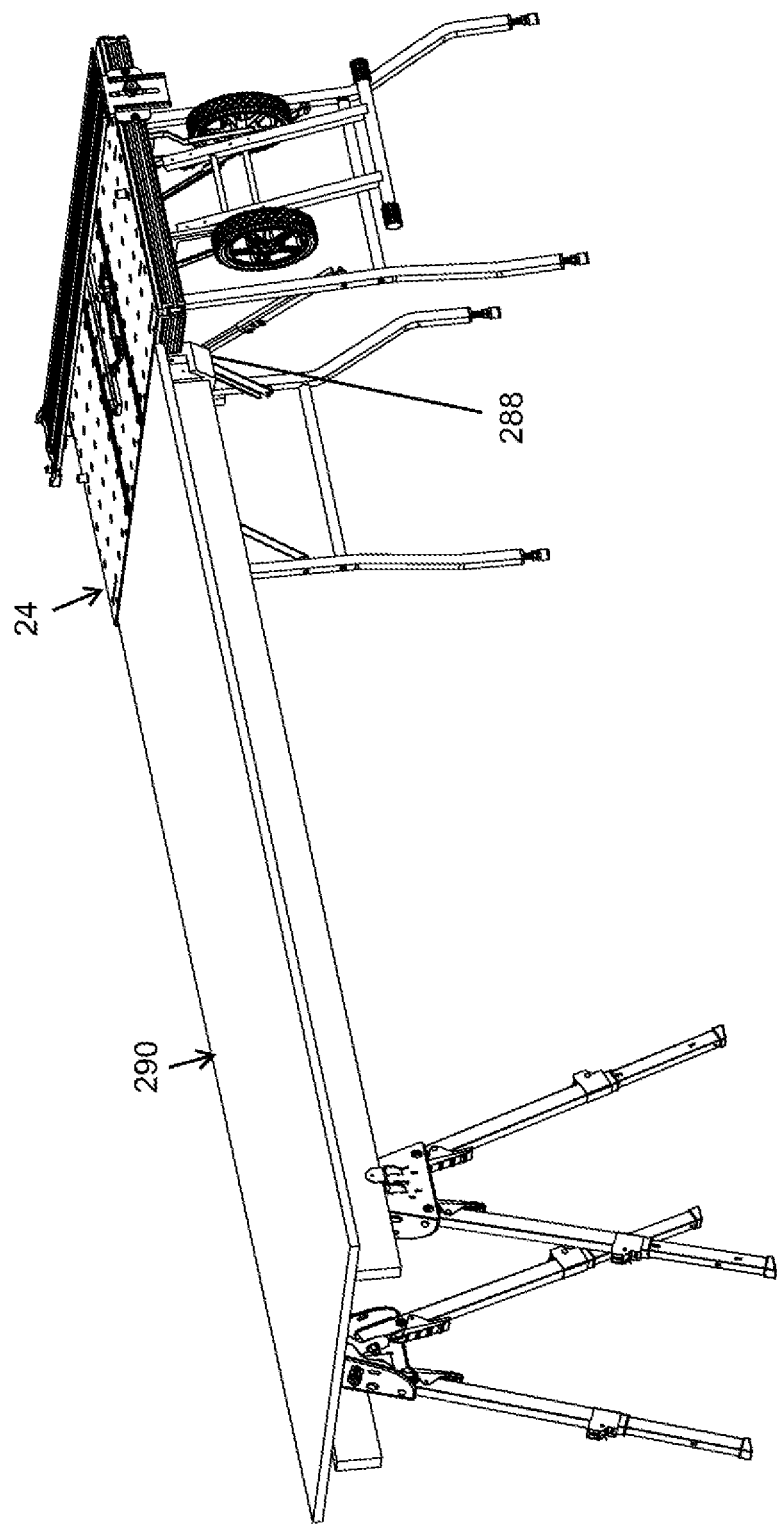
FIG. 91 is a perspective view of the pair of brackets shown in FIG. 89 connected to an edge track of the benchtop, the view showing a pair of support boards connected to the brackets and an extended benchtop surface connected to the pair of support boards, the view showing the free end of the support boards supported by saw horses.
Figure 92:
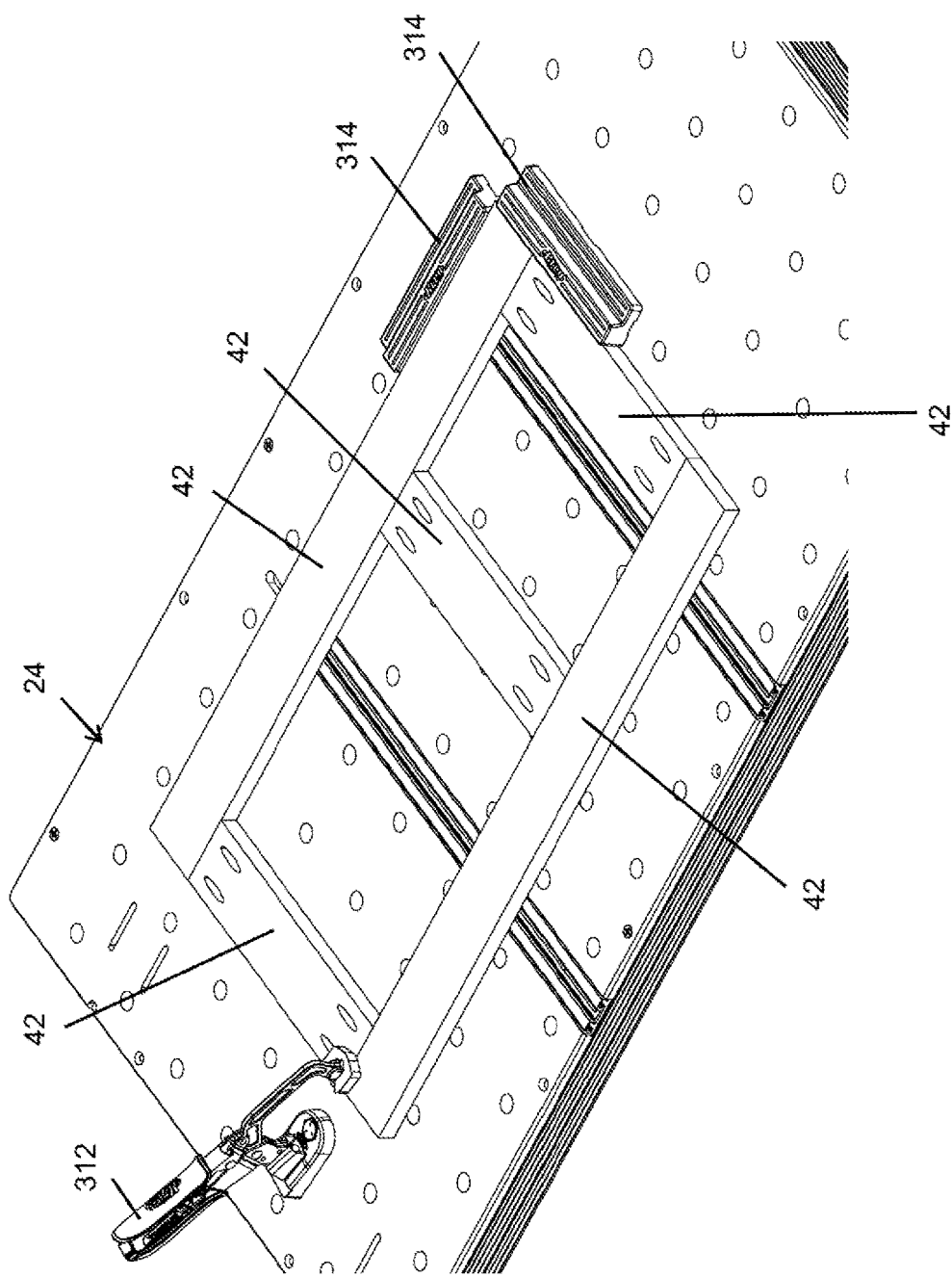
FIG. 92 is a perspective top view of the benchtop shown in FIG. 1, the view showing a face frame being formed using a plurality of workpieces with pocket holes therein to form pocket hole joints at their intersections, the view showing a pair of stops connected to the benchtop that support and align a corner of the face frame, the view showing a bench clamp connected to benchtop and clamping an intersection of workpieces on a corner opposite from the corner supported by the stops, this view is a use case example of how the system may be used in applications other than cutting by simply removing the saw track.
Figure 93:
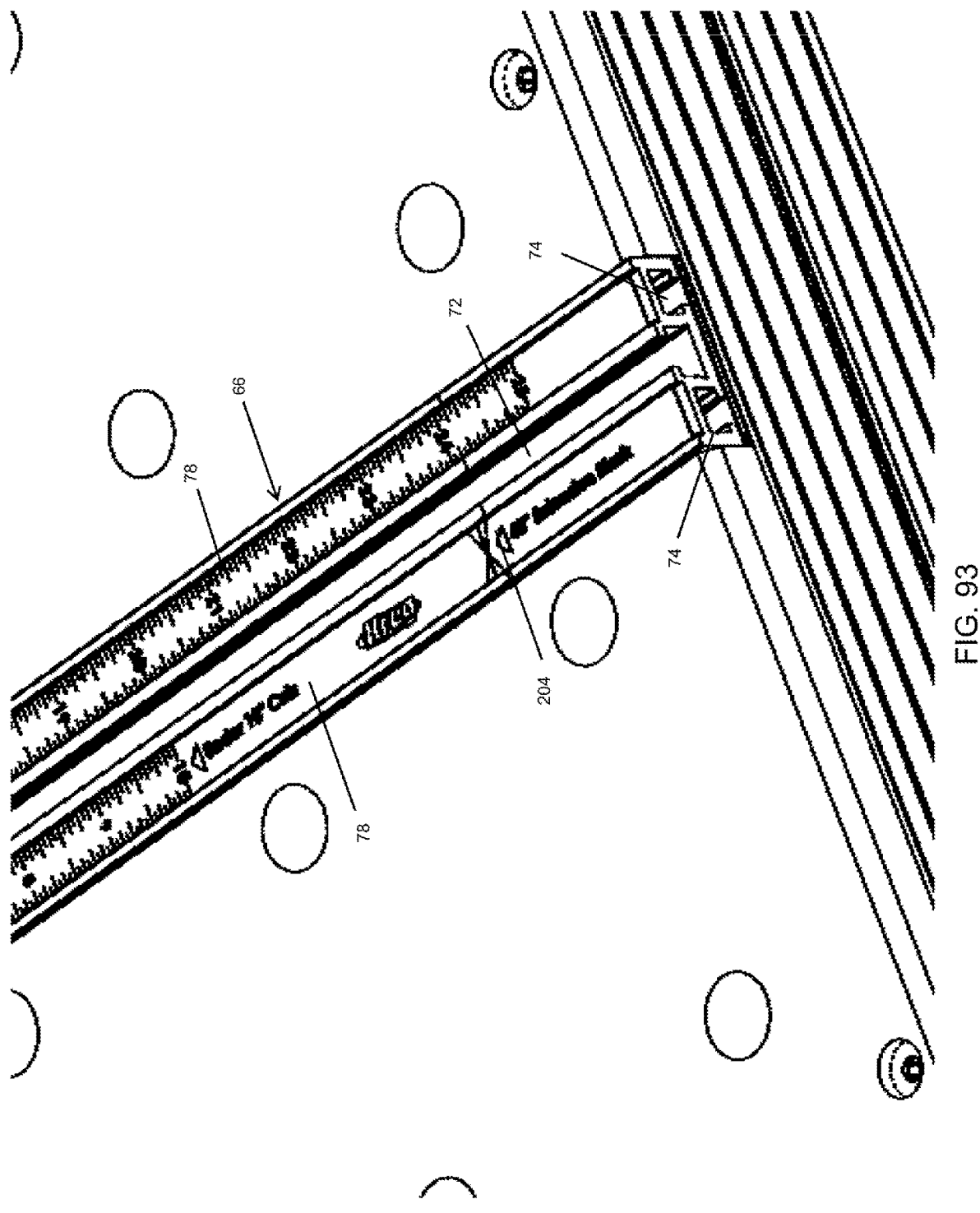
FIG. 93 is a close up perspective view of an end of a table track, the view showing the table tracks having a centrally positioned upwardly facing groove with a downward facing groove on each side of the centrally positioned groove, the view showing measuring grooves positioned on each outward side of the table track that face upward, the view showing measuring members positioned within each of the measuring grooves wherein the measuring members are measuring tapes that are adjustable within the measuring groves, the view showing one measuring member for use when a narrow rip stop is used in an under-the-saw track configuration and other measuring member for measuring when the rearward edge of the workpiece is not under the saw track, the view also showing a mark for use when using a wide rip stop.
Figure 94:
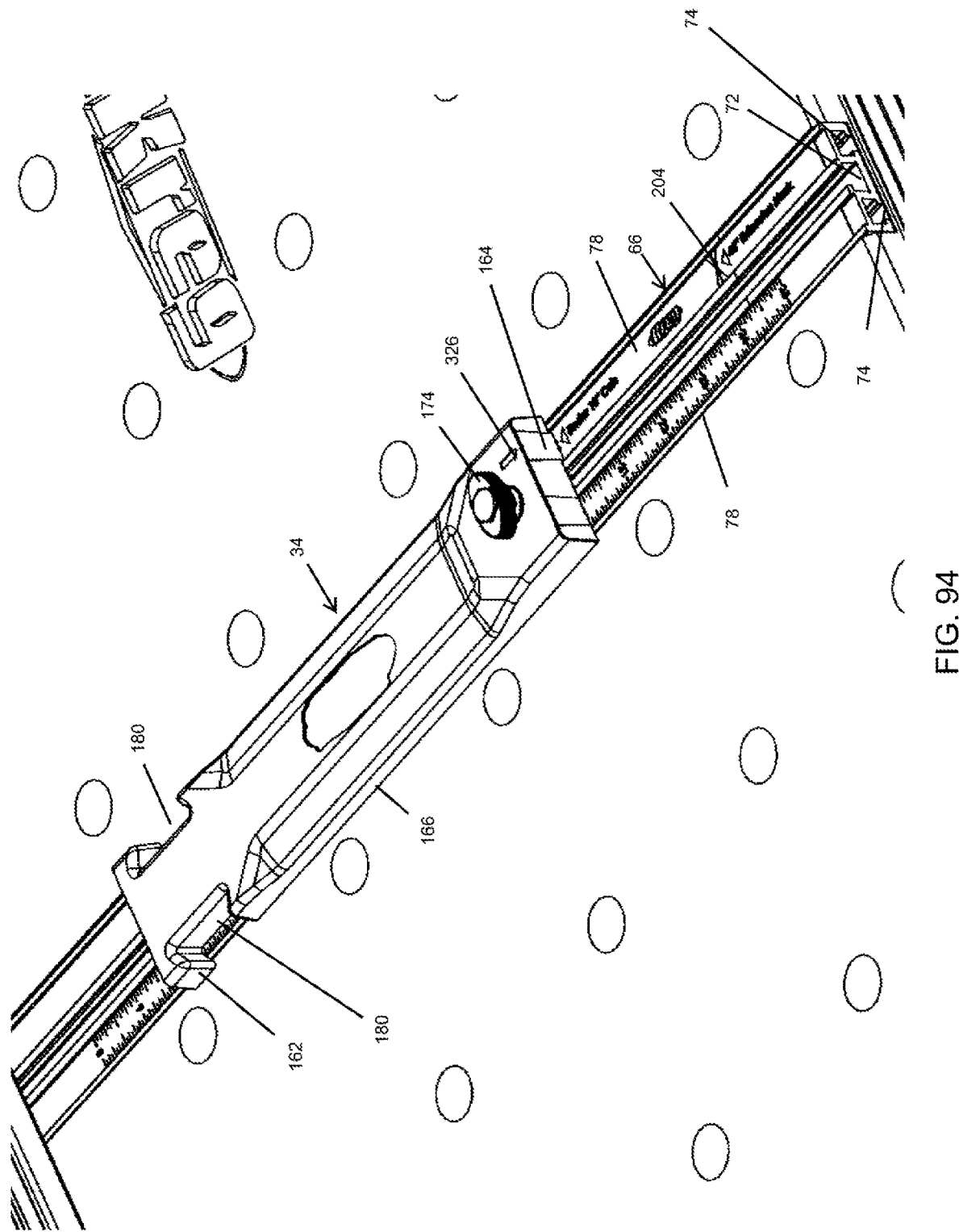
FIG. 94 is a close-up perspective view of the table track as is shown in FIG. 93, the view showing a narrow rip stop attached to the table track, the view showing the narrow stop end facing forward toward the saw track for a narrow cut.
Figure 95:
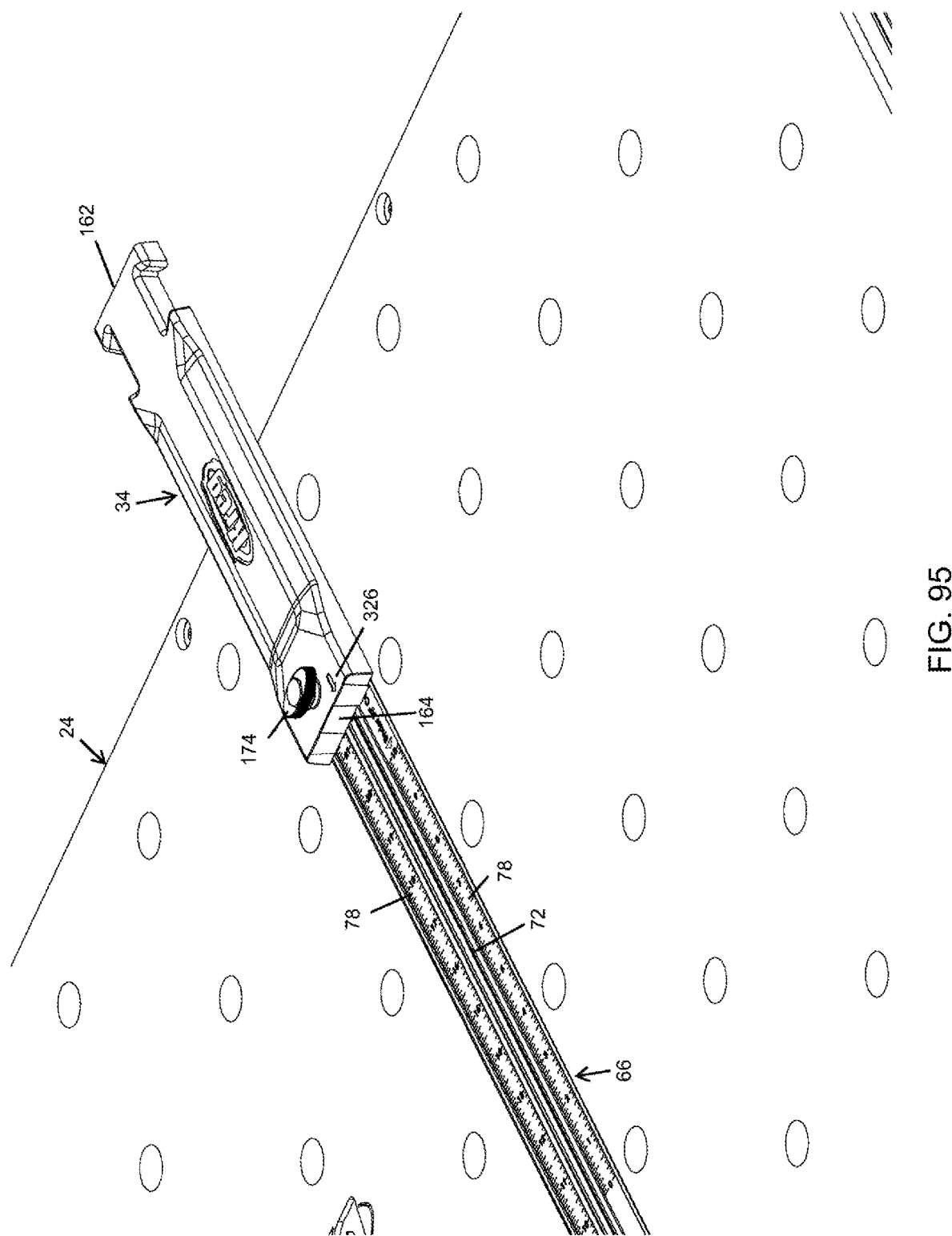
FIG. 95 is a close-up perspective view of the table track as is shown in FIG. 93, the view showing a narrow rip stop attached to the table track, the view showing the wide stop end facing forward toward the saw track for a wider cut than what is shown in FIG. 94.
Figure 96:
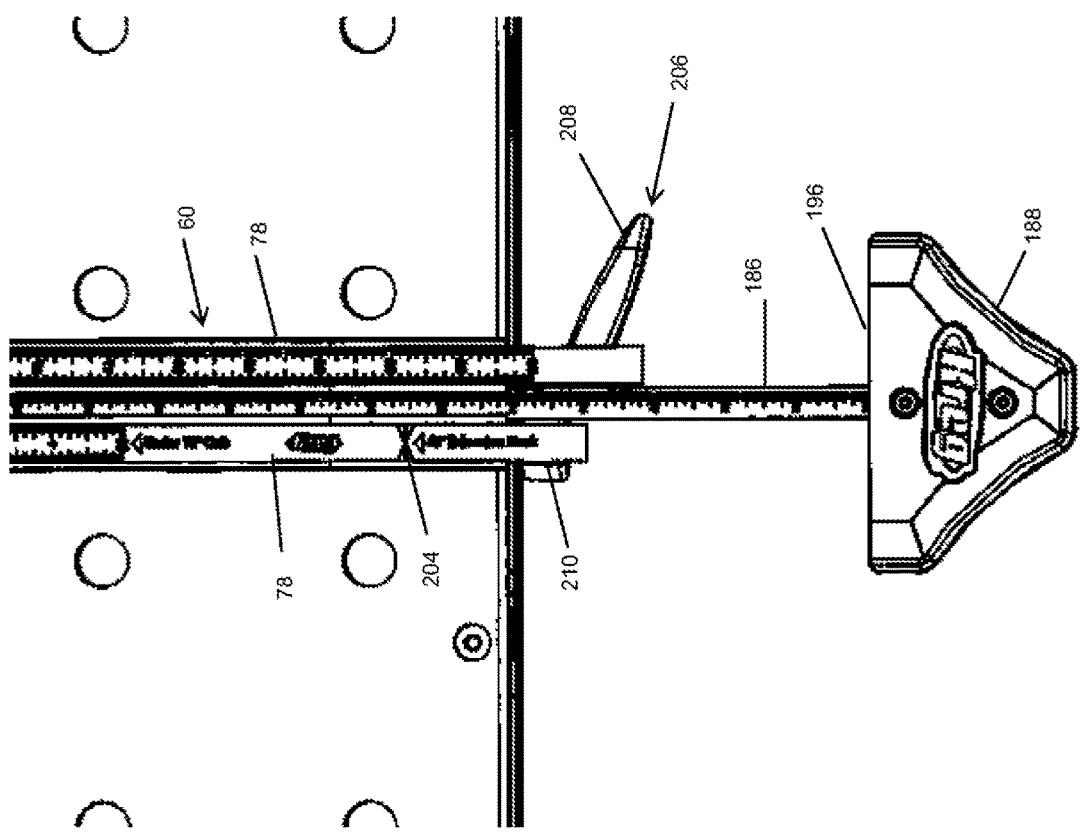
FIG. 96 is a top elevation view of the table track as is shown in FIG. 93, the view showing a wide rip stop connected to the center-positioned groove of the table top, the view showing the lock member positioned below the arm of the wide rip stop, the view showing the mark in a measuring member where the measurement is to be taken on the arm of the wide rip stop to be calibrated to the cutting edge of the saw track.

Brackets:

In one arrangement, system 10 includes brackets 288. Brackets 288 are formed of any suitable size, shape and design and is configured to facilitate constructing an extended benchtop surface 290 for system 10. With reference to FIGS. 89, 90 and 91, in the arrangement shown, as one example, brackets 288 include a center plate 292 that is generally flat and planar in shape that extends between a forward surface 294 and a rearward surface 296. The rearward surface 296 includes a protrusion 298 that extends from side to side across center plate 292. This protrusion 298 is configured to be received within groove 58 of edge tracks 54. The rearward surface 296 of bracket 288 includes a plurality of support members 300 that extend rearward a distance therefrom. These vertical support members 300 terminate in an upper edge 302 that is configured to engage the bottom surface of the edge track 54 when bracket 288 is installed upon edge track 54.

The forward surface 294 of bracket 288 includes a plurality of support members 304 that extend forward a distance therefrom. These vertical support members 304 terminate in an upper edge 306 that in one arrangement and manner of use is configured to engage the bottom surface of a sheet of material when bracket 288 is installed upon edge track 54 that extends the upper surface of benchtop 24. That is, the upper surface 306 of support members 304 is stepped below the upper surface of benchtop 24 approximately the thickness of a standard sheet of material, such as ¾ of an inch or any other standard thickness. In this way, when brackets 288 are installed on edge tracks 54, a standard thickness sheet of material may be placed on top of the upper surface of the support members 304 which will serve as a seamless extension of the benchtop 24. Also, in one arrangement, the height and width of the support members 304 are spaced apart so as to receive a conventional board, such as a 2×4 therein. In one arrangement, when a board is positioned within the pocket formed by opposing support members 304 the upper surface of the board may be flush with the upper surface of benchtop 24, however in alternative arrangements the top surface of the board may be proud of or recessed to the upper surface benchtop 24. In one arrangement, when boards, such as 2×4s are placed within the pockets formed between opposing support members 304, the top surface of these boards are positioned a distance below the top surface of benchtop 24 so as to facilitate reception of a standard thickness of a sheet of material (such as ¾ of an inch) so as to allow the upper surface of the sheet material placed on top of these boards to be flush with, or just slightly recessed to, the upper surface of the benchtop 24. Also, in the arrangement shown, support members 304 include an opening 308 that is configured to receive a fastener, such as a screw or bolt, or the like, that is configured to affix the plank or board to the bracket 288 between support members 304. Similarly, the center plate 292 includes a pair of openings 310 that are configured to receive fasteners that attach brackets 288 to edge tracks 54, in the same or a similar manner to that discussed with respect to lock member 206.

Brackets 288 may be configured to themselves stand flush with, proud of, or recessed to the top surface of benchtop 24. Similarly, brackets 288 may be configured such that when a board, such as a 2×4, or a sheet of material, such as a ¾ inch sheet of plywood, is held by brackets 288, the upper surface of these components may be flush with, proud or, or recessed to the top surface of benchtop 24.

With reference to FIGS. 100-103 an alternative arrangement of brackets 288 is presented. This arrangement is similar to the arrangement presented above, as such, unless specifically stated otherwise, the teachings of the prior arrangement apply to and are incorporated into arrangement. In this arrangement, brackets 288 include a pair of opposing sidewalls 328 that extend in approximate parallel spaced relation to one another. The lower end of sidewalls 328 connect to center wall 330 that extends between the opposing sidewalls 328 and connects their lower ends. In the arrangement shown, as one example, center wall 330 extends in approximate perpendicular alignment to sidewalls 328. In the arrangement shown, as one example a rear wall 332 extends between opposing sidewalls 328 and connects adjacent sidewalls 328 at their rearward side.

In the arrangement shown, as one example, a pair of arms 334 are connected to the upper end of sidewalls 328 and extends upward and outward therefrom in approximate perpendicular alignment to the plane formed by sidewalls 328. The upper end of arms 334 include a lock feature 336 that is configured to engage and lock to grove 58 in edge track 54 of benchtop 24.

Figure 101:
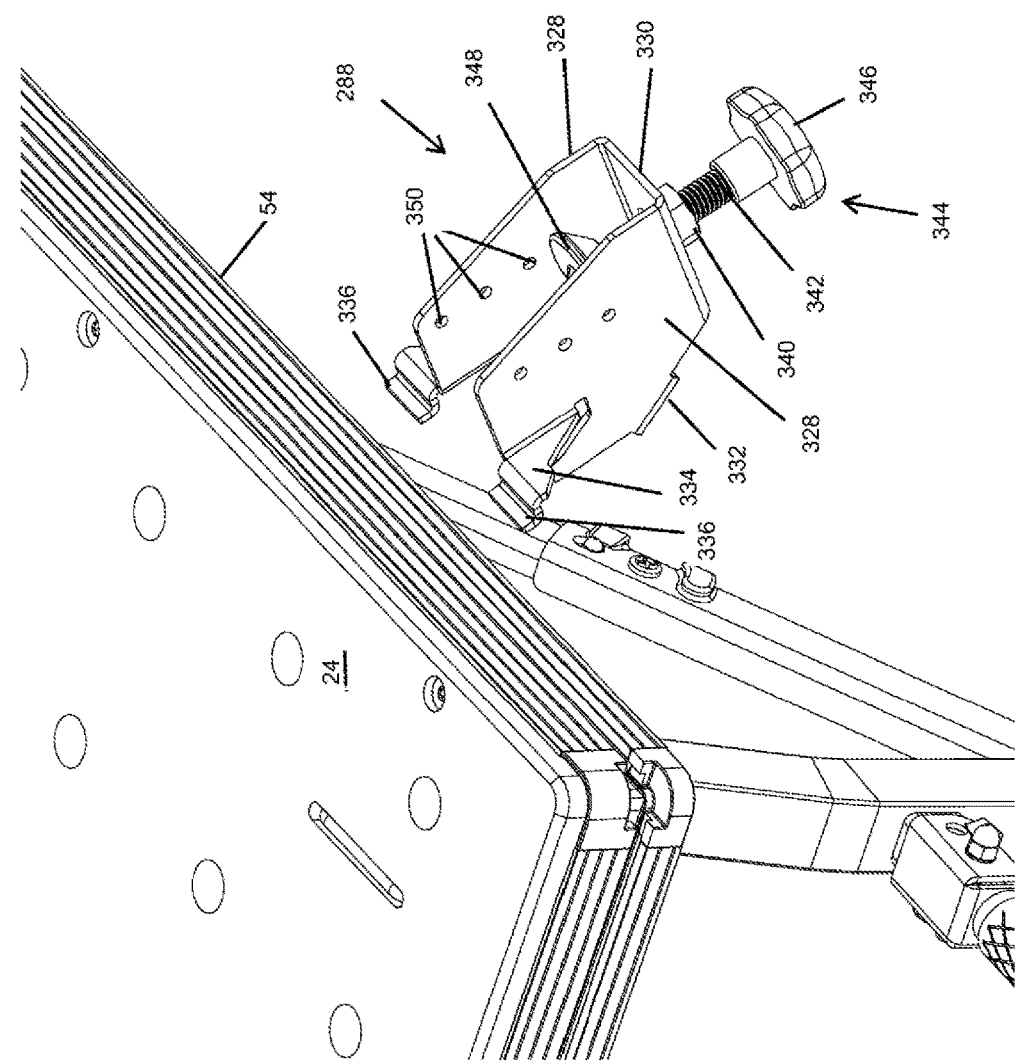
FIG. 101 is a perspective view of a bracket shown in FIG. 100 about to be installed in the groove of an edge track of the benchtop shown in FIG. 1, the view showing the bracket at an angled position with the lower end of the bracket rotated upward as the lock feature at the upper end of the bracket is angled toward the groove in the edge track.
Figure 102:
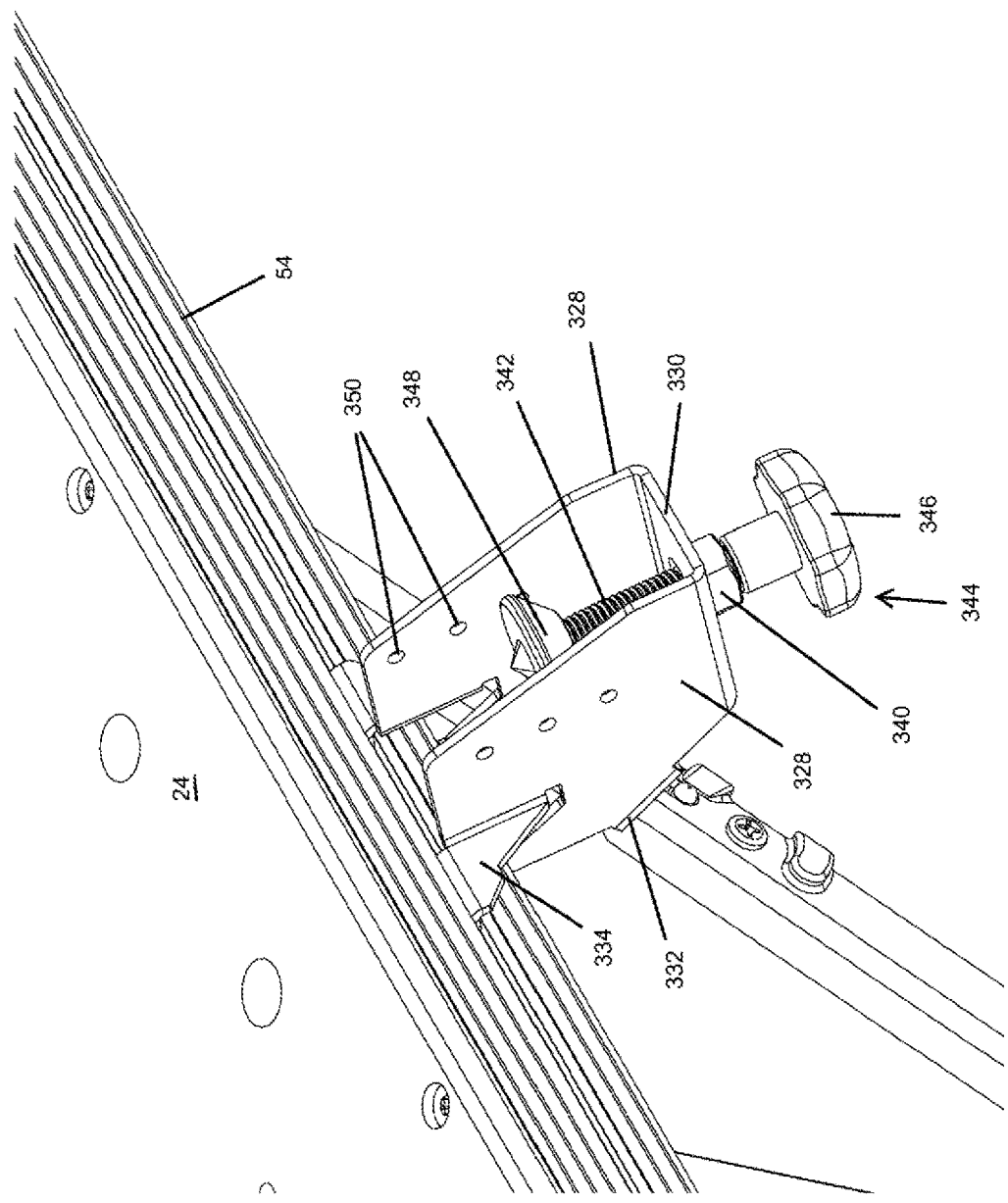
FIG. 102 is a perspective view of a bracket shown in FIG. 101 the view showing the bracket at an angled position with the lower end of the bracket rotated upward as the lock feature at the upper end of the bracket is angled toward the groove in the edge track, the view showing the lock feature inserted within the groove of the edge track.

In the arrangement shown, as one example, with reference to FIGS. 101 and 102, brackets 288 are installed at any position along the length of edge tracks 54 by aligning lock feature 336 of brackets 288 at an angle to edge tracks 54 such that the center wall 330 is slightly raised or rotated forward away from edge track 54. At this angle, the upper end of lock feature 336 may be inserted into groove 58 of edge track 54. Once the upper end of lock feature 336 is inserted into groove 58 of edge track 54, the lower end of brackets 288 may be rotated downward until a fully installed position is achieved, which is shown in FIG. 103.

Figure 103:
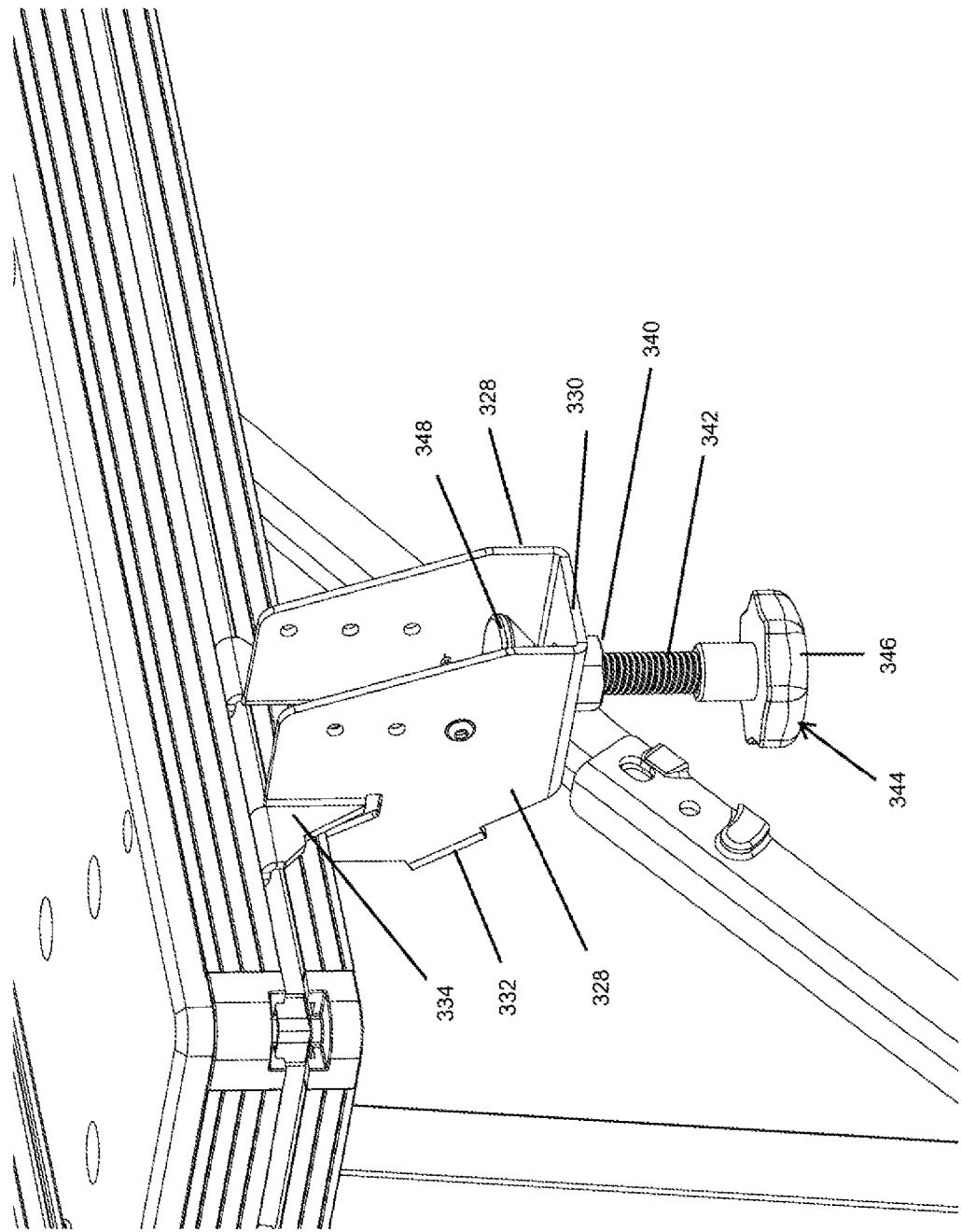
FIG. 103 is a perspective view of a bracket shown in FIG. 102 the view showing the bracket lowered into a locked position with the lower end of the bracket rotated downward as the lock feature at the upper end of the bracket is inserted within the groove in the edge track.

In this fully installed position, as is shown in FIG. 103, the rearward portion of sidewalls 328 engages the lower surface of edge tracks 54 and the rearward surface of arms engage the forward surface of edge tracks 54 while the lock feature 336 is locked within groove 58 of edge tracks 54. This provides a strong, durable and rigid, yet removable, connection between brackets 288 and edge tracks 54.

Center wall 330 includes an opening 338 that is approximately centrally positioned within center wall 330 between opposing sidewalls 328. A threaded member 340 is connected to the lower side of opening 338 and receives the threaded shaft 342 of an adjustment member 344. In one arrangement, threaded member 340 is essentially a threaded nut attached to the lower side of center wall 330 which is centered upon opening 338. In one arrangement, threaded member 340 is welded to center wall 330. Adjustment member 344 includes a knob 346 positioned at the lower end of threaded shaft 340 that is configured to facilitate user imparted rotation upon adjustment member 344 to raise or lower adjustment member 344. Adjustment member 344 includes a support member 348 positioned at the upper end of threaded shaft 342 that is configured to engage and support the lower end a support board, such as a 2×4, placed within between the sidewalls 328 of brackets 288. In the arrangement shown, as one example, support member 348 has a generally cylindrical and flat upper surface with a single centralized point extending upward therefrom. This flat circular shape with a centralized point is configured to receive, hold and support a board, such as a 2×4, while allowing for rotation of threaded shaft 342 to adjust the height of support member 348.

In use, brackets 288 are attached to edge tracks 54 and brackets 288 are attached to the groove 58 of edge tracks 54 in the desired positions. Next, the ends of support boards, such as 2×4s are placed within the opening within brackets 288 between opposing sidewalls 328, center wall 330 and rear wall 332. In this position, the lower end of the support board rests upon the upper surface of support member 348 therein and the point of support member 348 digs into the material of the support board thereby helping to hold it in place within bracket 288. Next, the user adjusts the height of the adjustment member 344 until the upper surface of the support board is at the desired position relative to the upper surface of benchtop 24. This vertical adjustment is accomplished by user applied rotation of knob 346 which rotates threaded shaft 342 which moves vertically within bracket 288 by way of the threaded engagement with threaded member 340. In the arrangement shown in FIG. 100 the bracket 288 to the right has a support member 348 in a raised position whereas the bracket 288 to the left has a support member 348 in a lowered position. Once the desired vertical position is achieved, the user may then pass screws or bolts or other fasteners through openings 350 in the sidewalls 328 of brackets 288 thereby securing the ends of support boards within brackets 288.

In this way, a convenient, easy to install, easy to adjust, strong, rigid, and durable bracket 288 is presented that is infinitely adjustable laterally as well as vertically and can be used with practically any support board.

Other Uses of Benchtop:

Benchtop 24 may be used for countless other purposes in addition to those shown and described herein. As one example, with reference to FIG. 91, benchtop 24 may be used to assemble and clamp face frames using a bench clamp 312, and stops 314, both of which utilize bench dog holes 60.

Wheels & Stand:

In one arrangement, to facilitate easy portability and storage, benchtop 24 includes a pair of wheels 316 and a stand 318. Wheels 316 and stand 318 may be formed of any suitable size, shape and design and are configured to allow the benchtop 24 to be rolled around on the wheels 316 to facilitate easy transport, and stand 318 is configured to facilitate vertical storage of the benchtop 24 so as to reduce the storage space requirements. In the arrangement shown, as on example, wheels 316 and stand 318 are connected to benchtop 24 by a pair of braces 320 and stand 318 moves between an extended position, wherein the stand 318 extends above the benchtop 24 so as to operate as a stand, and a retracted position, wherein stand 318 is positioned below the benchtop 24 and is out of the way so as to allow use of the benchtop 24.

From the above discussion it will be appreciated that the adaptive cutting system 10 and related methods of use, presented herein improves upon the state of the art.

Specifically, the adaptive cutting system 10 and related methods of use presented: is safe to use; is efficient to use; is relatively inexpensive; is capable of making long straight cuts; can be used to cut both large and small pieces easily and; is accurate; is efficient; provides precise alignment; can be used with workpieces with a wide range of thicknesses; is easy to learn how to use; is relatively small in size and shape; provides the benefits of a circular saw and a table saw in a single device; holds workpieces in a firm and rigid manner; is easy to set up; is easy to take down; is formed of a minimum number of parts; is simple to use; is easier to use than prior art systems; is unique; provides new capabilities to existing tools; can be used with a replaceable benchtop; is high quality; has a robust design; has a long useful life; provides accurate and clean cuts; helps prevent chip tear-out; is durable; saves time; is fun to use; can be used with workpieces of practically any material; is easily portable and can be used on a job site; makes it easier to measure for cuts; makes measuring more repeatable than prior art systems; reduces or eliminates the need for a helper when making cuts; provides support for both sides of the workpiece after a cut; among countless other advantages and improvements.

It will be appreciated by those skilled in the art that other various modifications could be made to the device without parting from the spirit and scope of this disclosure. All such modifications and changes fall within the scope of the claims and are intended to be covered thereby.

The invention claimed is:

1. An adaptive cutting system, comprising:
   a benchtop;
   the benchtop having a plurality of bench dog holes;
   the plurality of bench dog holes positioned in the benchtop in a pattern;
   a saw track;
   the saw track extending a length between opposing ends;
   the saw track having a cutting edge;
   a hinge member;
   the hinge member operatively connected to the benchtop;
   the hinge member operatively connected to the saw track;
   the saw track configured to receive and guide a saw;
   an alignment member;
   the alignment member having an alignment edge;
   wherein the alignment member is connected to at least one of the plurality of bench dog holes;
   wherein the alignment member is aligned with the cutting edge of the saw track by way of the alignment member's connection to the at least one of the plurality of bench dog holes;
   wherein the hinge member is configured to move the saw track between a raised position, that allows the placement and removal of workpieces under the saw track, and a lowered position, that facilitates engagement of workpieces under the saw track;
   wherein when in the raised position the saw track extends approximately horizontally between the opposing ends;
   wherein the cutting edge of the saw track is aligned with the pattern of the plurality of bench dog holes as well as the alignment edge of the alignment member.

2. The system of claim 1, wherein the alignment member is connected to at least two of the plurality of bench dog holes.

3. The system of claim 1, wherein the alignment edge of the alignment member is fixed in an angular alignment when the alignment member is connected to the at least one of the plurality of bench dog holes.

4. The system of claim 1, wherein the alignment edge of the alignment member is angularly adjustable when the alignment member is connected to the at least one of the plurality of bench dog holes.

5. The system of claim 1, wherein the alignment edge of the alignment member is adjustable when the alignment member is connected to the at least one of the plurality of bench dog holes.

6. The system of claim 1, wherein the alignment edge of the alignment member is aligned parallel to the cutting edge of the saw track when the alignment member is connected to the at least one of the plurality of bench dog holes.

7. The system of claim 1, wherein the alignment member is a miter gauge.

8. The system of claim 1, wherein the pattern of the plurality of bench dog holes is in a square grid pattern.

9. The system of claim 1, wherein the pattern of the plurality of bench dog holes is in a square grid pattern, wherein the cutting edge of the saw track is aligned to be squared to the square grid pattern of the plurality of bench dog holes.

10. The system of claim 1, the system further comprising at least one edge track connected to the benchtop, wherein the at least one edge track extends along at least one of a front side, a back side, a left side, and a right side of the benchtop.

11. The system of claim 1, further comprising:
a first table track;
wherein the first table track is configured to receive and guide movement of at least one accessory;
the first table track extending a length between opposing ends;
the first table track positioned in the benchtop;
the first table track having measuring indicia;
wherein the first table track is perpendicularly aligned to the cutting edge of the saw track.

12. The system of claim 1, further comprising:
a first table track;
wherein the table track is configured to receive and guide movement of at least one accessory;
the first table track extending a length between opposing ends;
the first table track positioned in the benchtop;
the first table track having measuring indicia;
wherein the first table track is perpendicularly aligned to the cutting edge of the saw track,
wherein the measuring indicia of the first table track is at least one measuring tape, wherein the at least one measuring tape is adjustable to an infinite number of positions within the first table track;
wherein the first table track has a groove therein that is configured to receive the at least one accessory.

13. An adaptive cutting system, comprising:
a benchtop;
the benchtop having a top side, a front side, a back side, a left side, and a right side;
the benchtop having a plurality of bench dog holes;
the plurality of bench dog holes positioned in the benchtop in a pattern;
a saw track;
the saw track extending a length between opposing ends;
the saw track having a cutting edge;
the saw track configured to receive and guide a saw;
a pair of hinge members operatively connected to the benchtop and the saw track;
an alignment member;
the alignment member having an alignment edge;
the alignment member configured and arranged to connect to at least one of the bench dog holes and align with the pattern of the plurality of bench dog holes by way of the alignment member's connection to the at least one of the plurality of bench dog holes;
wherein the pair of hinge members are configured to be laterally adjustable to, and locked in place at, an infinite number of positions to facilitate alignment of the cutting edge of the saw track with the pattern of the plurality of bench dog holes and the alignment edge of the alignment member.

14. The system of claim 13, wherein the alignment member is connected to at least two of the plurality of bench dog holes.

15. The system of claim 13, wherein the alignment edge of the alignment member is fixed in an angular alignment when the alignment member is connected to the at least one of the plurality of bench dog holes.

16. The system of claim 13, wherein the alignment edge of the alignment member is angularly adjustable when the alignment member is connected to the at least one of the plurality of bench dog holes.

17. The system of claim 13, wherein the alignment edge of the alignment member is adjustable when the alignment member is connected to the at least one of the plurality of bench dog holes.

18. The system of claim 13, wherein the alignment edge of the alignment member is aligned parallel to the cutting edge of the saw track when the alignment member is connected to the at least one of the plurality of bench dog holes.

19. The system of claim 13, wherein the alignment member is a miter gauge.

20. The system of claim 13, wherein the pattern of the plurality of bench dog holes is a square grid pattern.

21. The system of claim 13, wherein the pattern of the plurality of bench dog holes is a square grid pattern, wherein the cutting edge of the saw track is aligned to be squared to the square grid pattern of the plurality of bench dog holes.

22. The system of claim 13, the system further comprising at least one edge track connected to the benchtop, wherein the at least one edge track extends along at least one of the front side, the back side, the left side, and the right side of the benchtop.

23. The system of claim 13, further comprising:
a first table track;
wherein the table track is configured to receive and guide movement of at least one accessory;
the first table track extending a length between opposing ends;
the first table track positioned in the benchtop;
the first table track having measuring indicia;
wherein the first table track is perpendicularly aligned to the cutting edge of the saw track.

24. The system of claim 13, further comprising:
a first table track;
wherein the table track is configured to receive and guide movement of at least one accessory;
the first table track extending a length between opposing ends;
the first table track positioned in the benchtop;
the first table track having measuring indicia;
wherein the first table track is perpendicularly aligned to the cutting edge of the saw track,
wherein the measuring indicia of the first table track is at least one measuring tape, wherein the at least one measuring tape is adjustable to an infinite number of positions within the first table track; and
wherein the first table track has a groove therein that is configured to receive the at least one accessory.

25. An adaptive cutting system, comprising:
a benchtop;
the benchtop having a top side, a front side, a back side, a left side, and a right side;
the benchtop having a plurality of bench dog holes;
the plurality of bench dog holes positioned in the benchtop in a pattern;
a saw track;
the saw track extending a length between opposing ends;
the saw track having a cutting edge;
the saw track operatively connected to the benchtop adjacent a first one of the opposing ends of the saw track by a first hinge member;
the saw track operatively connected to the benchtop adjacent a second one of the opposing ends of the saw track by a second hinge member;
the saw track configured to receive and guide a saw;
wherein the saw track is configured to move between a raised position, that allows the placement and removal of workpieces under the saw track, and a lowered position, that facilitates engagement of workpieces under the saw track;

an alignment member;
the alignment member having an alignment edge;
the alignment member configured and arranged to connect to a pair of the bench dog holes and align with the pattern of the plurality of bench dog holes;
wherein the cutting edge of the saw track is aligned with the pattern of the plurality of bench dog holes as well the alignment edge of the alignment member.

26. The system of claim 25, further comprising:
a pair of hinge members;
wherein the pair of hinge members are operatively connected to the benchtop and the saw track;
wherein the pair of hinge members are laterally adjustable to an infinite number of positions to facilitate alignment of the cutting edge of the saw track with the pattern of the plurality of bench dog holes and the alignment edge of the alignment member.

27. The system of claim 25, wherein the alignment edge of the alignment member is fixed in an angular alignment when the alignment member is connected to the pair of the plurality of bench dog holes.

28. The system of claim 25, wherein the alignment edge of the alignment member is angularly adjustable when the alignment member is connected to the pair of the plurality of bench dog holes.

29. The system of claim 25, wherein the alignment edge of the alignment member is adjustable when the alignment member is connected to the pair of the plurality of bench dog holes.

30. The system of claim 25, wherein the alignment edge of the alignment member is aligned in a parallel manner to the cutting edge of the saw track when the alignment member is connected to the pair of the plurality of bench dog holes.

31. The system of claim 25, wherein the alignment member is a miter gauge.

32. The system of claim 25, wherein the pattern of the plurality of bench dog holes is a square grid pattern.

33. The system of claim 25, wherein the pattern of the plurality of bench dog holes is a square grid pattern, wherein the cutting edge of the saw track is aligned to be squared to the square grid pattern of the plurality of bench dog holes.

34. The system of claim 25, the system further comprising at least one edge track connected to the benchtop, wherein the at least one edge track extends along at least one of the front side, the back side, the left side, and the right side of the benchtop.

35. The system of claim 25, further comprising:
a first table track;
wherein the first table track is configured to receive and guide movement of at least one accessory;
the first table track extending a length between opposing ends;
the first table track positioned in the benchtop;
the first table track having measuring indicia;
wherein the first table track is perpendicularly aligned to the cutting edge of the saw track.

36. The system of claim 25, further comprising:
a first table track;
wherein the first table track is configured to receive and guide movement of at least one accessory;
the first table track extending a length between opposing ends;
the first table track positioned in the benchtop;
the first table track having measuring indicia;
wherein the first table track is perpendicularly aligned to the cutting edge of the saw track;
wherein the measuring indicia of the first table track is at least one measuring tape, wherein the at least one measuring tape is adjustable to an infinite number of positions within the first table track; and
wherein the first table track has a groove therein that is configured to receive the at least one accessory.

37. An adaptive cutting system, comprising:
a benchtop;
the benchtop having a plurality of bench dog holes;
the plurality of bench dog holes positioned in the benchtop in a pattern;
a saw track;
the saw track extending a length between opposing ends;
the saw track having a cutting edge;
a hinge member;
the hinge member operatively connected to the benchtop;
the hinge member operatively connected to the saw track;
the saw track configured to receive and guide a saw;
an alignment member;
the alignment member having an alignment edge;
wherein the alignment member is connected to at least one of the plurality of bench dog holes;
wherein the alignment member is aligned with the cutting edge of the saw track by way of connection of the alignment member to at least one of the plurality of bench dog holes;
wherein the hinge member is configured to move the saw track between a raised position, that allows the placement and removal of workpieces under the saw track, and a lowered position, that facilitates engagement of workpieces under the saw track;
wherein the cutting edge of the saw track is aligned with the pattern of the plurality of bench dog holes as well as the alignment edge of the alignment member;
wherein the hinge member is configured to be vertically adjustable and locked in place, thereby setting the height at which the saw track is positioned when in the lowered position as well as setting the height at which the saw track is positioned when in the raised position.

38. An adaptive cutting system, comprising:
a benchtop;
the benchtop having a plurality of bench dog holes;
the plurality of bench dog holes positioned in the benchtop in a pattern;
a saw track;
the saw track extending a length between opposing ends;
the saw track having a cutting edge;
a hinge member;
the hinge member operatively connected to the benchtop;
the hinge member operatively connected to the saw track;
the saw track configured to receive and guide a saw;
an alignment member;
the alignment member having an alignment edge;
wherein the alignment member is connected to at least one of the plurality of bench dog holes;
wherein the alignment member is aligned with the cutting edge of the saw track by way of connection of the alignment member to at least one of the plurality of bench dog holes;
wherein the hinge member is configured to move the saw track between a raised position, that allows the placement and removal of workpieces under the saw track, and a lowered position, that facilitates engagement of workpieces under the saw track;
wherein the cutting edge of the saw track is aligned with the pattern of the plurality of bench dog holes as well as the alignment edge of the alignment member;

a first table track;

the first table track extending a length between opposing ends;

the first table track positioned in the benchtop;

wherein the first table track includes a first groove, a second groove, and a third groove;

wherein the first groove, second groove, and third groove extend approximately parallel to one another;

wherein the first groove is configured to receive and guide movement of at least one accessory;

wherein the first table track includes a first measuring member positioned within the second groove;

wherein the first measuring member has a set of measuring indicia to facilitate positioning of the at least one accessory in the first table track, wherein the first table track includes a second measuring member positioned within the third groove;

wherein the second measuring member has a second set of measuring indicia to facilitate positioning of the at least one accessory in the first table track.

39. The system of claim 38, wherein the measuring indica is movable within the second groove to facilitate alignment of the measuring indica with the plurality of bench dog holes.

* * * * *